US010177948B2

(12) United States Patent
Murakami et al.

(10) Patent No.: US 10,177,948 B2
(45) Date of Patent: *Jan. 8, 2019

(54) TRANSMISSION METHOD

(71) Applicant: Sun Patent Trust, New York, NY (US)

(72) Inventors: Yutaka Murakami, Kanagawa (JP);
Tomohiro Kimura, Osaka (JP);
Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,579

(22) Filed: Feb. 26, 2018

(65) Prior Publication Data

US 2018/0191538 A1    Jul. 5, 2018

Related U.S. Application Data

(63) Continuation of application No. 15/271,626, filed on Sep. 21, 2016, now Pat. No. 9,942,067, which is a
(Continued)

(30) Foreign Application Priority Data

Apr. 12, 2013    (JP) .................................. 2013-084269
Apr. 12, 2013    (JP) .................................. 2013-084270
(Continued)

(51) Int. Cl.
*H04L 27/36*    (2006.01)
*H04L 27/00*    (2006.01)
(Continued)

(52) U.S. Cl.
CPC .......... *H04L 27/0008* (2013.01); *H04L 27/34* (2013.01); *H04W 28/0263* (2013.01)

(58) Field of Classification Search
CPC ... H04L 27/361; H04L 27/02; H04L 27/2071; H04L 27/389; H04L 27/10
(Continued)

(56) References Cited

U.S. PATENT DOCUMENTS 5,048,056 A * 9/1991 Goldstein ........... H04L 27/3411
375/261
5,113,412 A * 5/1992 Goldstein ........... H04L 27/3411
332/103
(Continued)

FOREIGN PATENT DOCUMENTS

EP    1 901 436    3/2008
JP    11-220505    8/1999
(Continued)

OTHER PUBLICATIONS

International Search Report dated Jun. 10, 2014 in corresponding International Application No. PCT/JP2014/002064.
(Continued)

*Primary Examiner* — James M Perez
(74) *Attorney, Agent, or Firm* — Wenderoth, Lind & Ponack, L.L.P.

(57) ABSTRACT

Provided is a transmission method that contributes to an increase in data reception quality when iterative detection is performed at a receive apparatus side. A transmit apparatus alternates between two types of modulation scheme that each shift amplitude and phase, performs mapping to constellation points according to a selected modulation scheme, and transmits a modulated signal obtained by mapping.

4 Claims, 53 Drawing Sheets

Related U.S. Application Data continuation of application No. 14/781,455, filed as application No. PCT/JP2014/002064 on Apr. 10, 2014, now Pat. No. 9,491,026.

(30) Foreign Application Priority Data

| | | |
|---|---|---|
| Apr. 12, 2013 | (JP) | 2013-084271 |
| May 9, 2013 | (JP) | 2013-099605 |
| May 9, 2013 | (JP) | 2013-099606 |
| May 9, 2013 | (JP) | 2013-099607 |

(51) Int. Cl.
    *H04L 27/34* (2006.01)
    *H04W 28/02* (2009.01)

(58) Field of Classification Search
    USPC .............................. 375/259–285, 295–315
    See application file for complete search history.

(56) References Cited

U.S. PATENT DOCUMENTS

| | | | | |
|---|---|---|---|---|
| 5,119,403 A * | 6/1992 | Krishnan | H04L 25/03343 | 370/207 |
| 5,185,763 A * | 2/1993 | Krishnan | H04L 25/03343 | 375/262 |
| 5,493,586 A * | 2/1996 | Brownlie | H04L 27/3411 | 375/261 |
| 5,675,590 A * | 10/1997 | Alamouti | H03M 13/235 | 379/38 |
| 5,828,695 A * | 10/1998 | Webb | H04L 1/0025 | 375/219 |
| 5,892,879 A * | 4/1999 | Oshima | H03M 13/256 | 348/726 |
| 5,974,090 A * | 10/1999 | Hirao | H04L 27/18 | 329/304 |
| 6,005,897 A * | 12/1999 | McCallister | H03M 13/253 | 375/265 |
| 6,046,629 A * | 4/2000 | Akiyama | H04L 27/389 | 329/304 |
| 6,115,435 A * | 9/2000 | Harada | H04L 27/38 | 375/262 |
| 6,259,744 B1 * | 7/2001 | Lee | H04L 1/0071 | 375/264 |
| 6,400,928 B1 * | 6/2002 | Khullar | H04L 1/0003 | 375/237 |
| 6,421,398 B1 * | 7/2002 | McVey | H03C 3/40 | 332/103 |
| 6,608,843 B1 * | 8/2003 | Murakami | H04L 27/3455 | 370/206 |
| 6,608,868 B1 * | 8/2003 | Murakami | H04L 27/206 | 375/261 |
| 6,889,356 B1 * | 5/2005 | Alamouti | H03M 13/235 | 5/265 |
| 7,210,092 B1 * | 4/2007 | Cameron | H03M 13/258 | 714/790 |
| 7,233,630 B2 * | 6/2007 | Murakami | H04L 27/0008 | 370/204 |
| 7,376,075 B1 * | 5/2008 | Petranovich | H04L 27/3494 | 370/205 |
| 7,844,009 B2 * | 11/2010 | Kim | H04L 1/0041 | 348/725 |
| RE42,643 E * | 8/2011 | Oshima | G11B 20/00086 | 348/726 |
| 8,009,761 B2 * | 8/2011 | Lai | H04L 27/2017 | 375/273 |
| 8,270,525 B2 * | 9/2012 | Nakagawa | H03M 13/256 | 375/261 |
| 8,867,482 B2 * | 10/2014 | Murakami | H04B 7/0697 | 370/330 |
| 8,867,659 B2 * | 10/2014 | Liebl | H04L 27/183 | 375/261 |
| 8,971,432 B2 * | 3/2015 | Murakami | H04W 52/42 | 375/260 |
| 9,491,026 B2 * | 11/2016 | Murakami | H04L 27/34 | |
| 2003/0039322 A1 * | 2/2003 | Murakami | H04L 27/0008 | 375/329 |
| 2003/0053549 A1 | 3/2003 | Uesugi | | |
| 2003/0076889 A1 * | 4/2003 | Walker | H04L 27/3422 | 375/261 |
| 2004/0261003 A1 * | 12/2004 | Shen | H03M 13/258 | 714/792 |
| 2005/0111590 A1 * | 5/2005 | Fang | H04L 27/205 | 375/330 |
| 2005/0152474 A1 * | 7/2005 | Murakami | H04L 27/0008 | 375/308 |
| 2005/0169402 A1 * | 8/2005 | Niwa | H03C 3/40 | 375/298 |
| 2005/0185722 A1 | 8/2005 | Abe et al. | | |
| 2005/0216819 A1 * | 9/2005 | Chugg | H03M 13/09 | 714/786 |
| 2005/0249312 A1 * | 11/2005 | Bode | H04L 27/0008 | 375/308 |
| 2006/0008019 A1 * | 1/2006 | Kawahara | H04L 27/34 | 375/261 |
| 2006/0209982 A1 * | 9/2006 | De Gaudenzi | H04L 27/3411 | 375/279 |
| 2007/0183520 A1 * | 8/2007 | Kim | H04L 1/0001 | 375/260 |
| 2008/0253349 A1 * | 10/2008 | Yu | H04L 27/0008 | 370/345 |
| 2009/0161786 A1 * | 6/2009 | Nakagawa | H03M 13/256 | 375/286 |
| 2009/0232253 A1 * | 9/2009 | Letunov | H04L 27/206 | 375/298 |
| 2010/0107032 A1 * | 4/2010 | Eroz | H03M 13/1137 | 714/752 |
| 2010/0166008 A1 * | 7/2010 | Hashimoto | H04L 27/38 | 370/458 |
| 2011/0037903 A1 * | 2/2011 | Limberg | H04L 1/0041 | 348/724 |
| 2011/0173509 A1 * | 7/2011 | Zhang | H03M 13/255 | 714/752 |
| 2011/0236033 A1 * | 9/2011 | Kikuchi | H04B 10/50 | 398/183 |
| 2012/0063549 A1 * | 3/2012 | Futami | H04L 25/03006 | 375/320 |
| 2012/0198502 A1 * | 8/2012 | Qin | H04N 7/20 | 725/70 |
| 2012/0266040 A1 * | 10/2012 | Hamkins | H04L 1/005 | 714/752 |
| 2013/0108276 A1 * | 5/2013 | Kikuchi | H04B 10/677 | 398/158 |
| 2013/0177306 A1 * | 7/2013 | Pfau | H04B 10/5561 | 398/9 |
| 2014/0177750 A1 * | 6/2014 | Kolze | H04L 27/3488 | 375/295 |
| 2014/0205032 A1 * | 7/2014 | Murakami | H04W 52/42 | 375/267 |
| 2015/0010103 A1 * | 1/2015 | Murakami | H04L 1/0003 | 375/267 |
| 2015/0046766 A1 * | 2/2015 | Shinohara | H03M 13/036 | 714/752 |
| 2015/0349802 A1 * | 12/2015 | Shinohara | H03M 13/1165 | 714/752 |
| 2015/0358032 A1 * | 12/2015 | Shinohara | H03M 13/1165 | 714/752 |
| 2016/0056989 A1 * | 2/2016 | Murakami | H04L 27/34 | 375/298 |
| 2016/0087736 A1 * | 3/2016 | Murakami | H04H 60/42 | 370/312 |
| 2016/0156498 A1 * | 6/2016 | Loghin | H04L 1/0042 | 375/298 |

FOREIGN PATENT DOCUMENTS

| | | |
|---|---|---|
| JP | 2000-216835 | 8/2000 |
| JP | 2002-261851 | 9/2002 |

(56) References Cited

FOREIGN PATENT DOCUMENTS

| | | |
|---|---|---|
| JP | 2004-201286 | 7/2004 |
| JP | 2006-217328 | 8/2006 |
| JP | 2009-147637 | 7/2009 |
| JP | 2013-016953 | 1/2013 |
| WO | 03/043283 | 5/2003 |
| WO | 2009/103746 | 8/2009 |

OTHER PUBLICATIONS

C. Zhang et al., "Trellis design of APSK in Satellite Broadcasting", 2008 IEEE International Conference on Telecommunications (2008. ICT), 2008, pp. 1-7.

Aik Chindapol et al., "Design, analysis, and performance evaluation for BICM-ID with square QAM constellations in Rayleigh fading channels" IEEE Journal on selected areas in communication, vol. 19, No. 15, May 2001, pp. 944-957.

"Transmission System for Advanced Wide Band Digital Satellite Broadcasting", ARIB Standard STD-B44, Ver. 1.0, Jul. 2009 (with partial English translation).

Extended European Search Report dated Feb. 26, 2016 in European Application No. 14783419.6.

Baldi et al., "A comparison between APSK and QAM in wireless tactical scenarios for land mobile systems," EURASIP Journal on Wireless Communications and Networking, Jan. 1, 2012, XP055250515.

Yoichi Suzuki et al., "Forward Error Correction Techniques for the Advanced Satellite Broadcasting System", Jan. 15, 2010, No. 119, pp. 36-48, with English abstract.

* cited by examiner

FIG.20
(a)
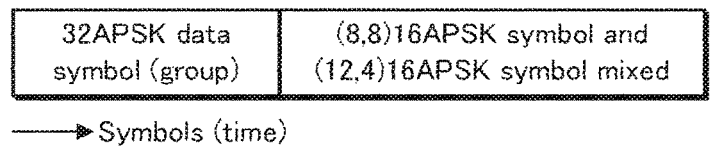
→ Symbols (time)
(b)
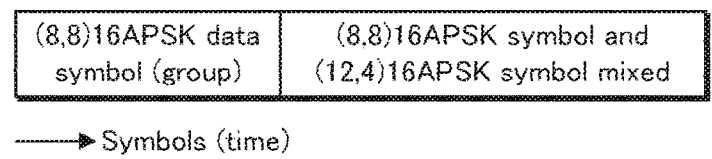
→ Symbols (time)
(c)
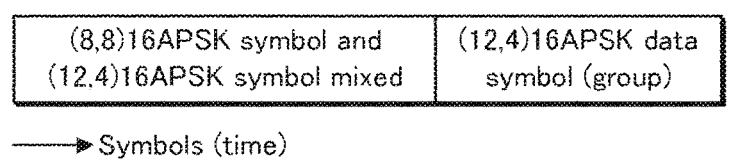
→ Symbols (time)
(d)
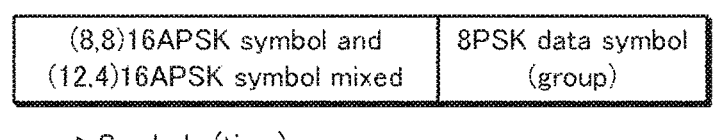
→ Symbols (time)
(e)
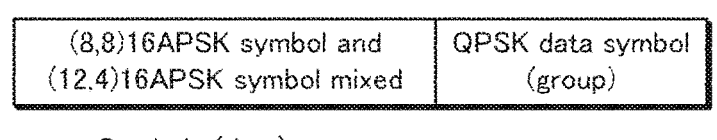
→ Symbols (time)
(f)
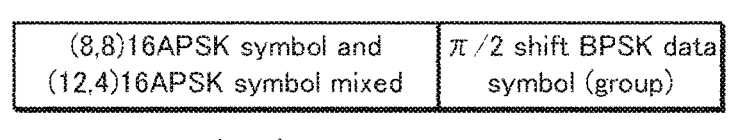
→ Symbols (time)

Stream type/relative stream information

| Stream type of relative stream 0 | Stream type of relative stream 1 | Stream type of relative stream 2 | ... | Stream type of relative stream 15 |
|---|---|---|---|---|
| 8 | 8 | 8 | | 8 |

(b)

Stream type information

| Value | Assignment |
|---|---|
| 00000000 | Reserved |
| 00000001 | MPEG-2TS |
| 00000010 | TLV |
| 00000011 | Video (moving image) of resolution approximately 4k (for example, 3840) pixels horizontally by approximately 2k (for example 2160) pixels vertically |
| 00000100 | Video (moving image) of resolution approximately 8k (for example, 7680) pixels horizontally by approximately 4k (for example 4320) pixels vertically |
| 00000101 | Differential information for generating video (moving image) of resolution approximately 8k (for example, 7680) pixels horizontally by approximately 4k (for example 4320) pixels vertically from a video (moving image) of resolution approximately 4k (for example, 3840) pixels horizontally by approximately 2k (for example 2160) pixels vertically |
| 00000110 | ... |
| 00000111 ~ 11111110 | Reserved |
| 11111111 | No type assigned |

Parameters specifying 4k, 8k, and differential for 8k (layer transmission)

FIG.25
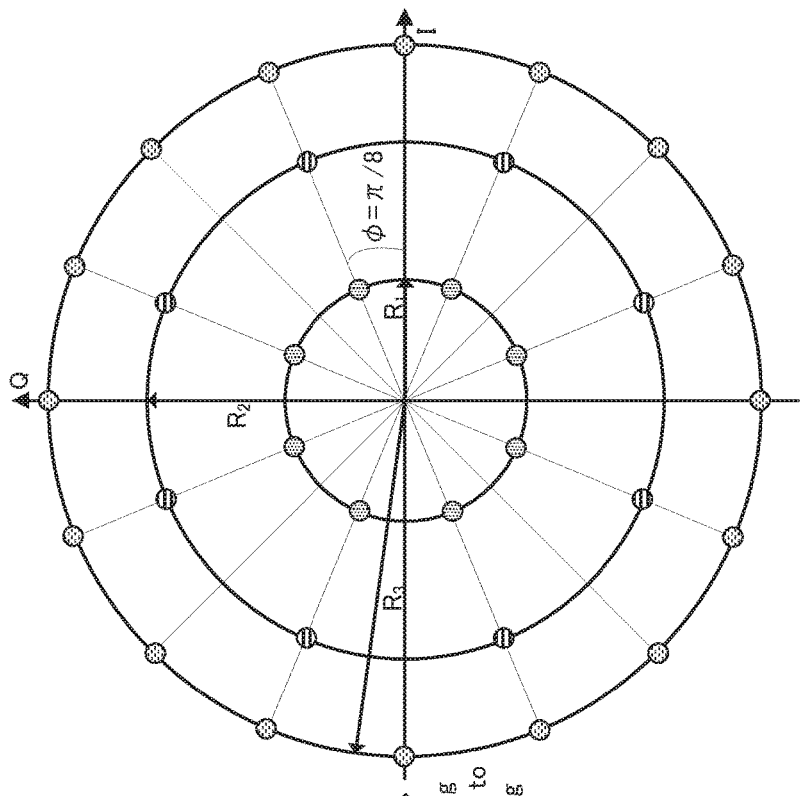
(b) (8,8,16)32APSK
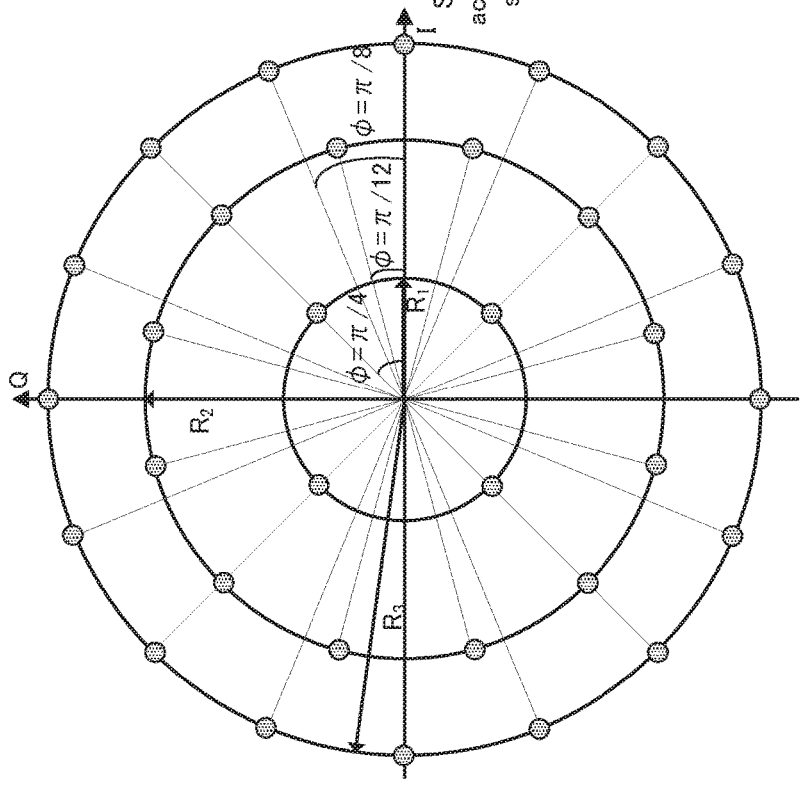
(a) (4,12,16)32APSK

FIG.37
(a)
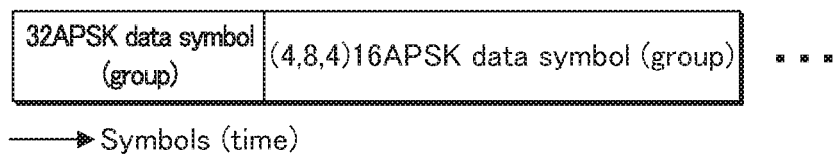
(b)
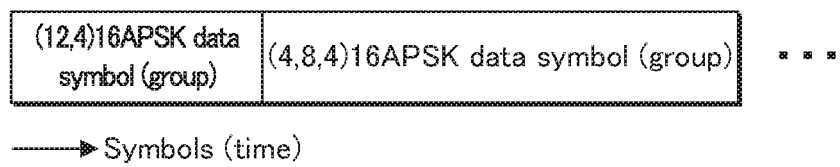
(c)
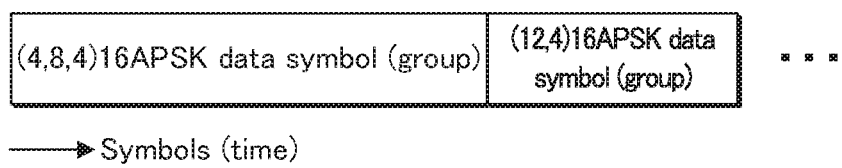
(d)
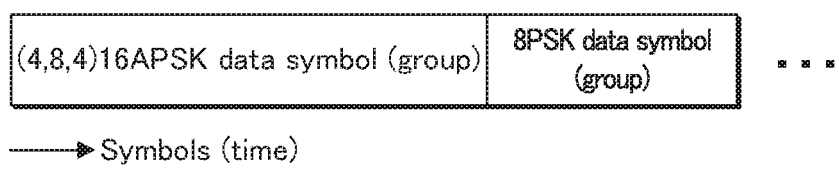
(e)
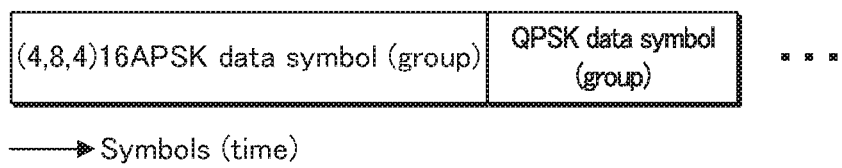
(f)
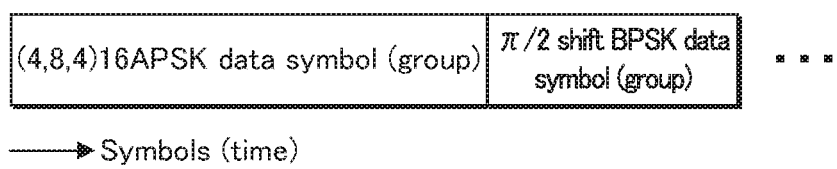

(a)

(b)

| Satellite broadcast scheme | Extended identifier | Extended region |
|---|---|---|
| Scheme A | All "0" | All "1" |
| Scheme B | Values other than all "0" | ... |

Scheme A: One ring ratio is assigned for a value of error coding
Scheme B: A plurality of ring ratios are assigned for a value of error coding FIG. 48
Scheme B
(1) Scheme
Scheme B
$d_0 = "1"$
(2) Coding rate and ring ratio table
Table 1
| Value ($b_0b_1b_2b_3$) | Coding rate | Ring ratio |
|---|---|---|
| 0000 | 41/120 | 3.09 |
| 0001 | 49/120 | 2.97 |
| ... | ... | ... |
| 1001 | 109/120 | 2.69 |
| ... | ... | ... |
Table 2
| Value ($b_0b_1b_2b_3$) | Coding rate | Ring ratio |
|---|---|---|
| 0000 | 41/120 | 4.00 |
| 0001 | 49/120 | 3.91 |
| ... | ... | ... |
| 1001 | 109/120 | 3.60 |
Table 16
| Value ($b_0b_1b_2b_3$) | Coding rate | Ring ratio |
|---|---|---|
| 0000 | 41/120 | 2.59 |
| 0001 | 49/120 | 2.50 |
| ... | ... | ... |
| 1001 | 109/120 | 2.23 |
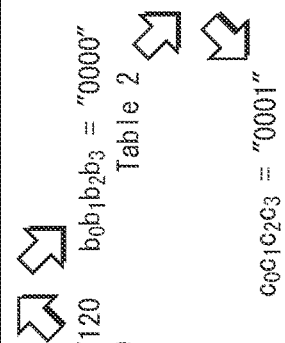
$b_0b_1b_2b_3 = "0000"$
Table 2
Coding rate 41/120
Ring ratio 4.00
$c_0c_1c_2c_3 = "0001"$
| Value ($c_0c_1c_2c_3$) | Table |
|---|---|
| 0000 | Table 1 |
| 0001 | Table 2 |
| ... | ... |
| 1111 | Table 16 |

FIG. 50

Scheme B

Ring ratio 2.00

$x_0x_1x_2x_3x_4x_5$ = 000000

| Value ($x_0x_1x_2x_3x_4x_5$) | Ring ratio |
|---|---|
| 000000 | 2.00 |
| ... | ... |
| 111111 | 4.00 |

FIG. 51

Scheme B

Coding rate 41/120
Ring ratio 3.49

$b_0b_1b_2b_3$ = "0000"

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| ... | ... | ... |

Ring ratio
3.49 − 3.09 = +0.4

$y_0y_1y_2y_3y_4y_5$ = "011110"

Difference table

| Value ($y_0y_1y_2y_3y_4y_5$) | Ring ratio difference |
|---|---|
| 000000 | ... |
| ... | ... |
| 011110 | +0.4 |
| 011111 | +0.2 |
| 100000 | 0 |
| 100001 | −0.2 |
| 100010 | −0.4 |
| ... | ... |
| 111111 | −2.0 |

FIG. 52

Scheme B

Coding rate 41/120
Ring ratio 2.78

$b_0b_1b_2b_3$ = "0000"

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| ... | ... | ... |

Ring ratio
2.78/3.09 = 0.9

$y_0y_1y_2y_3y_4y_5$ = "100001"

Difference table

| Value ($y_0y_1y_2y_3y_4y_5$) | Ring ratio difference |
|---|---|
| 000000 | ... |
| ... | ... |
| 011110 | ×1.2 |
| 011111 | ×1.1 |
| 100000 | ×1.0 |
| 100001 | ×0.9 |
| 100010 | ×0.8 |
| ... | ... |
| 111111 | ... |

FIG. 53
Scheme B
(1) Scheme
Scheme B 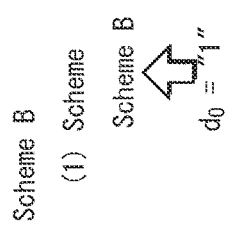 $d_0 = "1"$
(2) Coding rate and ring ratio table
Table 1
| Value ($b_0b_1b_2b_3$) | Coding rate | Ring ratio |
|---|---|---|
| 0000 | 41/120 | 3.09 |
| 0001 | 49/120 | 2.97 |
| ... | ... | ... |
| 1001 | 109/120 | 2.69 |
| ... | ... | ... |
Table 2
| Value ($b_0b_1b_2b_3$) | Coding rate | Ring ratio |
|---|---|---|
| 0000 | 41/120 | 4.00 |
| 0001 | 49/120 | 3.91 |
| ... | ... | ... |
| 1001 | 109/120 | 3.60 |
| ... | ... | ... |
⋮
Table 16
| Value ($b_0b_1b_2b_3$) | Coding rate | Ring ratio |
|---|---|---|
| 0000 | 41/120 | 2.59 |
| 0001 | 49/120 | 2.50 |
| ... | ... | ... |
| 1001 | 109/120 | 2.23 |
| ... | ... | ... |
Coding rate 41/120
Ring ratio 4.00
$b_0b_1b_2b_3 = "0000"$
Table 2
$c_0c_1c_2c_3 = "0001"$
| Value ($c_0c_1c_2c_3$) | Table |
|---|---|
| 0000 | Table 1 |
| 0001 | Table 2 |
| ... | ... |
| 1111 | Table 16 |

FIG. 54
Scheme B
(1) Scheme
Scheme B
$d_0 = "1"$
$z_0 = "0"$  Set to same ring ratio as scheme A
$z_0 = "1"$  Set to ring ratio for scheme B
(2) Ring ratio
Table 1
| Value ($b_0b_1b_2b_3$) | Coding rate | Ring ratio |
|---|---|---|
| 0000 | 41/120 | 3.09 |
| 0001 | 49/120 | 2.97 |
| ... | ... | ... |
| 1001 | 109/120 | 2.69 |
| ... | ... | ... |
Table 2
| Value ($b_0b_1b_2b_3$) | Coding rate | Ring ratio |
|---|---|---|
| 0000 | 41/120 | 4.00 |
| 0001 | 49/120 | 3.91 |
| ... | ... | ... |
| 1001 | 109/120 | 3.60 |
| ... | ... | ... |
...
Table 16
| Value ($b_0b_1b_2b_3$) | Coding rate | Ring ratio |
|---|---|---|
| 0000 | 41/120 | 2.59 |
| 0001 | 49/120 | 2.50 |
| ... | ... | ... |
| 1001 | 109/120 | 2.23 |
| ... | ... | ... |
Ring ratio 4.00
Table 2
| Value ($c_0c_1c_2c_3$) | Table |
|---|---|
| 0000 | Table 1 |
| 0001 | Table 2 |
| ... | ... |
| 1111 | Table 16 |
$c_0c_1c_2c_3 = "0001"$

FIG. 55

Scheme B

Ring ratio 2.00

$x_0x_1x_2x_3x_4x_5 = 000000$

| Value ($x_0x_1x_2x_3x_4x_5$) | Ring ratio |
|---|---|
| 000000 | 2.00 |
| ... | ... |
| 111111 | 4.00 |

FIG. 56

Scheme B

Coding rate 41/120
Ring ratio 3.49

$b_0b_1b_2b_3 = "0000"$

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| ... | ... | ... |

Ring ratio
3.49 − 3.09 = +0.4

$y_0y_1y_2y_3y_4y_5 = "011110"$

Difference table

| Value ($y_0y_1y_2y_3y_4y_5$) | Ring ratio difference |
|---|---|
| 000000 | ... |
| ... | ... |
| 011110 | +0.4 |
| 011111 | +0.2 |
| 100000 | 0 |
| 100001 | −0.2 |
| 100010 | −0.4 |
| ... | ... |
| 111111 | −2.0 |

FIG. 57

Scheme B

Coding rate 41/120
Ring ratio 2.78

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| ... | ... | ... |

$b_0b_1b_2b_3$ = "0000"

Ring ratio
2.78/3.09=0.9

Difference table

| Value ($y_0y_1y_2y_3y_4y_5$) | Ring ratio difference |
|---|---|
| 000000 | ... |
| ... | ... |
| 011110 | ×1.2 |
| 011111 | ×1.1 |
| 100000 | ×1.0 |
| 100001 | ×0.9 |
| 100010 | ×0.8 |
| ... | ... |
| 111111 | ... |

$y_0y_1y_2y_3y_4y_5$ = "100001"

TRANSMISSION METHOD

RELATED APPLICATIONS

All content disclosed in the claims, descriptions, drawings, and abstracts of Japanese Patent Application 2013-084269, Japanese Patent Application 2013-084270, and Japanese Patent Application 2013-084271, filed Apr. 12, 2013; and Japanese Patent Application 2013-099605, Japanese Patent Application 2013-099606, and Japanese Patent Application 2013-099607, filed May 9, 2015, is incorporated into the present application.

TECHNICAL FIELD

The present invention is related to transmission methods of signals for performing iterative detection at a receive apparatus side.

BACKGROUND ART

Conventionally, as in Non-Patent Literature 1, with respect to quadrature amplitude modulation (QAM), studies have been carried out into improvements in reception quality of data for bit interleaved coded modulation with iterative detection (BICM-ID) by changing aspects of bit labelling.

CITATION LIST

Patent Literature

Patent Literature 1
Japanese Patent Application Publication 2013-16953

Non-Patent Literature

Non-Patent Literature 1
A. Chindapol and J. A. Ritcey, "Design, analysis, and performance evaluation for BICM-ID with square QAM constellations in Rayleigh fading channels" *IEEE Journal on selected areas in communication*, vol. 19, no. 5, pp. 944-957, May 2001
Non-Patent Literature 2
*Transmission System for Advanced Wide Band Digital Satellite Broadcasting*, ARIB Standard STD-B44, Ver. 1.0, July 2009

SUMMARY OF INVENTION

Technical Problem

Modulation schemes other than QAM, such as amplitude phase shift keying (APSK), may be used due to peak-to-average power ratio (PAPR) limitations, etc., and therefore application to communication/broadcast systems of the techniques of Non-Patent Literature 1 that relate to QAM labelling may be difficult.

The present invention has an aim of providing a transmission method that contributes to improvement in data reception quality when iterative detection is performed on a receive apparatus side in, for example, a communication/broadcast system.

Solution to Problem

A transmission method pertaining to the present invention is applicable to a transmit apparatus for transmitting data by modulation schemes that shift amplitude and phase, the transmit apparatus comprising: a selector that alternately selects a first modulation scheme and a second modulation scheme for each symbol, a constellation and bit labelling of each constellation point of the first modulation scheme being different to a constellation and bit labelling of each constellation point of the second modulation scheme; a mapper that performs mapping by using constellation points of a selected modulation scheme; and a transmitter that transmits a modulated signal obtained by the mapping, wherein the first modulation scheme is 16 amplitude phase shift keying (APSK) modulation that arranges, in a first in-phase (I)-quadrature-phase (Q) plane, 16 constellation points composed of four constellation points on the circumference of a first inner circle and twelve constellation points on the circumference of a first outer circle, the first inner circle and the first outer circle being concentric circles, wherein: when the 16 constellation points are divided into four groups each composed of one constellation point on the circumference of the first inner circle and three constellation points on a portion of the circumference of the first outer circle in a direction from the origin of the first I-Q plane to the one constellation point, only one bit is different in bit labelling between each pair, within each group, of constellation points adjacent on the circumference of the first outer circle, and only one bit is different in bit labelling between each pair, within each group, of each constellation point on the circumference of the first inner circle and each constellation point at one of two ends of each portion of the circumference of the first outer circle; and only one bit is different in bit labelling between each pair, between different groups, of constellation points that are closest to each other on the first I-Q plane on the circumference of the first outer circle, and only one bit is different in bit labelling between each pair, between different groups, of constellation points that are closest to each other on the first I-Q plane on the circumference of the first inner circle, and the second modulation scheme is 16APSK modulation that arranges, in a second I-Q plane, 16 constellation points composed of eight constellation points on the circumference of a second inner circle and eight constellation points on the circumference of a second outer circle, the second inner circle and the second outer circle being concentric circles, wherein: when the 16 constellation points are divided into a first group composed of the eight constellation points on the circumference of the second inner circle and a second group composed of the eight constellation points on the circumference of the second outer circle, only one bit is different in bit labelling between each pair, within the first group, of constellation points that are adjacent on the circumference of the second inner circle, and only one bit is different in bit labelling between each pair, within the second group, of constellation points that are adjacent on the circumference of the second outer circle.

Advantageous Effects of Invention

The transmission method pertaining to the present invention, in particular when applied to a communication/broadcast system using error correction code having a high error correction capacity, such as low density parity check (LDPC) code and turbo code such as duo-binary turbo code, can contribute to improving data reception quality at a receive apparatus side at the time of initial detection or when iterative detection is performed.

BRIEF DESCRIPTION OF DRAWINGS

FIG. 20 illustrates examples of arrangement of modulation schemes.

FIG. 22 illustrates an example configuration of stream type/relative stream information.

FIG. 25 illustrates examples of constellations of 32APSK.

FIG. 37 illustrates examples of arrangement of modulation schemes.

FIG. 48 illustrates an example of signaling.
FIG. 50 illustrates an example of signaling.
FIG. 51 illustrates an example of signaling.
FIG. 52 illustrates an example of signaling.
FIG. 53 illustrates an example of signaling.
FIG. 54 illustrates an example of signaling.
FIG. 55 illustrates an example of signaling.
FIG. 56 illustrates an example of signaling.
FIG. 57 illustrates an example of signaling.

EMBODIMENTS (Developments that LED to an Embodiment Pertaining to the Present Invention)

Typically, in a communication/broadcast system, in order to reduce power consumption of an amplifier for transmission and reduce errors in data at a receiver, a modulation scheme is preferred for which the peak-to-average power ratio (PAPR) is low and data reception quality is high.

In particular, in satellite broadcasting, in order to reduce power consumption of an amplifier for transmission, use of a modulation scheme for which PAPR is low is preferred, and (12,4) 16 amplitude phase shift keying (16APSK) is commonly used as a modulation scheme in which 16 constellation points exist in an in-phase (I)-quadrature-phase (Q) plane. Note that a constellation in an I-Q plane of (12,4) 16APSK modulation is described in detail later.

However, when (12,4) 16APSK is used in a communication/broadcast system, data reception quality of a receiver is sacrificed, and therefore there is a need to use, in satellite broadcasting, a modulation scheme/transmission method in which PAPR is low and data reception quality is high.

In order to improve reception quality, a modulation scheme having good bit error ratio (BER) properties may be considered. However, use of a modulation scheme having excellent BER properties is not necessarily the best solution in every case. This point is explained below.

For example, assume that when a modulation scheme #B is used, a signal-to-noise power ratio (SNR) of 10.0 dB is required to obtain a BER of $10^{-5}$, and when a modulation scheme #A is used, an SNR of 9.5 dB is required to obtain a BER of $10^{-5}$.

When a transmit apparatus uses the modulation scheme #A or the modulation scheme #B at the same average transmission power, a receive apparatus can obtain a gain of 0.5 dB (10.0-9.5) by using the modulation scheme #B.

Figure 1:
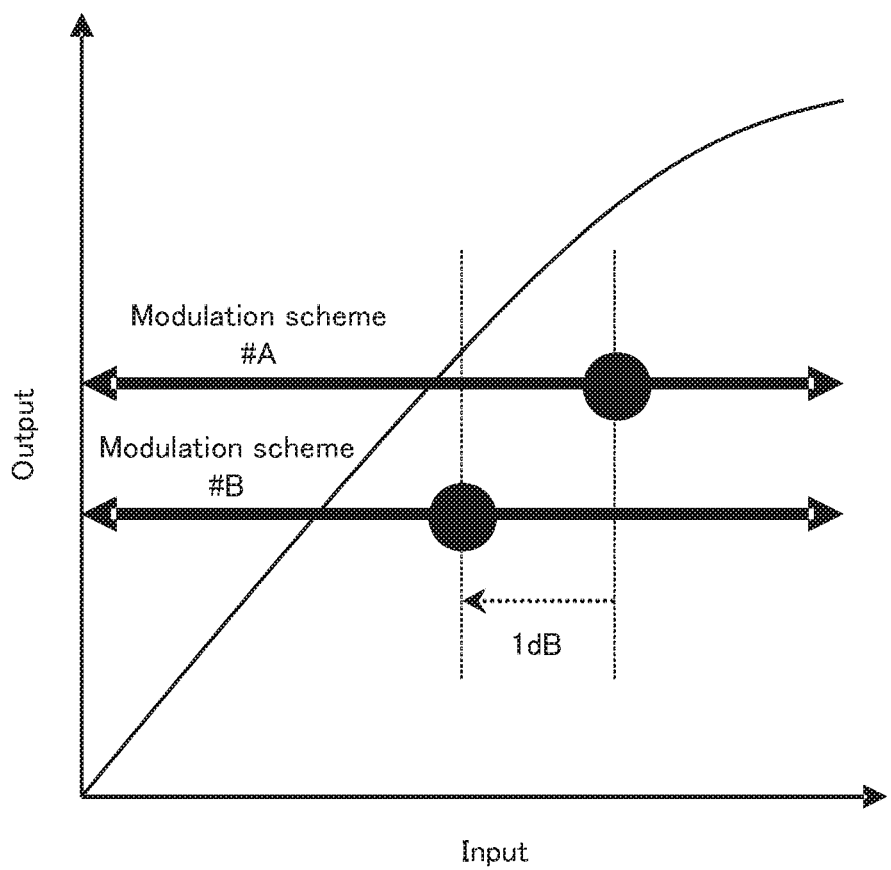
FIG. 1 illustrates an example of input/output power properties of a power amplifier mounted on a transmit apparatus.

However, when the transmit apparatus is installed on a satellite, PAPR becomes an issue. Input/output power properties of a power amplifier installed on the transmit apparatus are illustrated in FIG. 1.

Here, when the modulation scheme #A is used, PAPR is assumed to be 7.0 dB, and when the modulation scheme #B is used, PAPR is assumed to be 8.0 dB.

The average transmit power when the modulation scheme #B is used is 1.0 (8.0-7.0) dB less than the average transmit power when the modulation scheme #A is used.

Accordingly, when the modulation scheme #B is used, 0.5−1.0=−0.5, and therefore the receive apparatus obtains a gain of 0.5 dB when the modulation scheme #A is used.

As described above, use of a modulation scheme that excels in terms of BER properties is not preferred in such a case. The present embodiment takes into consideration the points above.

Thus, the present embodiment provides a modulation scheme/transmission method for which PAPR is low and data reception quality is high.

Further, in Non-Patent Literature 1, consideration is given to how to label bits and how that improves data reception quality when bit interleaved coded modulation with iterative detection (BICM-ID) is used with respect to quadrature amplitude modulation (QAM). However, in some cases it is difficult to achieve the described effects using the approach used in Non-Patent Literature 1 (how to label bits with respect to QAM) for error correction code having high error correction capacity, such as low-density parity-check (LDPC) code and turbo code such as duo-binary turbo code.

In the present embodiment, a transmission method is provided for obtaining high data reception quality when error correction code having high error correction capacity is used, such as LDPC code and turbo code, and iterative detection (or detection) is performed at a receive apparatus side.

The following is a detailed description of embodiments of the present invention, with reference to the drawings.

Embodiment 1

The following describes in detail a transmission method, transmit apparatus, reception method, and receive apparatus of the present embodiment.

Prior to this description, an overview of a communication system using a BICM-ID scheme at a receive apparatus side is described below.

<BICM-ID>

Figure 2:
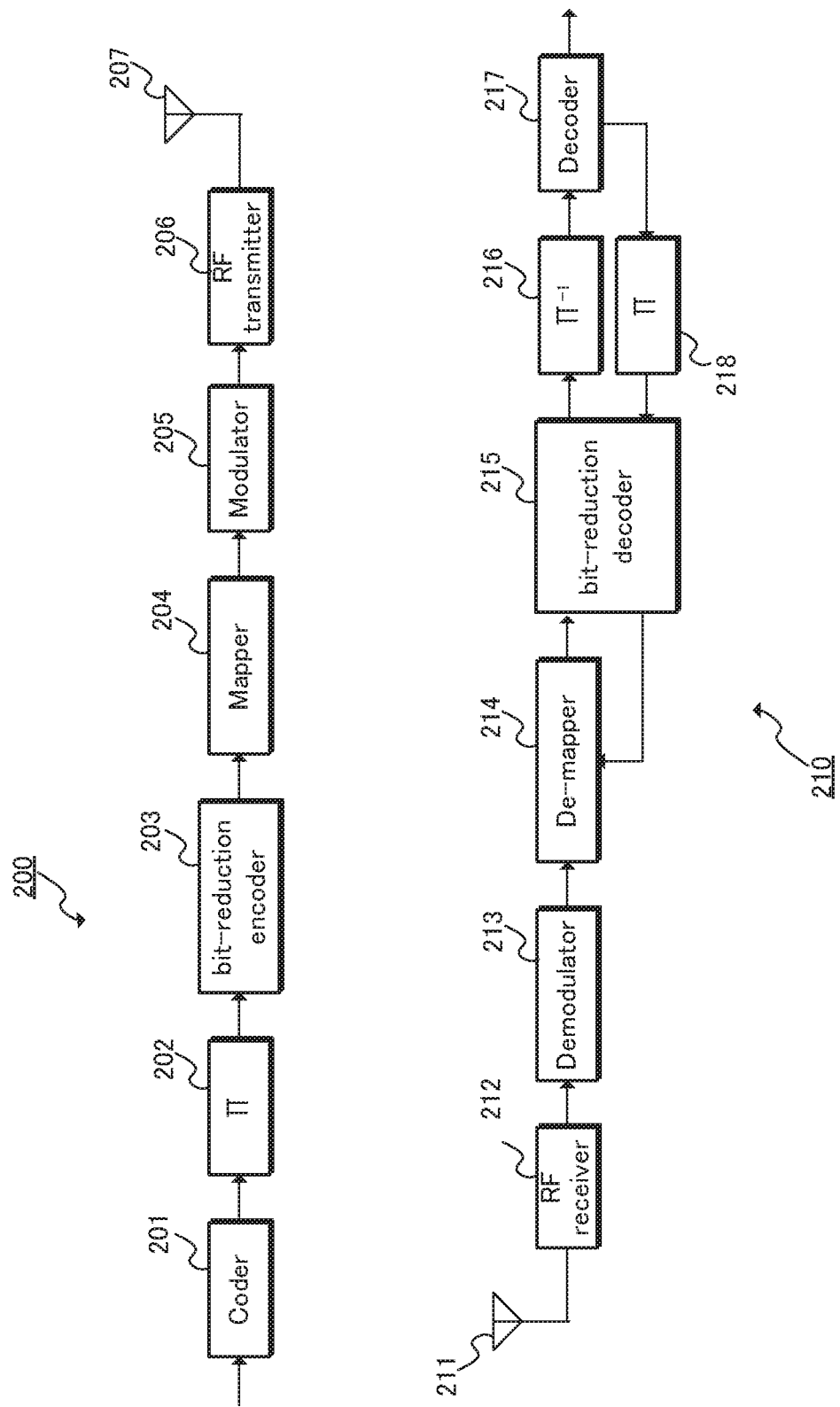
FIG. 2 illustrates a configuration example of a communication system using a BICM-ID scheme.

FIG. 2 illustrates an example of a communication system using a BICM-ID scheme.

The following describes BICM-ID when a bit-reduction encoder 203 and a bit-reduction decoder 215 are used, but iterative detection may be implemented in cases without the bit-reduction encoder 203 and the bit-reduction decoder 215.

A transmit apparatus 200 includes a coder 201, an interleaver 202, the bit-reduction encoder 203, a mapper 204, a modulator 205, a radio frequency (RF) transmitter 206, and a transmit antenna 207.

A receive apparatus 210 includes a receive antenna 211, an RF receiver 212, a demodulator 213, a de-mapper 214, the bit-reduction decoder 215, a de-interleaver 216, a decoder 217, and an interleaver 218.

Figure 3:
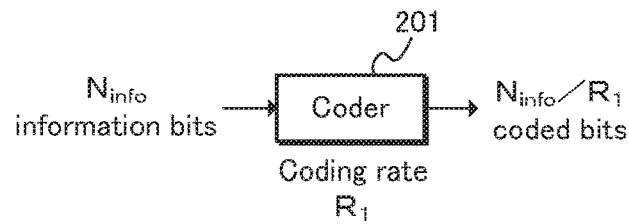
FIG. 3 illustrates an example of input and output of a coder of a transmit apparatus.

FIG. 3 illustrates an example of input/output bits of the coder 201 of the transmit apparatus 200.

The coder 201 performs coding at a coding rate $R_1$, and when $N_{info}$ information bits are inputted, the coder 201 outputs $N_{info}/R_1$ coded bits.

Figure 4:
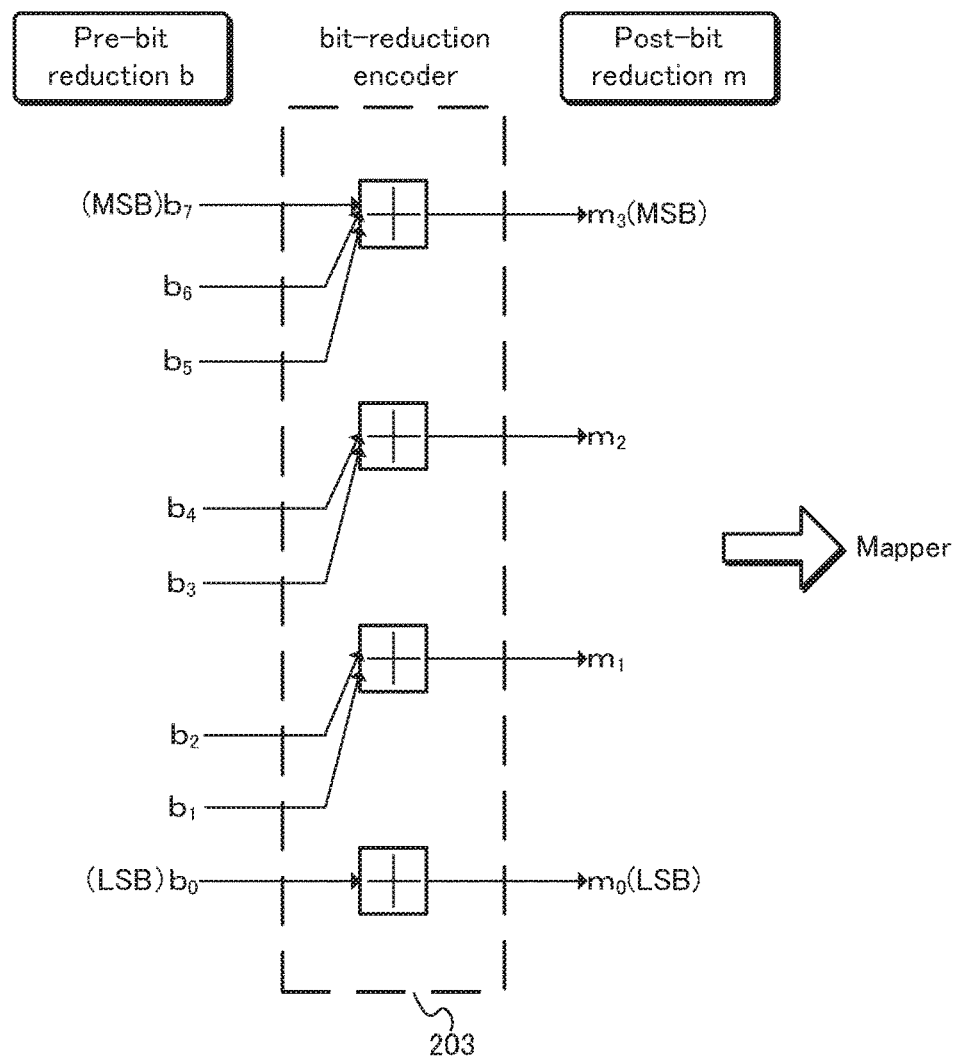
FIG. 4 illustrates an example of a bit-reduction encoder of a transmit apparatus.

FIG. 4 illustrates an example of the bit-reduction encoder 203 of the transmit apparatus 200.

The present example of the bit-reduction encoder 203, when a bit sequence $b(b_0-b_7)$ of eight bits is inputted from the interleaver 202, performs a conversion that involves reducing the number of bits, and outputs a bit sequence $m(m_0-m_3)$ of four bits to the mapper 204. In FIG. 4, "[+]" indicates an exclusive OR (XOR) section.

That is, the present example of the bit-reduction encoder 203 has: a branch that connects an input for bit $b_0$ to an output for bit $m_0$ via an XOR section; a branch that connects inputs for bits $b_1$ and $b_2$ to an output for bit $m_1$ via an XOR section; a branch that connects inputs for bits $b_3$ and $b_4$ to an output for bit $m_2$ via an XOR section; and a branch that connects inputs bits $b_5$, $b_6$ and $b_7$ to an output for bit $m_3$ via an XOR section.

Figure 5:
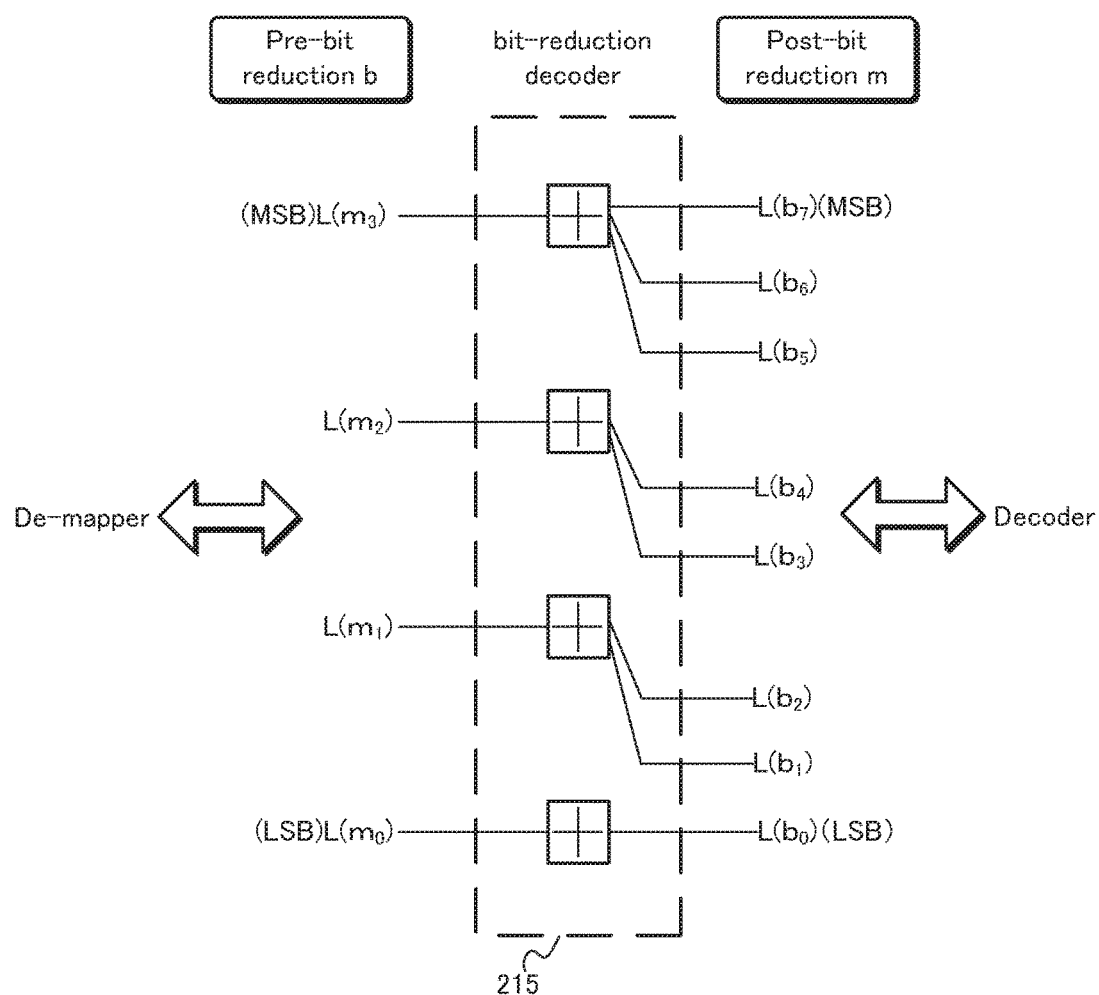
FIG. 5 illustrates an example of a bit-reduction decoder of a receive apparatus.

FIG. 5 illustrates an example of the bit-reduction decoder 215 of the receive apparatus 210.

The present example of the bit-reduction decoder 215, when a log likelihood ratio (LLR) $L(m_0)$-$L(m_3)$ for a bit sequence $m(m_0-m_3)$ of four bits is inputted from the de-mapper 214, performs a conversion that involves restoring the original number of bits, and outputs an LLR $L(b_0)$-$L(b_7)$ for a bit sequence $b(b_0-b_7)$ of eight bits. The LLR $L(b_0)$-$L(b_7)$ for the bit sequence $b(b_0-b_7)$ of eight bits is inputted to the decoder 217 via the de-interleaver 216.

Further, the bit-reduction decoder 215, when an LLR $L(b_0)$-$L(b_7)$ for a bit sequence $b(b_0-b_7)$ of eights bits is inputted from the decoder 217 via the interleaver 218, performs a conversion that involves reducing the number of bits, and outputs an LLR $L(m_0)$-$L(m_3)$ for a bit sequence $m(m_0-m_3)$ of four bits to the de-mapper 214.

In FIG. 5, "[+]" indicates an XOR section. That is, the present example of the bit-reduction decoder 215 has: a branch that connects an input/output for $L(b_0)$ to an input/output for $L(m_0)$ via an XOR section; a branch that connects inputs/outputs for $L(b_1)$ and $L(b_2)$ to an input/output for $L(m_1)$ via an XOR section; a branch that connects inputs/outputs for $L(b_3)$ and $L(b_4)$ to an input/output for $L(m_2)$ via an XOR section; and a branch that connects inputs/outputs for $L(b_5)$, $L(b_6)$ and $L(b_7)$ to an input/output for $L(m_3)$ via an XOR section.

In the present example, with respect to a bit sequence $b(b_0-b_7)$ of eight bits prior to bit reduction, bit $b_0$ is a least significant bit (LSB) and bit $b_7$ is a most significant bit (MSB). Further, with respect to a bit sequence $m(m_0-m_3)$ of four bits after bit reduction, bit $m_0$ is an LSB and bit $m_3$ is an MSB.

Figure 6:
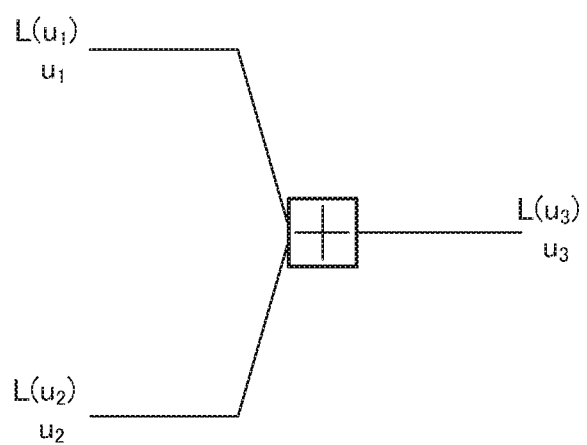
FIG. 6 illustrates an example of input and output of a XOR section of a bit-reduction decoder.

FIG. 6 illustrates input/output of an XOR section, in order to describe operation of the bit-reduction decoder 215.

In FIG. 6, bits $u_1$ and $u_2$ are connected to bit $u_3$ via an XOR section. Further, LLRs $L(u_1)$, $L(u_2)$, and $L(u_3)$ for bits $u_1$, $u_2$ and $u_3$ are illustrated.

A relationship between $L(u_1)$, $L(u_2)$, and $L(u_3)$ is described later.

The following describes processing flow with reference to FIG. 2 to FIG. 6.

At the transmit apparatus 200 side, transmit bits are inputted to the coder 201, and (error correction) coding is performed. For example, as illustrated in FIG. 3, when a coding rate of error correction code used in the coder 201 is $R_1$, and $N_{info}$ information bits are inputted to the coder 201, $N_{info}/R_1$ bits are outputted from the coder 201.

A signal (data) encoded by the coder 201 is, after interleaving processing by the interleaver 202 (permutation of data), inputted to the bit-reduction encoder 203. Subsequently, as described with reference to FIG. 3, bit number reduction processing is performed by the bit-reduction encoder 203. Note that bit number reduction processing need not be implemented.

A signal (data) on which bit reduction processing has been performed undergoes mapping processing at the mapper 204. The modulator 205 performs processing such as conversion of a digital signal to an analog signal, bandlimiting, and quadrature modulation (and multi-carrier modulation such as orthogonal frequency division multiplexing (OFDM) may also be implemented) on a signal on which mapping processing has been performed.

A signal that has undergone this signal processing is transmitted wirelessly from, for example, the transmit antenna 207, via transmit radio frequency (RF) processing (206) in which transmit processing is performed.

At the receive apparatus 210 side, the RF receiver 212 performs processing such as frequency conversion and quadrature demodulation on a signal (radio signal from a transmit apparatus side) received by the receive antenna 211, generates a baseband signal, and outputs to the demodulator 213.

The demodulator 213 performs processing such as channel estimation and demodulation, generates a signal after demodulation, and outputs to the de-mapper 214. The de-mapper 214 calculates an LLR for each bit, based on the receive signal inputted from the demodulator 213, noise power included in the receive signal, and prior information obtained from the bit-reduction decoder 215.

The de-mapper 214 performs processing with respect to a signal mapped by the mapper 204. In other words, the de-mapper 214 calculates LLRs for a bit sequence (corresponding to the bit sequence m illustrated in FIG. 4 and FIG. 5) after bit number reduction processing is performed at a transmit apparatus side.

In a subsequent step of decoding processing (decoder 217) processing is performed with respect to all coding bits (corresponding to the bit sequence b illustrated in FIG. 4 and FIG. 5), and therefore conversion of LLRs post-bit-reduction (LLRs pertaining to processing of the de-mapper 214) to LLRs pre-bit-reduction (LLRs pertaining to processing of the decoder 217) is required.

Thus, at the bit-reduction decoder 215, LLRs post-bit-reduction inputted from the de-mapper 214 are converted to LLRs corresponding to a time pre-bit-reduction (corresponding to bit sequence b illustrated in FIG. 4 and FIG. 5). Details of processing are described later.

An LLR calculated at the bit-reduction decoder 215 is inputted to the decoder 217 after de-interleaving processing by the de-interleaver 216. The decoder 217 performs decoding processing on the basis of inputted LLRs, and thereby re-calculates the LLRs. LLRs calculated by the decoder 217 are fed back to the bit-reduction decoder 215 after interleaving processing by the interleaver 218. The bit-reduction decoder 215 converts LLRs fed back from the decoder 217 to LLRs post-bit-reduction, and inputs the LLRs post-bit-reduction to the de-mapper 214. The de-mapper 214 again calculates an LLR for each bit, based on the receive signal, noise power included in the receive signal, and prior information obtained from the bit-reduction decoder 215.

In a case in which bit number reduction processing is not performed at a transmit apparatus side, the processing specific to the bit-reduction decoder 215 is not performed.

By repeatedly performing the above processing, finally a desired decoded result is obtained.

The following describes LLR calculation processing at the de-mapper 214.

An LLR outputted from the de-mapper 214 when a bit sequence $b(b_0, b_1, \ldots b_{N-1})$ of N (N being an integer greater than or equal to one) bits is allocated to M (M being an integer greater than or equal to one) symbol points $S_k(S_0, S_1, \ldots, S_{M-1})$ is considered below.

When a receive signal is y, an i-th (i being an integer from zero to N−1) bit is $b_i$, and an LLR for $b_i$ is $L(b_i)$, Math (1) holds true.

[Math 1]

$$L(b_i) = \log\frac{p(b_i = 0 \mid y)}{p(b_i = 1 \mid y)} \quad \text{(Math 1)}$$
$$= \log\frac{p(y \mid b_i = 0)p(b_i = 0)/p(y)}{p(y \mid b_i = 1)p(b_i = 1)/p(y)}$$
$$= \log\frac{p(y \mid b_i = 0)}{p(y \mid b_i = 1)} + \log\frac{p(b_i = 0)}{p(b_i = 1)}$$

As described later, the first term on the right side of the bottom formula shown in Math (1) is an LLR obtainable from a bit other than an i-th bit, and this is defined as extrinsic information $L_e(b_i)$. Further, the second term on the right side of the bottom formula shown in Math (1) is an LLR obtainable based on a prior probability of an i-th bit, and this is defined as prior information $L_a(b_i)$.

Thus, Math (1) becomes Math (2), and transformation to Math (3) is possible.

[Math 2]

$$L(b_i) = L_e(b_i) + L_a(b_i) \quad \text{(Math 2)}$$

[Math 3]

$$L_e(b_i) = L(b_i) - L_a(b_i) \quad \text{(Math 3)}$$

The de-mapper 214 outputs a processing result of Math (3) as an LLR

The numerator $p(y|b_i=0)$ of the first term on the right side of the bottom formula of Math (1) is considered below.

The numerator $p(y|b_i=0)$ is a probability that a receive signal is y when $b_i=0$ is known. This is expressed in the product $p(y|S_k)p(S_k|b_i=0)$ of "a probability $p(S_k|b_i=0)$ of a symbol point $S_k$ when $b_i=0$ is known," and "a probability $p(y|S_k)$ of y when $S_k$ is known". When considering all symbol points, Math (4) holds true.

[Math 4]

$$p(y \mid b_i = 0) = \sum_{S_k \mid S_k(b_i)=0} p(y \mid S_k)p(S_k \mid b_i = 0) \quad \text{(Math 4)}$$

In the same way, with respect to the denominator $p(y|b_i=1)$ of the first term on the right side of the bottom formula of Math (1), Math (5) holds true.

Accordingly, the first term on the right side of the bottom formula of Math (1) becomes Math (6).

[Math 5]

$$p(y \mid b_i = 1) = \sum_{S_k \mid S_k(b_i)=1} p(y \mid S_k)p(S_k \mid b_i = 1) \quad \text{(Math 5)}$$

[Math 6]

$$L_e(b_i) = \log\frac{p(y \mid b_i = 0)}{p(y \mid b_i = 1)} \quad \text{(Math 6)}$$
$$= \log\frac{\sum_{S_k \mid S_k(b_i)=0} p(y \mid S_k)p(S_k \mid b_i = 0)}{\sum_{S_k \mid S_k(b_i)=1} p(y \mid S_k)p(S_k \mid b_i = 1)}$$

The expression $p(y|S_k)$ of Math (6) can be expressed as shown in Math (7) when Gaussian noise of variance $\sigma^2$ is added in the process of transmitting the symbol point $S_k$ to become the receive signal y.

[Math 7]

$$p(y \mid S_k) = \frac{1}{\sqrt{2\pi\sigma^2}} \exp\left(-\frac{(y-S_k)^2}{2\sigma^2}\right)$$ (Math 7)

Further, the expression $p(S_k|b_i=0)$ of Math (6) is a probability of the symbol point $S_k$ when $b_i=0$ is known, and is expressed as a product of prior probabilities of bits other than $b_i$ that constitute the symbol point $S_k$. When a j-th (j=0, 1, ..., N−1 (j being an integer from 0 to N−1)) bit of the symbol point $S_k$ is expressed as $S_k(b_j)$, Math (8) holds true.

[Math 8]

$$S_k(b_j) \in \{0, 1\}$$
$$p(S_k \mid b_i = 0) = \prod_{j \neq i} p(b_j = S_k(b_j))$$ (Math 8)

The term $p(b_j=S_k(b_j))$ is considered below.

When $L_a(b_j)$ is given as prior information, Math (9) is derived from the second term of the right side of the bottom formula of Math (1), and can be transformed to Math (10).

[Math 9]

$$L_a(b_j) = \log\frac{p(b_j = 0)}{p(b_j = 1)}$$ (Math 9)

[Math 10]

$$\frac{p(b_j = 0)}{p(b_j = 1)} = \exp(L_a(b_j))$$ (Math 10)

Further, from the relationship $p(b_j=0)+p(b_j=1)=1$, Math (11) and Math (12) are derived.

[Math 11]

$$p(b_j = 0) = \frac{\exp(L_a(b_j))}{1 + \exp(L_a(b_j))}$$ (Math 11)

[Math 12]

$$p(b_j = 1) = \frac{1}{1 + \exp(L_a(b_j))}$$ (Math 12)

Using this, Math (13) is derived, and Math (8) becomes Math (14).

[Math 13]

$$p(b_j = S_k(b_j)) = \frac{\exp(-S_k(b_j)L_a(b_j))}{1 + \exp(-L_a(b_j))}$$ (Math 13)

[Math 14]

$$p(S_k \mid b_i = 0) = \prod_{j \neq i} p(b_j = S_k(b_j))$$ (Math 14)
$$= \prod_{j \neq i} \frac{\exp(-S_k(b_j)L_a(b_j))}{1 + \exp(-L_a(b_j))}$$

With respect to $p(S_k|b_i=1)$, a formula similar to Math (14) is derived. From Math (7) and Math (14), Math (6) becomes Math (15). Note that as per the condition of $\Sigma$, the numerator of $S_k(b_i)$ is zero, and the denominator of $S_k(b_i)$ is one.

[Math 15]

$$L_e(b_i) = \log\frac{\sum_{S_k|S_k(b_i)=0} p(y \mid S_k)p(S_k \mid b_i = 0)}{\sum_{S_k|S_k(b_i)=1} p(y \mid S_k)p(S_k \mid b_i = 1)}$$ (Math 15)

$$= \log\frac{\sum_{S_k|S_k(b_i)=0} \frac{1}{\sqrt{2\pi\sigma^2}}\exp\left(-\frac{|y-S_k|^2}{2\sigma^2}\right) \prod_{j \neq i}\frac{\exp(-S_k(b_j)L_a(b_j))}{1+\exp(-L_a(b_j))}}{\sum_{S_k|S_k(b_i)=1} \frac{1}{\sqrt{2\pi\sigma^2}}\exp\left(-\frac{|y-S_k|^2}{2\sigma^2}\right) \prod_{j \neq i}\frac{\exp(-S_k(b_j)L_a(b_j))}{1+\exp(-L_a(b_j))}}$$

$$= \log\frac{\sum_{S_k|S_k(b_i)=0}\exp\left(-\frac{|y-S_k|^2}{2\sigma^2} - \sum_j S_k(b_j)L_a(b_j)\right)}{\sum_{S_k|S_k(b_i)=1}\exp\left(-\frac{|y-S_k|^2}{2\sigma^2} - \sum_j S_k(b_j)L_a(b_j)\right)} - L_a(b_i)$$

From the above, in performing the repeated processing of BICM-ID, the de-mapper 214 performs exponential calculation and summation for a symbol point and each bit assigned to the symbol point, thereby seeking numerators/denominators, and further performs a logarithmic calculation.

The following described processing at the bit-reduction decoder 215.

The bit-reduction decoder 215 performs processing converting LLRs post-bit-reduction that are calculated at the de-mapper 214 to LLRs pre-bit-reduction that are required at the decoder 217, and performs processing converting LLRs pre-bit-reduction that are calculated at the decoder 217 to LLRs post-bit-reduction that are required at the de-mapper 214.

At the bit-reduction decoder 215, processing converting LLRs post-bit-reduction is performed at each [+] (each XOR section) in FIG. 5, calculation being performed according to bits connected to the [+].

In a configuration as illustrated in FIG. 6, $L(u_3)$ is considered when $L(u_1)$ and $L(u_2)$ are given, each bit being defined as $u_1$, $u_2$, $u_3$, and each LLR for the bits being defined as $L(u_1)$, $L(u_2)$, $L(u_3)$.

First, $u_1$ is considered below.

When $L(u_1)$ is given, Math (16) and Math (17) are derived from Math (11) and Math (12).

[Math 16]

$$p(u_1 = 0) = \frac{\exp(L(u_1))}{1 + \exp(L(u_1))} \quad \text{(Math 16)}$$

[Math 17]

$$p(u_1 = 1) = \frac{1}{1 + \exp(L(u_1))} \quad \text{(Math 17)}$$

When $u_1=0$ is associated with +1 and $u_1=1$ is associated with −1, the expected value $E[u_1]$ of $u_1$ is defined as in Math (18).

[Math 18]

$$\begin{aligned} E[u_1] &= (+1)p(u_1 = 0) + (-1)p(u_1 = 1) \\ &= \frac{\exp(L(u_1)) - 1}{\exp(L(u_1)) + 1} \\ &= \tanh\left(\frac{L(u_1)}{2}\right) \left(\Theta\tanh(\chi) = \frac{e^\chi - e^{-\chi}}{e^\chi + e^{-\chi}}\right) \end{aligned} \quad \text{(Math 18)}$$

In FIG. 6, $u_3 = u_1[+]u_2$ and $E[u_3] = E[u_1]E[u_2]$, and therefore when substituted into Math (18), Math (19) results, from which Math (20) is derived.

[Math 19]

$$\tanh\left(\frac{L(u_3)}{2}\right) = \tanh\left(\frac{L(u_1)}{2}\right)\tanh\left(\frac{L(u_2)}{2}\right) \quad \text{(Math 19)}$$

[Math 20]

$$L(u_3) = 2\tanh^{-1}\left(\tanh\left(\frac{L(u_1)}{2}\right)\tanh\left(\frac{L(u_2)}{2}\right)\right) \quad \text{(Math 20)}$$

The above considers bits $u_1$, $u_2$, and $u_3$, but when generalized to j signals, Math (21) is derived. For example, in FIG. 5, $L(m_3)$, $L(b_6)$, and $L(b_5)$ are used when determining $L(b_7)$, resulting in Math (22).

[Math 21]

$$L(u_i) = 2\tanh^{-1}\left(\prod_{j, j \neq i} \tanh\left(\frac{L(u_j)}{2}\right)\right) \quad \text{(Math 21)}$$

[Math 22]

$$L(b_7) = 2\tanh^{-1}\left(\tanh\frac{L(m_3)}{2}\tanh\frac{L(b_6)}{2}\tanh\frac{L(b_5)}{2}\right) \quad \text{(Math 22)}$$

In a case in which bit number reduction processing is not performed at a transmit apparatus side, the specific processing described above is not performed.

The above describes operations in connection with BICM-ID, but iterative detection need not be implemented, and signal processing may perform detection only once.

<Transmit Apparatus>

Figure 7:
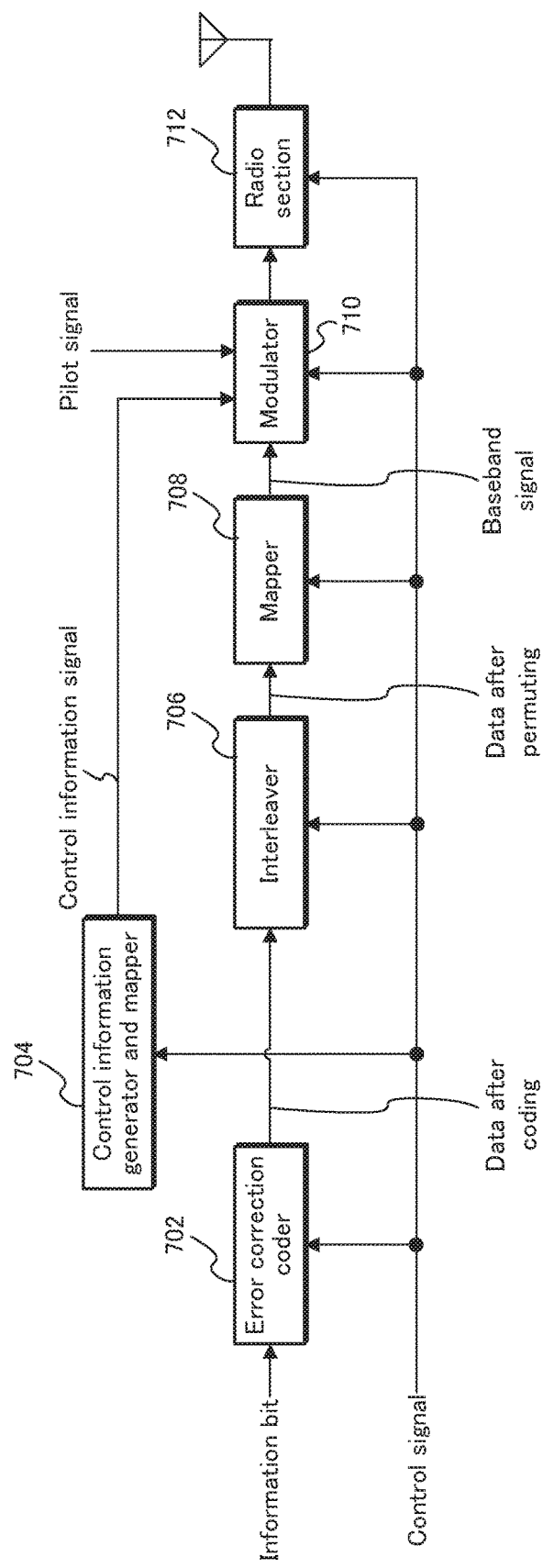
FIG. 7 illustrates a configuration of a transmit apparatus.

FIG. 7 illustrates a configuration of a transmit apparatus. A transmit apparatus 700 includes an error correction coder 702, a control information generator and mapper 704, an interleaver 706, a mapper 708, a modulator 710, and a radio section 712.

The error correction coder 702 receives a control signal and information bits as input, determines, for example, code length (block length) of error correction code and coding rate of error correction code based on the control signal, performs error correction coding on the information bits based on a determined error correction coding method, and outputs bits after error correction coding to the interleaver 706.

The interleaver 706 receives a control signal and bits post-coding as input, determines an interleaving method based on the control signal, interleaves (permutes) the bits post-coding, and outputs data post-interleaving to the mapper 708.

The control information generator and mapper 704 receives a control signal as input, generates control information for a receive apparatus to operate (for example, information related to physical layers such as an error correction scheme or modulation scheme used by a transmit apparatus, control information not related to physical layers, etc.) based on the control signal, performs mapping on the control information, and outputs a control information signal.

The mapper 708 receives a control signal and data post-interleaving as input, determines a mapping method based on the control signal, performs mapping on the data post-interleaving according to the mapping method determined, and outputs a baseband signal in-phase component I and quadrature component Q. Modulation schemes that the mapper 708 is capable of supporting are, for example, π/2 shift BPSK, QPSK, 8PSK, (12,4)16APSK, (8,8)16APSK, and 32APSK.

Details of (12,4)16APSK, (8,8)16APSK, and details of a mapping method that is a feature of the present embodiment are described in detail later.

The modulator 710 receives a control signal, a control information signal, a pilot signal, and a baseband signal as input, determines frame configuration based on the control signal, generates, according to the frame configuration, a modulated signal from the control information signal, the pilot signal, and the baseband signal, and outputs the modulated signal.

The radio section 712 receives a modulated signal as input, performs processing such as bandlimiting using a root roll-off filter, quadrature modulation, frequency conversion, and amplification, and generates a transmit signal, the transmit signal being transmitted from an antenna.

<Constellation>

The following describes constellations and assignment (labelling) of bits to each constellation point of (12,4) 16APSK and (8,8)16APSK mapping performed by the mapper 708, which is of importance in the present embodiment.

Figure 8:
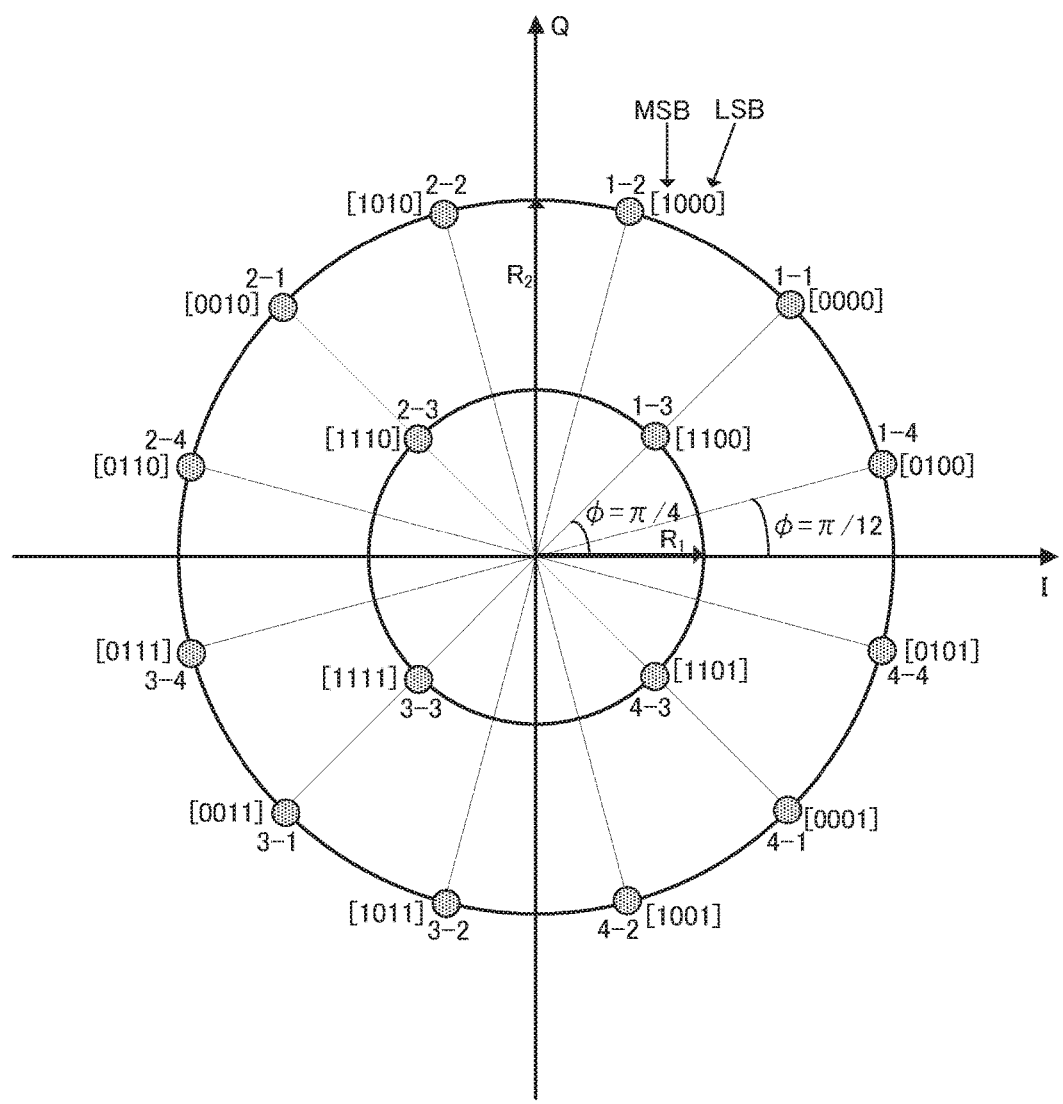
FIG. 8 illustrates a constellation of (12,4)16APSK.

As illustrated in FIG. 8, constellation points of (12,4) 16APSK mapping are arranged in two concentric circles having different radii (amplitude components) in the I-Q plane. In the present description, among the concentric circles, a circle having a larger radius $R_2$ is referred to as an "outer circle" and a circle having a smaller radius $R_1$ referred to as an "inner circle". A ratio of the radius $R_2$ to the radius $R_1$ is referred to as a "radius ratio" (or "ring ratio"). Note that here, $R_1$ is a real number, $R_2$ is a real number, $R_1$ is greater than zero, and $R_2$ is greater than zero. Further, $R_1$ is less than $R_2$.

Further, on the circumference of the outer circle are arranged twelve constellation points and on the circumference of the inner circle are arranged four constellation points. The (12,4) in (12,4)16APSK indicates that in the order of outer circle, inner circle, there are twelve and four constellation points, respectively.

Coordinates of each constellation point of (12,4)16APSK on the I-Q plane are as follows:

Constellation point 1-1 [0000] . . . ($R_2 \cos(\pi/4)$, $R_2 \sin(\pi/4)$)

Constellation point 1-2 [1000] . . . ($R_2 \cos(5\pi/12)$, $R_2 \sin(5\pi/12)$)

Constellation point 1-3 [1100] . . . ($R_1 \cos(\pi/4)$, $R_1 \sin(\pi/4)$)

Constellation point 1-4 [0100] . . . ($R_2 \cos(\pi/12)$, $R_2 \sin(\pi/12)$)

Constellation point 2-1 [0010] . . . ($R_2 \cos(3\pi/4)$, $R_2 \sin(3\pi/4)$)

Constellation point 2-2 [1010] . . . ($R_2 \cos(7\pi/12)$, $R_2 \sin(7\pi/12)$)

Constellation point 2-3 [1110] . . . ($R_1 \cos(3\pi/4)$, $R_1 \sin(3\pi/4)$)

Constellation point 2-4 [0110] . . . ($R_2 \cos(11\pi/12)$, $R_2 \sin(11\pi/12)$)

Constellation point 3-1 [0011] . . . ($R_2 \cos(-3\pi/4)$, $R_2 \sin(-3\pi/4)$)

Constellation point 3-2 [1011] . . . ($R_2 \cos(-7\pi/12)$, $R_2 \sin(-7\pi/12)$)

Constellation point 3-3 [1111] . . . ($R_1 \cos(-3\pi/4)$, $R_1 \sin(-3\pi/4)$)

Constellation point 3-4 [0111] . . . ($R_2 \cos(-11\pi/12)$, $R_2 \sin(-11\pi/12)$)

Constellation point 4-1 [0001] . . . ($R_2 \cos(-\pi/4)$, $R_2 \sin(-\pi/4)$)

Constellation point 4-2 [1001] . . . ($R_2 \cos(-5\pi/12)$, $R_2 \sin(-5\pi/12)$)

Constellation point 4-3 [1101] . . . ($R_1 \cos(-/4)$, $R_1 \sin(-\pi/4)$)

Constellation point 4-4 [0101] . . . ($R_2 \cos(-\pi/12)$, $R_2 \sin(-\pi/12)$)

With respect to phase, the unit used is radians. Accordingly, for example, referring to $R_2 \cos(\pi/4)$, the unit of $\pi/4$ is radians. Hereinafter, the unit of phase is radians.

Further, for example, the following relationship is disclosed above:

Constellation point 1-1 [0000] . . . ($R_2 \cos(\pi/4)$, $R_2 \sin(\pi/4)$)

In data that is inputted to the mapper 708, this means that when four bits [$b_3 b_2 b_1 b_0$]=[0000], an in-phase component I and quadrature component Q of a baseband signal after mapping are defined as (I,Q)=($R_2 \cos(\pi/4)$, $R_2 \sin(\pi/4)$). As another example, the following relationship is disclosed above:

Constellation point 4-4 [0101] . . . ($R_2 \cos(-\pi/12)$, $R_2 \sin(-\pi/12)$)

In data that is inputted to the mapper 708, this means that when four bits [$b_3 b_2 b_1 b_0$]=[0101], an in-phase component I and quadrature component Q of a baseband signal after mapping are defined as (I,Q)=($R_2 \cos(-\pi/12)$, $R_2 \sin(-\pi/12)$).

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Figure 9:
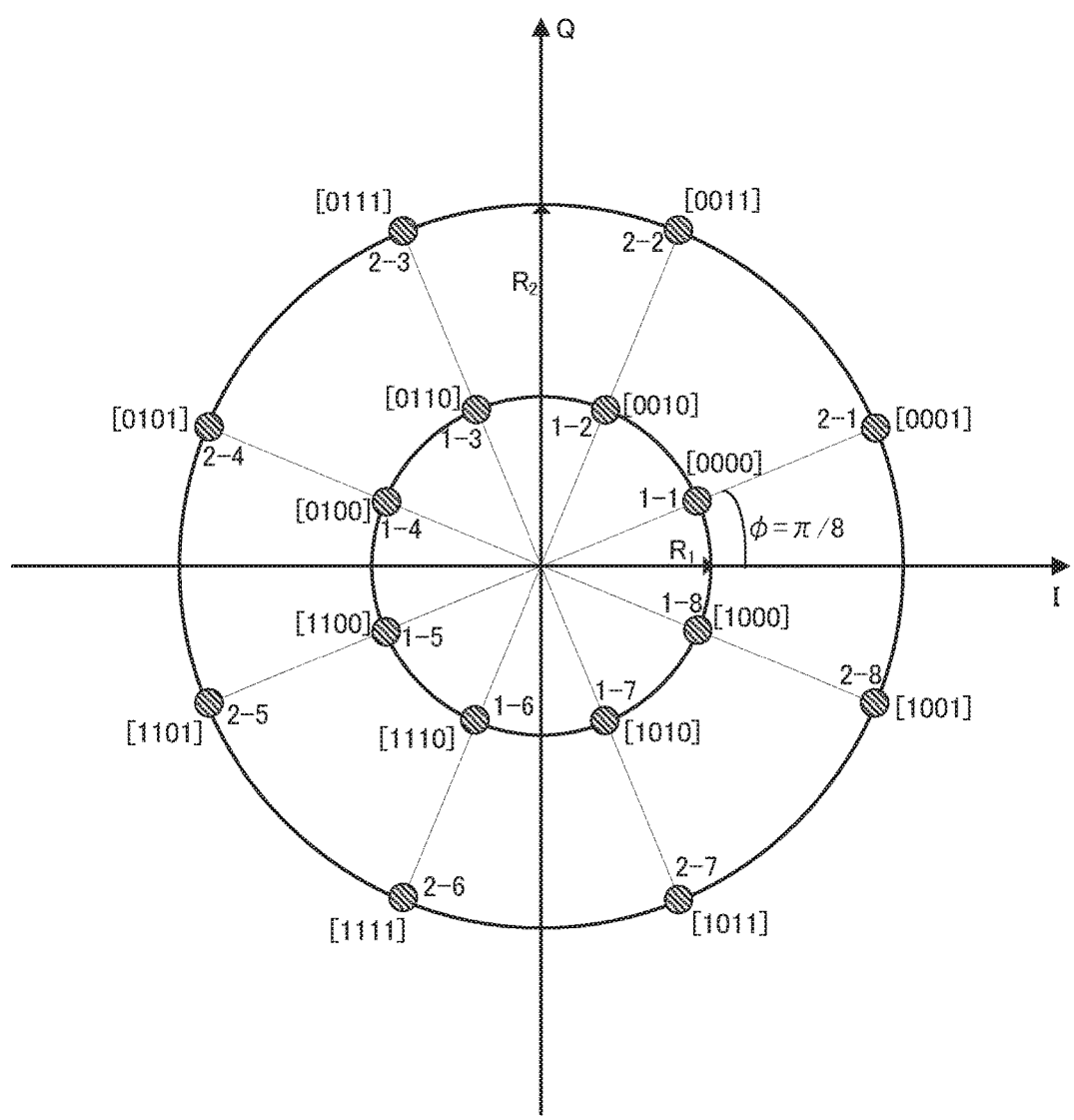
FIG. 9 illustrates a constellation of (8,8)16APSK.

As illustrated in FIG. 9, constellation points of (8,8) 16APSK mapping are arranged in two concentric circles having different radii (amplitude components) in the I-Q plane. On the circumference of the outer circle are arranged eight constellation points and on the circumference of the inner circle are arranged eight constellation points. The (8,8) in (8,8)16APSK indicates that in the order of outer circle, inner circle, there are eight and eight constellation points, respectively. Further, as with (12,4)16APSK, among the concentric circles, the circle having a larger radius $R_2$ is referred to as the "outer circle" and the circle having a smaller radius $R_1$ is referred to as the "inner circle". A ratio of the radius $R_2$ to the radius $R_1$ is referred to as a "radius ratio" (or "ring ratio"). Note that here, $R_1$ is a real number, $R_2$ is a real number, $R_1$ is greater than zero, and $R_2$ is greater than zero. Also, $R_1$ is less than $R_2$.

Coordinates of each constellation point of (8,8)16APSK on the I-Q plane are as follows:

Constellation point 1-1 [0000] . . . ($R_1 \cos(\pi/8)$, $R_1 \sin(\pi/8)$)

Constellation point 1-2 [0010] . . . ($R_1 \cos(3\pi/8)$, $R_1 \sin(3\pi/8)$)

Constellation point 1-3 [0110] . . . ($R_1 \cos(5\pi/8)$, $R_1 \sin(5\pi/8)$)

Constellation point 1-4 [0100] . . . ($R_1 \cos(7\pi/8)$, $R_1 \sin(7\pi/8)$)

Constellation point 1-5 [1100] . . . ($R_1 \cos(-7\pi/8)$, $R_1 \sin(-7\pi/8)$)

Constellation point 1-6 [1110] . . . ($R_1 \cos(-5\pi/8)$, $R_1 \sin(-5\pi/8)$)

Constellation point 1-7 [1010] . . . ($R_1 \cos(-3\pi/8)$, $R_1 \sin(-3\pi/8)$)

Constellation point 1-8 [1000] . . . ($R_1 \cos(-\pi/8)$, $R_1 \sin(-\pi/8)$)

Constellation point 2-1 [0001] . . . ($R_2 \cos(\pi/8)$, $R_2 \sin(\pi/8)$)

Constellation point 2-2 [0011] . . . ($R_2 \cos(3\pi/8)$, $R_2 \sin(3\pi/8)$)

Constellation point 2-3 [0111] . . . ($R_2 \cos(5\pi/8)$, $R_2 \sin(5\pi/8)$)

Constellation point 2-4 [0101] . . . ($R_2 \cos(7\pi/8)$, $R_2 \sin(7\pi/8)$)

Constellation point 2-5 [1101] . . . ($R_2 \cos(-7\pi/8)$, $R_2 \sin(-7\pi/8)$)

Constellation point 2-6 [1111] . . . ($R_2 \cos(-5\pi/8)$, $R_2 \sin(-5\pi/8)$)

Constellation point 2-7 [1011] . . . ($R_2 \cos(-3\pi/8)$, $R_2 \sin(-3\pi/8)$)

Constellation point 2-8 [1001] . . . ($R_2 \cos(-\pi/8)$, $R_2 \sin(-\pi/8)$)

For example, the following relationship is disclosed above:

Constellation point 1-1 [0000] . . . ($R_1 \cos(\pi/8)$, $R_1 \sin(\pi/8)$)

In data that is inputted to the mapper 708, this means that when four bits [$b_3 b_2 b_1 b_0$]=[0000], an in-phase component I and quadrature component Q of a baseband signal after mapping are defined as (I,Q)=($R_1 \cos(\pi/8)$, $R_1 \sin(\pi/8)$). As another example, the following relationship is disclosed above:

Constellation point 2-8 [1001] . . . ($R_2 \cos(-\pi/8)$, $R_2 \sin(-\pi/8)$)

In data that is inputted to the mapper 708, this means that when four bits [$b_3 b_2 b_1 b_0$]=[1001], an in-phase component I and quadrature component Q of a baseband signal after mapping are defined as (I,Q)=($R_2 \cos(-\pi/8)$, $R_2 \sin(-\pi/8)$).

This holds true for all of constellation point 1-1, constellation point 1-2, constellation point 1-3, constellation point 1-4, constellation point 1-5, constellation point 1-6, constellation point 1-7, constellation point 1-8, constellation point 2-1, constellation point 2-2, constellation point 2-3, constellation point 2-4, constellation point 2-5, constellation point 2-6, constellation point 2-7, and constellation point 2-8.

<Transmission Output>

In order to achieve the same transmission output for each of the two types of modulation scheme above, the following normalization coefficient may be used.

[Math 23]
$$a_{(12,4)} = \frac{z}{\sqrt{(4 \times R_1^2 + 12 \times R_2^2)/16}} \quad \text{(Math 23)}$$

[Math 24]
$$a_{(8,8)} = \frac{z}{\sqrt{(R_1^2 + R_2^2)/2}} \quad \text{(Math 24)}$$

Note that $a_{(12,4)}$ is a normalization coefficient of (12,4) 16APSK and $a_{(8,8)}$ is a coefficient of (8,8)16APSK.

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is (12,4)16APSK, $(I_n, Q_n)=(a_{(12,4)} \times I_b, a_{(12,4)} \times Q_b)$ holds true, and when a modulation scheme is (8,8)16APSK, $(I_n, Q_n)=(a_{(8,8)} \times I_b, a_{(8,8)} \times Q_b)$ holds true.

When a modulation scheme is (12,4)16APSK, the in-phase component $I_b$ and quadrature component $Q_b$ are the in-phase component I and quadrature component Q, respectively, of a baseband signal after mapping that is obtained by mapping based on FIG. 8. Accordingly, when a modulation scheme is (12,4)16APSK, the following relationships hold true:

Constellation point 1-1 [0000] . . . $(I_n, Q_n)=(a_{(12,4)}R_2 \times \cos(\pi/4), a_{(12,4)} \times R_2 \times \sin(\pi/4))$ Constellation point 1-2 [1000] . . . $(I_n, Q_n)=(a_{(12,4)} \times R_2 \times \cos(5\pi/12), a_{(12,4)} \times R_2 \times \sin(5\pi/12))$ Constellation point 1-3 [1100] . . . $(I_n, Q_n)=(a_{(12,4)} \times R_1 \times \cos(\pi/4), a_{(12,4)} \times R_1 \times \sin(\pi/4))$ Constellation point 1-4 [0100] . . . $(I_n, Q_n)=(a_{(12,4)} \times R_2 \times \cos(\pi/12), a_{(12,4)} \times R_2 \times \sin(\pi/12))$ Constellation point 2-1 [0010] . . . $(I_n, Q_n)=(a_{(12,4)} \times R_2 \times \cos(3\pi/4), a_{(12,4)} \times R_2 \times \sin(3\pi/4))$ Constellation point 2-2 [1010] . . . $(I_n, Q_n)=(a_{(12,4)} \times R_2 \times \cos(7\pi/12), a_{(12,4)} \times R_2 \times \sin(7\pi/12))$ Constellation point 2-3 [1110] . . . $(I_n, Q_n)=(a_{(12,4)} \times R_1 \times \cos(3\pi/4), a_{(12,4)} \times R_1 \times \sin(3\pi/4))$ Constellation point 2-4 [0110] . . . $(I_n, Q_n)=(a_{(12,4)} \times R_2 \times \cos(11\pi/12), a_{(12,4)} \times R_2 \times \sin(11\pi/12))$ Constellation point 3-1 [0011] . . . $(I_n, Q_n)=(a_{(12,4)} \times R_2 \times \cos(-3\pi/4), a_{(12,4)} \times R_2 \times \sin(-3\pi/4))$ Constellation point 3-2 [1011] . . . $(I_n, Q_n)=(a_{(12,4)} \times R_2 \times \cos(-7\pi/12), a_{(12,4)} \times R_2 \times \sin(-7\pi/12))$ Constellation point 3-3 [1111] . . . $(I_n, Q_n)=(a_{(12,4)} \times R_1 \times \cos(-3\pi/4), a_{(12,4)} \times R_1 \times \sin(-3\pi/4))$ Constellation point 3-4 [0111] . . . $(I_n, Q_n)=(a_{(12,4)} \times R_2 \times \cos(-11\pi/12), a_{(12,4)} \times R_2 \times \sin(-11\pi/12))$ Constellation point 4-1 [0001] . . . $(I_n, Q_n)=(a_{(12,4)} \times R_2 \times \cos(-\pi/4), a_{(12,4)} \times R_2 \times \sin(-\pi/4))$ Constellation point 4-2 [1001] . . . $(I_n, Q_n)=(a_{(12,4)} \times R_2 \times \cos(-5\pi/12), a_{(12,4)} \times R_2 \times \sin(-5\pi/12))$ Constellation point 4-3 [1101] . . . $(I_n, Q_n)=(a_{(12,4)} \times R_1 \times \cos(-\pi/4), a_{(12,4)} \times R_1 \times \sin(-\pi/4))$ Constellation point 4-4 [0101] . . . $(I_n, Q_n)=(a_{(12,4)} \times R_2 \times \cos(-\pi/12), a_{(12,4)} \times R_2 \times \sin(-\pi/12))$ For example, the following relationship is disclosed above:

Constellation point 1-1 [0000] . . . $(I_n, Q_n)=(a_{(12,4)} \times R_2 \times \cos(\pi/4), a_{(12,4)} \times R_2 \times \sin(\pi/4))$ In data that is inputted to the mapper 708, this means that when four bits $[b_3b_2b_1b_0]=[0000]$, $(I_n, Q_n)=(a_{(12,4)} \times R_2 \times \cos(\pi/4), a_{(12,4)} \times R_2 \times \sin(\pi/4))$.

As another example, the following relationship is disclosed above:

Constellation point 4-4 [0101] . . . $(I_n, Q_n)=(a_{(12,4)} \times R_2 \times \cos(-\pi/12), a_{(12,4)} \times R_2 \times \sin(-\pi/12))$ In data that is inputted to the mapper 708, this means that when four bits $[b_3b_2b_1b_0]=[0101]$, $(I_n, Q_n)=(a_{(12,4)} \times R_2 \times \cos(-\pi/12), a_{(12,4)} \times R_2 \times \sin(-\pi/12))$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Thus, the mapper 708 outputs $I_n$ and $Q_n$, as described above, as an in-phase component and a quadrature component, respectively, of a baseband signal.

In a similar way, when a modulation scheme is (8,8) 16APSK, the in-phase component $I_b$ and quadrature component $Q_b$ are the in-phase component I and quadrature component Q, respectively, of a baseband signal after mapping that is obtained by mapping based on FIG. 9. Accordingly, when a modulation scheme is (8,8)16APSK, the following relationships hold true:

Constellation point 1-1 [0000] . . . $(I_n, Q_n)=(a_{(8,8)} \times R_1 \times \cos(\pi/8), a_{(8,8)} \times R_1 \times \sin(\pi/8))$ Constellation point 1-2 [0010] . . . $(I_n, Q_n)=(a_{(8,8)} \times R_1 \times \cos(3\pi/8), a_{(8,8)} \times R_1 \times \sin(3\pi/8))$ Constellation point 1-3 [0110] . . . $(I_n, Q_n)=(a_{(8,8)} \times R_1 \times \cos(5\pi/8), a_{(8,8)} \times R_1 \times \sin(5\pi/8))$ Constellation point 1-4 [0100] . . . $(I_n, Q_n)=(a_{(8,8)} \times R_1 \times \cos(7\pi/8), a_{(8,8)} \times R_1 \times \sin(7\pi/8))$ Constellation point 1-5 [1100] . . . $(I_n, Q_n)=(a_{(8,8)} \times R_1 \times \cos(-7\pi/8), a_{(8,8)} \times R_1 \times \sin(-7\pi/8))$ Constellation point 1-6 [1110] . . . $(I_n, Q_n)=(a_{(8,8)} \times R_1 \times \cos(-5\pi/8), a_{(8,8)} \times R_1 \times \sin(-5\pi/8))$ Constellation point 1-7 [1010] . . . $(I_n, Q_n)=(a_{(8,8)} \times R_1 \times \cos(-3\pi/8), a_{(8,8)} \times R_1 \times \sin(-3\pi/8))$ Constellation point 1-8 [1000] . . . $(I_n, Q_n)=(a_{(8,8)} \times R_1 \times \cos(-\pi/8), a_{(8,8)} \times R_1 \times \sin(-\pi/8))$ Constellation point 2-1 [0001] . . . $(I_n, Q_n)=(a_{(8,8)} \times R_2 \times \cos(\pi/8), a_{(8,8)} \times R_2 \times \sin(\pi/8))$ Constellation point 2-2 [0011] . . . $(I_n, Q_n)=(a_{(8,8)} \times R_2 \times \cos(3\pi/8), a_{(8,8)} \times R_2 \times \sin(3\pi/8))$ Constellation point 2-3 [0111] . . . $(I_n, Q_n)=(a_{(8,8)} \times R_2 \times \cos(5\pi/8), a_{(8,8)} \times R_2 \times \sin(5\pi/8))$ Constellation point 2-4 [0101] . . . $(I_n, Q_n)=(a_{(8,8)} \times R_2 \times \cos(7\pi/8), a_{(8,8)} \times R_2 \times \sin(7\pi/8))$ Constellation point 2-5 [1101] . . . $(I_n, Q_n)=(a_{(8,8)} \times R_2 \times \cos(-7\pi/8), a_{(8,8)} \times R_2 \times \sin(-7\pi/8))$ Constellation point 2-6 [1111] . . . $(I_n, Q_n)=(a_{(8,8)} \times R_2 \times \cos(-5\pi/8), a_{(8,8)} \times R_2 \times \sin(-5\pi/8))$ Constellation point 2-7 [1011] . . . $(I_n, Q_n)=(a_{(8,8)} \times R_2 \times \cos(-3\pi/8), a_{(8,8)} \times R_2 \times \sin(-3\pi/8))$ Constellation point 2-8 [1001] ... $(I_n, Q_n)=(a_{(8,8)} \times R_2 \times \cos(-\pi/8), a_{(8,8)} \times R_2 \times \sin(-\pi/8))$ For example, the following relationship is disclosed above:

Constellation point 1-1 [0000] ... $(I_n, Q_n)=(a_{(8,8)} \times R_1 \times \cos(\pi/8), a_{(8,8)} \times R_1 \times \sin(\pi/8))$ In data that is inputted to the mapper 708, this means that when four bits $[b_3 b_2 b_1 b_0]=[0000]$, $(I_n, Q_n)=(a_{(8,8)} \times R_1 \times \cos(\pi/8), a_{(8,8)} \times R_1 \times \sin(\pi/8))$. As another example, the following relationship is disclosed above:

Constellation point 2-8 [1001] ... $(I_n, Q_n)=(a_{(8,8)} \times R_2 \times \cos(-\pi/8), a_{(8,8)} \times R_2 \times \sin(-\pi/8))$ In data that is inputted to the mapper 708, this means that when four bits $[b_3 b_2 b_1 b_0]=[1001]$, $(I_n, Q_n)=(a_{(8,8)} \times R_2 \times \cos(-\pi/8), a_{(8,8)} \times R_2 \times \sin(-\pi/8))$.

This holds true for all of constellation point 1-1, constellation point 1-2, constellation point 1-3, constellation point 1-4, constellation point 1-5, constellation point 1-6, constellation point 1-7, constellation point 1-8, constellation point 2-1, constellation point 2-2, constellation point 2-3, constellation point 2-4, constellation point 2-5, constellation point 2-6, constellation point 2-7, and constellation point 2-8.

Thus, the mapper 708 outputs $I_n$ and $Q_n$, as described above, as an in-phase component and a quadrature component, respectively, of a baseband signal.

<Frame Configuration of Modulated Signal>

The following describes frame configuration of a modulated signal when the present embodiment is applied to advanced wide band digital satellite broadcasting.

Figure 10:
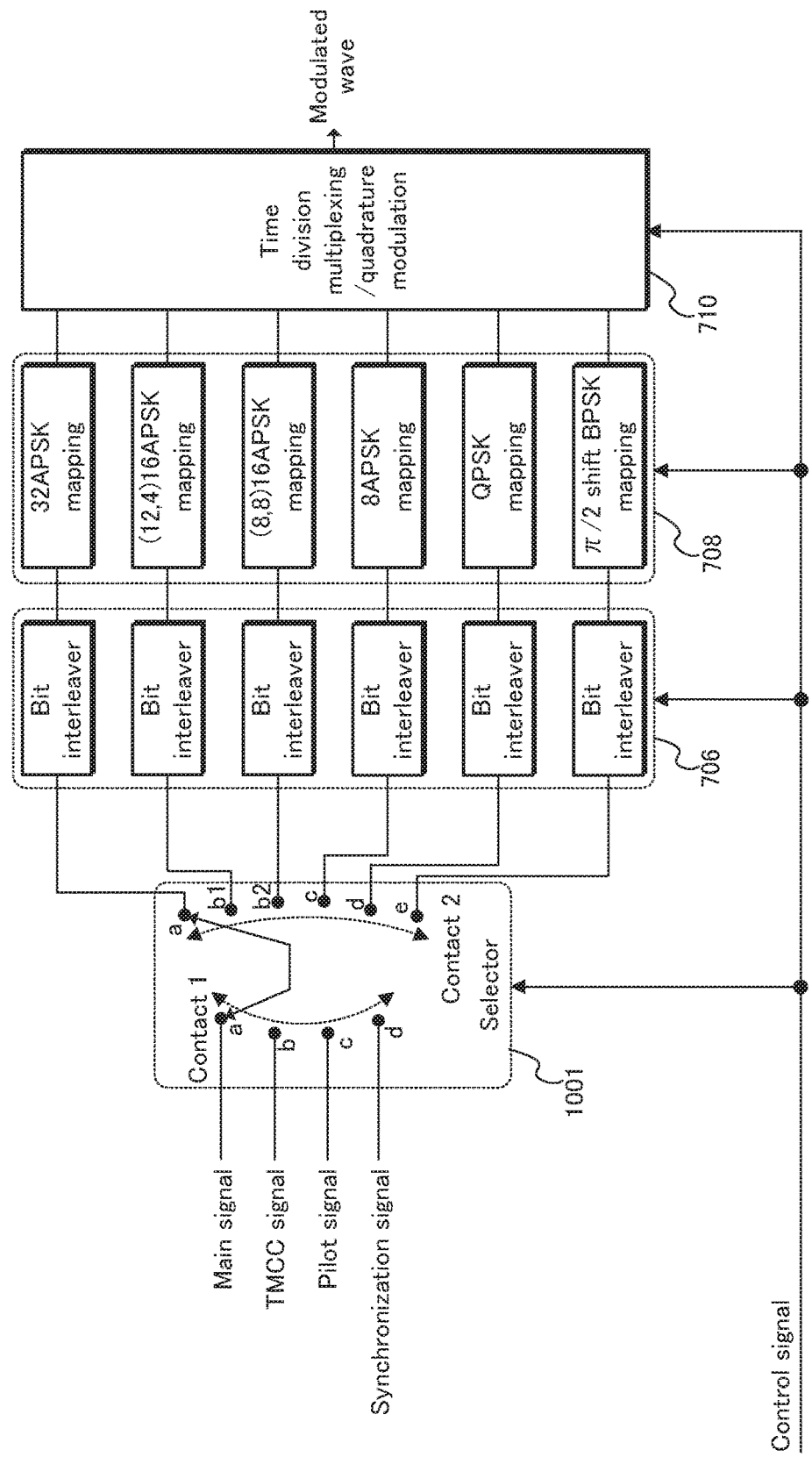
FIG. 10 illustrates a block diagram related to generation of a modulated signal.
Figure 11:
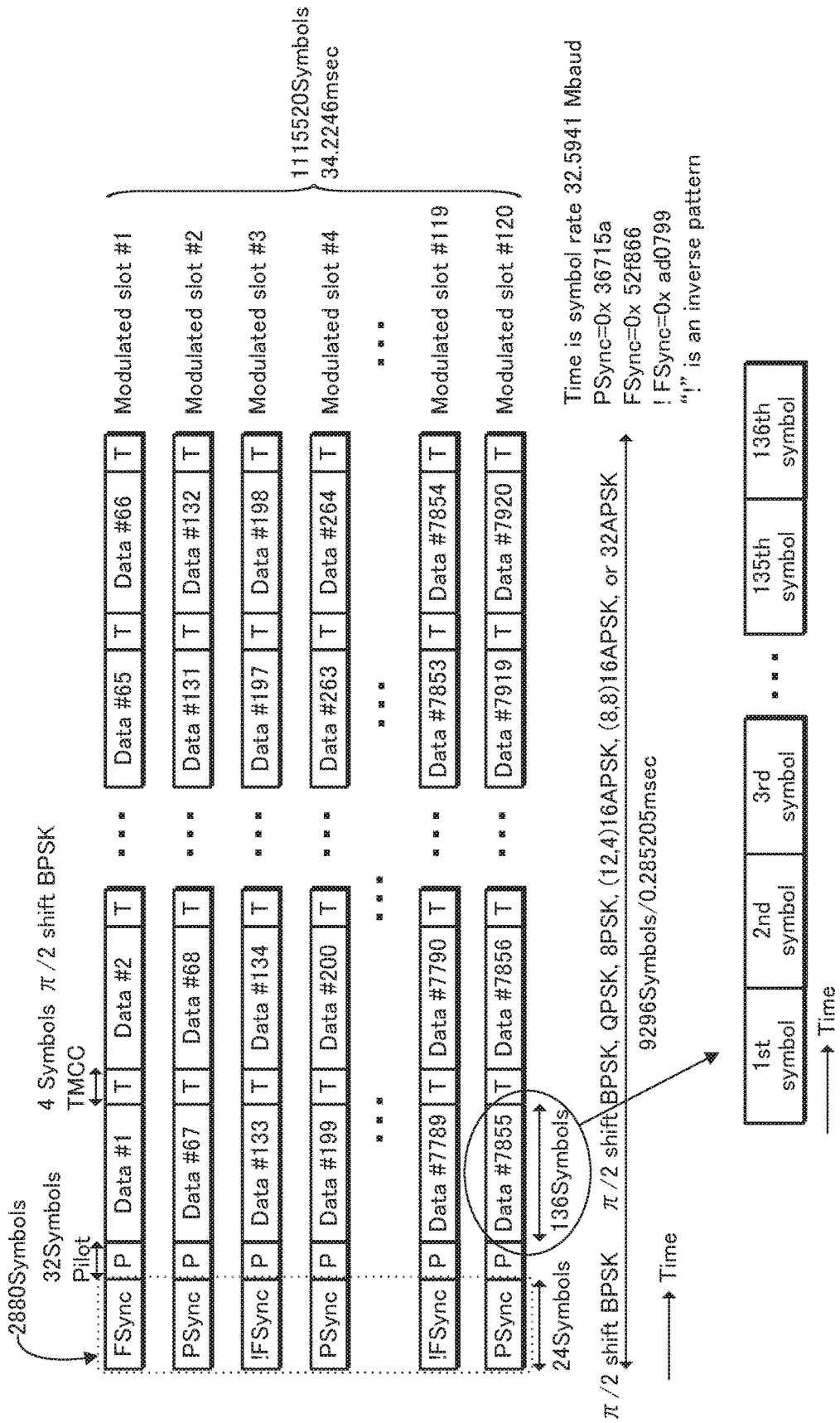
FIG. 11 illustrates frame configuration of a modulated signal.

FIG. 10 is a block diagram related to generation of a modulated signal. FIG. 11 illustrates a frame configuration of a modulated signal.

Note that the blocks related to modulated signal generation in FIG. 10 are the error correction coder 702, the control information generator and mapper 704, the interleaver 706, and the mapper 708 in FIG. 7, consolidated and re-drawn.

A transmission and multiplexing configuration control (TMCC) signal is a control signal for performing control related to transmission and multiplexing such as a plurality of transmission modes (modulation scheme/error correction coding rate). Further, a TMCC signal indicates assignment of a modulation scheme for each symbol (or slot composed from a plurality of symbols).

A selector 1001 in FIG. 10 switches contact 1 and contact 2 so that symbol sequences of modulated wave output are arranged as illustrated in FIG. 11. Specifically, switching is performed as follows.

During synchronous transmission: Contact 1=d, contact 2=e.

During pilot transmission: Contact 1=c, contact 2=selection from a to e according to modulation scheme assigned to slot (or symbol) (as an important point of the present invention, b1 and b2 may be alternately selected for each symbol—this point is described in detail later).

During TMCC transmission: Contact 1=b, contact 2=e.

During data transmission: Contact 1=a, contact 2=selection from a to e according to modulation scheme assigned to slot (or symbol) (as an important point of the present invention, b1 and b2 may be alternately (or regularly) selected for each symbol—this point is described in detail later).

Information for arrangement indicated in FIG. 11 is included in the control signal of FIG. 10.

The interleaver 706 performs bit interleaving (bit permuting) based on information in the control signal.

The mapper 708 performs mapping according to a scheme selected by the selector 1001 based on the information in the control signal.

The modulator 710 performs processing such as time division multiplexing/quadrature modulation and bandlimiting according to a root roll-off filter, and outputs a modulated wave.

<Example of Data Symbol Pertaining to Present Invention>

As described above, in advanced wide band digital satellite broadcasting, in an in-phase (I)-quadrature-phase (Q) plane, (12,4)16APSK is used as a modulation scheme that broadcasts 16 constellation points, in other words four bits by one symbol. One reason for this is that PAPR of (12,4)16APSK is, for example, less than PAPR of 16QAM and PAPR of (8,8)16APSK, and therefore average transmission power of radio waves transmitted from a broadcast station, i.e., a satellite, can be increased. Accordingly, although BER properties of (12,4)16APSK are worse than BER properties of 16QAM and (8,8)16APSK, when the point that average transmission power can be set higher is considered, the probability of achieving a wide reception area is high (this point is described in more detail above).

Accordingly, in an in-phase (I)-quadrature-phase (Q) plane, as long as a modulation scheme (or transmission method) having a low PAPR and good BER properties is used as a modulation scheme (or transmission method) having 16 constellation points, the probability of achieving a wide reception area is high. The present invention is an invention based on this point (note that "good BER properties" means that at a given SNR, a low BER is achieved).

An outline of a method of constructing a data symbol, which is one point of the present invention, is described below.

"In a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols." (However, as described in modifications below, there is a transmission method that can obtain a similar effect to the above symbol arrangement even as a method that does not satisfy this outline.)

This point is explained with specific examples below.

The 136 symbols of Data#7855 in FIG. 11 are, as illustrated in FIG. 11, ordered along a time axis into "1st symbol", "2nd symbol", "3rd symbol", . . . , "135th symbol", and "136th symbol".

A (12,4)16APSK modulation scheme is used for odd-numbered symbols, and an (8,8)16APSK modulation scheme is used for even-numbered symbols.

Figure 12:
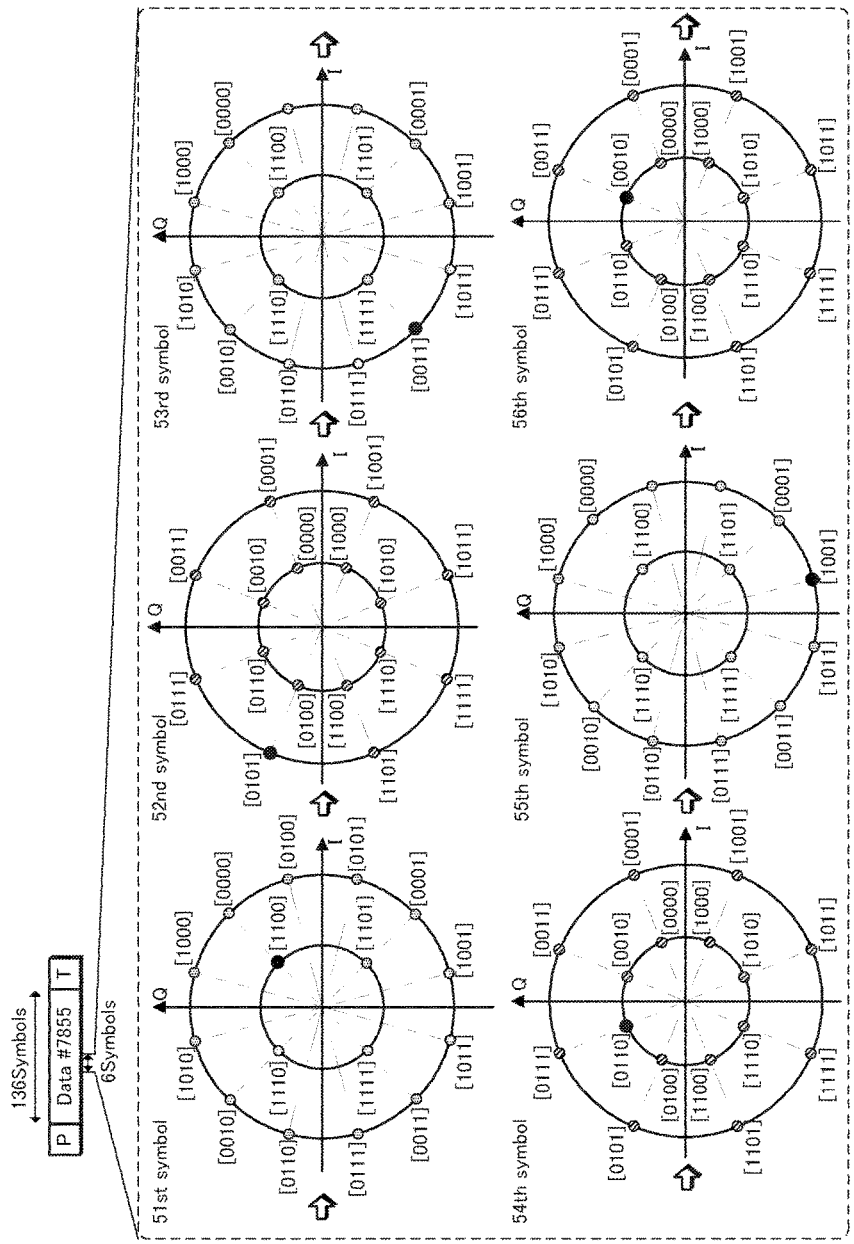
FIG. 12 illustrates an example of data symbols.

An example of data symbols is illustrated in FIG. 12. FIG. 12 illustrates six symbols among 136 symbols (from "51st symbol" to "56th symbol"). As illustrated in FIG. 12, among consecutive symbols, two types of modulation scheme are alternately used in an order (12,4)16APSK, (8,8)16APSK, (12,4)16APSK, (8,8)16APSK, (12,4)16APSK, (8,8)16APSK.

FIG. 12 illustrates the following.

When four bits $[b_3 b_2 b_1 b_0]$ transmitted as the "51st symbol" are [1100], an in-phase component and quadrature component of a baseband signal corresponding to the constellation point marked by a black circle (●) in FIG. 12 is transmitted by the transmit apparatus. (modulation scheme: (12,4)16APSK)

When four bits $[b_3 b_2 b_1 b_0]$ transmitted as the "52nd symbol" are [0101], an in-phase component and quadrature component of a baseband signal corresponding to the constellation point marked by a black circle (●) in FIG. 12 is transmitted by the transmit apparatus. (modulation scheme: (8,8)16APSK)

When four bits $[b_3b_2b_1b_0]$ transmitted as the "53rd symbol" are [0011], an in-phase component and quadrature component of a baseband signal corresponding to the constellation point marked by a black circle (●) in FIG. 12 is transmitted by the transmit apparatus. (modulation scheme: (12,4)16APSK)

When four bits $[b_3b_2b_1b_0]$ transmitted as the "54th symbol" are [0110], an in-phase component and quadrature component of a baseband signal corresponding to the constellation point marked by a black circle (●) in FIG. 12 is transmitted by the transmit apparatus. (modulation scheme: (8,8)16APSK)

When four bits $[b_3b_2b_1b_0]$ transmitted as the "55th symbol" are [1001], an in-phase component and quadrature component of a baseband signal corresponding to the constellation point marked by a black circle (●) in FIG. 12 is transmitted by the transmit apparatus. (modulation scheme: (12,4)16APSK)

When four bits $[b_3b_2b_1b_0]$ transmitted as the "56th symbol" are [0010], an in-phase component and quadrature component of a baseband signal corresponding to the constellation point marked by a black circle (●) in FIG. 12 is transmitted by the transmit apparatus. (modulation scheme: (8,8)16APSK)

Note that in the above example an "odd-numbered symbol=(12,4)16APSK and even-numbered symbol=(8,8)16APSK modulation scheme configuration" is described, but this may be an "even-numbered symbol=(8,8)16APSK and odd-numbered symbol=(12,4)16APSK modulation scheme configuration".

Thus, a transmission method having a low PAPR and good BER properties is achieved, and because an average transmission power can be set high and BER properties are good, the probability of achieving a wide reception area is high.

<Advantage of Arranging Alternate Symbols of Different Modulation Schemes>

According to the present invention, among modulation schemes having 16 constellation points in an I-Q plane, and in particular (12,4)16APSK for which PAPR is low and (8,8)16APSK for which PAPR is slightly higher: "In a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols".

When (8,8)16APSK symbols are arranged consecutively, PAPR becomes higher as (8,8)16APSK symbols continue. However, in order that (8,8)16APSK symbols are not consecutive, "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", and therefore there are no consecutive constellation points in connection with (8,8)16APSK. Thus, PAPR is influenced by (12,4)16APSK, for which PAPR is low, and an effect of suppressing PAPR is obtained.

In connection with BER properties, when (12,4)16APSK symbols are consecutive, BER properties are poor when performing BICM (or BICM-ID) but "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols". Thus, BER properties are influenced by (8,8)16APSK, and an effect of improving BER properties is obtained.

In particular, in order to obtain the low PAPR mentioned above, setting of the ring ratio of (12,4)16APSK and the ring ratio of (8,8)16APSK is of importance.

According to $R_1$ and $R_2$ used in representing the constellation points in the I-Q plane of (12,4)16APSK, a ring ratio $R_{(12,4)}$ of (12,4)16APSK represents $R_{(12,4)}=R_2/R_1$.

In the same way, according to $R_1$ and $R_2$ used in representing the constellation points in the I-Q plane of (8,8)16APSK, a ring ratio $R_{(8,8)}$ of (8,8)16APSK represents $R_{(8,8)}=R_2/R_1$.

Thus, an effect is obtained that "when $R_{(8,8)}<R_{(12,4)}$, the probability of further lowering PAPR is high".

When "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", a modulation scheme likely to control peak power is (8,8)16APSK. Peak power generated by (8,8)16APSK is likely to increase as $R_{(8,8)}$ increases. Accordingly, in order to avoid increasing peak power, setting $R_{(8,8)}$ low is preferable. On the other hand, there is a high degree of freedom for $R_{(12,4)}$ of (12,4)16APSK as long as a value is set for which BER properties are good. Thus, it is likely that the relationship $R_{(8,8)}<R_{(12,4)}$ is preferable.

However, even when $R_{(8,8)}>R_{(12,4)}$, an effect of lowering PAPR of (8,8)16APSK can be obtained.

Accordingly, when focusing on improving BER properties, $R_{(8,8)}>R_{(12,4)}$ may be preferable.

The above-described relationship of ring ratios is also true for the modifications described later (<Patterns of switching modulation schemes, etc.>).

According to the embodiment described above, by alternately arranging symbols of different modulation schemes, PAPR is low and contribution is made towards providing improved data reception quality.

As stated above, an outline of the present invention is: "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols". The following describes labelling and constellations of (12,4)16APSK, and labelling and constellations of (8,8)16APSK for increasing the probability of a receive apparatus obtaining high data reception quality.

<Labelling and Constellations of (12,4)16APSK>

[Labelling of (12,4)16APSK]

The following describes labelling of (12,4)16APSK. Labelling is the relationship between four bits $[b_3b_2b_1b_0]$, which are input, and arrangement of constellation points in an in-phase (I)-quadrature-phase (Q) plane. An example of labelling of (12,4)16APSK is illustrated in FIG. 8, but labelling need not conform to FIG. 8 as long as labelling satisfies the following <Condition 1> and <Condition 2>.

For the purposes of description, the following definitions are used.

When four bits to be transmitted are $[b_{a3}b_{a2}b_{a1}b_{a0}]$, a constellation point A is provided in the in-phase (I)-quadrature-phase (Q) plane, and when four bits to be transmitted are $[b_{b3}b_{b2}b_{b1}b_{b0}]$, a constellation point B is provided in the in-phase (I)-quadrature-phase (Q) plane.

When $b_{a3}=b_{b3}$, $b_{a2}=b_{b2}$, $b_{a1}=b_{b1}$, and $b_{a0}=b_{b0}$, the number of different bits of labelling is defined as zero.

Further, the following definitions are made.

When $b_{a3}\neq b_{b3}$, $b_{a2}=b_{b2}$, $b_{a1}=b_{b1}$, and $b_{a0}=b_{b0}$, the number of different bits of labelling is defined as one.

When $b_{a3}=b_{b3}$, $b_{a2}\neq b_{b2}$, $b_{a1}=b_{b1}$, and $b_{a0}=b_{b0}$, the number of different bits of labelling is defined as one.

When $b_{a3}=b_{b3}$, $b_{a2}=b_{b2}$, $b_{a1}\neq b_{b1}$, and $b_{a0}=b_{b0}$, the number of different bits of labelling is defined as one.

When $b_{a3}=b_{b3}$, $b_{a2}=b_{b2}$, $b_{a1}=b_{b1}$, and $b_{a0}\neq b_{b0}$, the number of different bits of labelling is defined as one.

When $b_{a3}\neq b_{b3}$, $b_{a2}\neq b_{b2}$, $b_{a1}=b_{b1}$, and $b_{a0}=b_{b0}$, the number of different bits of labelling is defined as two.

When $b_{a3}\neq b_{b3}$, $b_{a2}=b_{b2}$, $b_{a1}\neq b_{b1}$, and $b_{a0}=b_{b0}$, the number of different bits of labelling is defined as two.

When $b_{a3}\neq b_{b3}$, $b_{a2}=b_{b2}$, $b_{a1}=bb$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}=b_{b0}$, the number of different bits of labelling is defined as two.

When $b_{a3}=b_{b3}$, $b_{a2}\neq b_{b2}$, $b_{a1}=b_{b1}$, and $b_{a0}\neq b_{b0}$, the number of different bits of labelling is defined as two.

When $b_{a3}=b_{b3}$, $b_{a2}=b_{b2}$, $b_{a1}\neq b_{b1}$, and $b_{a0}\neq b_{b0}$, the number of different bits of labelling is defined as two.

When $b_{a3}\neq b_{b3}$, $b_{a2}\neq b_{b2}$, $b_{a1}\neq b_{b1}$, and $b_{a0}=b_{b0}$, the number of different bits of labelling is defined as three.

When $b_{a3}\neq b_{b3}$, $b_{a2}=b_{b2}$, $b_{a1}\neq b_{b1}$, and $b_{a0}\neq b_{b0}$, the number of different bits of labelling is defined as three.

When $b_{a3}=b_{b3}$, $b_{a2}\neq b_{b2}$, $b_{a1}\neq b_{b1}$, and $b_{a0}\neq b_{b0}$, the number of different bits of labelling is defined as three.

When $b_{a3}\neq b_{b3}$, $b_{a2}\neq b_{b2}$, $b_{a1}\neq b_{b1}$, and $b_{a0}=b_{b0}$, the number of different bits of labelling is defined as three.

When $b_{a3}\neq b_{b3}$, $b_{a2}\neq b_{b2}$, $b_{a1}\neq b_{b1}$, and $b_{a0}\neq b_{b0}$, the number of different bits of labelling is defined as four.

Thus, group definitions are performed.

In labelling and constellation of (12,4)16APSK in an in-phase (I)-quadrature-phase (Q) plane in FIG. 8, constellation point 1-1, constellation point 1-2, constellation point 1-3, and constellation point 1-4 are defined as group 1. In the same way, constellation point 2-1, constellation point 2-2, constellation point 2-3, and constellation point 2-4 are defined as group 2; constellation point 3-1, constellation point 3-2, constellation point 3-3, and constellation point 3-4 are defined as group 3; and constellation point 4-1, constellation point 4-2, constellation point 4-3, and constellation point 4-4 are defined as group 4.

The following two conditions are provided.

<Condition 1>

X represents 1, 2, 3, and 4. All values of X satisfy the following:

The number of different bits of labelling between constellation point X-1 and constellation point X-2 is one;

The number of different bits of labelling between constellation point X-2 and constellation point X-3 is one;

The number of different bits of labelling between constellation point X-3 and constellation point X-4 is one; and The number of different bits of labelling between constellation point X-4 and constellation point X-1 is one.

<Condition 2>

In the outer circle:

The number of different bits of labelling between constellation point 1-2 and constellation point 2-2 is one;

The number of different bits of labelling between constellation point 3-2 and constellation point 4-2 is one;

The number of different bits of labelling between constellation point 1-4 and constellation point 4-4 is one; and The number of different bits of labelling between constellation point 2-4 and constellation point 3-4 is one.

In the inner circle:

The number of different bits of labelling between constellation point 1-3 and constellation point 2-3 is one;

The number of different bits of labelling between constellation point 2-3 and constellation point 3-3 is one;

The number of different bits of labelling between constellation point 3-3 and constellation point 4-3 is one; and The number of different bits of labelling between constellation point 4-3 and constellation point 1-3 is one.

By satisfying the above conditions, the number of different bits of labelling among constellation points that are near each other in an in-phase (I)-quadrature-phase (Q) plane is low, and therefore the possibility of a receive apparatus achieving high data reception quality is increased. Thus, when a receive apparatus performs iterative detection, the possibility of the receive apparatus achieving high data reception quality is increased.

Constellation of (12,4)16APSK

Figure 14:
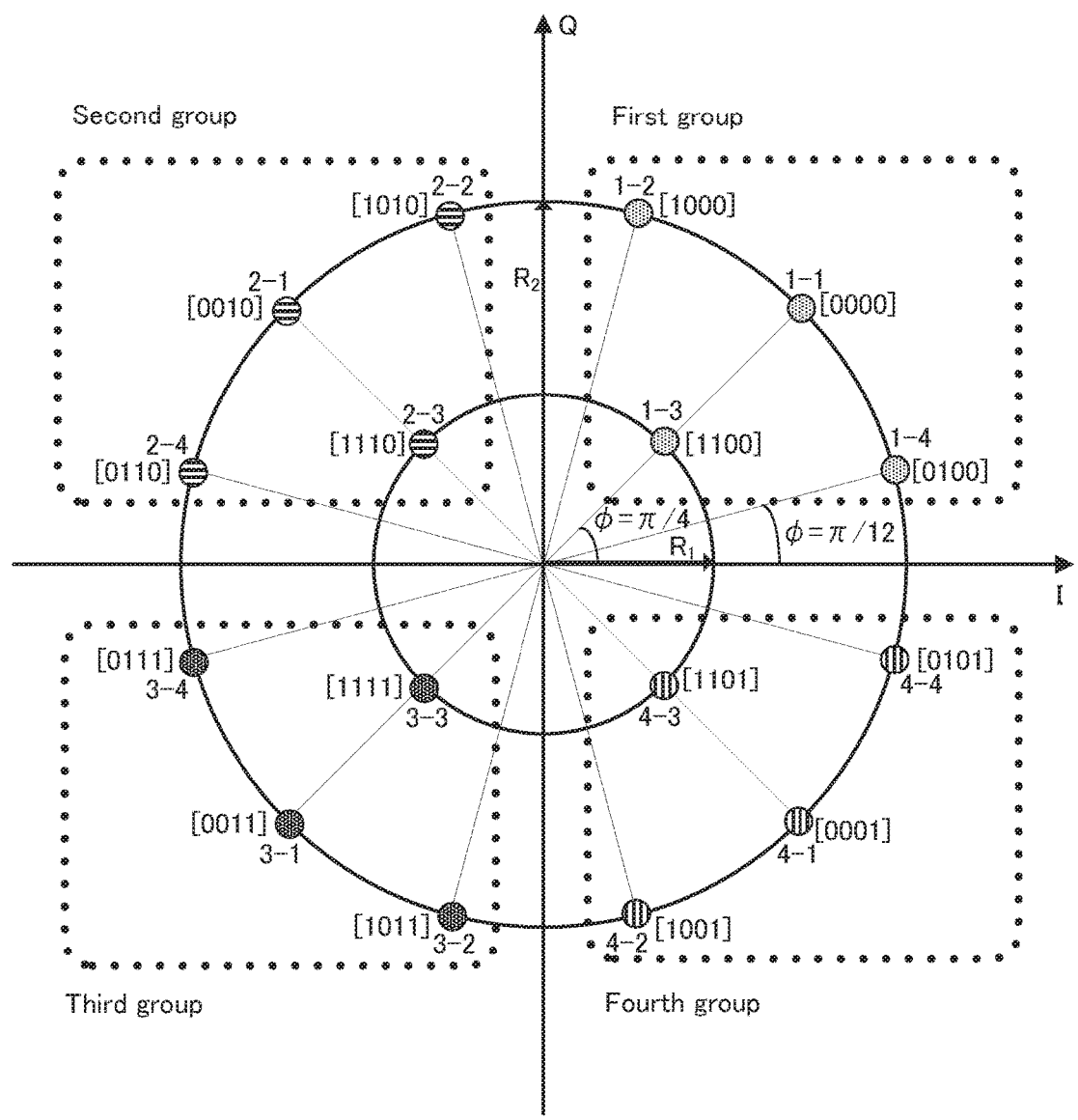
FIG. 14 illustrates an example of labelling of (12,4) 16APSK.

The above describes constellation and labelling in an in-phase (I)-quadrature-phase (Q) plane of FIG. 14, but constellation and labelling in an in-phase (I)-quadrature-phase (Q) plane is not limited to this example. For example, labelling of coordinates on an I-Q plane of each constellation point of (12,4)16APSK may be performed as follows.

Coordinates on an I-Q plane of the constellation point 1-1: $(\cos\theta\times R_2\times\cos(\pi/4)-\sin\theta\times R_2\times\sin(\pi/4), \sin\theta\times R_2\times\cos(\pi/4)+\cos\theta\times R_2\times\sin(\pi/4))$ Coordinates on an I-Q plane of the constellation point 1-2: $(\cos\theta\times R_2\times\cos(5\pi/12)-\sin\theta\times R_2\times\sin(5\pi/12), \sin\theta\times R_2\times\cos(5\pi/12)+\cos\theta\times R_2\times\sin(5\pi/12))$ Coordinates on an I-Q plane of the constellation point 1-3: $(\cos\theta\times R_1\times\cos(\pi/4)-\sin\theta\times R_1\times\sin(\pi/4), \sin\theta\times R_1\times\cos(\pi/4)+\cos\theta\times R_1\times\sin(\pi/4))$ Coordinates on an I-Q plane of the constellation point 1-4: $(\cos\theta\times R_2\times\cos(\pi/12)-\sin\theta\times R_2\times\sin(\pi/12), \sin\theta\times R_2\times\cos(\pi/12)+\cos\theta\times R_2\times\sin(\pi/12))$ Coordinates on an I-Q plane of the constellation point 2-1: $(\cos\theta\times R_2\times\cos(3\pi/4)-\sin\theta\times R_2\times\sin(3\pi/4), \sin\theta\times R_2\times\cos(3\pi/4)+\cos\theta\times R_2\times\sin(3\pi/4))$ Coordinates on an I-Q plane of the constellation point 2-2: $(\cos\theta\times R_2\times\cos(7\pi/12)-\sin\theta\times R_2\times\sin(7\pi/12), \sin\theta\times R_2\times\cos(7\pi/12)+\cos\theta\times R_2\times\sin(7\pi/12))$ Coordinates on an I-Q plane of the constellation point 2-3: $(\cos\theta\times R_1\times\cos(3\pi/4)-\sin\theta\times R_1\times\sin(3\pi/4), \sin\theta\times R_1\times\cos(3\pi/4)+\cos\theta\times R_1\times\sin(3\pi/4))$ Coordinates on an I-Q plane of the constellation point 2-4: $(\cos\theta\times R_2\times\cos(11\pi/12)-\sin\theta\times R_2\times\sin(11\pi/12), \sin\theta\times R_2\times\cos(11\pi/12)+\cos\theta\times R_2\times\sin(11\pi/12))$ Coordinates on an I-Q plane of the constellation point 3-1: $(\cos\theta\times R_2\times\cos(-3\pi/4)-\sin\theta\times R_2\times\sin(-3\pi/4), \sin\theta\times R_2\times\cos(-3\pi/4)+\cos\theta\times R_2\times\sin(-3\pi/4))$ Coordinates on an I-Q plane of the constellation point 3-2: $(\cos\theta\times R_2\times\cos(-7\pi/12)-\sin\theta\times R_2\times\sin(-7\pi/12), \sin\theta\times R_2\times\cos(-7\pi/12)+\cos\theta\times R_2\times\sin(-7\pi/12))$ Coordinates on an I-Q plane of the constellation point 3-3: $(\cos\theta\times R_1\times\cos(-3\pi/4)-\sin\theta\times R_1\times\sin(-3\pi/4), \sin\theta\times R_1\times\cos(-\pi/4)+\cos\theta\times R_1\times\sin(-3\pi/4))$ Coordinates on an I-Q plane of the constellation point 3-4: $(\cos\theta\times R_2\times\cos(-11\pi/12)-\sin\theta\times R_2\times\sin(-11\pi/12), \sin\theta\times R_2\times\cos(-11\pi/12)+\cos\theta\times R_2\times\sin(-11\pi/12))$ Coordinates on an I-Q plane of the constellation point 4-1: $(\cos\theta\times R_2\times\cos(-\pi/4)-\sin\theta\times R_2\times\sin(-\pi/4), \sin\theta\times R_2\times\cos(-\pi/4)+\cos\theta\times R_2\times\sin(-\pi/4))$ Coordinates on an I-Q plane of the constellation point 4-2: $(\cos\theta\times R_2\times\cos(-5\pi/12)-\sin\theta\times R_2\times\sin(-5\pi/12), \sin\theta\times R_2\times\cos(-5\pi/12)+\cos\theta\times R_2\times\sin(-5\pi/12))$ Coordinates on an I-Q plane of the constellation point 4-3:
(cos θ×$R_1$×cos(−π/4)−sin θ×$R_1$×sin(−π/4), sin θ×$R_1$×cos(−π/4)+cos θ×$R_1$×sin(−π/4))

Coordinates on an I-Q plane of the constellation point 4-4:
(cos θ×$R_2$×cos(−π/12)−sin θ×$R_2$×sin(−π/12), sin θ×$R_2$×cos(−π/12)+cos θ×$R_2$×sin(−π/12))

With respect to phase, the unit used is radians. Accordingly, an in-phase component $I_n$ and a quadrature component $Q_n$ of a baseband signal after normalization is represented as below.

Coordinates on an I-Q plane of the constellation point 1-1:
($I_n$, $Q_n$)=($a_{(12,4)}$×cos θ×$R_2$×cos(π/4)−$a_{(12,4)}$×sin θ×$R_2$×sin(π/4), $a_{(12,4)}$×sin θ×$R_2$×cos(π/4)+$a_{(12,4)}$×cos θ×$R_2$×sin(π/4))

Coordinates on an I-Q plane of the constellation point 1-2:
($I_n$, $Q_n$)=($a_{(12,4)}$×cos θ×$R_2$×cos(5π/12)−$a_{(12,4)}$×sin θ×$R_2$×sin(5π/12), $a_{(12,4)}$×sin θ×$R_2$×cos(5π/12)+$a_{(12,4)}$×cos θ×$R_2$×sin(5π/12))

Coordinates on an I-Q plane of the constellation point 1-3:
($I_n$, $Q_n$)=($a_{(12,4)}$×cos θ×$R_1$×cos(π/4)−$a_{(12,4)}$×sin θ×$R_1$×sin(π/4), $a_{(12,4)}$×sin θ×$R_1$×cos(π/4)+$a_{(12,4)}$×cos θ×$R_1$×sin(π/4))

Coordinates on an I-Q plane of the constellation point 1-4:
($I_n$, $Q_n$)=($a_{(12,4)}$×cos θ×$R_2$×cos(π/12)−$a_{(12,4)}$×sin θ×$R_2$×sin(π/12), $a_{(12,4)}$×sin θ×$R_2$×cos(π/12)+$a_{(12,4)}$×cos θ×$R_2$×sin(π/12))

Coordinates on an I-Q plane of the constellation point 2-1:
($I_n$, $Q_n$)=($a_{(12,4)}$×cos θ×$R_2$×cos(3π/4)−$a_{(12,4)}$×sin θ×$R_2$×sin(3π/4), $a_{(12,4)}$×sin θ×$R_2$×cos(3π/4)+$a_{(12,4)}$×cos θ×$R_2$×sin(3π/4))

Coordinates on an I-Q plane of the constellation point 2-2:
($I_n$, $Q_n$)=($a_{(12,4)}$×cos θ×$R_2$×cos(7π/12)−$a_{(12,4)}$×sin θ×$R_2$×sin(7π/12), $a_{(12,4)}$×sin θ×$R_2$×cos(7π/12)+$a_{(12,4)}$×cos θ×$R_2$×sin(7π/12))

Coordinates on an I-Q plane of the constellation point 2-3:
($I_n$, $Q_n$)=($a_{(12,4)}$×cos θ×$R_1$×cos(3π/4)−$a_{(12,4)}$×sin θ×$R_1$×sin(3π/4), $a_{(12,4)}$×sin θ×$R_1$×cos(3π/4)+$a_{(12,4)}$×cos θ×$R_1$×sin(3π/4))

Coordinates on an I-Q plane of the constellation point 2-4:
($I_n$, $Q_n$)=($a_{(12,4)}$×cos θ×$R_2$×cos(11π/12)−$a_{(12,4)}$×sin θ×$R_2$×sin(11π/12), $a_{(12,4)}$×sin θ×$R_2$×cos(11π/12)+$a_{(12,4)}$×cos θ×$R_2$×sin(11π/12))

Coordinates on an I-Q plane of the constellation point 3-1:
($I_n$, $Q_n$)=($a_{(12,4)}$×cos θ×$R_2$×cos(−3π/4)−$a_{(12,4)}$×sin θ×$R_2$×sin(−3π/4), $a_{(12,4)}$×sin θ×$R_2$×cos(−3π/4)+$a_{(12,4)}$×cos θ×$R_2$×sin(−3π/4))

Coordinates on an I-Q plane of the constellation point 3-2:
($I_n$, $Q_n$)=($a_{(12,4)}$×cos θ×$R_2$×cos(−7π/12)−$a_{(12,4)}$×sin θ×$R_2$×sin(−7π/12), $a_{(12,4)}$×sin θ×$R_2$×cos(−7π/12)+$a_{(12,4)}$×cos θ×$R_2$×sin(−7π/12))

Coordinates on an I-Q plane of the constellation point 3-3:
($I_n$, $Q_n$)=($a_{(12,4)}$×cos θ×$R_1$×cos(−3π/4)−$a_{(12,4)}$×sin θ×$R_1$×sin(−3π/4), $a_{(12,4)}$×sin θ×$R_1$×cos(−3π/4)+$a_{(12,4)}$×cos θ×$R_1$×sin(−3π/4))

Coordinates on an I-Q plane of the constellation point 3-4:
($I_n$, $Q_n$)=($a_{(12,4)}$×cos θ×$R_2$×cos(−11π/12)−$a_{(12,4)}$×sin θ×$R_2$×sin(−11π/12), $a_{(12,4)}$×sin θ×$R_2$×cos(−11π/12)+$a_{(12,4)}$×cos θ×$R_2$×sin(−11π/12))

Coordinates on an I-Q plane of the constellation point 4-1:
($I_n$, $Q_n$)=($a_{(12,4)}$×cos θ×$R_2$×cos(−π/4)−$a_{(12,4)}$×sin θ×$R_2$×sin(−π/4), $a_{(12,4)}$×sin θ×$R_2$×cos(−π/4)+$a_{(12,4)}$×cos θ×$R_2$×sin(−π/4))

Coordinates on an I-Q plane of the constellation point 4-2:
($I_n$, $Q_n$)=($a_{(12,4)}$×cos θ×$R_2$×cos(−5π/12)−$a_{(12,4)}$×sin θ×$R_2$×sin(−5π/12), $a_{(12,4)}$×sin θ×$R_2$×cos(−5π/12)+$a_{(12,4)}$×cos θ×$R_2$×sin(−5π/12))

Coordinates on an I-Q plane of the constellation point 4-3:
($I_n$, $Q_n$)=($a_{(12,4)}$×cos θ×$R_1$×cos(−π/4)−$a_{(12,4)}$×sin θ×$R_1$×sin(−π/4), $a_{(12,4)}$×sin θ×$R_1$×cos(−π/4)+$a_{(12,4)}$×cos θ×$R_1$×sin(−π/4))

Coordinates on an I-Q plane of the constellation point 4-4:
($I_n$, $Q_n$)=($a_{(12,4)}$×cos θ×$R_2$×cos(−π/12)−$a_{(12,4)}$×sin θ×$R_2$×sin(−π/12), $a_{(12,4)}$×sin θ×$R_2$×cos(−π/12)+$a_{(12,4)}$×cos θ×$R_2$×sin(−π/12))

Note that θ is a phase provided on an in-phase (I)-quadrature-phase (Q) plane, and $a_{(12,4)}$ is as shown in Math (23).

In a scheme wherein "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8) 16APSK symbols", a (12,4)16APSK modulation scheme may be used for which coordinates on an I-Q plane of each constellation point are as described above and <Condition 1> and <Condition 2> are satisfied.

Figure 15:
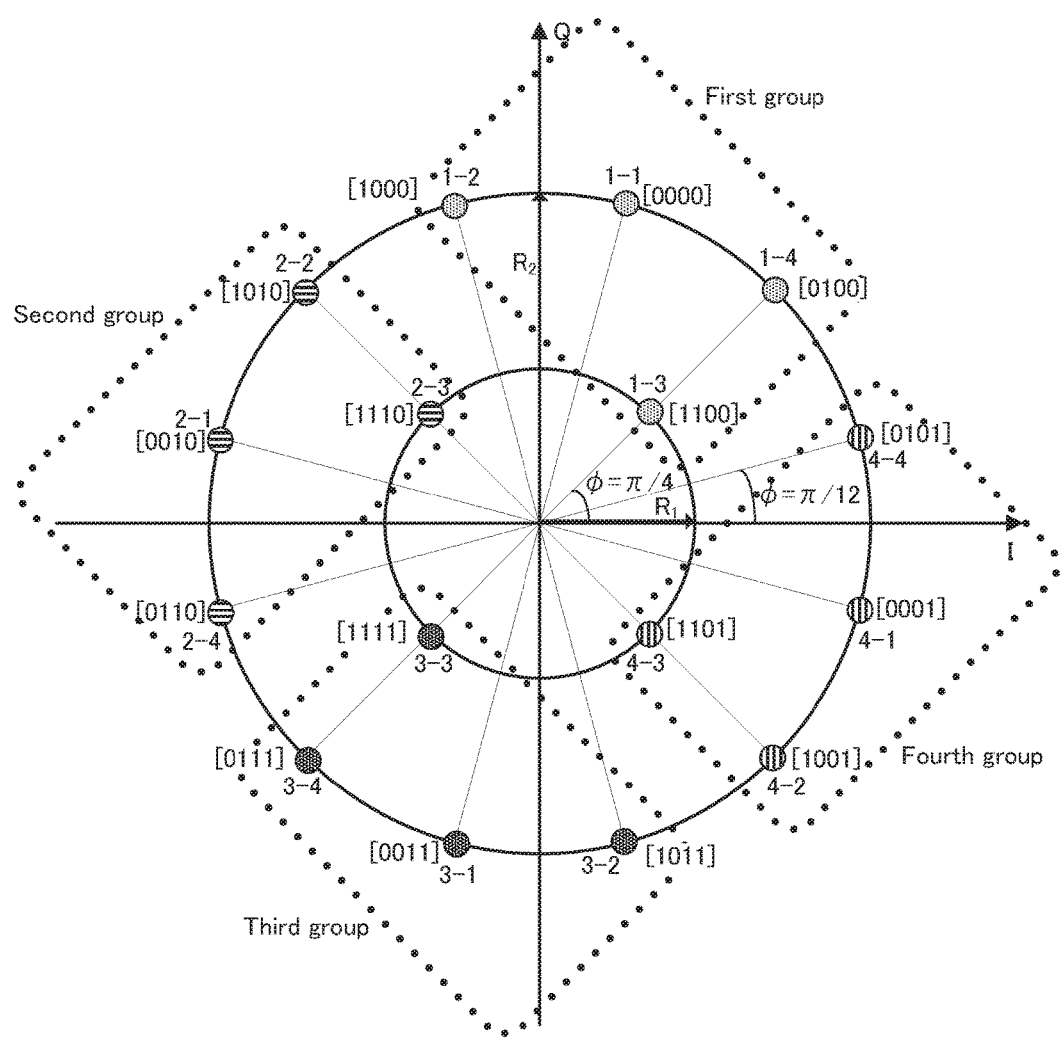
FIG. 15 illustrates an example of labelling of (12,4) 16APSK.

One example that satisfies the above is an example of constellation and labelling of (12,4)16APSK illustrated in FIG. 15. FIG. 15 shows every constellation point rotated π/6 radians with respect to FIG. 14, so that θ=π/6.

<Labelling and constellations of (8,8)16APSK>
[Labelling of (8,8)16APSK]

The following describes labelling of (8,8)16APSK. An example of labelling of (8,8)16APSK is illustrated in FIG. 9, but labelling need not conform to FIG. 9 as long as labelling satisfies the following <Condition 3> and <Condition 4>.

For the purposes of description, the following definitions are used.

Figure 16:
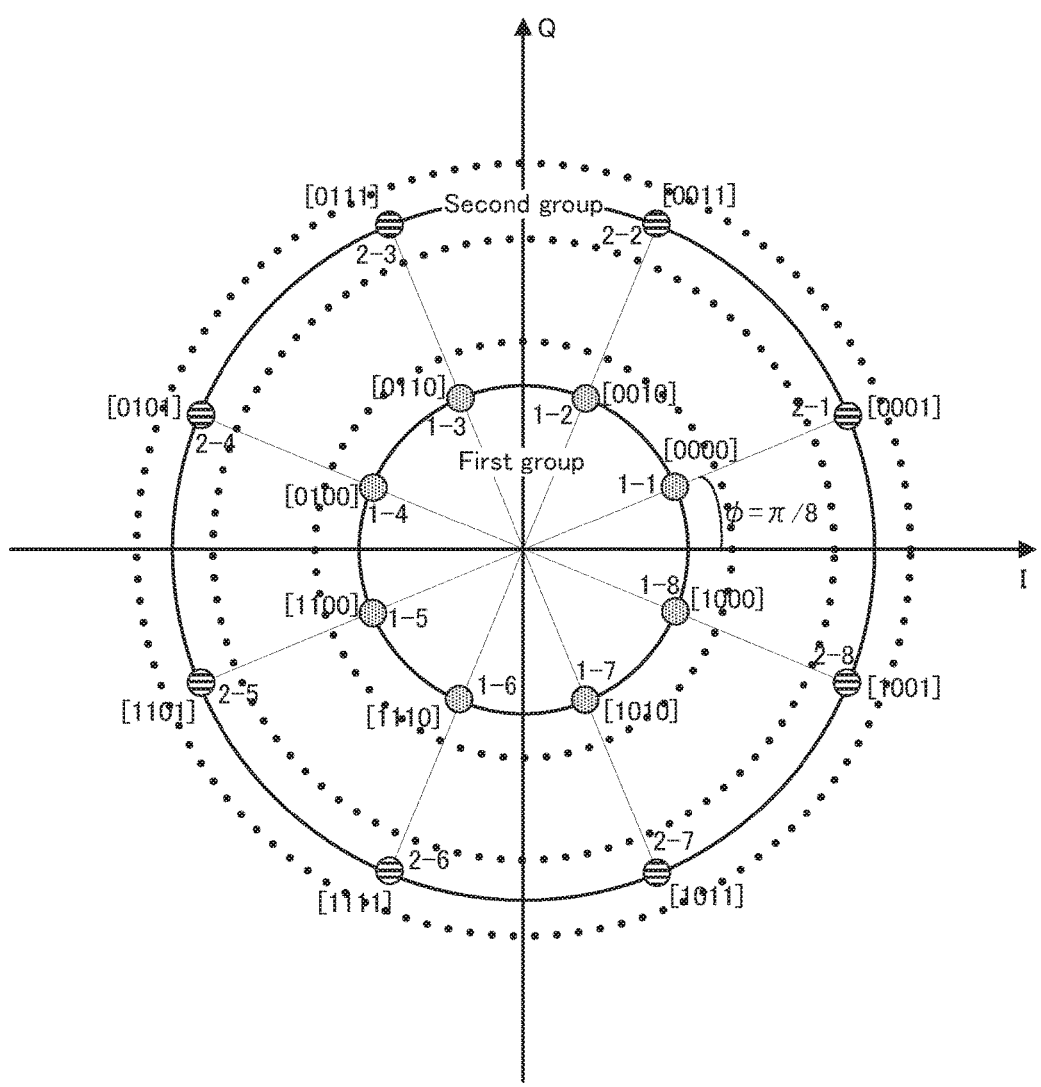
FIG. 16 illustrates an example of labelling of (8,8) 16APSK.

As illustrated in FIG. 16, eight constellation points on the circumference of the inner circle are defined as group 1: constellation point 1-1, constellation point 1-2, constellation point 1-3, constellation point 1-4, constellation point 1-5, constellation point 1-6, constellation point 1-7, and constellation point 1-8. Further, eight constellation points on the circumference of the outer circle are defined as group 2: constellation point 2-1, constellation point 2-2, constellation point 2-3, constellation point 2-4, constellation point 2-5, constellation point 2-6, constellation point 2-7, and constellation point 2-8.

The following two conditions are provided.
<Condition 3>

X represents 1 and 2. All values of X satisfy the following:

The number of different bits of labelling between constellation point X-1 and constellation point X-2 is one.

The number of different bits of labelling between constellation point X-2 and constellation point X-3 is one.

The number of different bits of labelling between constellation point X-3 and constellation point X-4 is one.

The number of different bits of labelling between constellation point X-4 and constellation point X-5 is one.

The number of different bits of labelling between constellation point X-5 and constellation point X-6 is one.

The number of different bits of labelling between constellation point X-6 and constellation point X-7 is one.

The number of different bits of labelling between constellation point X-7 and constellation point X-8 is one.

The number of different bits of labelling between constellation point X-8 and constellation point X-1 is one.

Definitions of the number of different bits of labelling are as described above.
<Condition 4>

Z represents 1, 2, 3, 4, 5, 6, 7, and 8. All values of Z satisfy the following:

The number of different bits of labelling between constellation point 1-Z and constellation point 2-Z is one.

By satisfying the above conditions, the number of different bits of labelling among constellation points that are near each other in an in-phase (I)-quadrature-phase (Q) plane is low, and therefore the possibility of a receive apparatus achieving high data reception quality is increased. Thus, when a receive apparatus performs iterative detection, the possibility of the receive apparatus achieving high data reception quality is increased.

Constellation of (8,8)16APSK

The above describes constellation and labelling in an in-phase (I)-quadrature-phase (Q) plane of FIG. 16, but constellation and labelling in an in-phase (I)-quadrature-phase (Q) plane is not limited to this example. For example, coordinates on an I-Q plane of each constellation point of (8,8)16APSK may be labelled as follows.

Coordinates on an I-Q plane of the constellation point 1-1:
$(\cos\theta \times R_1 \times \cos(\pi/8) - \sin\theta \times R_1 \times \sin(\pi/8), \sin\theta \times R_1 \times \cos(\pi/8) + \cos\theta \times R_1 \times \sin(\pi/8))$ Coordinates on an I-Q plane of the constellation point 1-2:
$(\cos\theta \times R_1 \times \cos(3\pi/8) - \sin\theta \times R_1 \times \sin(3\pi/8), \sin\theta \times R_1 \times \cos(3\pi/8) + \cos\theta \times R_1 \times \sin(3\pi/8))$ Coordinates on an I-Q plane of the constellation point 1-3:
$(\cos\theta \times R_1 \times \cos(5\pi/8) - \sin\theta \times R_1 \times \sin(5\pi/8), \sin\theta \times R_1 \times \cos(5\pi/8) + \cos\theta \times R_1 \times \sin(5\pi/8))$ Coordinates on an I-Q plane of the constellation point 1-4:
$(\cos\theta \times R_1 \times \cos(7\pi/8) - \sin\theta \times R_1 \times \sin(7\pi/8), \sin\theta \times R_1 \times \cos(7\pi/8) + \cos\theta \times R_1 \times \sin(7\pi/8))$ Coordinates on an I-Q plane of the constellation point 1-5:
$(\cos\theta \times R_1 \times \cos(-7\pi/8) - \sin\theta \times R_1 \times \sin(-7\pi/8), \sin\theta \times R_1 \times \cos(-7\pi/8) + \cos\theta \times R_1 \times \sin(-7\pi/8))$ Coordinates on an I-Q plane of the constellation point 1-6:
$(\cos\theta \times R_1 \times \cos(-5\pi/8) - \sin\theta \times R_1 \times \sin(-5\pi/8), \sin\theta \times R_1 \times \cos(-5\pi/8) + \cos\theta \times R_1 \times \sin(-5\pi/8))$ Coordinates on an I-Q plane of the constellation point 1-7:
$(\cos\theta \times R_1 \times \cos(-3\pi/8) - \sin\theta \times R_1 \times \sin(-3\pi/8), \sin\theta \times R_1 \times \cos(-3\pi/8) + \cos\theta \times R_1 \times \sin(-3\pi/8))$ Coordinates on an I-Q plane of the constellation point 1-8:
$(\cos\theta \times R_1 \times \cos(-\pi/8) - \sin\theta \times R_1 \times \sin(-\pi/8), \sin\theta \times R_1 \times \cos(-\pi/8) + \cos\theta \times R_1 \times \sin(-\pi/8))$ Coordinates on an I-Q plane of the constellation point 2-1:
$(\cos\theta \times R_2 \times \cos(\pi/8) - \sin\theta \times R_2 \times \sin(\pi/8), \sin\theta \times R_2 \times \cos(\pi/8) + \cos\theta \times R_2 \times \sin(\pi/8))$ Coordinates on an I-Q plane of the constellation point 2-2:
$(\cos\theta \times R_1 \times \cos(3\pi/8) - \sin\theta \times R_1 \times \sin(3\pi/8), \sin\theta \times R_1 \times \cos(3\pi/8) + \cos\theta \times R_1 \times \sin(3\pi/8))$ Coordinates on an I-Q plane of the constellation point 2-3:
$(\cos\theta \times R_2 \times \cos(5\pi/8) - \sin\theta \times R_2 \times \sin(5\pi/8), \sin\theta \times R_2 \times \cos(5\pi/8) + \cos\theta \times R_2 \times \sin(5\pi/8))$ Coordinates on an I-Q plane of the constellation point 2-4:
$(\cos\theta \times R_2 \times \cos(7\pi/8) - \sin\theta \times R_2 \times \sin(7\pi/8), \sin\theta \times R_2 \times \cos(7\pi/8) + \cos\theta \times R_2 \times \sin(7\pi/8))$ Coordinates on an I-Q plane of the constellation point 2-5:
$(\cos\theta \times R_2 \times \cos(-7\pi/8) - \sin\theta \times R_2 \times \sin(-7\pi/8), \sin\theta \times R_2 \times \cos(-7\pi/8) + \cos\theta \times R_2 \times \sin(-7\pi/8))$ Coordinates on an I-Q plane of the constellation point 2-6:
$(\cos\theta \times R_2 \times \cos(-5\pi/8) - \sin\theta \times R_2 \times \sin(-5\pi/8), \sin\theta \times R_2 \times \cos(-5\pi/8) + \cos\theta \times R_2 \times \sin(-5\pi/8))$ Coordinates on an I-Q plane of the constellation point 2-7:
$(\cos\theta \times R_2 \times \cos(-3\pi/8) - \sin\theta \times R_2 \times \sin(-3\pi/8), \sin\theta \times R_2 \times \cos(-3\pi/8) + \cos\theta \times R_2 \times \sin(-3\pi/8))$ Coordinates on an I-Q plane of the constellation point 2-8:
$(\cos\theta \times R_2 \times \cos(-\pi/8) - \sin\theta \times R_2 \times \sin(-\pi/8), \sin\theta \times R_2 \times \cos(-\pi/8) + \cos\theta \times R_2 \times \sin(-\pi/8))$ With respect to phase, the unit used is radians. Accordingly, an in-phase component $I_n$ and a quadrature component $Q_n$ of a baseband signal after normalization is represented as below.

Coordinates on an I-Q plane of the constellation point 1-1:
$(I_n, Q_n) = (a_{(8,8)} \times \cos\theta \times R_1 \times \cos(\pi/8) - a_{(8,8)} \times \sin\theta \times R_1 \times \sin(\pi/8), a_{(8,8)} \times \sin\theta \times R_1 \times \cos(\pi/8) + a_{(8,8)} \times \cos\theta \times R_1 \times \sin(\pi/8))$ Coordinates on an I-Q plane of the constellation point 1-2:
$(I_n, Q_n) = (a_{(8,8)} \times \cos\theta \times R_1 \times \cos(3\pi/8) - a_{(8,8)} \times \sin\theta \times R_1 \times \sin(3\pi/8), a_{(8,8)} \times \sin\theta \times R_1 \times \cos(3\pi/8) + a_{(8,8)} \times \cos\theta \times R_1 \times \sin(3\pi/8))$ Coordinates on an I-Q plane of the constellation point 1-3:
$(I_n, Q_n) = (a_{(8,8)} \times \cos\theta \times R_1 \times \cos(5\pi/8) - a_{(8,8)} \times \sin\theta \times R_1 \times \sin(5\pi/8), a_{(8,8)} \times \sin\theta \times R_1 \times \cos(5\pi/8) + a_{(8,8)} \times \cos\theta \times R_1 \times \sin(5\pi/8))$ Coordinates on an I-Q plane of the constellation point 1-4:
$(I_n, Q_n) = (a_{(8,8)} \times \cos\theta \times R_1 \times \cos(7\pi/8) - a_{(8,8)} \times \sin\theta \times R_1 \times \sin(7\pi/8), a_{(8,8)} \times \sin\theta \times R_1 \times \cos(7\pi/8) + a_{(8,8)} \times \cos\theta \times R_1 \times \sin(7\pi/8))$ Coordinates on an I-Q plane of the constellation point 1-5:
$(I_n, Q_n) = (a_{(8,8)} \times \cos\theta \times R_1 \times \cos(-7\pi/8) - a_{(8,8)} \times \sin\theta \times R_1 \times \sin(-7\pi/8), a_{(8,8)} \times \sin\theta \times R_1 \times \cos(-7\pi/8) + a_{(8,8)} \times \cos\theta \times R_1 \times \sin(-7\pi/8))$ Coordinates on an I-Q plane of the constellation point 1-6:
$(I_n, Q_n) = (a_{(8,8)} \times \cos\theta \times R_1 \times \cos(-5\pi/8) - a_{(8,8)} \times \sin\theta \times R_1 \times \sin(-5\pi/8), a_{(8,8)} \times \sin\theta \times R_1 \times \cos(-5\pi/8) + a_{(8,8)} \times \cos\theta \times R_1 \times \sin(-5\pi/8))$ Coordinates on an I-Q plane of the constellation point 1-7:
$(I_n, Q_n) = (a_{(8,8)} \times \cos\theta \times R_1 \times \cos(-3\pi/8) - a_{(8,8)} \times \sin\theta \times R_1 \times \sin(-3\pi/8), a_{(8,8)} \times \sin\theta \times R_1 \times \cos(-3\pi/8) + a_{(8,8)} \times \cos\theta \times R_1 \times \sin(-3\pi/8))$ Coordinates on an I-Q plane of the constellation point 1-8:
$(I_n, Q_n) = (a_{(8,8)} \times \cos\theta \times R_1 \times \cos(-\pi/8) - a_{(8,8)} \times \sin\theta \times R_1 \times \sin(-\pi/8), a_{(8,8)} \times \sin\theta \times R_1 \times \cos(-\pi/8) + a_{(8,8)} \times \cos\theta \times R_1 \times \sin(-\pi/8))$ Coordinates on an I-Q plane of the constellation point 2-1:
$(I_n, Q_n) = (a_{(8,8)} \times \cos\theta \times R_2 \times \cos(\pi/8) - a_{(8,8)} \times \sin\theta \times R_2 \times \sin(\pi/8), a_{(8,8)} \times \sin\theta \times R_2 \times \cos(\pi/8) + a_{(8,8)} \times \cos\theta \times R_2 \times \sin(\pi/8))$ Coordinates on an I-Q plane of the constellation point 2-2:
$(I_n, Q_n) = (a_{(8,8)} \times \cos\theta \times R_1 \times \cos(3\pi/8) - a_{(8,8)} \times \sin\theta \times R_1 \times \sin(3\pi/8), a_{(8,8)} \times \sin\theta \times R_1 \times \cos(3\pi/8) + a_{(8,8)} \times \cos\theta \times R_1 \times \sin(3\pi/8))$ Coordinates on an I-Q plane of the constellation point 2-3:
$(I_n, Q_n) = (a_{(8,8)} \times \cos\theta \times R_2 \times \cos(5\pi/8) - a_{(8,8)} \times \sin\theta \times R_2 \times \sin(5\pi/8), a_{(8,8)} \times \sin\theta \times R_2 \times \cos(5\pi/8) + a_{(8,8)} \times \cos\theta \times R_2 \times \sin(5\pi/8))$ Coordinates on an I-Q plane of the constellation point 2-4:
$(I_n, Q_n) = (a_{(8,8)} \times \cos\theta \times R_2 \times \cos(7\pi/8) - a_{(8,8)} \times \sin\theta \times R_2 \times \sin(7\pi/8), a_{(8,8)} \times \sin\theta \times R_2 \times \cos(7\pi/8) + a_{(8,8)} \times \cos\theta \times R_2 \times \sin(7\pi/8))$ Coordinates on an I-Q plane of the constellation point 2-5:
$(I_n, Q_n) = (a_{(8,8)} \times \cos\theta \times R_1 \times \cos(-7\pi/8) - a_{(8,8)} \times \sin\theta \times R_1 \times \sin(-7\pi/8), a_{(8,8)} \times \sin\theta \times R_1 \times \cos(-7\pi/8) + a_{(8,8)} \times \cos\theta \times R_1 \times \sin(-7\pi/8))$ Coordinates on an I-Q plane of the constellation point 2-6:
$(I_n, Q_n) = (a_{(8,8)} \times \cos\theta \times R_2 \times \cos(-5\pi/8) - a_{(8,8)} \times \sin\theta \times R_2 \times \sin(-5\pi/8), a_{(8,8)} \times \sin\theta \times R_2 \times \cos(-5\pi/8) + a_{(8,8)} \times \cos\theta \times R_2 \times \sin(-5\pi/8))$ Coordinates on an I-Q plane of the constellation point 2-7:
$(I_n, Q_n) = (a_{(8,8)} \times \cos\theta \times R_2 \times \cos(-3\pi/8) - a_{(8,8)} \times \sin\theta \times R_2 \times \sin(-3\pi/8), a_{(8,8)} \times \sin\theta \times R_2 \times \cos(-3\pi/8) + a_{(8,8)} \times \cos\theta \times R_2 \times \sin(-3\pi/8))$ Coordinates on an I-Q plane of the constellation point 2-8:
$(I_n, Q_n) = (a_{(8,8)} \times \cos\theta \times R_2 \times \cos(-\pi/8) - a_{(8,8)} \times \sin\theta \times R_2 \times \sin(-\pi/8), a_{(8,8)} \times \sin\theta \times R_2 \times \cos(-\pi/8) + a_{(8,8)} \times \cos\theta \times R_2 \times \sin(-\pi/8))$ Note that $\theta$ is a phase provided on an in-phase (I)-quadrature-phase (Q) plane, and $a_{(8,8)}$ is as shown in Math (24).

In a scheme wherein "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8) 16APSK symbols", an (8,8)16APSK modulation scheme may be used for which coordinates on an I-Q plane of each constellation point are as described above and <Condition 3> and <Condition 4> are satisfied.

Figure 17:
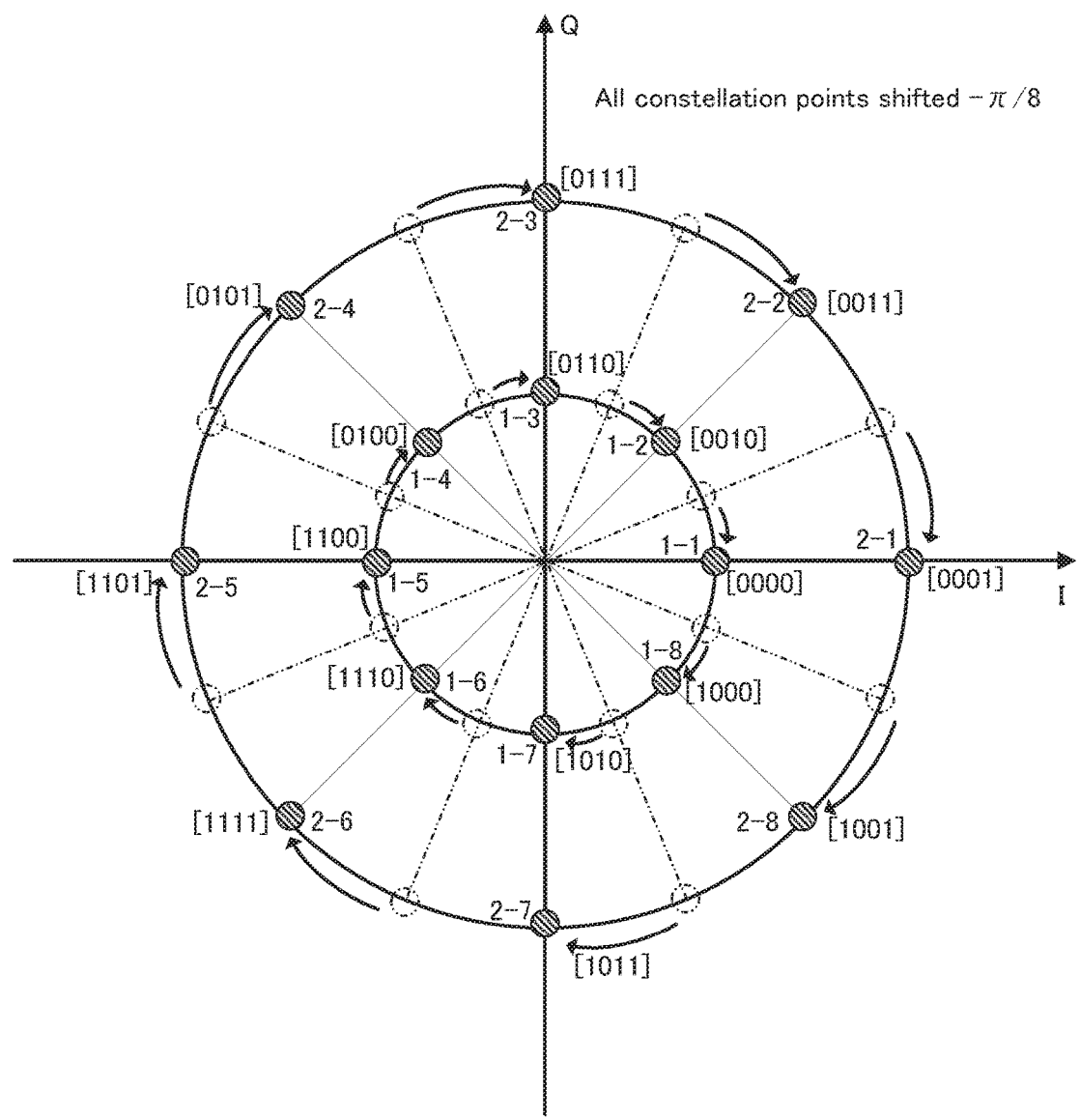
FIG. 17 illustrates an example of a constellation of (8,8)16APSK.

Further, in a scheme wherein "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", according to the above description, when θ of (12,4)16APSK is θ=(N×π)/2 radians (N being an integer) and θ of (8,8)16APSK is θ=π/8+(N× π)/4 radians (N being an integer), there is a possibility that PAPR becomes lower. FIG. 17 is an example of constellation and labelling when θ=π/8 radians.

<Patterns of Switching Modulation Schemes, Etc.>

In the example of FIG. 12, an example is described in which (12,4)16APSK symbols and (8,8)16APSK symbols are alternately switched (there are no consecutive (12,4) 16APSK symbols or consecutive (8,8)16APSK symbols). The following describes modifications of the above scheme.

Figure 23:
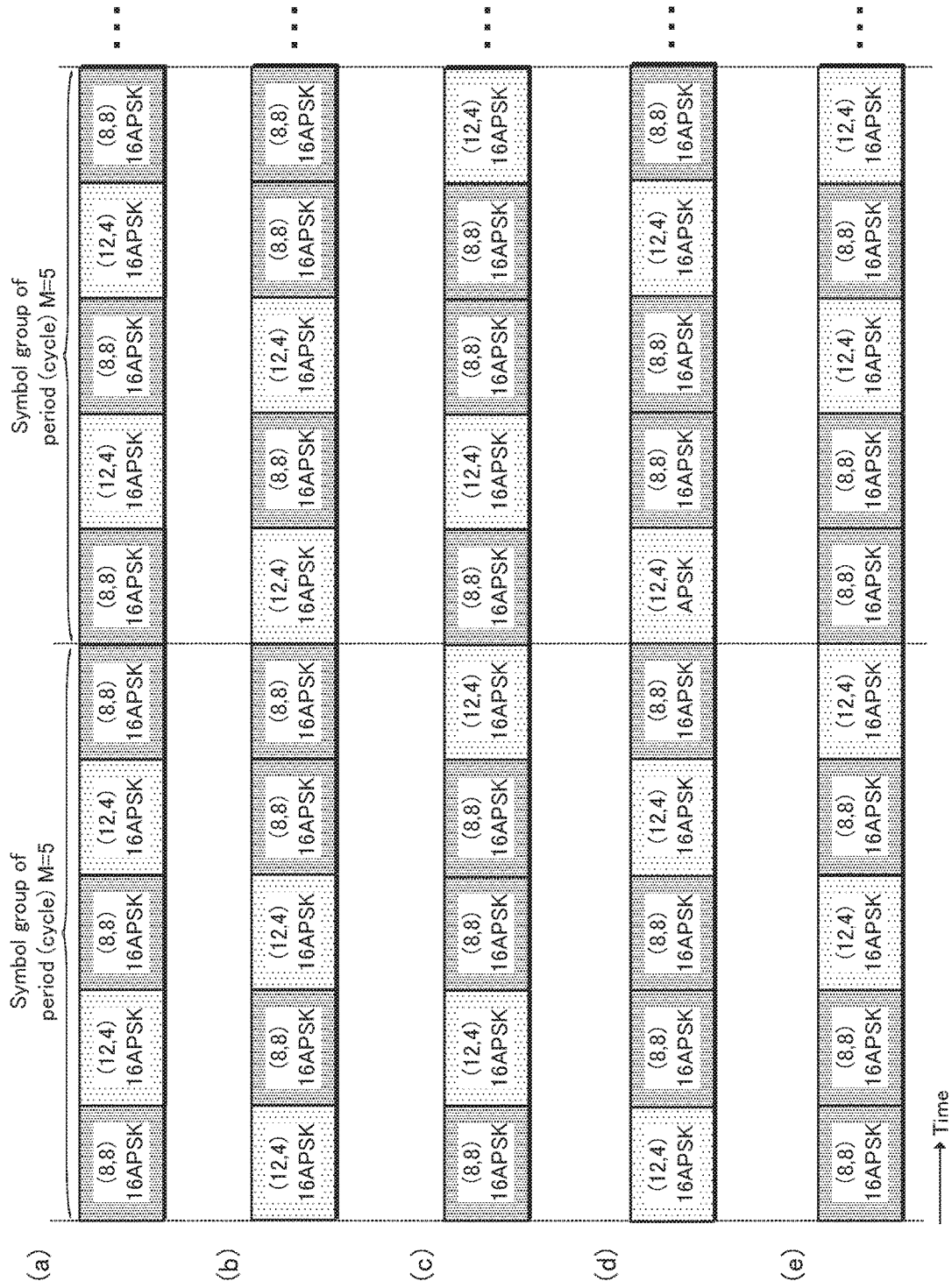
FIG. 23 illustrates examples of arrangement of modulation schemes.
Figure 24:
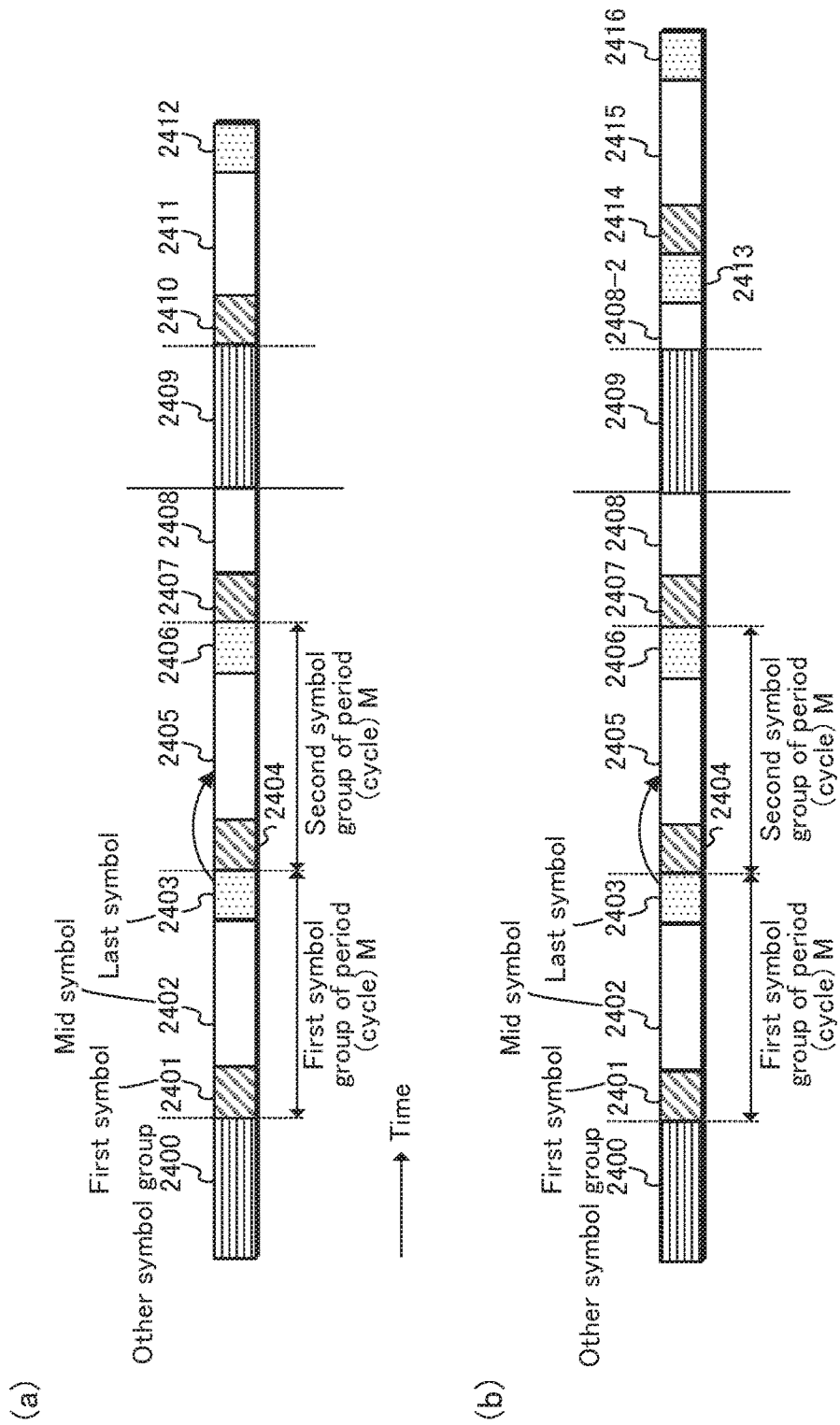
FIG. 24 illustrates an example of arrangement of symbols.

FIG. 23 and FIG. 24 are related to modifications.

Features of the modifications are as follows.

One period (cycle) is composed of M symbols. Note that for the following description, one period (cycle) of M symbols is referred to (defined as) a "symbol group of period (cycle) M". The following description references FIG. 23.

When the number of consecutive symbols is at least M+1, a plurality of a "symbol group of period (cycle) M" is arranged. This point is described with reference to FIG. 24.

FIG. 23 illustrates examples of symbol groups when a "symbol group of period (cycle) M=5". Features of FIG. 23 satisfy the following two points.

In a "symbol group of period (cycle) M=5", the number of (8,8)16APSK symbols is one greater than the number of (12,4)16APSK symbols, in other words the number of (12,4)16APSK symbols is two and the number of (8,8)16APSK symbols is three.

In a "symbol group of period (cycle) M=5", there are no consecutive (8,8)16APSK symbols or there is only 1 position at which two consecutive (8,8)16APSK symbols exist. Accordingly, there are no cases of three or more consecutive (8,8)16APSK symbols.

Cases that satisfy the above two points, as methods of configuring a "symbol group of period (cycle) M=5", are illustrated in parts (a), (b), (c), (d), and (e) of FIG. 23. In FIG. 23, the horizontal axis is time.

According to FIG. 23, part (a), when configuring a "symbol group of period (cycle) M=5", a "symbol group of period (cycle) M=5" is an arrangement of symbols in the order (8,8)16APSK symbol, (12,4)16APSK symbol, (8,8) 16APSK symbol, (12,4)16APSK symbol, and (8,8)16APSK symbol. Thus, a "symbol group of period (cycle) M=5" configured in this way is arranged in a repeating pattern.

According to FIG. 23, part (b), when configuring a "symbol group of period (cycle) M=5", a "symbol group of period (cycle) M=5" is an arrangement of symbols in the order (12,4)16APSK symbol, (8,8)16APSK symbol, (12,4) 16APSK symbol, (8,8)16APSK symbol, and (8,8)16APSK symbol. Thus, a "symbol group of period (cycle) M=5" configured in this way is arranged in a repeating pattern.

According to FIG. 23, part (c), when configuring a "symbol group of period (cycle) M=5", a "symbol group of period (cycle) M=5" is an arrangement of symbols in the order (8,8)16APSK symbol, (12,4)16APSK symbol, (8,8) 16APSK symbol, (8,8)16APSK symbol, and (12,4)16APSK symbol. Thus, a "symbol group of period (cycle) M=5" configured in this way is arranged in a repeating pattern.

According to FIG. 23, part (d), when configuring a "symbol group of period (cycle) M=5", a "symbol group of period (cycle) M=5" is an arrangement of symbols in the order (12,4)16APSK symbol, (8,8)16APSK symbol, (8,8) 16APSK symbol, (12,4)16APSK symbol, and (8,8)16APSK symbol. Thus, a "symbol group of period (cycle) M=5" configured in this way is arranged in a repeating pattern.

According to FIG. 23, part (e), when configuring a "symbol group of period (cycle) M=5", a "symbol group of period (cycle) M=5" is an arrangement of symbols in the order (8,8)16APSK symbol, (8,8)16APSK symbol, (12,4) 16APSK symbol, (8,8)16APSK symbol, and (12,4)16APSK symbol. Thus, a "symbol group of period (cycle) M=5" configured in this way is arranged in a repeating pattern.

Note that methods of configuring a "symbol group of period (cycle) M=5" are described with reference to FIG. 23, but the period (cycle) M is not limited to a value of five, and the following configurations are possible.

In a "symbol group of period (cycle) M", the number of (8,8)16APSK symbols is one greater than the number of (12,4)16APSK symbols, in other words the number of (12,4)16APSK symbols is N and the number of (8,8)16APSK symbols is N+1. Note that N is a natural number.

In a "symbol group of period (cycle) M", there are no consecutive (8,8)16APSK symbols or there is only 1 position at which two consecutive (8,8)16APSK symbols exist. Accordingly, there are no cases of three or more consecutive (8,8)16APSK symbols.

Accordingly, the period (cycle) M of a "symbol group of period (cycle) M" is an odd number greater than or equal to three, but when considering an increase of PAPR when a modulation scheme is (12,4)16APSK a period (cycle) M of greater than or equal to five is suitable. However, even when a period (cycle) M is three, there is the advantage that PAPR is less than PAPR of (8,8)16APSK.

The above describes configurations according to a "symbol group of period (cycle) M", but a periodic (cyclic) configuration need not be adopted when the following is true.

When each data symbol is either a (12,4)16APSK symbol or an (8,8)16APSK symbol, three or more consecutive (8,8)16APSK symbols are not present in a consecutive data symbol group.

When constellations, labelling, and ring ratios of (12,4) 16APSK and (8,8)16APSK are as described above and the condition described above is satisfied, a similar effect can be obtained.

In a case as described above, two consecutive (8,8) 16APSK symbols may occur, but an effect of a lower PAPR than PAPR of (8,8)16APSK is achieved and an effect of improving data reception quality according to (12,4) 16APSK is achieved.

The following is a supplemental description, referencing FIG. 24, of a method of configuring consecutive symbols composed of (12,4)16APSK symbols and (8,8)16APSK symbols when other symbols are inserted.

In FIG. 24, part (a), 2400, 2409 indicate other symbol groups (here, a symbol group may indicate consecutive symbols and may indicate a single symbol). These other symbol groups may indicate a control symbol for transmission of a transmission method such as a modulation scheme, an error correction coding scheme, etc., pilot symbols or reference symbol for a receive apparatus to perform channel estimation, frequency synchronization, and time synchronization, or a data symbol modulated by a modulation scheme other than (12,4)16APSK or (8,8)16APSK. In other words, the other symbol groups are symbols for which a modulation scheme is a modulation scheme other than (12,4)16APSK or (8,8)16APSK.

In FIG. 24, part (a), 2401, 2404, 2407, and 2410 indicate a first symbol of a "symbol group of period (cycle) M" (in a "symbol group of period (cycle) M", a first symbol of the period (cycle)). 2403, 2406, and 2412 indicate a last symbol of a "symbol group of period (cycle) M" (in a "symbol group of period (cycle) M", a last symbol of the period (cycle)).

2402, 2405, 2408, and 2411 indicate a mid symbol group of a "symbol group of period (cycle) M" (in a "symbol group of period (cycle) M", a symbol group excluding the first symbol and the last symbol).

FIG. 24, part (a), illustrates an example of symbol arrangement along a horizontal axis of time. In FIG. 24, part (a), a first symbol 2401 of a "symbol group of period (cycle) M" is arranged immediately after the "other symbol group" 2400. Subsequently, a mid symbol group 2402 of the "symbol group of period (cycle) M" and a last symbol 2403 of the "symbol group of period (cycle) M" are arranged. Accordingly, a "first symbol group of period (cycle) M" is arranged immediately after the "other symbol group" 2400.

A "second symbol group of period (cycle) M" is arranged immediately after the "first symbol group of period (cycle) M", the "second symbol group of period (cycle) M" being composed of a first symbol 2404, a mid symbol group 2045, and a last symbol 2406.

A first symbol 2407 of a "symbol group of period (cycle) M" is arranged after the "second symbol group of period (cycle) M", and a portion 2408 of a mid symbol group of the "symbol group of period (cycle) M" is arranged subsequently.

The "other symbol group" 2409 is arranged after the portion 2408 of the mid symbol group of the "symbol group of period (cycle) M".

A feature illustrated in FIG. 24, part (a), is that a "symbol group of period (cycle) M" is arranged after the "other symbol group" 2409, the "symbol group of period (cycle) M" being composed of a first symbol 2410, a mid symbol group 2411, and a last symbol 2412.

FIG. 24, part (b), illustrates an example of symbol arrangement along a horizontal axis of time. In FIG. 24, part (b), the first symbol 2401 of a "symbol group of period (cycle) M" is arranged immediately after the "other symbol group" 2400. Subsequently, the mid symbol group 2402 of the "symbol group of period (cycle) M" and the last symbol 2403 of the "symbol group of period (cycle) M" are arranged. Accordingly, the "first symbol group of period (cycle) M" is arranged immediately after the "other symbol group" 2400.

The "second symbol group of period (cycle) M" is arranged immediately after the "first symbol group of period (cycle) M", the "second symbol group of period (cycle) M" being composed of the first symbol 2404, the mid symbol group 2045, and the last symbol 2406.

The first symbol 2407 of the "symbol group of period (cycle) M" is arranged after the "second symbol group of period (cycle) M", and a portion 2408 of the mid symbol group of the "symbol group of period (cycle) M" is arranged subsequently.

The "other symbol group" 2409 is arranged after the portion 2408 of the mid symbol group of the "symbol group of period (cycle) M".

A feature illustrated in FIG. 24, part (b) is that a remaining portion 2408-2 of the mid symbol group of the "symbol group of period (cycle) M" is arranged after the "other symbol group" 2409, and a last symbol 2413 of the "symbol group of period (cycle) M" is arranged subsequent to the remaining portion 2408. Note that a "symbol group of period (cycle) M" is formed by the first symbol 2407, the portion 2408 of the mid symbol group, the remaining portion 2408-2 of the mid symbol group, and the last symbol 2413.

A "symbol group of period (cycle) M" is arranged after the last symbol 2413, the "symbol group of period (cycle) M" being composed of a first symbol 2414, a mid symbol group 2415, and a last symbol 2416.

In FIG. 24, each "symbol group of period (cycle) M" may have the same configuration as the "symbol group of period (cycle) M" described as an example with reference to FIG. 23, and may be configured so that "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols".

When constellations, labelling, and ring ratios of (12,4)16APSK and (8,8)16APSK are as described above and the conditions described above are satisfied, a similar effect can be obtained.

According to the examples described so far, 16APSK is an example of a modulation scheme used in switching, but 32APSK and 64APSK may be implemented in the same way.

A method of configuring consecutive symbols is as described above:

A "symbol group of period (cycle) M" is configured from a symbol of a first modulation scheme of a first constellation in an in-phase (I)-quadrature-phase (Q) plane and a symbol of a second modulation scheme of a second constellation in an in-phase (I)-quadrature-phase (Q) plane. (However, the number of constellation points in the in-phase (I)-quadrature-phase (Q) plane of the first modulation scheme and the number of constellation points in the in-phase (I)-quadrature-phase (Q) plane of the second modulation scheme are equal.)

In a symbol group of at least three consecutive symbols (or at least four consecutive symbols), among which a modulation scheme for each symbol is the first modulation scheme or the second modulation scheme, there are no consecutive first modulation scheme symbols and there are no consecutive second modulation scheme symbols. (However, the number of constellation points in the in-phase (I)-quadrature-phase (Q) plane of the first modulation scheme and the number of constellation points in the in-phase (I)-quadrature-phase (Q) plane of the second modulation scheme are equal.) FIG. 25 illustrates constellations in an in-phase (I)-quadrature-phase (Q) plane of a scheme of types of 32APSK having 32 constellation points in an in-phase (I)-quadrature-phase (Q) plane, according to the method described above of configuring two types of symbol as consecutive symbols.

FIG. 25, part (a) illustrates a constellation in an in-phase (I)-quadrature-phase (Q) plane of (4,12,16)32APSK. With an origin thereof as a center, constellation points a=4 exist on a circle of radius $R_1$, constellation points b=12 exist on a circle of radius $R_2$, and constellation points c=16 exist on a circle of radius $R_3$. Accordingly (a,b,c)=(4,12,16) and is therefore referred to as (4,12,16)32APSK (note that $R_1<R_2<R_3$).

FIG. 25, part (b) illustrates a constellation in an in-phase (I)-quadrature-phase (Q) plane of (8,8,16)32APSK. With an origin thereof as a center, constellation points a=8 exist on a circle of radius $R_1$, constellation points b=8 exist on a circle of radius $R_2$, and constellation points c=16 exist on a circle of radius $R_3$. Accordingly (a,b,c)=(8,8,16) and is therefore referred to as (8,8,16)32APSK (note that $R_1<R_2<R_3$).

Thus, the method of configuring two types of symbol as consecutive symbols described above may be implemented by (4,12,16)32APSK in FIG. 25, part (a), and (8,8,16) 32APSK in FIG. 25, part (b). In other words, in the method of configuring two types of symbol as consecutive symbols described above, the first modulation scheme and the second modulation scheme may be (4,12,16)32APSK and (8,8,16) 32APSK, respectively.

Further, with an origin thereof as a center, constellation points a=16 may exist on a circle of radius $R_1$ and constellation points b=16 may exist on a circle of radius $R_2$, (a,b)=(16,16), thereby describing (16,16)32APSK (note that $R_1<R_2$).

Thus, the method of configuring two types of symbol as consecutive symbols described above may be implemented by (4,12,16)32APSK in FIG. 25, part (a), and (16,16) 32APSK. In other words, in the method of configuring two types of symbol as consecutive symbols described above, the first modulation scheme and the second modulation scheme may be (4,12,16)32APSK and (16,16)32APSK, respectively.

In addition a γ scheme 32APSK may be considered that has a different constellation to (4,12,16)32APSK, (8,8,16) 32APSK, and (16,16)32APSK. Thus, the method of configuring two types of symbol as consecutive symbols described above may be implemented by (4,12,16)32APSK in FIG. 25, part (a), and the γ scheme 32APSK. In other words, in the method of configuring two types of symbol as consecutive symbols described above, the first modulation scheme and the second modulation scheme may be (4,12,16)32APSK and the γ scheme 32APSK, respectively.

Note that a labelling method with respect to constellation in an in-phase (I)-quadrature-phase (Q) plane of (12,4) 16APSK and a labelling method with respect to constellation in an in-phase (I)-quadrature-phase (Q) plane of (8,8) 16APSK are described in the present embodiment, but a labelling method with respect to constellation in an in-phase (I)-quadrature-phase (Q) plane that is different from the present embodiment may be applied (there is a possibility of achieving an effect similar to the effect of the present embodiment).

Embodiment 2

<Example of Pilot Symbols>

In the present embodiment, configuration examples of pilot symbols in the transmission method described in embodiment 1 are described.

Note that the transmit apparatus in the present embodiment is identical to the transmit apparatus described in embodiment 1 and therefore description thereof is omitted here.

Interference occurs between code (between symbols) of a modulated signal, because of non-linearity of the power amplifier of the transmit apparatus. High data reception quality can be achieved by a receive apparatus by decreasing this intersymbol interference.

In the present example of pilot symbol configuration, a method is described of transmitting baseband signals as pilot symbols, in order to decrease intersymbol interference at a receive apparatus. When data symbols are configured so that "in a symbol group of at least three consecutive symbols (or at least four consecutive symbols), among which a modulation scheme for each symbol is (12,4)16APSK or (8,8) 16APSK, there are no consecutive (12,4)16APSK symbols and there are no consecutive (8,8)16APSK symbols", a transmit apparatus generates and transmits, as pilot symbols, baseband signals corresponding to all constellation points of (12,4)16APSK on an in-phase (I)-quadrature-phase (Q) plane (in other words, baseband signals corresponding to the 16 constellation points of four transmit bits $[b_3b_2b_1b_0]$ from [0000] to [1111]) and baseband signals corresponding to all constellation points of (8,8)16APSK on an in-phase (I)-quadrature-phase (Q) plane (in other words, baseband signals corresponding to the 16 constellation points of four transmit bits $[b_3b_2b_1b_0]$ from [0000] to [1111]).

Thus, the receive apparatus can estimate intersymbol interference for all constellation points on an in-phase (I)-quadrature-phase (Q) plane of (12,4)16APSK and all constellation points on an in-phase (I)-quadrature-phase (Q) plane of (8,8)16APSK, and therefore there is a high possibility of achieving high data reception quality.

Figure 13:
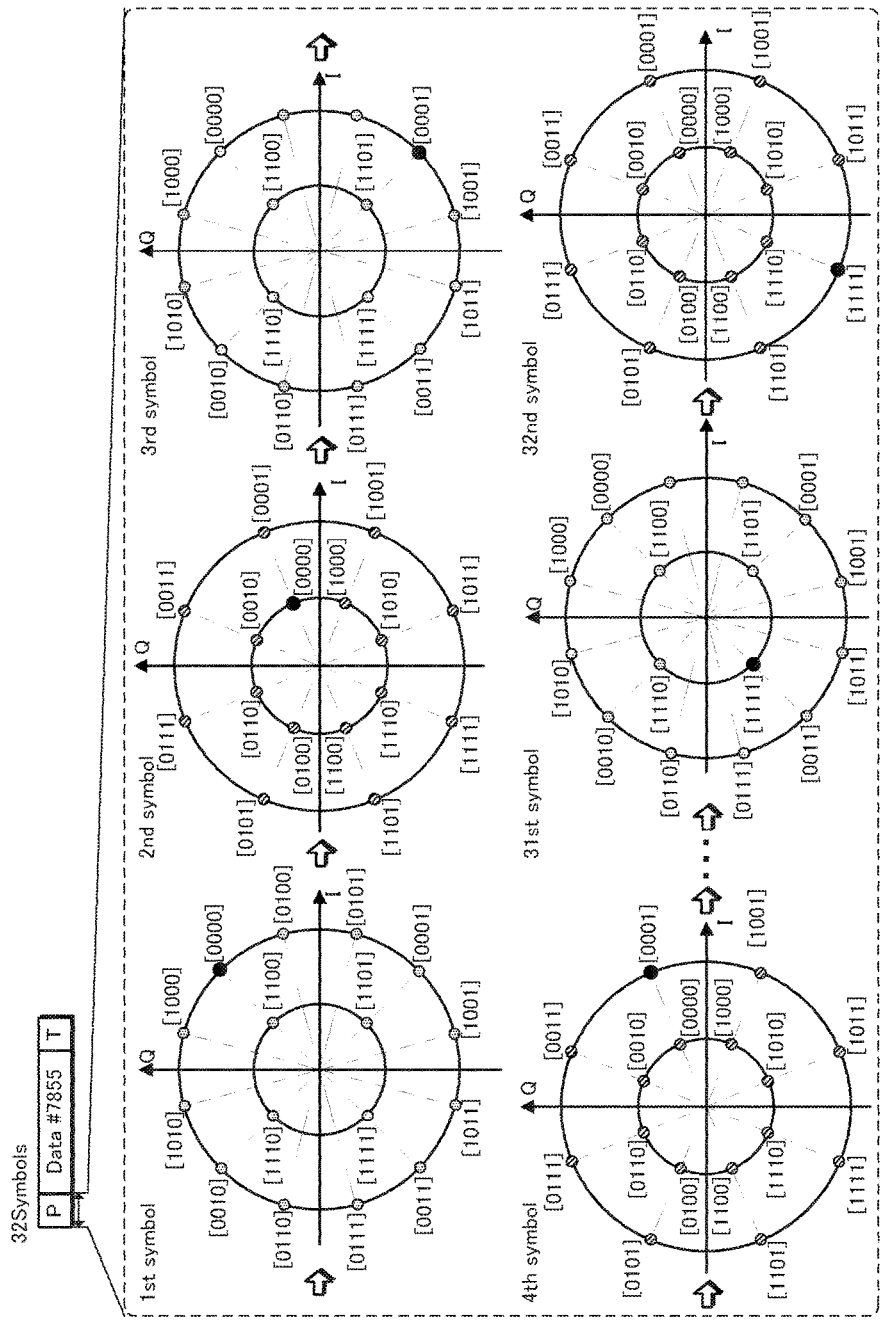
FIG. 13 illustrates an example of pilot symbols.

In the example illustrated in FIG. 13, the following are transmitted as pilot symbols, in order:

a symbol of a constellation point (baseband signal) corresponding to $[b_3b_2b_1b_0]$=[0000] of (12,4)16APSK; a symbol of a constellation point (baseband signal) corresponding to $[b_3b_2b_1b_0]$=[0000] of (8,8)16APSK;

a symbol of a constellation point (baseband signal) corresponding to $[b_3b_2b_1b_0]$=[0001] of (12,4)16APSK; a symbol of a constellation point (baseband signal) corresponding to $[b_3b_2b_1b_0]$=[0001] of (8,8)16APSK;

a symbol of a constellation point (baseband signal) corresponding to $[b_3b_2b_1b_0]$=[0010] of (12,4)16APSK; a symbol of a constellation point (baseband signal) corresponding to $[b_3b_2b_1b_0]$=[0010] of (8,8)16APSK;

a symbol of a constellation point (baseband signal) corresponding to $[b_3b_2b_1b_0]$=[0011] of (12,4)16APSK; a symbol of a constellation point (baseband signal) corresponding to $[b_3b_2b_1b_0]$=[0011] of (8,8)16APSK;

a symbol of a constellation point (baseband signal) corresponding to $[b_3b_2b_1b_0]$=[0100] of (12,4)16APSK; a symbol of a constellation point (baseband signal) corresponding to $[b_3b_2b_1b_0]$=[0100] of (8,8)16APSK;

a symbol of a constellation point (baseband signal) corresponding to $[b_3b_2b_1b_0]$=[0101] of (12,4)16APSK; a symbol of a constellation point (baseband signal) corresponding to $[b_3b_2b_1b_0]$=[0101] of (8,8)16APSK;

a symbol of a constellation point (baseband signal) corresponding to $[b_3b_2b_1b_0]$=[0110] of (12,4)16APSK; a symbol of a constellation point (baseband signal) corresponding to $[b_3b_2b_1b_0]$=[0110] of (8,8)16APSK;

a symbol of a constellation point (baseband signal) corresponding to $[b_3b_2b_1b_0]$=[0111] of (12,4)16APSK; a symbol of a constellation point (baseband signal) corresponding to $[b_3b_2b_1b_0]$=[0111] of (8,8)16APSK;

a symbol of a constellation point (baseband signal) corresponding to $[b_3b_2b_1b_0]$=[1000] of (12,4)16APSK; a symbol of a constellation point (baseband signal) corresponding to $[b_3b_2b_1b_0]=[1000]$ of (8,8)16APSK;

a symbol of a constellation point (baseband signal) corresponding to $[b_3b_2b_1b_0]=[1001]$ of (12,4)16APSK; a symbol of a constellation point (baseband signal) corresponding to $[b_3b_2b_1b_0]=[1001]$ of (8,8)16APSK;

a symbol of a constellation point (baseband signal) corresponding to $[b_3b_2b_1b_0]=[1010]$ of (12,4)16APSK; a symbol of a constellation point (baseband signal) corresponding to $[b_3b_2b_1b_0]=[1010]$ of (8,8)16APSK;

a symbol of a constellation point (baseband signal) corresponding to $[b_3b_2b_1b_0]=[1011]$ of (12,4)16APSK; a symbol of a constellation point (baseband signal) corresponding to $[b_3b_2b_1b_0]=[1011]$ of (8,8)16APSK;

a symbol of a constellation point (baseband signal) corresponding to $[b_3b_2b_1b_0]=[1100]$ of (12,4)16APSK; a symbol of a constellation point (baseband signal) corresponding to $[b_3b_2b_1b_0]=[1100]$ of (8,8)16APSK;

a symbol of a constellation point (baseband signal) corresponding to $[b_3b_2b_1b_0]=[1101]$ of (12,4)16APSK; a symbol of a constellation point (baseband signal) corresponding to $[b_3b_2b_1b_0]=[1101]$ of (8,8)16APSK;

a symbol of a constellation point (baseband signal) corresponding to $[b_3b_2b_1b_0]=[1110]$ of (12,4)16APSK; a symbol of a constellation point (baseband signal) corresponding to $[b_3b_2b_1b_0]=[1110]$ of (8,8)16APSK; and a symbol of a constellation point (baseband signal) corresponding to $[b_3b_2b_1b_0]=[1111]$ of (12,4)16APSK; and a symbol of a constellation point (baseband signal) corresponding to $[b_3b_2b_1b_0]=[1111]$ of (8,8)16APSK.

The above feature means that:

<1> Symbols corresponding to all constellation points on an in-phase (I)-quadrature-phase (Q) plane of (12,4) 16APSK, i.e., the following symbols, are transmitted:

a symbol of a constellation point (baseband signal) corresponding to $[b_3b_2b_1b_0]=[0000]$ of (12,4)16APSK;
a symbol of a constellation point (baseband signal) corresponding to $[b_3b_2b_1b_0]=[0001]$ of (12,4)16APSK;
a symbol of a constellation point (baseband signal) corresponding to $[b_3b_2b_1b_0]=[0010]$ of (12,4)16APSK;
a symbol of a constellation point (baseband signal) corresponding to $[b_3b_2b_1b_0]=[0011]$ of (12,4)16APSK;
a symbol of a constellation point (baseband signal) corresponding to $[b_3b_2b_1b_0]=[0100]$ of (12,4)16APSK;
a symbol of a constellation point (baseband signal) corresponding to $[b_3b_2b_1b_0]=[0101]$ of (12,4)16APSK;
a symbol of a constellation point (baseband signal) corresponding to $[b_3b_2b_1b_0]=[0110]$ of (12,4)16APSK;
a symbol of a constellation point (baseband signal) corresponding to $[b_3b_2b_1b_0]=[0111]$ of (12,4)16APSK;
a symbol of a constellation point (baseband signal) corresponding to $[b_3b_2b_1b_0]=[1000]$ of (12,4)16APSK;
a symbol of a constellation point (baseband signal) corresponding to $[b_3b_2b_1b_0]=[1001]$ of (12,4)16APSK;
a symbol of a constellation point (baseband signal) corresponding to $[b_3b_2b_1b_0]=[1010]$ of (12,4)16APSK;
a symbol of a constellation point (baseband signal) corresponding to $[b_3b_2b_1b_0]=[1011]$ of (12,4)16APSK;
a symbol of a constellation point (baseband signal) corresponding to $[b_3b_2b_1b_0]=[1100]$ of (12,4)16APSK;
a symbol of a constellation point (baseband signal) corresponding to $[b_3b_2b_1b_0]=[1101]$ of (12,4)16APSK;
a symbol of a constellation point (baseband signal) corresponding to $[b_3b_2b_1b_0]=[1110]$ of (12,4)16APSK; and a symbol of a constellation point (baseband signal) corresponding to $[b_3b_2b_1b_0]=[1111]$ of (12,4)16APSK.

Symbols corresponding to all constellation points on an in-phase (I)-quadrature-phase (Q) plane of (8,8)16APSK, i.e., the following symbols, are transmitted:

a symbol of a constellation point (baseband signal) corresponding to $[b_3b_2b_1b_0]=[0000]$ of (8,8)16APSK;
a symbol of a constellation point (baseband signal) corresponding to $[b_3b_2b_1b_0]=[0001]$ of (8,8)16APSK;
a symbol of a constellation point (baseband signal) corresponding to $[b_3b_2b_1b_0]=[0010]$ of (8,8)16APSK;
a symbol of a constellation point (baseband signal) corresponding to $[b_3b_2b_1b_0]=[0011]$ of (8,8)16APSK;
a symbol of a constellation point (baseband signal) corresponding to $[b_3b_2b_1b_0]=[0100]$ of (8,8)16APSK;
a symbol of a constellation point (baseband signal) corresponding to $[b_3b_2b_1b_0]=[0101]$ of (8,8)16APSK;
a symbol of a constellation point (baseband signal) corresponding to $[b_3b_2b_1b_0]=[0110]$ of (8,8)16APSK;
a symbol of a constellation point (baseband signal) corresponding to $[b_3b_2b_1b_0]=[0111]$ of (8,8)16APSK;
a symbol of a constellation point (baseband signal) corresponding to $[b_3b_2b_1b_0]=[1000]$ of (8,8)16APSK;
a symbol of a constellation point (baseband signal) corresponding to $[b_3b_2b_1b_0]=[1001]$ of (8,8)16APSK;
a symbol of a constellation point (baseband signal) corresponding to $[b_3b_2b_1b_0]=[1010]$ of (8,8)16APSK;
a symbol of a constellation point (baseband signal) corresponding to $[b_3b_2b_1b_0]=[1011]$ of (8,8)16APSK;
a symbol of a constellation point (baseband signal) corresponding to $[b_3b_2b_1b_0]=[1100]$ of (8,8)16APSK;
a symbol of a constellation point (baseband signal) corresponding to $[b_3b_2b_1b_0]=[1101]$ of (8,8)16APSK;
a symbol of a constellation point (baseband signal) corresponding to $[b_3b_2b_1b_0]=[1110]$ of (8,8)16APSK; and a symbol of a constellation point (baseband signal) corresponding to $[b_3b_2b_1b_0]=[1111]$ of (8,8)16APSK.

<2> In a symbol group composed of consecutive pilot symbols, there are no consecutive (12,4)16APSK symbols and there are no consecutive (8,8)16APSK symbols. According to <1>, a receive apparatus can estimate intersymbol interference with high precision, and can therefore achieve high data reception quality. Further, according to <2>, an effect is achieved of lowering PAPR Note that pilot symbols are not only symbols for estimating intersymbol interference, and a receive apparatus may use pilot symbols to perform estimation of a radio wave propagation environment (channel estimation) between the transmit apparatus and the receive apparatus, and may use pilot symbols to perform frequency offset estimation and time synchronization.

Operation of a receive apparatus is described with reference to FIG. 2.

In FIG. 2, 210 indicates a configuration of a receive apparatus. The de-mapper 214 of FIG. 2 performs de-mapping with respect to mapping of a modulation scheme used by the transmit apparatus, for example obtaining and outputting a log-likelihood ratio for each bit. At this time, although not illustrated in FIG. 2, estimation of intersymbol interference, estimation of a radio wave propagation environment (channel estimation) between the transmit apparatus and the receive apparatus, time synchronization between the transmit apparatus and the receive apparatus, and frequency offset estimation between the transmit apparatus and the received apparatus may be performed in order to precisely perform de-mapping.

Although not illustrated in FIG. 2, the receive apparatus includes an intersymbol interference estimator, a channel estimator, a time synchronizer, and a frequency offset estimator. These estimators extract from receive signals a portion of pilot symbols, for example, and respectively perform intersymbol interference estimation, estimation of a radio wave propagation environment (channel estimation) between the transmit apparatus and the receive apparatus, time synchronization between the transmit apparatus and the receive apparatus, and frequency offset estimation between the transmit apparatus and the receive apparatus. Subsequently, the de-mapper 214 of FIG. 2 inputs these estimation signals and, by performing de-mapping based on these estimation signals, performs, for example, calculation of a log-likelihood ratio.

Further, a transmission method of pilot symbols is not limited to the example illustrated in FIG. 13 as long as the transmission method satisfies both <1> and <2> described above. For example, a modulation scheme of the 1st symbol of FIG. 13 may be (8,8)16APSK, and a transmission order of $[b_3b_2b_1b_0]$ may be any transmission order. Further, the number of pilot symbols is not limited to 32 symbols as long as the pilot symbols satisfy both <1> and <2>. Accordingly, when composed of 32×N (N being a natural number) symbols, there is an advantage that the number of occurrences of each of the following symbols can be equalized:

a symbol of a constellation point (baseband signal) corresponding to $[b_3b_2b_1b_0]$=[0000] of (12,4)16APSK;
a symbol of a constellation point (baseband signal) corresponding to $[b_3b_2b_1b_0]$=[0001] of (12,4)16APSK;
a symbol of a constellation point (baseband signal) corresponding to $[b_3b_2b_1b_0]$=[0010] of (12,4)16APSK;
a symbol of a constellation point (baseband signal) corresponding to $[b_3b_2b_1b_0]$=[0011] of (12,4)16APSK;
a symbol of a constellation point (baseband signal) corresponding to $[b_3b_2b_1b_0]$=[0100] of (12,4)16APSK;
a symbol of a constellation point (baseband signal) corresponding to $[b_3b_2b_1b_0]$=[0101] of (12,4)16APSK;
a symbol of a constellation point (baseband signal) corresponding to $[b_3b_2b_1b_0]$=[0110] of (12,4)16APSK;
a symbol of a constellation point (baseband signal) corresponding to $[b_3b_2b_1b_0]$=[0111] of (12,4)16APSK;
a symbol of a constellation point (baseband signal) corresponding to $[b_3b_2b_1b_0]$=[1000] of (12,4)16APSK;
a symbol of a constellation point (baseband signal) corresponding to $[b_3b_2b_1b_0]$=[1001] of (12,4)16APSK;
a symbol of a constellation point (baseband signal) corresponding to $[b_3b_2b_1b_0]$=[1010] of (12,4)16APSK;
a symbol of a constellation point (baseband signal) corresponding to $[b_3b_2b_1b_0]$=[1011] of (12,4)16APSK;
a symbol of a constellation point (baseband signal) corresponding to $[b_3b_2b_1b_0]$=[1100] of (12,4)16APSK;
a symbol of a constellation point (baseband signal) corresponding to $[b_3b_2b_1b_0]$=[1101] of (12,4)16APSK;
a symbol of a constellation point (baseband signal) corresponding to $[b_3b_2b_1b_0]$=[1110] of (12,4)16APSK;
a symbol of a constellation point (baseband signal) corresponding to $[b_3b_2b_1b_0]$=[1111] of (12,4)16APSK;
a symbol of a constellation point (baseband signal) corresponding to $[b_3b_2b_1b_0]$=[0000] of (8,8)16APSK;
a symbol of a constellation point (baseband signal) corresponding to $[b_3b_2b_1b_0]$=[0001] of (8,8)16APSK;
a symbol of a constellation point (baseband signal) corresponding to $[b_3b_2b_1b_0]$=[0010] of (8,8)16APSK;
a symbol of a constellation point (baseband signal) corresponding to $[b_3b_2b_1b_0]$=[0011] of (8,8)16APSK;
a symbol of a constellation point (baseband signal) corresponding to $[b_3b_2b_1b_0]$=[0100] of (8,8)16APSK;
a symbol of a constellation point (baseband signal) corresponding to $[b_3b_2b_1b_0]$=[0101] of (8,8)16APSK;
a symbol of a constellation point (baseband signal) corresponding to $[b_3b_2b_1b_0]$=[0110] of (8,8)16APSK;
a symbol of a constellation point (baseband signal) corresponding to $[b_3b_2b_1b_0]$=[0111] of (8,8)16APSK;
a symbol of a constellation point (baseband signal) corresponding to $[b_3b_2b_1b_0]$=[1000] of (8,8)16APSK;
a symbol of a constellation point (baseband signal) corresponding to $[b_3b_2b_1b_0]$=[1001] of (8,8)16APSK;
a symbol of a constellation point (baseband signal) corresponding to $[b_3b_2b_1b_0]$=[1010] of (8,8)16APSK;
a symbol of a constellation point (baseband signal) corresponding to $[b_3b_2b_1b_0]$=[1011] of (8,8)16APSK;
a symbol of a constellation point (baseband signal) corresponding to $[b_3b_2b_1b_0]$=[1100] of (8,8)16APSK;
a symbol of a constellation point (baseband signal) corresponding to $[b_3b_2b_1b_0]$=[1101] of (8,8)16APSK;
a symbol of a constellation point (baseband signal) corresponding to $[b_3b_2b_1b_0]$=[1110] of (8,8)16APSK; and
a symbol of a constellation point (baseband signal) corresponding to $[b_3b_2b_1b_0]$=[1111] of (8,8)16APSK.

Embodiment 3

<Signaling>

In the present embodiment, examples are described of various information signaled as TMCC information in order to facilitate reception at the receive apparatus of a transmit signal used in the transmission scheme described in embodiment 1 and embodiment 2.

Note that the transmit apparatus in the present embodiment is identical to the transmit apparatus described in embodiment 1 and therefore description thereof is omitted here.

Figure 18:
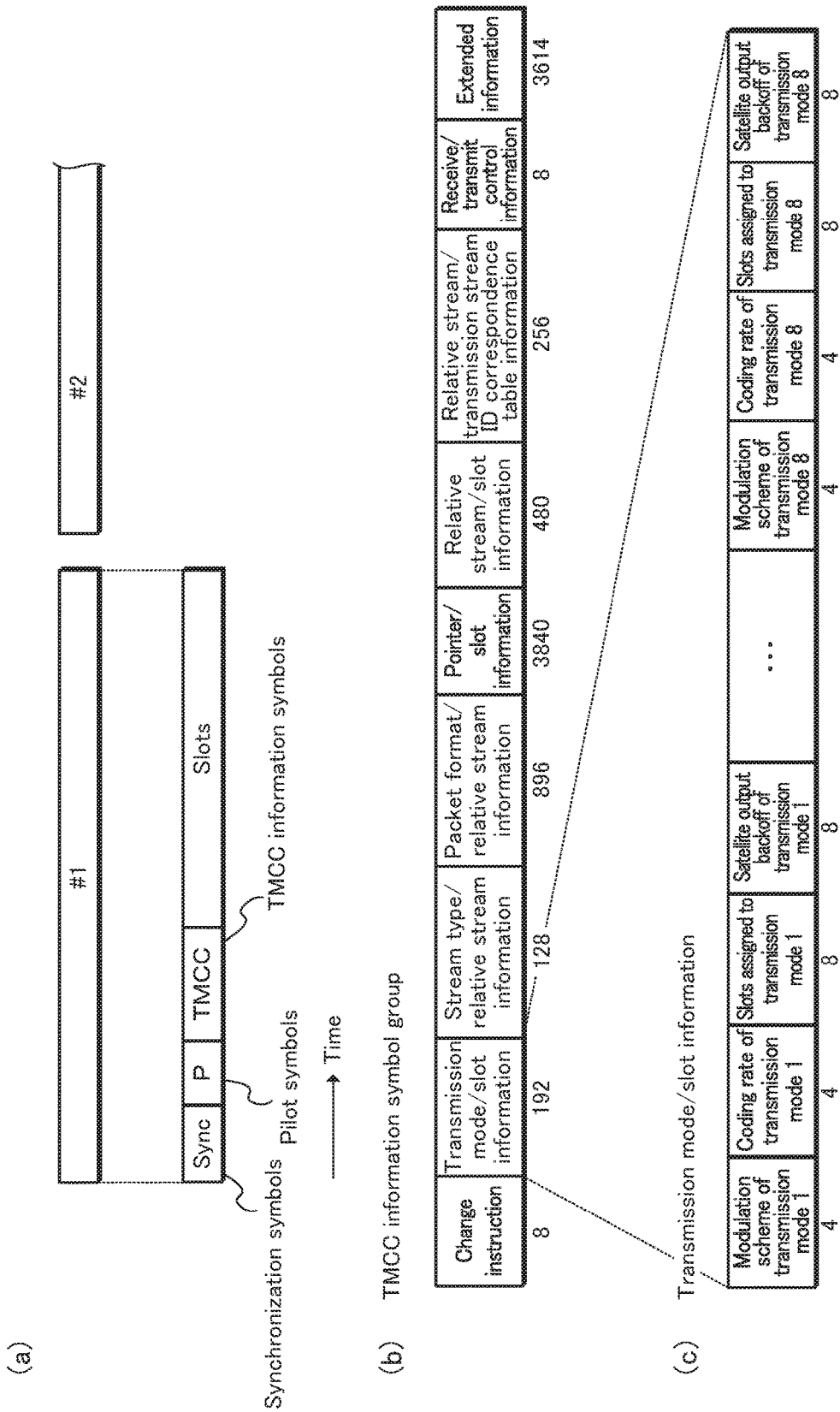
FIG. 18 illustrates a schematic of a transmit signal frame of advanced wide band digital satellite broadcasting.

FIG. 18 illustrates a schematic of a frame of a transmit signal of advanced wide band digital satellite broadcasting. (However, FIG. 18 is not intended to be an exact illustration of a frame of advanced wide band digital satellite broadcasting).

FIG. 18, part (a) indicates a frame along a horizontal axis of time, along which a "#1 symbol group", a "#2 symbol group", a "#3 symbol group", . . . are arranged. Each symbol group of the "#1 symbol group", the "#2 symbol group", the "#3 symbol group", . . . is composed of a "synchronization symbol group", a "pilot symbol group", a "TMCC information symbol group", and "slots composed of a data symbol group", as illustrated in FIG. 18, part (a). A "synchronization symbol group" is, for example, a symbol for a receive apparatus to perform time synchronization and frequency synchronization, and a "pilot symbol group" is used by a receive apparatus for processing as described above.

"Slots composed of a data symbol group" is composed of data symbols. Transmission methods used to generate data symbols, including error correction code, coding rate, code length, modulation scheme, etc., are switchable. Information related to transmission methods used to generate data symbols, including error correction code, coding rate, code length, modulation scheme, etc., is transmitted to a receive apparatus via a "TMCC information symbol group".

FIG. 18, part (b), illustrates an example of a "TMCC information symbol group". The following describes in particular a configuration of "transmission mode/slot information" of a "TMCC information symbol group".

FIG. 18, part (c), illustrates a configuration of "transmission mode/slot information" of a "TMCC information symbol group". In FIG. 18, part (c), "transmission mode 1" to "transmission mode 8" are illustrated, and "slots composed of data symbol group of #1 symbol group", "slots composed of data symbol group of #2 symbol group", "slots composed of data symbol group of #3 symbol group", . . . each belong to a respective one of "transmission mode 1" to "transmission mode 8".

Thus, modulation scheme information for generating symbols of "slots composed of a data symbol group" is transmitted by symbols for transmitting each modulation scheme of a transmission mode in FIG. 18, part (c) (indicated in FIG. 18, part (c), by "modulation scheme of transmission mode 1", . . . , "modulation scheme of transmission mode 8").

Further, coding rate information of error correction code for generating symbols of "slots composed of a data symbol group" is transmitted by symbols for transmitting each coding rate of a transmission mode in FIG. 18, part (c) (indicated in FIG. 18, part (c), by "coding rate of transmission mode 1", . . . , "coding rate of transmission mode 8").

Table 1 illustrates a configuration of modulation scheme information. In Table 1, for example, when four bits to be transmitted by a symbol for transmitting a modulation scheme of a transmission mode of "transmission mode/slot information" of a "TMCC information symbol group" are [0001], a modulation scheme for generating symbols of "slots composed of a symbol group" is π/2 shift binary phase shift keying (BPSK).

When four bits to be transmitted by a symbol for transmitting a modulation scheme of a transmission mode of "transmission mode/slot information" of a "TMCC information symbol group" are [0010], a modulation scheme for generating symbols of "slots composed of a symbol group" is quadrature phase shift keying (QPSK).

When four bits to be transmitted by a symbol for transmitting a modulation scheme of a transmission mode of a "transmission mode/slot information" of a "TMCC information symbol group" are [0011], a modulation scheme for generating symbols of "slots composed of a symbol group" is 8 phase shift keying (8PSK).

When four bits to be transmitted by a symbol for transmitting a modulation scheme of a transmission mode of "transmission mode/slot information" of a "TMCC information symbol group" are [0100], a modulation scheme for generating symbols of "slots composed of a symbol group" is (12,4)16APSK.

When four bits to be transmitted by a symbol for transmitting a modulation scheme of a transmission mode of "transmission mode/slot information" of a "TMCC information symbol group" are [0101], a modulation scheme for generating symbols of "slots composed of a symbol group" is (8,8)16APSK.

When four bits to be transmitted by a symbol for transmitting a modulation scheme of a transmission mode of "transmission mode/slot information" of a "TMCC information symbol group" are [0110], a modulation scheme for generating symbols of "slots composed of a symbol group" is 32 amplitude phase shift keying (32APSK).

When four bits to be transmitted by a symbol for transmitting a modulation scheme of a transmission mode of "transmission mode/slot information" of a "TMCC information symbol group" are [0111], a modulation scheme for generating symbols of "slots composed of a symbol group" is a "transmission method mixing (12,4)16APSK symbols and (8,8)16APSK symbols" (this may be the transmission method described in embodiment 1, for example, but the present description also describes other transmission methods (for example, embodiment 4)).

. . .

TABLE 1

Modulation scheme information

| Value | Assignment |
|---|---|
| 0000 | Reserved |
| 0001 | π/2 shift BPSK |
| 0010 | QPSK |
| 0011 | 8PSK |
| 0100 | (12,4)16APSK |
| 0101 | (8,8)16APSK |
| 0110 | 32APSK |
| 0111 | Transmission method mixing (12,4)16APSK symbols and (8,8)16APSK symbols |
| . . . | . . . |
| 1111 | No scheme assigned |

Table 2 illustrates a relationship between coding rates of error correction code and ring ratios when a modulation scheme is (12,4)16APSK. According to $R_1$ and $R_2$, used above to represent constellation points in an I-Q plane of (12,4)16APSK, a ring ratio $R_{(12,4)}$ of (12,4)16APSK is represented as $R_{(12,4)} = R_2/R_1$.

In Table 2, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when a symbol for transmitting a modulation scheme of a transmission mode is indicated to be (12,4)16APSK, a ring ratio $R_{(12,4)}$ of (12,4)16APSK is 3.09.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈2/5), and this means that when a symbol for transmitting a modulation scheme of a transmission mode is indicated to be (12,4)16APSK, a ring ratio $R_{(12,4)}$ of (12,4)16APSK is 2.97.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when a symbol for transmitting a modulation scheme of a transmission mode is indicated to be (12,4)16APSK, a ring ratio $R_{(12,4)}$ of (12,4)16APSK is 3.93.

. . .

TABLE 2

Relationship between coding rates of error correction code and ring ratios when modulation scheme is (12,4)16APSK

| Value | Coding rate (approximate value) | Ring ratio |
|---|---|---|
| 0000 | 41/120 (⅓) | 3.09 |
| 0001 | 49/120 (⅖) | 2.97 |
| 0010 | 61/120 (½) | 3.93 |
| . . . | . . . | . . . |
| 1111 | No scheme assigned | — |

Table 3 illustrates a relationship between coding rates of error correction code and ring ratios when a modulation scheme is (8,8)16APSK. As above, according to $R_1$ and $R_2$ used in representing the constellation points in the I-Q plane of (8,8)16APSK, a ring ratio $R_{(8,8)}$ of (8,8)16APSK is represented as $R_{(8,8)}=R_2/R_1$. In Table 3, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when a symbol for transmitting a modulation scheme of a transmission mode is indicated to be (8,8)16APSK, a ring ratio $R_{(8,8)}$ of (8,8)16APSK is 2.70.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈2/5), and this means that when a symbol for transmitting a modulation scheme of a transmission mode is indicated to be (8,8)16APSK, a ring ratio $R_{(8,8)}$ of (8,8)16APSK is 2.60.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when a symbol for transmitting a modulation scheme of a transmission mode is indicated to be (8,8)16APSK, a ring ratio $R_{(8,8)}$ of (8,8)16APSK is 2.50.

. . .

TABLE 3

Relationship between coding rates of error correction code and ring ratios when a modulation scheme is (8,8)16APSK

| Value | Coding rate (approximate value) | Ring ratio |
|---|---|---|
| 0000 | 41/120 (⅓) | 2.70 |
| 0001 | 49/120 (⅖) | 2.60 |
| 0010 | 61/120 (½) | 2.50 |
| . . . | . . . | . . . |
| 1111 | No scheme assigned | — |

Table 4 illustrates a relationship between coding rates of error correction code and ring ratios when a transmission method mixes (12,4)16APSK symbols and (8,8)16APSK symbols.

In Table 4, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when symbols for transmitting a modulation scheme of a transmission mode are indicated to be generated by a transmission method mixing (12,4)16APSK symbols and (8,8)16APSK symbols, a ring ratio $R_{(12,4)}$ of (12,4)16APSK is 4.20 and a ring ratio $R_{(8,8)}$ of (8,8)16APSK is 2.70.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈0.2/5), and this means that when symbols for transmitting a modulation scheme of a transmission mode are indicated to be generated by a transmission method mixing (12,4)16APSK symbols and (8,8)16APSK symbols, a ring ratio $R_{(12,4)}$ of (12,4)16APSK is 4.10 and a ring ratio $R_{(8,8)}$ of (8,8)16APSK is 2.60.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when symbols for transmitting a modulation scheme of a transmission mode are indicated to be generated by a transmission method mixing (12,4)16APSK symbols and (8,8)16APSK symbols, a ring ratio $R_{(12,4)}$ of (12,4)16APSK is 4.00 and a ring ratio $R_{(8,8)}$ of (8,8)16APSK is 2.50.

. . .

TABLE 4

Relationship between coding rates of error correction code and ring ratios when transmission method mixes (12,4)16APSK symbols and (8,8)16APSK symbols.

| Value | Coding rate (approximate value) | (12,4)16APSK ring ratio | (8,8)16APSK ring ratio |
|---|---|---|---|
| 0000 | 41/120 (⅓) | 4.20 | 2.70 |
| 0001 | 49/120 (⅖) | 4.10 | 2.60 |
| 0010 | 61/120 (½) | 4.00 | 2.50 |
| . . . | . . . | . . . | . . . |
| 1111 | No scheme assigned | — | — |

Further, as in FIG. 22, the following transmission is performed by "stream type/relative stream information" of a "TMCC information symbol group".

FIG. 22, part (a) illustrates a configuration of "stream type/relative stream information". In FIG. 22, part (a), a configuration for transmitting stream type information is illustrated as an example including stream 0 to stream 15. In FIG. 22, part (a), "stream type of relative stream 0" indicates stream type information of stream 0.

Likewise, "stream type of relative stream 1" indicates stream type information of stream 1.

"Stream type of relative stream 2" indicates stream type information of stream 2.

. . .

"Stream type of relative stream 15" indicates stream type information of stream 15.

Stream type information for a stream is assumed to be composed of eight bits (however, this is just an example).

FIG. 22, part (b), illustrates examples of assignments to eight bit stream type information.

Eight bit stream type information [00000000] is reserved.

Eight bit stream type information [00000001] indicates that the stream is Moving Picture Experts Group—2 transport stream (MPEG-2TS).

Eight bit stream type information [00000010] indicates that the stream is type-length-value (TLV).

Eight bit stream type information [00000011] indicates that the stream is video (moving image) of resolution approximately 4 k (for example, 3840) pixels horizontally by approximately 2 k (for example 2160) pixels vertically. Video coding information may also be included.

Eight bit stream type information [00000100] indicates that the stream is video (moving image) of resolution approximately 8 k (for example, 7680) pixels horizontally by approximately 4 k (for example 4320) pixels vertically. Video coding information may also be included.

Eight bit stream type information [00000101] indicates that the stream is differential information for generating video (moving image) of resolution approximately 8 k (for example, 7680) pixels horizontally by approximately 4 k (for example 4320) pixels vertically from a video (moving image) of resolution approximately 4 k (for example, 3840) pixels horizontally by approximately 2 k (for example 2160) pixels vertically. Video coding information may also be included. This information is described further later.

. . .

Eight bit stream type information [11111111] is not assigned a type.

The following describes how eight bit stream type information [00000101] is used.

Assume the transmit apparatus transmits a stream of a video #A, which is a video (moving image) of resolution approximately 4 k (for example 3840) pixels horizontally by approximately 2 k (for example 2160) pixels vertically. Thus, the transmit apparatus transmits eight bit stream type information [00000011].

In addition, the transmit apparatus is assumed to transmit differential information for generating video (moving image) of resolution approximately 8 k (for example, 7680) pixels horizontally by approximately 4 k (for example 4320) pixels vertically from a video (moving image) of resolution approximately 4 k (for example, 3840) pixels horizontally by approximately 2 k (for example 2160) pixels vertically. Thus, the transmit apparatus transmits eight bit stream type information [00000101].

A receive apparatus receives the stream type information [00000011], determines from this information that the stream is a video (moving image) of resolution approximately 4 k (for example, 3840) pixels horizontally by approximately 2 k (for example 2160) pixels vertically, and can receive the video #A that is a video (moving image) of resolution approximately 4 k (for example, 3840) pixels horizontally by approximately 2 k (for example 2160) pixels vertically.

Further, in addition to the receive apparatus receiving the stream type information [00000011], and determining from this information that the stream is a video (moving image) of resolution approximately 4 k (for example, 3840) pixels horizontally by approximately 2 k (for example 2160) pixels vertically, the receive apparatus receives the stream type information [00000101] and determines from this information that the stream is differential information for generating a video (moving image) of resolution approximately 8 k (for example, 7680) pixels horizontally by approximately 4 k (for example 4320) pixels vertically from a video (moving image) of resolution approximately 4 k (for example, 3840) pixels horizontally by approximately 2 k (for example 2160) pixels vertically. Thus, the receive apparatus can obtain a video (moving image) of resolution approximately 8 k (for example, 7680) pixels horizontally by approximately 4 k (for example 4320) pixels vertically of the video #A from both streams.

Note that in order to transmit these streams, the transmit apparatus uses, for example, a transmission method described in embodiment 1 and embodiment 2. Further, as described in embodiment 1 and embodiment 2, when the transmit apparatus transmits these streams using modulation scheme of both (12,4)16APSK and (8,8)16APSK, the effects described in embodiment 1 and embodiment 2 can be achieved.

<Receive Apparatus>

Figure 19:
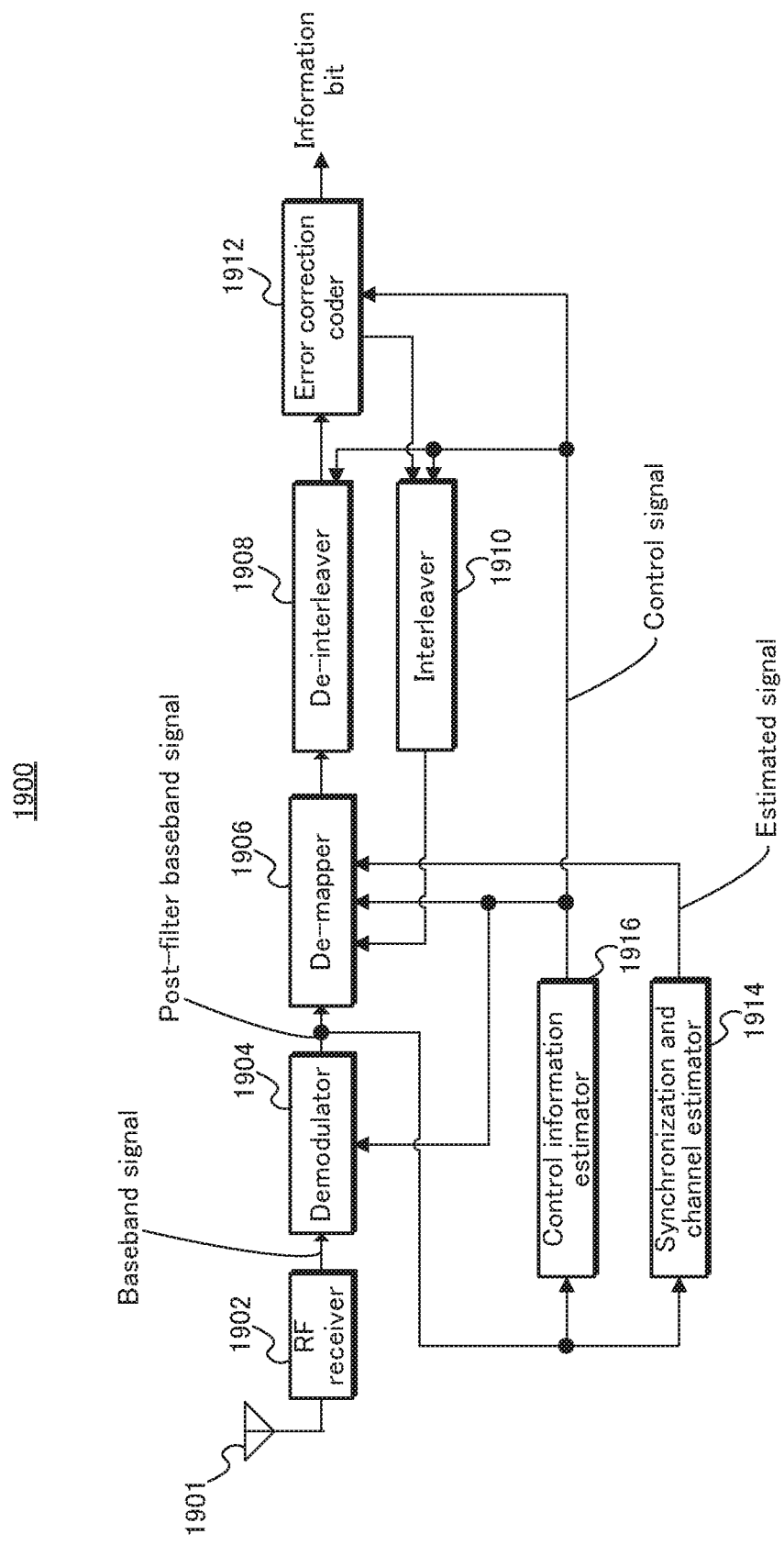
FIG. 19 illustrates a configuration of a receive apparatus.

The following describes operation of a receive apparatus that receives a radio signal transmitted by the transmit apparatus 700, with reference to the diagram of a receive apparatus in FIG. 19.

A receive apparatus 1900 of FIG. 19 receives a radio signal transmitted by the transmit apparatus 700 via an antenna 1901. An RF receiver 1902 performs processing such as frequency conversion and quadrature demodulation on a received radio signal, and outputs a baseband signal.

A demodulator 1904 performs processing such as root roll-off filter processing, and outputs a post-filter baseband signal.

A synchronization and channel estimator 1914 receives a post-filter baseband signal as input, performs time synchronization, frequency synchronization, and channel estimation, using, for example, a "synchronization symbol group" and "pilot symbol group" transmitted by the transmit apparatus, and outputs an estimated signal.

A control information estimator 1916 receives a post-filter baseband signal as input, extracts symbols including control information such as a "TMCC information symbol group", performs demodulation and decoding, and outputs a control signal. Of importance in the present embodiment is that a receive apparatus demodulates and decodes a symbol transmitting "transmission mode modulation scheme" information and a symbol transmitting "transmission mode coding rate" of "transmission mode/slot information" of a "TMCC information symbol group"; and, based on Table 1, Table 2, Table 3, and Table 4, the control information estimator 1916 generates modulation scheme (or transmission method) information and error correction code scheme (for example, coding rate of error correction code) information used by "slots composed of a data symbol group", and generates ring ratio information when a modulation scheme (or transmission method) used by "slots composed of a data symbol group" is a transmission method mixing (12,4)16APSK, (8,8)16APSK, 32APSK, (12,4)16APSK symbols and (8,8)16APSK symbols, and outputs the information as a portion of a control signal.

A de-mapper 1906 receives a post-filter baseband signal, control signal, and estimated signal as input, determines a modulation scheme (or transmission method) used by "slots composed of a data symbol group" based on the control signal (in this case, when there is a ring ratio, determination with respect to the ring ratio is also performed), calculates, based on this determination, a log-likelihood ratio (LLR) for each bit included in a data symbol from the post-filter baseband signal and estimated signal, and outputs the log-likelihood ratios. (However, instead of a soft decision value such as an LLR a hard decision value may be outputted, and a soft decision value instead of an LLR may be outputted.) A de-interleaver 1908 receives log-likelihood ratios as input, accumulates input, performs de-interleaving (permutes data) corresponding to interleaving used by the transmit apparatus, and outputs post-de-interleaving log-likelihood ratios.

An error correction decoder 1912 receives post-de-interleaving log-likelihood ratios and a control signal as input, determines error correction coding used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method.

The above describes operation when iterative detection is not performed. The following is supplemental description of operation when iterative detection is performed. Note that a receive apparatus need not implement iterative detection, and a receive apparatus may be a receive apparatus that performs initial detection and error detection decoding without being provided with elements related to iterative detection that are described below.

When iterative detection is performed, the error correction decoder 1912 outputs a log-likelihood ratio for each post-decoding bit (note that when only initial detection is performed, output of a log-likelihood ratio for each post decoding bit is not necessary).

An interleaver 1910 interleaves a log-likelihood ratio for each post-decoding bit (performs permutation), and outputs a post-interleaving log-likelihood ratio.

The de-mapper 1906 performs iterative detection by using post-interleaving log-likelihood ratios, a post-filter baseband signal, and an estimated signal, and outputs a log-likelihood ratio for each post-iterative detection bit.

Subsequently, interleaving and error correction code operations are performed. Thus, these operations are iteratively performed. In this way, finally the possibility of achieving a preferable decoding result is increased.

In the above description, a feature thereof is that by a reception apparatus obtaining a symbol for transmitting a modulation scheme of a transmission mode of "transmission mode/slot information" of a "TMCC information symbol group" and a symbol for transmitting coding rate of a transmission mode of "transmission mode/slot information" of a "TMCC information symbol group"; a modulation scheme, coding rate of error detection coding, and, when a modulation scheme is 16APSK, 32APSK, or a transmission method mixing (12,4)16APSK symbols and (8,8)16APSK symbols, ring ratios, are estimated and demodulation and decoding operations become possible.

The above description describes the frame configuration in FIG. 18, but frame configurations applicable to the present invention are not limited in this way. When a plurality of data symbols exist, a symbol for transmitting information related to a modulation scheme used in generating the plurality of data symbols, and a symbol for transmitting information related to an error correction scheme (for example, error correction code, code length of error correction code, coding rate of error correction code, etc.) exist, any arrangement in a frame may be used with respect to the plurality of data symbols, the symbol for transmitting information related to a modulation scheme, and the symbol for transmitting information related to an error correction scheme. Further, symbols other than these symbols, for example symbols for preamble and synchronization, pilot symbols, reference symbols, etc., may exist in a frame.

In addition, as a method different to that described above, a symbol transmitting information related to ring ratios may exist, and the transmit apparatus may transmit the symbol. An example of a symbol transmitting information related to ring ratios is illustrated below.

TABLE 5

Example of symbol transmitting information related to ring ratios

| Value | Assignment |
|---|---|
| 00000 | (12,4)16APSK ring ratio 4.00 |
| 00001 | (12,4)16APSK ring ratio 4.10 |
| 00010 | (12,4)16APSK ring ratio 4.20 |
| 00011 | (12,4)16APSK ring ratio 4.30 |
| 00100 | (8,8)16APSK ring ratio 2.50 |
| 00101 | (8,8)16APSK ring ratio 2.60 |
| 00110 | (8,8)16APSK ring ratio 2.70 |
| 00111 | (8,8)16APSK ring ratio 2.80 |

TABLE 5-continued

Example of symbol transmitting information related to ring ratios

| Value | Assignment |
|---|---|
| 01000 | (12,4)16APSK ring ratio 4.00, (8,8)16APSK ring ratio 2.50 in a transmission method mixing (12,4)16APSK symbols and (8,8)16APSK symbols |
| 01001 | (12,4)16APSK ring ratio 4.00, (8,8)16APSK ring ratio 2.60 in a transmission method mixing (12,4)16APSK symbols and (8,8)16APSK symbols |
| 01010 | (12,4)16APSK ring ratio 4.00, (8,8)16APSK ring ratio 2.70 in a transmission method mixing (12,4)16APSK symbols and (8,8)16APSK symbols |
| 01011 | (12,4)16APSK ring ratio 4.00, (8,8)16APSK ring ratio 2.80 in a transmission method mixing (12,4)16APSK symbols and (8,8)16APSK symbols |
| 01100 | (12,4)16APSK ring ratio 4.10, (8,8)16APSK ring ratio 2.50 in a transmission method mixing (12,4)16APSK symbols and (8,8)16APSK symbols |
| 01101 | (12,4)16APSK ring ratio 4.10, (8,8)16APSK ring ratio 2.60 in a transmission method mixing (12,4)16APSK symbols and (8,8)16APSK symbols |
| 01110 | (12,4)16APSK ring ratio 4.10, (8,8)16APSK ring ratio 2.70 in a transmission method mixing (12,4)16APSK symbols and (8,8)16APSK symbols |
| 01111 | (12,4)16APSK ring ratio 4.10, (8,8)16APSK ring ratio 2.80 in a transmission method mixing (12,4)16APSK symbols and (8,8)16APSK symbols |
| . . . | . . . |
| 11111 | . . . |

According to Table 5, when [00000] is transmitted by a symbol transmitting information related to a ring ratio, a data symbol is a symbol of "(12,4)16APSK ring ratio 4.00".

Further, the following is true.

When [00001] is transmitted by a symbol transmitting information related to a ring ratio, a data symbol is a symbol of "(12,4)16APSK ring ratio 4.10".

When [00010] is transmitted by a symbol transmitting information related to a ring ratio, a data symbol is a symbol of "(12,4)16APSK ring ratio 4.20".

When [00011] is transmitted by a symbol transmitting information related to a ring ratio, a data symbol is a symbol of "(12,4)16APSK ring ratio 4.30".

When [00100] is transmitted by a symbol transmitting information related to a ring ratio, a data symbol is a symbol of "(8,8)16APSK ring ratio 2.50".

When [00101] is transmitted by a symbol transmitting information related to a ring ratio, a data symbol is a symbol of "(8,8)16APSK ring ratio 2.60".

When [00110] is transmitted by a symbol transmitting information related to a ring ratio, a data symbol is a symbol of "(8,8)16APSK ring ratio 2.70".

When [00111] is transmitted by a symbol transmitting information related to a ring ratio, a data symbol is a symbol of "(8,8)16APSK ring ratio 2.80".

When [01000] is transmitted by a symbol transmitting information related to a ring ratio, a data symbol is a symbol of "(12,4)16APSK ring ratio 4.00, (8,8)16APSK ring ratio 2.50 in a transmission method mixing (12,4)16APSK symbols and (8,8)16APSK symbols".

When [01001] is transmitted by a symbol transmitting information related to a ring ratio, a data symbol is a symbol of "(12,4)16APSK ring ratio 4.00, (8,8)16APSK ring ratio 2.60 in a transmission method mixing (12,4)16APSK symbols and (8,8)16APSK symbols".

When [01010] is transmitted by a symbol transmitting information related to a ring ratio, a data symbol is a symbol of "(12,4)16APSK ring ratio 4.00, (8,8)16APSK ring ratio 2.70 in a transmission method mixing (12,4)16APSK symbols and (8,8)16APSK symbols".

When [01011] is transmitted by a symbol transmitting information related to a ring ratio, a data symbol is a symbol of "(12,4)16APSK ring ratio 4.00, (8,8)16APSK ring ratio 2.80 in a transmission method mixing (12,4)16APSK symbols and (8,8)16APSK symbols".

When [01100] is transmitted by a symbol transmitting information related to a ring ratio, a data symbol is a symbol of "(12,4)16APSK ring ratio 4.10, (8,8)16APSK ring ratio 2.50 in a transmission method mixing (12,4)16APSK symbols and (8,8)16APSK symbols".

When [01101] is transmitted by a symbol transmitting information related to a ring ratio, a data symbol is a symbol of "(12,4)16APSK ring ratio 4.10, (8,8)16APSK ring ratio 2.60 in a transmission method mixing (12,4)16APSK symbols and (8,8)16APSK symbols".

When [01110] is transmitted by a symbol transmitting information related to a ring ratio, a data symbol is a symbol of "(12,4)16APSK ring ratio 4.10, (8,8)16APSK ring ratio 2.70 in a transmission method mixing (12,4)16APSK symbols and (8,8)16APSK symbols".

When [01111] is transmitted by a symbol transmitting information related to a ring ratio, a data symbol is a symbol of "(12,4)16APSK ring ratio 4.10, (8,8)16APSK ring ratio 2.80 in a transmission method mixing (12,4)16APSK symbols and (8,8)16APSK symbols".

. . .

Thus, by obtaining a symbol transmitting information related to a ring ratio, a receive apparatus can estimate a ring ratio used by a data symbol, and therefore demodulation and decoding of the data symbol becomes possible.

Further, ring ratio information may be included in a symbol for transmitting a modulation scheme. An example is illustrated below.

TABLE 6

| Modulation scheme information | |
|---|---|
| Value | Assignment |
| 00000 | (12,4)16APSK ring ratio 4.00 |
| 00001 | (12,4)16APSK ring ratio 4.10 |
| 00010 | (12,4)16APSK ring ratio 4.20 |
| 00011 | (12,4)16APSK ring ratio 4.30 |
| 00100 | (8,8)16APSK ring ratio 2.50 |
| 00101 | (8,8)16APSK ring ratio 2.60 |
| 00110 | (8,8)16APSK ring ratio 2.70 |
| 00111 | (8,8)16APSK ring ratio 2.80 |
| 01000 | (12,4)16APSK ring ratio 4.00, (8,8)16APSK ring ratio 2.50 in a transmission method mixing (12,4)16APSK symbols and (8,8)16APSK symbols |
| 01001 | (12,4)16APSK ring ratio 4.00, (8,8)16APSK ring ratio 2.60 in a transmission method mixing (12,4)16APSK symbols and (8,8)16APSK symbols |
| 01010 | (12,4)16APSK ring ratio 4.00, (8,8)16APSK ring ratio 2.70 in a transmission method mixing (12,4)16APSK symbols and (8,8)16APSK symbols |
| 01011 | (12,4)16APSK ring ratio 4.00, (8,8)16APSK ring ratio 2.80 in a transmission method mixing (12,4)16APSK symbols and (8,8)16APSK symbols |
| 01100 | (12,4)16APSK ring ratio 4.10, (8,8)16APSK ring ratio 2.50 in a transmission method mixing (12,4)16APSK symbols and (8,8)16APSK symbols |
| 01101 | (12,4)16APSK ring ratio 4.10, (8,8)16APSK ring ratio 2.60 in a transmission method mixing (12,4)16APSK symbols and (8,8)16APSK symbols |
| 01110 | (12,4)16APSK ring ratio 4.10, (8,8)16APSK ring ratio 2.70 in a transmission method mixing (12,4)16APSK symbols and (8,8)16APSK symbols |

TABLE 6-continued

| Modulation scheme information | |
|---|---|
| Value | Assignment |
| 01111 | (12,4)16APSK ring ratio 4.10, (8,8)16APSK ring ratio 2.80 in a transmission method mixing (12,4)16APSK symbols and (8,8)16APSK symbols |
| . . . | . . . |
| 11101 | 8PSK |
| 11110 | QPSK |
| 11111 | π/2 shift BPSK |

According to Table 6, when [00000] is transmitted by a symbol transmitting modulation scheme information, a data symbol is a symbol of "(12,4)16APSK ring ratio 4.00".

Further, the following is true.

When [00001] is transmitted by a symbol transmitting modulation scheme information, a data symbol is a symbol of "(12,4)16APSK ring ratio 4.10".

When [00010] is transmitted by a symbol transmitting modulation scheme information, a data symbol is a symbol of "(12,4)16APSK ring ratio 4.20".

When [00011] is transmitted by a symbol transmitting modulation scheme information, a data symbol is a symbol of "(12,4)16APSK ring ratio 4.30".

When [00100] is transmitted by a symbol transmitting modulation scheme information, a data symbol is a symbol of "(8,8)16APSK ring ratio 2.50".

When [00101] is transmitted by a symbol transmitting modulation scheme information, a data symbol is a symbol of "(8,8)16APSK ring ratio 2.60".

When [00110] is transmitted by a symbol transmitting modulation scheme information, a data symbol is a symbol of "(8,8)16APSK ring ratio 2.70".

When [00111] is transmitted by a symbol transmitting modulation scheme information, a data symbol is a symbol of "(8,8)16APSK ring ratio 2.80".

When [01000] is transmitted by a symbol transmitting modulation scheme information, a data symbol is a symbol of "(12,4)16APSK ring ratio 4.00, (8,8)16APSK ring ratio 2.50 in a transmission method mixing (12,4)16APSK symbols and (8,8)16APSK symbols".

When [01001] is transmitted by a symbol transmitting modulation scheme information, a data symbol is a symbol of "(12,4)16APSK ring ratio 4.00, (8,8)16APSK ring ratio 2.60 in a transmission method mixing (12,4)16APSK symbols and (8,8)16APSK symbols".

When [01010] is transmitted by a symbol transmitting modulation scheme information, a data symbol is a symbol of "(12,4)16APSK ring ratio 4.00, (8,8)16APSK ring ratio 2.70 in a transmission method mixing (12,4)16APSK symbols and (8,8)16APSK symbols".

When [01011] is transmitted by a symbol transmitting modulation scheme information, a data symbol is a symbol of "(12,4)16APSK ring ratio 4.00, (8,8)16APSK ring ratio 2.80 in a transmission method mixing (12,4)16APSK symbols and (8,8)16APSK symbols".

When [01100] is transmitted by a symbol transmitting modulation scheme information, a data symbol is a symbol of "(12,4)16APSK ring ratio 4.10, (8,8)16APSK ring ratio 2.50 in a transmission method mixing (12,4)16APSK symbols and (8,8)16APSK symbols".

When [01101] is transmitted by a symbol transmitting modulation scheme information, a data symbol is a symbol of "(12,4)16APSK ring ratio 4.10, (8,8)16APSK ring ratio 2.60 in a transmission method mixing (12,4)16APSK symbols and (8,8)16APSK symbols".

When [01110] is transmitted by a symbol transmitting modulation scheme information, a data symbol is a symbol of "(12,4)16APSK ring ratio 4.10, (8,8)16APSK ring ratio 2.70 in a transmission method mixing (12,4)16APSK symbols and (8,8)16APSK symbols".

When [01111] is transmitted by a symbol transmitting modulation scheme information, a data symbol is a symbol of "(12,4)16APSK ring ratio 4.10, (8,8)16APSK ring ratio 2.80 in a transmission method mixing (12,4)16APSK symbols and (8,8)16APSK symbols".

. . .

When [11101] is transmitted by a symbol transmitting modulation scheme information, a data symbol is a symbol of "8PSK".

When [11110] is transmitted by a symbol transmitting modulation scheme information, a data symbol is a symbol of "QPSK".

When [11111] is transmitted by a symbol transmitting modulation scheme information, a data symbol is a symbol of "π/2 shift BPSK".

Thus, by obtaining a symbol transmitting modulation scheme information, a receive apparatus can estimate a modulation scheme and ring ratio used by a data symbol, and therefore demodulation and decoding of the data symbol becomes possible.

Note that in the above description, examples are described including "(12,4)16APSK ring ratio 4.10, (8,8)16APSK ring ratio 2.80 in a transmission method mixing (12,4)16APSK symbols and (8,8)16APSK symbols", "(12,4)16APSK", and "(8,8)16APSK" as selectable modulation schemes (transmission methods), but modulation schemes (transmission methods) are not limited to these examples. For example, "(12,4)16APSK ring ratio 4.10, (8,8)16APSK ring ratio 2.80 in a transmission method mixing (12,4)16APSK symbols and (8,8)16APSK symbols" may be included as a selectable modulation scheme (transmission method); "(12,4)16APSK ring ratio 4.10, (8,8)16APSK ring ratio 2.80 in a transmission method mixing (12,4)16APSK symbols and (8,8)16APSK symbols" and "(12,4)16APSK" may be included as selectable modulation schemes (transmission methods); or "(12,4)16APSK ring ratio 4.10, (8,8)16APSK ring ratio 2.80 in a transmission method mixing (12,4)16APSK symbols and (8,8)16APSK symbols" and "(8,8)16APSK" may be included as selectable modulation schemes (transmission methods).

When a modulation scheme for which a ring ratio can be set is included among selectable modulation schemes, the transmit apparatus transmits information related to the ring ratio of the modulation scheme or a control symbol that enables estimation of the ring ratio, and therefore a receive apparatus can estimate a modulation scheme and ring ratio of a data symbol, and demodulation and decoding of the data symbol becomes possible.

Embodiment 4

In the present embodiment, an order of generation of a data symbol is described.

FIG. 18, part (a) illustrates a schematic of a frame configuration.

In FIG. 18, part (a), the "#1 symbol group", the "#2 symbol group", the "#3 symbol group", . . . are lined up.

Each symbol group among the "#1 symbol group", the "#2 symbol group", the "#3 symbol group", . . . is herein composed of a "synchronization symbol group", a "pilot symbol group", a "TMCC information symbol group", and "slots composed of a data symbol group" as illustrated in FIG. 18, part (a).

Here, a configuration scheme is described of data symbol groups in each "slots composed of a data symbol group" among, for example, N symbol groups including the "#1 symbol group", the "#2 symbol group", the "#3 symbol group", . . . , an "#N-1 symbol group", an "#N symbol group".

A rule is provided with respect to generation of data symbol groups in each "slots composed of a data symbol group" among N symbol groups from a "#(β×N+1) symbol group" to a "#(β×N+N) symbol group". The rule is described with reference to FIG. 20.

In FIG. 20, "(8,8)16APSK symbol and (12,4)16APSK symbol mixed" is written, but "(8,8)16APSK symbol and (12,4)16APSK symbol mixed" means that the symbol group is generated, as described in embodiment 1, by a transmission method selected from:

"In a symbol group of at least three consecutive symbols (or at least four consecutive symbols), among which a modulation scheme for each symbol is (12,4)16APSK or (8,8)16APSK, there are no consecutive (12,4) 16APSK symbols and there are no consecutive (8,8) 16APSK symbols"; and When each data symbol is either a (12,4)16APSK symbol or an (8,8)16APSK symbol, three or more consecutive (8,8)16APSK symbols are not present in a consecutive data symbol group, as in the examples of FIG. 23.

Thus, "(8,8)16APSK symbol and (12,4)16APSK symbol mixed" satisfies the features of FIG. 20, part (a) to part (f). Note that in FIG. 20, the horizontal axis is symbols.

FIG. 20, part (a):

When a 32APSK data symbol exists and an (8,8)16APSK data symbol does not exist, a "(8,8)16APSK symbol and (12,4)16APSK symbol mixed" symbol exists after a "32APSK data symbol", as illustrated in FIG. 20, part (a).

FIG. 20, part (b):

When an (8,8)16APSK data symbol exists, a "(8,8) 16APSK symbol and (12,4)16APSK symbol mixed" symbol exists after an "(8,8)16APSK data symbol", as illustrated in FIG. 20, part (b).

FIG. 20, part (c):

When a (12,4)16APSK data symbol exists, a "(12,4) 16APSK data symbol" exists after a "(8,8)16APSK symbol and (12,4)16APSK symbol mixed" symbol, as illustrated in FIG. 20, part (c).

FIG. 20, part (d):

When an 8PSK data symbol exists and a (12,4)16APSK data symbol does not exist, an "8PSK data symbol" exists after a "(8,8)16APSK symbol and (12,4)16APSK symbol mixed" symbol, as illustrated in FIG. 20, part (d).

FIG. 20, part (e):

When a QPSK data symbol exists, an 8PSK data symbol does not exist, and a (12,4)16APSK data symbol does not exist, a "QPSK data symbol" exists after a "(8,8)16APSK symbol and (12,4)16APSK symbol mixed" symbol, as illustrated in FIG. 20, part (e).

FIG. 20, part (f):

When a π/2 shift BPSK data symbol exists, a QPSK data symbol does not exist, an 8PSK data symbol does not exist, and a (12,4)16APSK data symbol does not exist, a "π/2 shift BPSK data symbol" exists after a "(8,8)16APSK symbol and (12,4)16APSK symbol mixed" symbol, as illustrated in FIG. 20, part (f).

When symbols are arranged as described above, there is an advantage that a receive apparatus can easily perform automatic gain control (AGC) because a signal sequence is arranged in order of modulation schemes (transmission methods) of high peak power.

Figure 21:
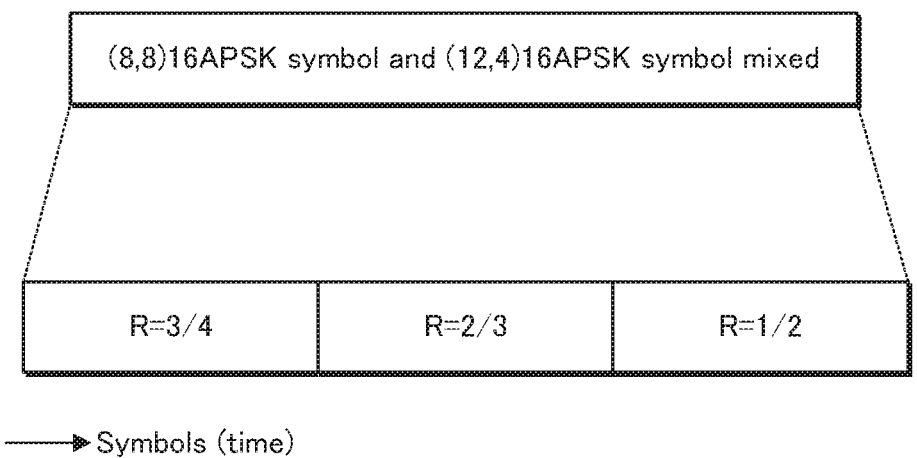
FIG. 21 illustrates an example of arrangement of modulation schemes.

FIG. 21 illustrates a method of configuring a "(8,8)16APSK symbol and (12,4)16APSK symbol mixed" symbol, as described above.

Assume that a "(8,8)16APSK symbol and (12,4)16APSK symbol mixed" symbol of a coding rate X of error correction code and a "(8,8)16APSK symbol and (12,4)16APSK symbol mixed" symbol of a coding rate Y of error correction code exist. Also assume that a relationship X>Y is satisfied.

When the above is true, a "(8,8)16APSK symbol and (12,4)16APSK symbol mixed" symbol of a coding rate Y of error correction code is arranged after a "(8,8)16APSK symbol and (12,4)16APSK symbol mixed" symbol of a coding rate X of error correction code.

As in FIG. 21, assume that a "(8,8)16APSK symbol and (12,4)16APSK symbol mixed" symbol of a coding rate 1/2 of error correction code, a "(8,8)16APSK symbol and (12,4)16APSK symbol mixed" symbol of a coding rate 2/3 of error correction code, and a "(8,8)16APSK symbol and (12,4)16APSK symbol mixed" symbol of a coding rate 3/4 of error correction code exist. Thus, from the above description, as illustrated in FIG. 21, symbols are arranged in the order of a "(8,8)16APSK symbol and (12,4)16APSK symbol mixed" symbol of a coding rate 3/4 of error correction code, a "(8,8)16APSK symbol and (12,4)16APSK symbol mixed" symbol of a coding rate 2/3 of error correction code, and a "(8,8)16APSK symbol and (12,4)16APSK symbol mixed" symbol of a coding rate 1/2 of error correction code.

Embodiment 5

According to embodiment 1 to embodiment 4, methods of switching (12,4)16APSK symbols and (8,8)16APSK symbols in a transmit frame, methods of configuring pilot symbols, methods of configuring control information including TMCC, etc., have been described.

Methods achieving a similar effect to embodiment 1 to embodiment 4 are not limited to methods using (12,4)16APSK symbols and (8,8)16APSK symbols in a transmit frame, and a method using (12,4)16APSK symbols and non-uniform (NU)-16QAM symbols can also achieve a similar effect to embodiment 1 to embodiment 4. In other words, NU-16QAM symbols may be used instead of (8,8)16APSK symbols in embodiment 1 to embodiment 4 (the modulation scheme used in combination is (12,4)16APSK). Accordingly, the present embodiment primarily describes using NU-16QAM symbols instead of (8,8)16APSK symbols.

<Constellation>

The following describes constellation and assignment of bits to each constellation point (labelling) of NU-16QAM performed by the mapper 708 of FIG. 7.

Figure 26:
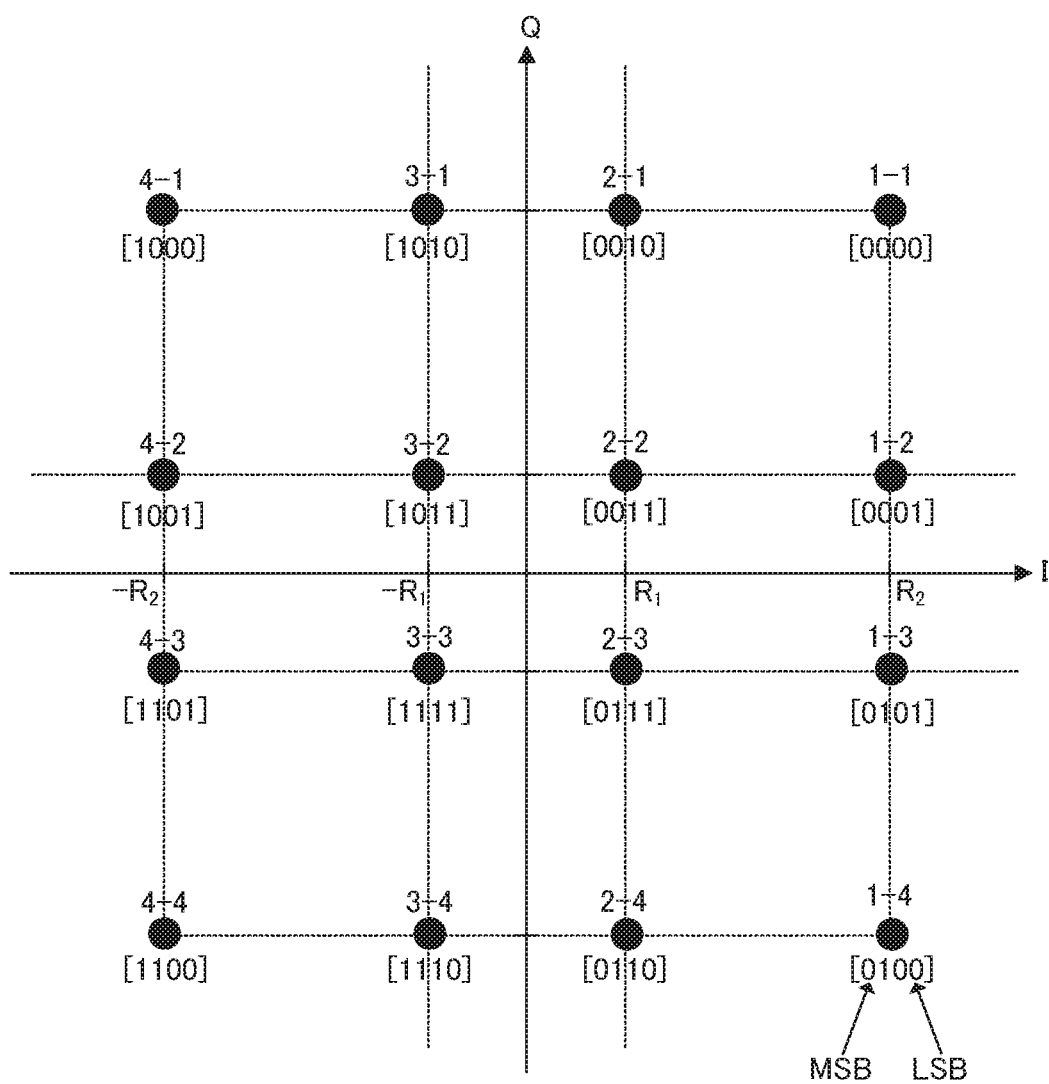
FIG. 26 illustrates an example of constellation and labelling of NU-16QAM.

FIG. 26 illustrates an example of labelling a constellation of NU-16QAM in an in-phase (I)-quadrature-phase (Q) plane. In embodiment 1 to embodiment 4, description is provided using ring ratios, but here an "amplitude ratio" is defined instead of a ring ratio. When $R_1$ and $R_2$ are defined as in FIG. 26 (here, $R_1$ is a real number greater than zero and $R_2$ is a real number greater than zero, and $R_1 < R_2$), an amplitude ratio $A_r = R_2/R_1$. Thus, an amplitude ratio of NU-16QAM is applicable instead of a ring ratio of (8,8)16APSK in embodiment 1 to embodiment 4.

Coordinates of each constellation point of NU-16QAM on the I-Q plane are as follows.

Constellation point 1-1 [0000] . . . $(R_2, R_2)$
Constellation point 1-2 [0001] . . . $(R_2, R_1)$
Constellation point 1-3 [0101] . . . $(R_2, -R_1)$
Constellation point 1-4 [0100] . . . $(R_2, -R_2)$
Constellation point 2-1 [0010] . . . $(R_1, R_2)$
Constellation point 2-2 [0011] . . . $(R_1, R_1)$
Constellation point 2-3 [0111] . . . $(R_1, -R_1)$
Constellation point 2-4 [0110] . . . $(R_1, -R_2)$
Constellation point 3-1 [1010] . . . $(-R_1, R_2)$
Constellation point 3-2 [1011] . . . $(-R_1, R_1)$
Constellation point 3-3 [1111] . . . $(-R_1, -R_1)$
Constellation point 3-4 [1110] . . . $(-R_1, -R_2)$
Constellation point 4-1 [1000] . . . $(-R_2, R_2)$
Constellation point 4-2 [1001] . . . $(-R_2, R_1)$
Constellation point 4-3 [1101] . . . $(-R_2, -R_1)$
Constellation point 4-4 [1100] . . . $(-R_2, -R_2)$ Further, for example, the following relationship is disclosed above:

Constellation point 1-1 [0000] . . . $(R_2, R_2)$

In data that is inputted to the mapper 708, this means that when four bits $[b_3 b_2 b_1 b_0] = [0000]$, an in-phase component I and quadrature component Q of a baseband signal after mapping are defined as $(I, Q) = (R_2, R_2)$. As another example, the following relationship is disclosed above:

Constellation point 4-4 [1100] . . . $(-R_2, -R_2)$

In data that is inputted to the mapper 708, this means that when four bits $[b_3 b_2 b_1 b_0] = [1100]$, an in-phase component I and quadrature component Q of a baseband signal after mapping are defined as $(I, Q) = (-R_2, -R_2)$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

<Transmission Output>

In order to achieve the same transmission output for (12,4)16APSK symbols and NU-16QAM symbols, the following normalization coefficient may be used. The normalization coefficient for (12,4)16APSK symbols is as described in embodiment 1. A normalization coefficient for NU-16QAM symbols is defined by the following formula.

[Math 25]

$$a_{NU-16QAM} = \frac{z}{\sqrt{(4 \times 2 \times R_1^2 + 4 \times 2 \times R_2^2 + 8 \times (R_1^2 + R_2^2))/16}} \quad \text{(Math 25)}$$

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is NU-16QAM, $(I_n, Q_n) = (a_{NU-16QAM} \times I_b, a_{NU-16QAM} \times Q_b)$ holds true.

When a modulation scheme is NU-16QAM, the in-phase component $I_b$ and quadrature component $Q_b$ are the in-phase component I and quadrature component Q, respectively, of a baseband signal after mapping that is obtained by mapping based on FIG. 26. Accordingly, when a modulation scheme is NU-16QAM, the following relationships hold true.

Constellation point 1-1 [0000] . . . $(I_n, Q_n) = (a_{NU-16QAM} \times R_2, a_{NU-16QAM} \times R_2)$
Constellation point 1-2 [0001] . . . $(I_n, Q_n) = (a_{NU-16QAM} \times R_2, a_{NU-16QAM} \times R_1)$ Constellation point 1-3 [0101] ... $(I_n, Q_n)=(a_{NU\text{-}16QAM} \times R_2, -a_{NU\text{-}16QAM} \times R_1)$ Constellation point 1-4 [0100] ... $(I_n, Q_n)=(a_{NU\text{-}16QAM} \times R_2, -a_{NU\text{-}16QAM} \times R_2)$ Constellation point 2-1 [0010] ... $(I_n, Q_n)=(a_{NU\text{-}16QAM} \times R_1, a_{NU\text{-}16QAM} \times R_2)$ Constellation point 2-2 [0011] ... $(I_n, Q_n)=(a_{NU\text{-}16QAM} \times R_1, a_{NU\text{-}16QAM} \times R_1)$ Constellation point 2-3 [0111] ... $(I_n, Q_n)=(a_{NU\text{-}16QAM} \times R_1, -a_{NU\text{-}16QAM} \times R_1)$ Constellation point 2-4 [0110] ... $(I_n, Q_n)=(a_{NU\text{-}16QAM} \times R_1, -a_{NU\text{-}16QAM} \times R_2)$ Constellation point 3-1 [1010] ... $(I_n, Q_n)=(-a_{NU\text{-}16QAM} \times R_1, a_{NU\text{-}16QAM} \times R_2)$ Constellation point 3-2 [1011] ... $(I_n, Q_n)=(-a_{NU\text{-}16QAM} \times R_1, a_{NU\text{-}16QAM} \times R_1)$ Constellation point 3-3 [1111] ... $(I_n, Q_n)=(-a_{NU\text{-}16QAM} \times R_1, -a_{NU\text{-}16QAM} \times R_1)$ Constellation point 3-4 [1110] ... $(I_n, Q_n)=(-a_{NU\text{-}16QAM} \times R_1, -a_{NU\text{-}16QAM} \times R_2)$ Constellation point 4-1 [1000] ... $(I_n, Q_n)=(-a_{NU\text{-}16QAM} \times R_2, a_{NU\text{-}16QAM} \times R_2)$ Constellation point 4-2 [1001] ... $(I_n, Q_n)=(-a_{NU\text{-}16QAM} \times R_2, a_{NU\text{-}16QAM} \times R_1)$ Constellation point 4-3 [1101] ... $(I_n, Q_n)=(-a_{NU\text{-}16QAM} \times R_2, -a_{NU\text{-}16QAM} \times R_1)$ Constellation point 4-4 [1100] ... $(I_n, Q_n)=(-a_{NU\text{-}16QAM} \times R_2, -a_{NU\text{-}16QAM} \times R_2)$ Further, for example, the following relationship is disclosed above:

Constellation point 1-1 [0000] ... $(I_n, Q_n)=(a_{NU\text{-}16QAM} \times R_2, a_{NU\text{-}16QAM} \times R_2)$ In data that is inputted to the mapper 708, this means that when four bits $[b_3b_2b_1b_0]=[0000]$, $(I_n, Q_n)=(a_{NU\text{-}16QAM} \times R_2, a_{NU\text{-}16QAM} \times R_2)$. As another example, the following relationship is disclosed above:

Constellation point 4-4 [1100] ... $(I_n, Q_n)=(-a_{NU\text{-}16QAM} \times R_2, -a_{NU\text{-}16QAM} \times R_2)$ In data that is inputted to the mapper 708, this means that when four bits $[b_3b_2b_1b_0]=[1100]$, $(I_n, Q_n)=(-a_{NU\text{-}16QAM} \times R_2, -a_{NU\text{-}16QAM} \times R_2)$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Thus, the mapper 708 outputs $I_n$ and $Q_n$ as described above as an in-phase component and a quadrature component, respectively, of a baseband signal.

According to $R_1$ and $R_2$ used in representing the constellation points in the I-Q plane of (12,4)16APSK, a ring ratio $R_{(12,4)}$ of (12,4)16APSK represents $R_{(12,4)}=R_2/R_1$.

When $R_1$ and $R_2$ are defined as in FIG. 26, an amplitude ratio of NU-16QAM is defined as $A_r=R_2/R_1$.

Thus, an effect is obtained that "when $A_r < R_{(12,4)}$, the probability of further lowering PAPR is high".

This is because a modulation scheme likely to control peak power is NU-16QAM. Peak power generated by NU-16QAM is likely to increase as $A_r$ increases. Accordingly, in order to avoid increasing peak power, setting $A_r$ low is preferable. On the other hand, there is a high degree of freedom for $R_{(12,4)}$ of (12,4)16APSK as long as a value is set for which BER properties are good. Thus, it is likely that when $A_r < R_{(12,4)}$ a lower PAPR can be obtained.

However, even when $A_r > R_{(12,4)}$, an effect of lowering PAPR of NU-16QAM can be obtained. Accordingly, when focusing on improving BER properties, $A_r > R_{(12,4)}$ may be preferable.

<Labelling and Constellations of NU-16QAM>
[Nu-16QAM Labelling]

Here, labelling of NU-16QAM is described. Labelling is the relationship between four bits $[b_3b_2b_1b_0]$, which are input, and arrangement of constellation points in an in-phase (I)-quadrature-phase (Q) plane. FIG. 26 illustrates an example of NU-16QAM labelling, but as long as labelling satisfies <Condition 5> and <Condition 6>, below, labelling need not conform to FIG. 26.

For the purposes of description, the following definitions are used.

When four bits to be transmitted are $[b_{a3}b_{a2}b_{a1}b_{a0}]$, a constellation point A is provided in the in-phase (I)-quadrature-phase (Q) plane, and when four bits to be transmitted are $[b_{b3}b_{b2}b_{b1}b_{b0}]$, a constellation point B is provided in the in-phase (I)-quadrature-phase (Q) plane.

When $b_{a3}=b_{b3}$, $b_{a2}=b_{b2}$, $b_{a1}=b_{b1}$, and $b_{a0}=b_{b0}$, the number of different bits of labelling is defined as zero.

Further, the following definitions are made.

When $b_{a3}\neq b_{b3}$, $b_{a2}=b_{b2}$, $b_{a1}=b_{b1}$, and $b_{a0}=b_{b0}$, the number of different bits of labelling is defined as one.

When $b_{a3}=b_{b3}$, $b_{a2}\neq b_{b2}$, $b_{a1}=b_{b1}$, and $b_{a0}=b_{b0}$, the number of different bits of labelling is defined as one.

When $b_{a3}=b_{b3}$, $b_{a2}=b_{b2}$, $b_{a1}\neq b_{b1}$, and $b_{a0}=b_{b0}$, the number of different bits of labelling is defined as one.

When $b_{a3}=b_{b3}$, $b_{a2}=b_{b2}$, $b_{a1}=b_{b1}$, and $b_{a0}\neq b_{b0}$, the number of different bits of labelling is defined as one.

When $b_{a3}\neq b_{b3}$, $b_{a2}\neq b_{b2}$, $b_{a1}=b_{b1}$, and $b_{a0}=b_{b0}$, the number of different bits of labelling is defined as two.

When $b_{a3}\neq b_{b3}$, $b_{a2}=b_{b2}$, $b_{a1}\neq b_{b1}$, and $b_{a0}=b_{b0}$, the number of different bits of labelling is defined as two.

When $b_{a3}\neq b_{b3}$, $b_{a2}=b_{b2}$, $b_{a1}=b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}=b_{b0}$, the number of different bits of labelling is defined as two.

When $b_{a3}=b_{b3}$, $b_{a2}=b_{b2}$, $b_{a1}=b_{b1}$, and $b_{a0}\neq b_{b0}$, the number of different bits of labelling is defined as two.

When $b_{a3}=b_{b3}$, $b_{a2}=b_{b2}$, $b_{a1}\neq b_{b1}$, and $b_{a0}\neq b_{b0}$, the number of different bits of labelling is defined as two.

When $b_{a3}=b_{b3}$, $b_{a2}=b_{b2}$, $b_{a1}\neq b_{b1}$, and $b_{a0}\neq b_{b0}$, the number of different bits of labelling is defined as three.

When $b_{a3}\neq b_{b3}$, $b_{a2}=b_{b2}$, $b_{a1}\neq b_{b1}$, and $b_{a0}\neq b_{b0}$, the number of different bits of labelling is defined as three.

When $b_{a3}\neq b_{b3}$, $b_{a2}\neq b_{b2}$, $b_{a1}=b_{b1}$, and $b_{a0}\neq b_{b0}$, the number of different bits of labelling is defined as three.

When $b_{a3}\neq b_{b3}$, $b_{a2}\neq b_{b2}$, $b_{a1}\neq b_{b1}$, and $b_{a0}=b_{b0}$, the number of different bits of labelling is defined as three.

When $b_{a3}\neq b_{b3}$, $b_{a2}\neq b_{b2}$, $b_{a1}\neq b_{b1}$, and $b_{a0}\neq b_{b0}$, the number of different bits of labelling is defined as four.

Thus, group definitions are performed.

With respect to constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4 in the above description of NU-16QAM, constellation point 1-1, constellation point 1-2, constellation point 1-3, and constellation point 1-4 are defined as group 1. In the same way, constellation point 2-1, constellation point 2-2, constellation point 2-3, and constellation point 2-4 are defined as group 2; constellation point 3-1, constellation point 3-2, constellation point 3-3, and constellation point 3-4 are defined as group 3; and constellation point 4-1, constellation point 4-2, constellation point 4-3, and constellation point 4-4 are defined as group 4.

The following two conditions are provided.
<Condition 5>
X represents 1, 2, 3, and 4. All values of X satisfy the following:
The number of different bits of labelling between constellation point X-1 and constellation point X-2 is one.
The number of different bits of labelling between constellation point X-2 and constellation point X-3 is one.
The number of different bits of labelling between constellation point X-3 and constellation point X-4 is one.
<Condition 6>
A value u represents 1, 2, and 3, and a value v represents 1, 2, 3, and 4. All values of u and all values of v satisfy the following: The number of different bits of labelling between constellation point u–v and constellation point (u+1)–v is one.

By satisfying the above conditions, the number of different bits of labelling among constellation points that are near each other in an in-phase (I)-quadrature-phase (Q) plane is low, and therefore the possibility of a receive apparatus achieving high data reception quality is increased. Thus, when a receive apparatus performs iterative detection, the possibility of the receive apparatus achieving high data reception quality is increased.

When forming a symbol by NU-16QAM, as above, and (12,4)16APSK, and when implemented similarly to embodiment 1, any of the following transmission methods may be considered.

In a symbol group of at least three consecutive symbols (or at least four consecutive symbols), among which a modulation scheme for each symbol is (12,4)16APSK or NU-16QAM, there are no consecutive (12,4) 16APSK symbols and there are no consecutive NU-16QAM symbols.

In a "symbol group of period (cycle) M", the number of NU-16QAM symbols is one greater than the number of (12,4)16APSK symbols, in other words the number of (12,4)16APSK symbols is N and the number of NU-16QAM symbols is N+1. Note that N is a natural number. Thus, in a "symbol group of period (cycle) M", there are no consecutive NU-16QAM symbols or there is only 1 position at which two consecutive NU-16QAM symbols exist. Accordingly, there are no cases of three or more consecutive NU-16QAM symbols.

When each data symbol is either a (12,4)16APSK symbol or an NU-16QAM symbol, three or more consecutive NU-16QAM symbols are not present in a consecutive data symbol group.

Thus, by replacing description related to (8,8)16APSK symbols with NU-16QAM for portions of embodiment 1 to embodiment 4 in which (12,4)16APSK symbols and (8,8) 16APSK symbols are described (for example, transmission method, pilot symbol configuration method, receive apparatus configuration, control information configuration including TMCC, etc.), a transmission method using (12,4) 16APSK symbols and NU-16QAM can be implemented in the same way as described in embodiment 1 to embodiment 4.

Embodiment 6

In the present embodiment, an example is described of application to wide band digital satellite broadcasting of the transmission method, the transmit apparatus, the reception method, and the receive apparatus described in embodiment 1 to embodiment 5.

Figure 27:
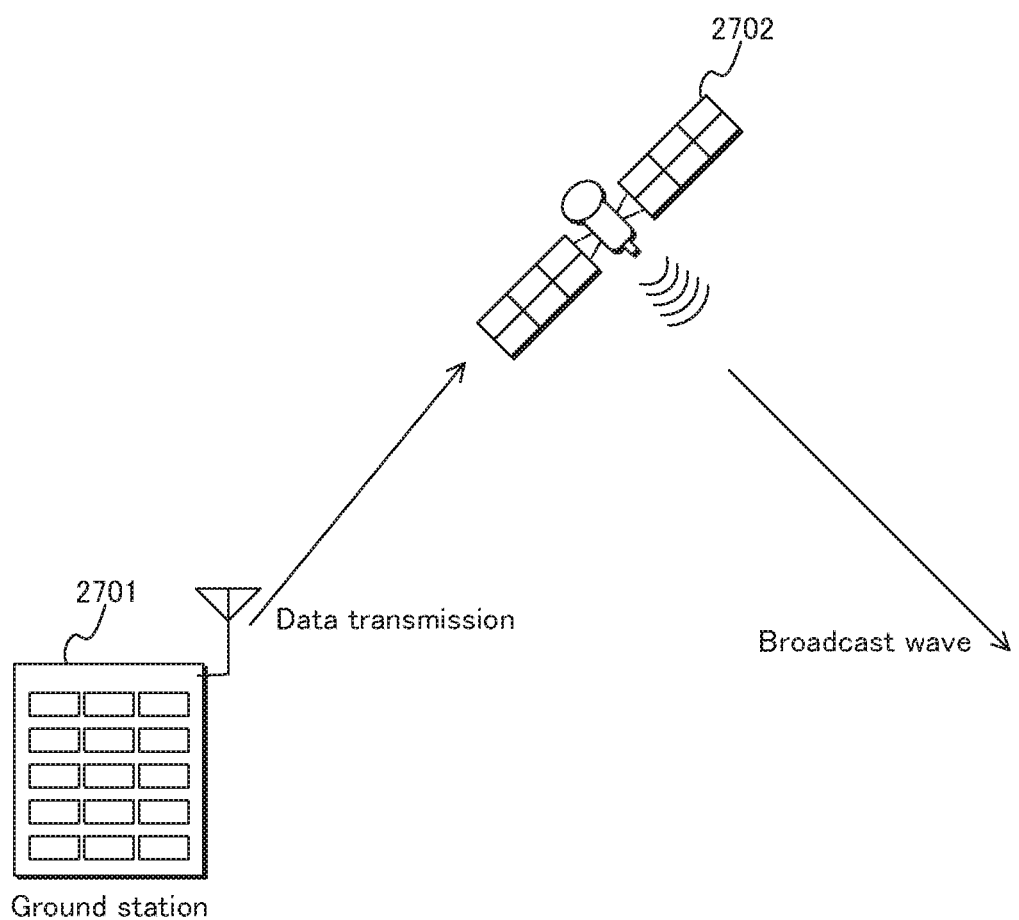
FIG. 27 illustrates a schematic of wide band digital satellite broadcasting.

FIG. 27 illustrates a schematic of wide band digital satellite broadcasting. A satellite 2702 in FIG. 27 transmits a transmit signal by using the transmission method described in embodiment 1 to embodiment 5. This transmit signal is received by a terrestrial receive apparatus.

On the other hand, data for transmission by the satellite 2702 via a modulated signal is transmitted by a ground station 2701 in FIG. 27. Accordingly, the ground station 2701 transmits a modulation signal including data for transmission by a satellite. Thus, the satellite 2702 receives a modulated signal transmitted by the ground station 2701, and transmits data included in the modulated signal by using a transmission method described in embodiment 1 to embodiment 5.

Embodiment 7

In the present embodiment, description is provided of various information configuration examples signaled as TMCC information for smooth reception at a receive apparatus side performed by a transmit apparatus using a transmission method described in embodiment 1, embodiment 2, embodiment 5, etc.

In order to reduce distortion generated by a power amplifier included in the radio section 712 of the transmit apparatus in FIG. 7, there is a method of compensating for the distortion of the power amplifier or acquiring backoff information (difference value between operating point output of a modulated signal and saturation point output of a non-modulated signal).

In wide band digital satellite broadcasting, in relation to distortion of a power amplifier, "satellite output backoff" information is transmitted in TMCC information by a transmit apparatus.

In the present embodiment, a method of transmitting accurate information related to distortion of a power amplifier and a configuration of TMCC information are described. By transmission of the information described below, a receive apparatus can receive a modulated signal having little distortion, and therefore an effect can be achieved of improving data reception quality.

Transmission of "whether power amplifier performed distortion compensation" information and "index indicating degree of effect of distortion compensation of power amplifier" information as TMCC information is disclosed herein.

TABLE 7

Information related to distortion compensation of power amplifier

| Value | Assignment |
|---|---|
| 0 | Distortion compensation of power amplifier OFF |
| 1 | Distortion compensation of power amplifier ON |

Table 7 indicates a specific example of configuration of information related to distortion compensation of a power amplifier. As illustrated in FIG. 7, a transmit apparatus transmits "0", when distortion compensation of a power amplifier is OFF, or "1", when distortion compensation of a power amplifier is ON, as, for example, a portion of TMCC information (a portion of control information).

TABLE 8

Information related to index indicating degree of effect of distortion compensation of power amplifier

| Value | Assignment |
|---|---|
| 00 | Between code (intersymbol) interference: High |
| 01 | Between code (intersymbol) interference: Medium |
| 10 | Between code (intersymbol) interference: Low |
| 11 | — |

Table indicates a specific example of configuration of information related to an index indicating degrees of effect of distortion compensation of a power amplifier. When between code (intersymbol) interference is high, the transmit apparatus transmits "00". When between code (intersymbol) interference is of a medium degree, the transmit apparatus transmits "01". When between code (intersymbol) interference is low, the transmit apparatus transmits "10".

In Table 2, Table 3, and Table 4 of embodiment 3, configurations are illustrated according to which a ring ratio is determined when a coding rate of error correction code is determined.

In the present embodiment, a different method is disclosed wherein a ring ratio is determined based on information related to distortion compensation of a power amplifier and/or information related to an index indicating a degree of effect of distortion compensation of a power amplifier and/or "satellite output backoff" information; and even when a coding rate of error correction code is set as A (even when a value is set), a transmit apparatus selects a ring ratio from among a plurality of candidates. As TMCC information, the transmit apparatus can notify a receive apparatus of modulation scheme information and ring ratio information by using the "modulation scheme information" of Table 1 and/or the "information related to ring ratio" of Table 5 and/or the "modulation scheme information" of Table 6.

Figure 28:
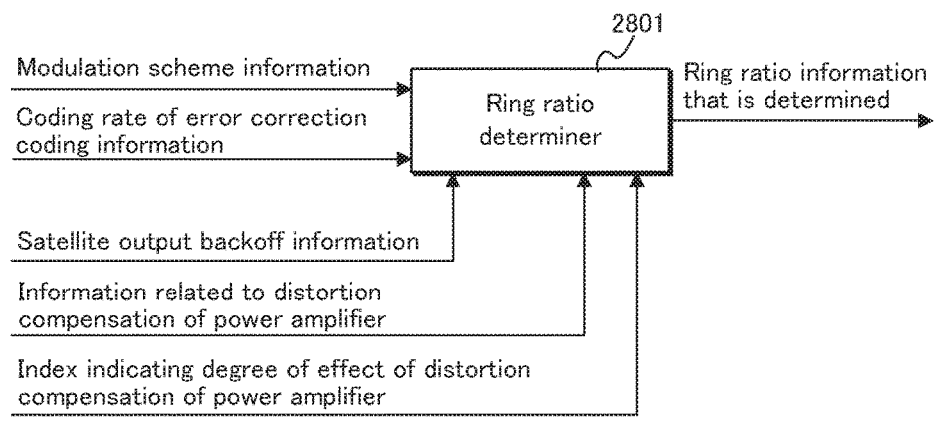
FIG. 28 illustrates a block diagram related to ring ratio determination.

FIG. 28 illustrates a block diagram related to ring ratio determination in connection with the above description. A ring ratio determiner 2801 of FIG. 28 receives "modulation scheme information", "coding rate of error correction code information", "satellite output backoff information", "information related to distortion compensation of power amplifier (ON/OFF information)", and an "index indicating degree of effect of distortion compensation of power amplifier" as input, uses all of this information or a portion of this information, determines a ring ratio when a modulation scheme (or transmission method) requires a ring ratio setting (for example, a transmission method using (8,8)16APSK, (12,4)16APSK, or a combination of (8,8)16APSK and (12,4)16APSK), and outputs ring ratio information that is determined. Subsequently, based on this ring ratio information, a mapper of the transmit apparatus performs mapping, and this ring ratio information is, for example, transmitted by the transmit apparatus to a receive apparatus as control information as in Table 5 and Table 6.

Note that a characteristic point of this embodiment is that when a modulation scheme A and coding rate B are selected, ring ratio can be set from a plurality of candidates.

For example, when a modulation scheme is (12,4) 16APSK and a coding rate of error correction code is 61/129 (approximately 1/2), three types of ring ratio, C, D, and E, are candidates as a ring ratio. Thus, which value of ring ratio to use can be determined according to backoff status and information related to distortion compensation of a power amplifier (ON/OFF information). For example, when distortion compensation of a power amplifier is ON, a ring ratio may be selected that improves data reception quality of a receive apparatus, and when distortion compensation of a power amplifier is OFF and backoff is low, a ring ratio may be selected that decreases PAPR (ring ratio may be selected in similar ways for other coding rates, etc.). Note that this selection method can be applied in the same way when a modulation scheme is (8,8)16APSK, and when a transmission method is a transmission method combining (8,8) 16APSK and (12,4)16APSK as described in embodiment 1.

According to the operations above, an effect is achieved of improving data reception quality of a receive apparatus and reducing load of a transmit power amplifier.

Embodiment 8

In embodiment 7 a case is described in which NU-16QAM symbols are used instead of (8,8)16APSK symbols in embodiment 1 to embodiment 4. In the present embodiment, (4,8,4)16APSK is disclosed as an extension of NU-16QAM (NU-16QAM is one example of (4.8.4) 16APSK).

In the present embodiment, a case is described in which (4,8,4)16APSK symbols are used instead of (8,8)16APSK symbols in embodiment 1 to embodiment 4.

According to embodiment 1 to embodiment 4, methods of switching (12,4)16APSK symbols and (8,8)16APSK symbols in a transmit frame, methods of configuring pilot symbols, methods of configuring control information including TMCC, etc., have been described.

Methods achieving a similar effect to embodiment 1 to embodiment 4 are not limited to methods using (12,4) 16APSK symbols and (8,8)16APSK symbols in a transmit frame, and a method using (12,4)16APSK symbols and (4,8,4)16APSK symbols can also achieve a similar effect to embodiment 1 to embodiment 4. In other words, (4,8,4) 16APSK symbols may be used instead of (8,8)16APSK symbols in embodiment 1 to embodiment 4 (the modulation scheme used in combination is (12,4)16APSK).

Accordingly, the present embodiment primarily describes using (4,8,4)16APSK symbols instead of (8,8)16APSK symbols.

<Constellation>

Figure 30:
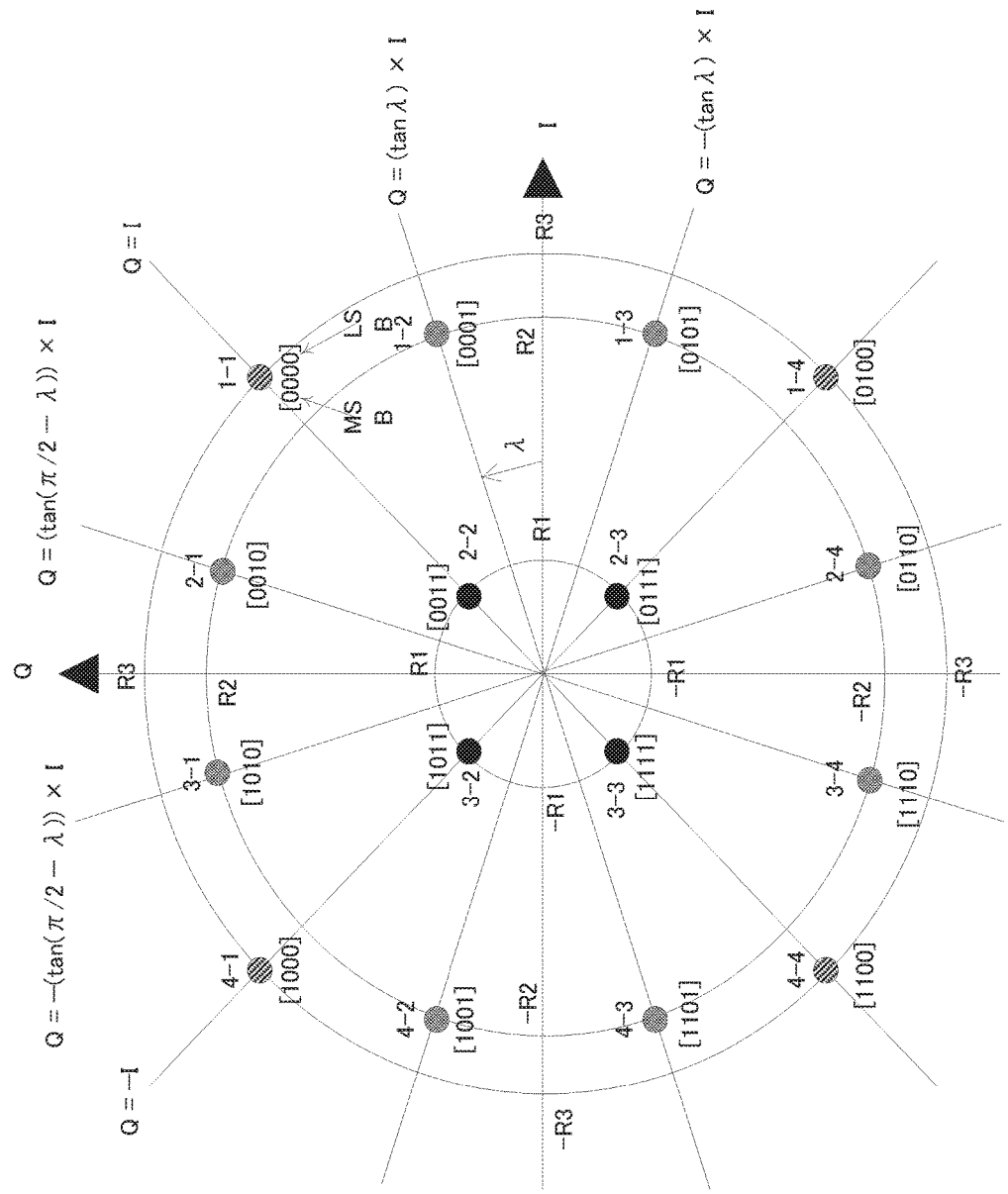
FIG. 30 illustrates an example of a constellation of (4,8,4)16APSK.

As illustrated in FIG. 30, constellation points of (4,8,4) 16APSK mapping are arranged on three concentric circles having different radii (amplitude components) in an in-phase (I)-quadrature-phase (Q) plane. In the present description, among these concentric circles, a circle having the largest radius $R_3$ is called an "outer circle", a circle having an intermediate radius $R_2$ is called a "mid circle", and a circle having the smallest radius $R_1$ is called an "inner circle". When $R_1$, $R_2$, and $R_3$ are defined as in FIG. 30 ($R_1$ being a real number greater than zero, $R_2$ being a real number greater than zero, and $R_3$ being a real number greater than zero, $R_1 < R_2 < R_3$).

Further, four constellation points are arranged on the circumference of the outer circle, eight constellation points are arranged on the circumference of the mid circle, and four constellation points are arranged on the circumference of the inner circle. The (4,8,4) in (4,8,4)16APSK refers to the four, eight, four constellation points in the order of the outer circle, the mid circle, and the inner circle.

The following describes a constellation and assignment (labelling) of bits to each constellation point of (4,8,4) 16APSK performed by the mapper 708 of FIG. 7.

FIG. 30 illustrates an example of labelling a constellation of (4,8,4)16APSK in an in-phase (I)-quadrature-phase (Q) plane. In embodiment 1 to embodiment 4, ring ratio is described, but in the case of (4,8,4)16APSK, two ring ratios are defined. A first ring ratio is $r_1=R_2/R_1$, and another ring ratio is $r_2=R_3/R_1$. Thus, two ring ratios of (4,8,4)16APSK, $r_1=R_2/R_1$ and $r_2=R_3/R_1$, are applicable instead of the ring ratio of (8,8)16APSK in embodiment 1 to embodiment 4.

Coordinates of each constellation point of (4,8,4)16APSK on the I-Q plane are as follows.

Constellation point 1-1 [0000] ... ($R_3 \cos(\pi/4), R_3 \sin(\pi/4)$)
Constellation point 1-2 [0001] ... ($R_2 \cos \lambda, R_2 \sin \lambda$)
Constellation point 1-3 [0101] ... ($R_2 \cos(-\lambda), R_2 \sin(-\lambda)$)
Constellation point 1-4 [0100] ... ($R_3 \cos(-\pi/4), R_3 \sin(-\pi/4)$)
Constellation point 2-1 [0010] ... ($R_2 \cos(-\lambda+\pi/2), R_2 \sin(-\lambda+\pi/2)$)
Constellation point 2-2 [0011] ... ($R_1 \cos(\pi/4), R_1 \sin(\pi/4)$)
Constellation point 2-3 [0111] ... ($R_1 \cos(-\pi/4), R_1 \sin(-\pi/4)$)
Constellation point 2-4 [0110] ... ($R_2 \cos(\lambda-\pi/2), R_2 \sin(\lambda-\pi/2)$)
Constellation point 3-1 [1010] ... ($R_2 \cos(\lambda+\pi/2), R_2 \sin(\lambda+\pi/2)$)
Constellation point 3-2 [1011] ... ($R_1 \cos(3\pi/4), R_1 \sin(3\pi/4)$)
Constellation point 3-3 [1111] ... ($R_1 \cos(-3\pi/4), R_1 \sin(-3\pi/4)$)
Constellation point 3-4 [1110] ... ($R_2 \cos(-\lambda-\pi/2), R_2 \sin(-\lambda-\pi/2)$)
Constellation point 4-1 [1000] ... ($R_3 \cos(3\pi/4), R_3 \sin(3\pi/4)$)
Constellation point 4-2 [1001] ... ($R_2 \cos(\pi-\lambda), R_2 \sin(\pi-\lambda)$)
Constellation point 4-3 [1101] ... ($R_2 \cos(-\pi+\lambda), R_2 \sin(-\pi+\lambda)$)
Constellation point 4-4 [1100] ... ($R_3 \cos(-3\pi/4), R_3 \sin(-3\pi/4)$)

With respect to phase, the unit used is radians. Accordingly, for example, referring to $R_3 \cos(\pi/4)$, the unit of $\pi/4$ is radians. Hereinafter, the unit of phase is radians. Further, $\lambda$ is greater than zero radians and smaller than $\pi/4$ (0 radians$<\lambda<\pi/4$ radians).

Further, for example, the following relationship is disclosed above:

Constellation point 1-1 [0000] ... ($R_3 \cos(\pi/4), R_3 \sin(\pi/4)$)

In data that is inputted to the mapper 708, this means that when four bits $[b_3 b_2 b_1 b_0]=[0000]$, an in-phase component I and quadrature component Q of a baseband signal after mapping are defined as $(I,Q)=(R_3 \cos(\pi/4), R_3 \sin(\pi/4))$.

As another example, the following relationship is disclosed above:

Constellation point 4-4 [1100] ... ($R_3 \cos(-3\pi/4), R_3 \sin(-3\pi/4)$)

In data that is inputted to the mapper 708, this means that when four bits $[b_3 b_2 b_1 b_0]=[1100]$, an in-phase component I and quadrature component Q of a baseband signal after mapping are defined as $(I,Q)=(R_3 \cos(-3\pi/4), R_3 \sin(-3\pi/4))$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

<Transmission Output>

In order to achieve the same transmission output for (12,4)16APSK symbols and (4,8,4)16APSK symbols, the following normalization coefficient may be used. The normalization coefficient for (12,4)16APSK symbols is as described in embodiment 1. The normalization coefficient for (4,8,4)16APSK symbols is defined by the following formula.

[Math 26]

$$a_{(4,8,4)} = \frac{z}{\sqrt{(4 \times R_1^2 + 8 \times R_2^2 + 4 \times R_3^2)/16}} \quad \text{(Math 26)}$$

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is (4,8,4)16APSK, $(I_n, Q_n)=(a_{(4,8,4)} \times I_b, a_{(4,8,4)} \times Q_b)$ holds true.

When a modulation scheme is (4,8,4)16APSK, the in-phase component $I_b$ and quadrature component $Q_b$ are the in-phase component I and quadrature component Q, respectively, of a baseband signal after mapping that is obtained by mapping based on FIG. 30. Accordingly, when a modulation scheme is (4,8,4)16APSK, the following relationships hold true.

Constellation point 1-1 [0000] ... $(I_n, Q_n)=(a_{(4,8,4)} \times R_3 \cos(\pi/4), a_{(4,8,4)} \times R_3 \sin(\pi/4))$
Constellation point 1-2 [0001] ... $(I_n, Q_n)=(a_{(4,8,4)} \times R_2 \cos \lambda, a_{(4,8,4)} \times R_2 \sin \lambda)$
Constellation point 1-3 [0101] ... $(I_n, Q_n)=(a_{(4,8,4)} \times R_2 \cos(-\lambda), a_{(4,8,4)} \times R_2 \sin(-\lambda))$
Constellation point 1-4 [0100] ... $(I_n, Q_n)=(a_{(4,8,4)} \times R_3 \cos(-\pi/4), a_{(4,8,4)} \times R_3 \sin(-\pi/4))$
Constellation point 2-1 [0010] ... $(I_n, Q_n)=(a_{(4,8,4)} \times R_2 \cos(-\lambda+\pi/2), a_{(4,8,4)} \times R_2 \sin(-\lambda+\pi/2))$
Constellation point 2-2 [0011] ... $(I_n, Q_n)=(a_{(4,8,4)} \times R_1 \cos(\pi/4), a_{(4,8,4)} \times R_1 \sin(\pi/4))$
Constellation point 2-3 [0111] ... $(I_n, Q_n)=(a_{(4,8,4)} \times R_1 \cos(-\pi/4), a_{(4,8,4)} \times R_1 \sin(-\pi/4))$
Constellation point 2-4 [0110] ... $(I_n, Q_n)=(a_{(4,8,4)} \times R_2 \cos(\lambda-\pi/2), a_{(4,8,4)} \times R_2 \sin(\lambda-\pi/2))$
Constellation point 3-1 [1010] ... $(I_n, Q_n)=(a_{(4,8,4)} \times R_2 \cos(\lambda+\pi/2), a_{(4,8,4)} \times R_2 \sin(\lambda+\pi/2))$
Constellation point 3-2 [1011] ... $(I_n, Q_n)=(a_{(4,8,4)} \times R_1 \cos(3\pi/4), a_{(4,8,4)} \times R_1 \sin(3\pi/4))$
Constellation point 3-3 [1111] ... $(I_n, Q_n)=(a_{(4,8,4)} \times R_1 \cos(-3\pi/4), a_{(4,8,4)} \times R_1 \sin(-3\pi/4))$
Constellation point 3-4 [1110] ... $(I_n, Q_n)=(a_{(4,8,4)} \times R_2 \cos(-\lambda-\pi/2), a_{(4,8,4)} \times R_2 \sin(-\lambda-\pi/2))$
Constellation point 4-1 [1000] ... $(I_n, Q_n)=(a_{(4,8,4)} \times R_3 \cos(3\pi/4), a_{(4,8,4)} \times R_3 \sin(3\pi/4))$
Constellation point 4-2 [1001] ... $(I_n, Q_n)=(a_{(4,8,4)} \times R_2 \cos(\pi-\lambda), a_{(4,8,4)} \times R_2 \sin(\pi-\lambda))$
Constellation point 4-3 [1101] ... $(I_n, Q_n)=(a_{(4,8,4)} \times R_2 \cos(-\pi+\lambda), a_{(4,8,4)} \times R_2 \sin(-\pi+\lambda))$
Constellation point 4-4 [1100] ... $(I_n, Q_n)=(a_{(4,8,4)} \times R_3 \cos(-3\pi/4), a_{(4,8,4)} \times R_3 \sin(-3\pi/4))$ Further, for example, the following relationship is disclosed above:

Constellation point 1-1 [0000] ... $(I, Q_n)=(a_{(4,8,4)} \times R_3 \cos(\pi/4), a_{(4,8,4)} \times R_3 \sin(\pi/4))$ In data that is inputted to the mapper 708, this means that when four bits $[b_3 b_2 b_1 b_0]=[0000]$, $(I_n, Q_n)=(a_{(4,8,4)} \times R_3 \cos$ ($\pi/4$), $a_{(4,8,4)} \times R_3 \sin(\pi/4)$). As another example, the following relationship is disclosed above:

Constellation point 4-4 [1100] ... $(I_n, Q_n) = (a_{(4,8,4)} \times R_3 \cos(-3\pi/4), a_{(4,8,4)} \times R_3 \sin(-3\pi/4))$ In data that is inputted to the mapper 708, this means that when four bits $[b_3 b_2 b_1 b_0] = [1100]$, $(I_n, Q_n) = (a_{(4,8,4)} \times R_3 \cos(-3\pi/4), a_{(4,8,4)} \times R_3 \sin(-3\pi/4))$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Thus, the mapper 708 outputs $I_n$ and $Q_n$ as described above as an in-phase component and a quadrature component, respectively, of a baseband signal.

<Labelling and Constellations of (4,8,4)16APSK>
[Labelling of (4,8,4)16APSK]

The following describes labelling of (4,8,4)16APSK. Labelling is the relationship between four bits $[b_3 b_2 b_1 b_0]$, which are input, and arrangement of constellation points in an in-phase (I)-quadrature-phase (Q) plane. An example of labelling of (4,8,4)16APSK is illustrated in FIG. 30, but labelling need not conform to FIG. 30 as long as labelling satisfies the following <Condition 7> and <Condition 8>.

For the purposes of description, the following definitions are used.

When four bits to be transmitted are $[b_{a3} b_{a2} b_{a1} b_{a0}]$, a constellation point A is provided in the in-phase (I)-quadrature-phase (Q) plane, and when four bits to be transmitted are $[b_{b3} b_{b2} b_{b1} b_{b0}]$, a constellation point B is provided in the in-phase (I)-quadrature-phase (Q) plane.

When $b_{a3} = b_{b3}$, $b_{a2} = b_{b2}$, $b_{a1} = b_{b1}$, and $b_{a0} = b_{b0}$, the number of different bits of labelling is defined as zero.

Further, the following definitions are made.

When $b_{a3} \neq b_{b3}$, $b_{a2} = b_{b2}$, $b_{a1} = b_{b1}$, and $b_{a0} = b_{b0}$, the number of different bits of labelling is defined as one.

When $b_{a3} = b_{b3}$, $b_{a2} \neq b_{b2}$, $b_{a1} = b_{b1}$, and $b_{a0} = b_{b0}$, the number of different bits of labelling is defined as one.

When $b_{a3} = b_{b3}$, $b_{a2} = b_{b2}$, $b_{a1} \neq b_{b1}$, and $b_{a0} = b_{b0}$, the number of different bits of labelling is defined as one.

When $b_{a3} = b_{b3}$, $b_{a2} = b_{b2}$, $b_{a1} = b_{b1}$, and $b_{a0} \neq b_{b0}$, the number of different bits of labelling is defined as one.

When $b_{a3} \neq b_{b3}$, $b_{a2} \neq b_{b2}$, $b_{a1} = b_{b1}$, and $b_{a0} = b_{b0}$, the number of different bits of labelling is defined as two.

When $b_{a3} \neq b_{b3}$, $b_{a2} = b_{b2}$, $b_{a1} \neq b_{b1}$, and $b_{a0} = b_{b0}$, the number of different bits of labelling is defined as two.

When $b_{a3} \neq b_{b3}$, $b_{a2} = b_{b2}$, $b_{a1} = b_{b1}$, and $b_{a0} \neq b_{b0}$, the number of different bits of labelling is defined as two.

When $b_{a3} = b_{b3}$, $b_{a2} \neq b_{b2}$, $b_{a1} \neq b_{b1}$, and $b_{a0} = b_{b0}$, the number of different bits of labelling is defined as two.

When $b_{a3} = b_{b3}$, $b_{a2} \neq b_{b2}$, $b_{a1} = b_{b1}$, and $b_{a0} \neq b_{b0}$, the number of different bits of labelling is defined as two.

When $b_{a3} = b_{b3}$, $b_{a2} = b_{b2}$, $b_{a1} \neq b_{b1}$, and $b_{a0} \neq b_{b0}$, the number of different bits of labelling is defined as two.

When $b_{a3} = b_{b3}$, $b_{a2} \neq b_{b2}$, $b_{a1} \neq b_{b1}$, and $b_{a0} \neq b_{b0}$, the number of different bits of labelling is defined as three.

When $b_{a3} \neq b_{b3}$, $b_{a2} = b_{b2}$, $b_{a1} \neq b_{b1}$, and $b_{a0} \neq b_{b0}$, the number of different bits of labelling is defined as three.

When $b_{a3} \neq b_{b3}$, $b_{a2} \neq b_{b2}$, $b_{a1} = b_{b1}$, and $b_0 \neq b_{b0}$, the number of different bits of labelling is defined as three.

When $b_{a3} \neq b_{b3}$, $b_{a2} \neq b_{b2}$, $b_{a1} \neq b_{b1}$, and $b_{a0} = b_{b0}$, the number of different bits of labelling is defined as three.

When $b_{a3} \neq b_{b3}$, $b_{a2} \neq b_{b2}$, $b_{a1} \neq b_{b1}$, and $b_{a0} \neq b_{b0}$, the number of different bits of labelling is defined as four.

Thus, group definitions are performed. With respect to constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4 in the above description of (4,8,4)16APSK, constellation point 1-1, constellation point 1-2, constellation point 1-3, and constellation point 1-4 are defined as group 1.

In the same way, constellation point 2-1, constellation point 2-2, constellation point 2-3, and constellation point 2-4 are defined as group 2; constellation point 3-1, constellation point 3-2, constellation point 3-3, and constellation point 3-4 are defined as group 3; and constellation point 4-1, constellation point 4-2, constellation point 4-3, and constellation point 4-4 are defined as group 4.

The following two conditions are provided.
<Condition 7>

X represents 1, 2, 3, and 4. All values of X satisfy the following:

The number of different bits of labelling between constellation point X-1 and constellation point X-2 is one.

The number of different bits of labelling between constellation point X-2 and constellation point X-3 is one.

The number of different bits of labelling between constellation point X-3 and constellation point X-4 is one.
<Condition 8>

A value u represents 1, 2, and 3, and a value v represents 1, 2, 3, and 4. All values of u and all values of v satisfy the following:

The number of different bits of labelling between constellation point u-v and constellation point (u+1)-v is one.

By satisfying the above conditions, the number of different bits of labelling among constellation points that are near each other in an in-phase (I)-quadrature-phase (Q) plane is low, and therefore the possibility of a receive apparatus achieving high data reception quality is increased. Thus, when a receive apparatus performs iterative detection, the possibility of the receive apparatus achieving high data reception quality is increased.

[Constellation of (4,8,4)16APSK]

The above describes constellation and labelling in an in-phase (I)-quadrature-phase (Q) plane of FIG. 30, but constellation and labelling in an in-phase (I)-quadrature-phase (Q) plane is not limited to this example. For example, labelling of coordinates on an I-Q plane of each constellation point of (4,8,4)16APSK may be performed as follows.

Coordinates on an I-Q plane of the constellation point 1-1 [0000]: $(\cos\theta \times R_3 \times \cos(\pi/4) - \sin\theta \times R_3 \times \sin(\pi/4), \sin\theta \times R_3 \times \cos(\pi/4) + \cos\theta \times R_3 \times \sin(\pi/4))$ Coordinates on an I-Q plane of the constellation point 1-2 [0001]: $(\cos\theta \times R_2 \times \cos\lambda - \sin\theta \times R_2 \times \sin\lambda, \sin\theta \times R_2 \times \cos\lambda + \cos\theta \times R_2 \times \sin\lambda)$ Coordinates on an I-Q plane of the constellation point 1-3 [0101]: $(\cos\theta \times R_2 \times \cos(-\lambda) - \sin\theta \times R_2 \times \sin(-\lambda), \sin\theta \times R_2 \times \cos(-\lambda) + \cos\theta \times R_2 \times \sin(-\lambda))$ Coordinates on an I-Q plane of the constellation point 1-4 [0100]: $(\cos\theta \times R_3 \times \cos(-\pi/4) - \sin\theta \times R_3 \times \sin(-\pi/4), \sin\theta \times R_3 \times \cos(-\pi/4) + \cos\theta \times R_3 \times \sin(-\pi/4))$ Coordinates on an I-Q plane of the constellation point 2-1 [0010]: $(\cos\theta \times R_2 \times \cos(-\lambda + \pi/2) - \sin\theta \times R_2 \times \sin(-\lambda + \pi/2), \sin\theta \times R_2 \times \cos(-\lambda + \pi/2) + \cos\theta \times R_2 \times \sin(-\lambda + \pi/2))$ Coordinates on an I-Q plane of the constellation point 2-2 [0011]: $(\cos\theta \times R_1 \times \cos(\pi/4) - \sin\theta \times R_1 \times \sin(\pi/4), \sin\theta \times R_1 \times \cos(\pi/4) + \cos\theta \times R_1 \times \sin(\pi/4))$ Coordinates on an I-Q plane of the constellation point 2-3
[0111]: (cos θ×$R_1$×cos(−π/4)−sin θ×$R_1$×sin(−π/4), sin θ×$R_1$×cos(−π/4)+cos θ×$R_1$×sin(−π/4))

Coordinates on an I-Q plane of the constellation point 2-4
[0110]: (cos θ×$R_2$×cos(λ−π/2)−sin θ×$R_2$×sin(λ−π/2), sin θ×$R_2$×cos(λ−π/2)+cos θ×$R_2$×sin(λ−π/2))

Coordinates on an I-Q plane of the constellation point 3-1
[1010]: (cos θ×$R_2$×cos(λ+π/2)−sin θ×$R_2$×sin(λ+π/2), sin θ×$R_2$×cos(λ+π/4)+cos θ×$R_2$×sin(λ+π/4))

Coordinates on an I-Q plane of the constellation point 3-2
[1011]: (cos θ×$R_1$×cos(3π/4)−sin θ×$R_1$×sin(3π/4), sin θ×$R_1$×cos(3π/4)+cos θ×$R_1$×sin(3π/4))

Coordinates on an I-Q plane of the constellation point 3-3
[1111]: (cos θ×$R_1$×cos(−3π/4)−sin θ×$R_1$×sin(−3π/4), sin θ×$R_1$×cos(−3π/4)+cos θ×$R_1$×sin(−3π/4))

Coordinates on an I-Q plane of the constellation point 3-4
[1110]: (cos θ×$R_2$×cos(−λ−π/2)−sin θ×$R_2$×sin(−λ−π/2), sin θ×$R_2$×cos(−λ−π/2)+cos θ×$R_2$×sin(−λ−π/2))

Coordinates on an I-Q plane of the constellation point 4-1
[1000]: (cos θ×$R_3$×cos(3π/4)−sin θ×$R_3$×sin(3π/4), sin θ×$R_3$×cos(3π/4)+cos θ×$R_3$×sin(3π/4))

Coordinates on an I-Q plane of the constellation point 4-2
[1001]: (cos θ×$R_2$×cos(π−λ)−sin θ×$R_2$×sin(π−λ), sin θ×$R_2$×cos(π−λ)+cos θ×$R_2$×sin(π−λ))

Coordinates on an I-Q plane of the constellation point 4-3
[1101]: (cos θ×$R_2$×cos(−π+λ)−sin θ×$R_2$×sin(−π+λ), sin θ×$R_2$×cos(−π+λ)+cos θ×$R_2$×sin(−π+λ))

Coordinates on an I-Q plane of the constellation point 4-4
[1100]: (cos θ×$R_3$×cos(−3π/4)−sin θ×$R_3$×sin(−3π/4), sin θ×$R_3$×cos(−3π/4)+cos θ×$R_3$×sin(−3π/4))

With respect to phase, the unit used is radians. Accordingly, an in-phase component $I_n$ and a quadrature component $Q_n$ of a baseband signal after normalization is represented as below.

Coordinates on an I-Q plane of the constellation point 1-1
[0000]: ($I_n$, $Q_n$)=($a_{(4,8,4)}$×cos θ×$R_3$×cos(π/4)−$a_{(4,8,4)}$×sin θ×$R_3$×sin(π/4), $a_{(4,8,4)}$×sin θ×$R_3$×cos(π/4)+$a_{(4,8,4)}$×cos θ×$R_3$×sin(π/4))

Coordinates on an I-Q plane of the constellation point 1-2
[0001]: ($I_n$, $Q_n$)=($a_{(4,8,4)}$×cos θ×$R_2$×cos λ−$a_{(4,8,4)}$×sin θ×$R_2$×sin λ, $a_{(4,8,4)}$×sin θ×$R_2$×cos λ+$a_{(4,8,4)}$×cos θ×$R_2$×sin λ)

Coordinates on an I-Q plane of the constellation point 1-3
[0101]: ($I_n$, $Q_n$)=($a_{(4,8,4)}$×cos θ×$R_2$×cos(−λ)−$a_{(4,8,4)}$×sin θ×$R_2$×sin(−λ), $a_{(4,8,4)}$×sin θ×$R_2$×cos(−λ)+$a_{(4,8,4)}$×cos θ×$R_2$×sin(−λ))

Coordinates on an I-Q plane of the constellation point 1-4
[0100]: ($I_n$, $Q_n$)=($a_{(4,8,4)}$×cos θ×$R_3$×cos(−π/4)−$a_{(4,8,4)}$×sin θ×$R_3$×sin(−π/4), $a_{(4,8,4)}$×sin θ×$R_3$×cos(−π/4)+$a_{(4,8,4)}$×cos θ×$R_3$×sin(−π/4))

Coordinates on an I-Q plane of the constellation point 2-1
[0010]: ($I_n$, $Q_n$)=($a_{(4,8,4)}$×cos θ×$R_2$×cos(−λ+π/2)−$a_{(4,8,4)}$×sin θ×$R_2$×sin(−λ+π/2), $a_{(4,8,4)}$×sin θ×$R_2$×cos(−λ+π/2)+$a_{(4,8,4)}$×cos θ×$R_2$×sin(−λ+π/2))

Coordinates on an I-Q plane of the constellation point 2-2
[0011]: ($I_n$, $Q_n$)=($a_{(4,8,4)}$×cos θ×$R_1$×cos(π/4)−$a_{(4,8,4)}$×sin θ×$R_1$×sin(π/4), $a_{(4,8,4)}$×sin θ×$R_1$×cos(π/4)+$a_{(4,8,4)}$×cos θ×$R_1$×sin(π/4))

Coordinates on an I-Q plane of the constellation point 2-3
[0111]: ($I_n$, $Q_n$)=($a_{(4,8,4)}$×cos θ×$R_1$×cos(−π/4)−$a_{(4,8,4)}$×sin θ×$R_1$×sin(−π/4), $a_{(4,8,4)}$×sin θ×$R_1$×cos(−π/4)+$a_{(4,8,4)}$×cos θ×$R_1$×sin(−π/4))

Coordinates on an I-Q plane of the constellation point 2-4
[0110]: ($I_n$, $Q_n$)=($a_{(4,8,4)}$×cos θ×$R_2$×cos(λ−π/2)−$a_{(4,8,4)}$×sin θ×$R_2$×sin(λ−π/2), $a_{(4,8,4)}$×sin θ×$R_2$×cos(λ−π/2)+$a_{(4,8,4)}$×cos θ×$R_2$×sin(λ−π/2))

Coordinates on an I-Q plane of the constellation point 3-1
[1010]: ($I_n$, $Q_n$)=($a_{(4,8,4)}$×cos θ×$R_2$×cos(λ+π/2)−$a_{(4,8,4)}$×sin θ×$R_2$×sin(λ+π/2), $a_{(4,8,4)}$×sin θ×$R_2$×cos(λ+π/2)+$a_{(4,8,4)}$×cos θ×$R_2$×sin(λ+π/2))

Coordinates on an I-Q plane of the constellation point 3-2
[1011]: ($I_n$, $Q_n$)=($a_{(4,8,4)}$×cos θ×$R_1$×cos(3π/4)−$a_{(4,8,4)}$×sin θ×$R_1$×sin(3π/4), $a_{(4,8,4)}$×sin θ×$R_1$×cos(3π/4)+$a_{(4,8,4)}$×cos θ×$R_1$×sin(3π/4))

Coordinates on an I-Q plane of the constellation point 3-3
[1111]: ($I_n$, $Q_n$)=($a_{(4,8,4)}$×cos θ×$R_1$×cos(−3π/4)−$a_{(4,8,4)}$×sin θ×$R_1$×sin(−3π/4), $a_{(4,8,4)}$×sin θ×$R_1$×cos(−3π/4)+$a_{(4,8,4)}$×cos θ×$R_1$×sin(−3π/4))

Coordinates on an I-Q plane of the constellation point 3-4
[1110]: ($I_n$, $Q_n$)=($a_{(4,8,4)}$×cos θ×$R_2$×cos(−λ−π/2)−$a_{(4,8,4)}$×sin θ×$R_2$×sin(−λ−π/2), $a_{(4,8,4)}$×sin θ×$R_2$×cos(−λ−π/2)+$a_{(4,8,4)}$×cos θ×$R_2$×sin(−λ−π/2))

Coordinates on an I-Q plane of the constellation point 4-1
[1000]: ($I_n$, $Q_n$)=($a_{(4,8,4)}$×cos θ×$R_3$×cos(3π/4)−$a_{(4,8,4)}$×sin θ×$R_3$×sin(3π/4), $a_{(4,8,4)}$×sin θ×$R_3$×cos(3π/4)+$a_{(4,8,4)}$×cos θ×$R_3$×sin(3π/4))

Coordinates on an I-Q plane of the constellation point 4-2
[1001]: ($I_n$, $Q_n$)=($a_{(4,8,4)}$×cos θ×$R_2$×cos(π−λ)−$a_{(4,8,4)}$×sin θ×$R_2$×sin(π−λ), $a_{(4,8,4)}$×sin θ×$R_2$×cos(π−λ)+$a_{(4,8,4)}$×cos θ×$R_2$×sin(π−λ))

Coordinates on an I-Q plane of the constellation point 4-3
[1101]: ($I_n$, $Q_n$)=($a_{(4,8,4)}$×cos θ×$R_2$×cos(−π+λ)−$a_{(4,8,4)}$×sin θ×$R_2$×sin(−π+λ), $a_{(4,8,4)}$×sin θ×$R_2$×cos(−π+λ)+$a_{(4,8,4)}$×cos θ×$R_2$×sin(−π+λ))

Coordinates on an I-Q plane of the constellation point 4-4
[1100]: ($I_n$, $Q_n$)=($a_{(4,8,4)}$×cos θ×$R_3$×cos(−3π/4)−$a_{(4,8,4)}$×sin θ×$R_3$×sin(−3π/4), $a_{(4,8,4)}$×sin θ×$R_3$×cos(−3π/4)+$a_{(4,8,4)}$×cos θ×$R_3$×sin(−2π/4))

Note that θ is a phase provided on an in-phase (I)-quadrature-phase (Q) plane, and $a_{(4,8,4)}$ is as shown in Math (26).

When forming a symbol by (4,8,4)16APSK, as above, and (12,4)16APSK, and when implemented similarly to embodiment 1, any of the following transmission methods may be considered.

In a symbol group of at least three consecutive symbols (or at least four consecutive symbols), among which a modulation scheme for each symbol is (12,4)16APSK or (4,8,4)16APSK, there are no consecutive (12,4)16APSK symbols and there are no consecutive (4,8,4)16APSK symbols".

In a "symbol group of period (cycle) M", the number of (4,8,4)16APSK symbols is one greater than the number of (12,4)16APSK symbols, in other words the number of (12,4)16APSK symbols is N and the number of (4,8,4)16APSK symbols is N+1. Note that N is a natural number. Thus, in a "symbol group of period (cycle) M", there are no consecutive (4,8,4)16APSK symbols or there is only 1 position at which two consecutive (4,8,4)16APSK symbols exist. Accordingly, three or more consecutive (4,8,4)16APSK symbols do not exist.

When each data symbol is either a (12,4)16APSK symbol or a (4,8,4)16APSK symbol, three or more consecutive (4,8,4)16APSK symbols are not present in a consecutive data symbol group.

Thus, by replacing description related to (8,8)16APSK symbols with (4,8,4)16APSK for portions of embodiment 1 to embodiment 4 in which (12,4)16APSK symbols and (8,8)16APSK symbols are described (for example, transmission method, pilot symbol configuration method (embodiment 2), receive apparatus configuration, control information configuration including TMCC, etc.), a transmission method using (12,4)16APSK symbols and (4,8,4)16APSK can be implemented in the same way as described in embodiment 1 to embodiment 4.

Embodiment 9

In embodiment 8, a case is described in which (4,8,4)16APSK symbols are used instead of the (8,8)16APSK symbols in embodiment 1 to embodiment 4. In the present embodiment, conditions are described related to constellations for improving data reception quality with respect to the (4,8,4)16APSK described in embodiment 8.

As stated in embodiment 8, FIG. 30 illustrates an example arrangement of 16 constellation points of (4,8,4)16APSK in an in-phase (I)-quadrature-phase (Q) plane. Here, phases forming a half-line of Q=0 and I≥0 and a half-line of Q=(tan $\lambda$)×I and Q≥0 are considered to be $\lambda$ (radians) (0 radians<$\lambda$<$\pi$/4 radians).

In FIG. 30, 16 constellation points of (4,8,4)16APSK are drawn so that $\lambda$<$\pi$/8 radians.

Figure 31:
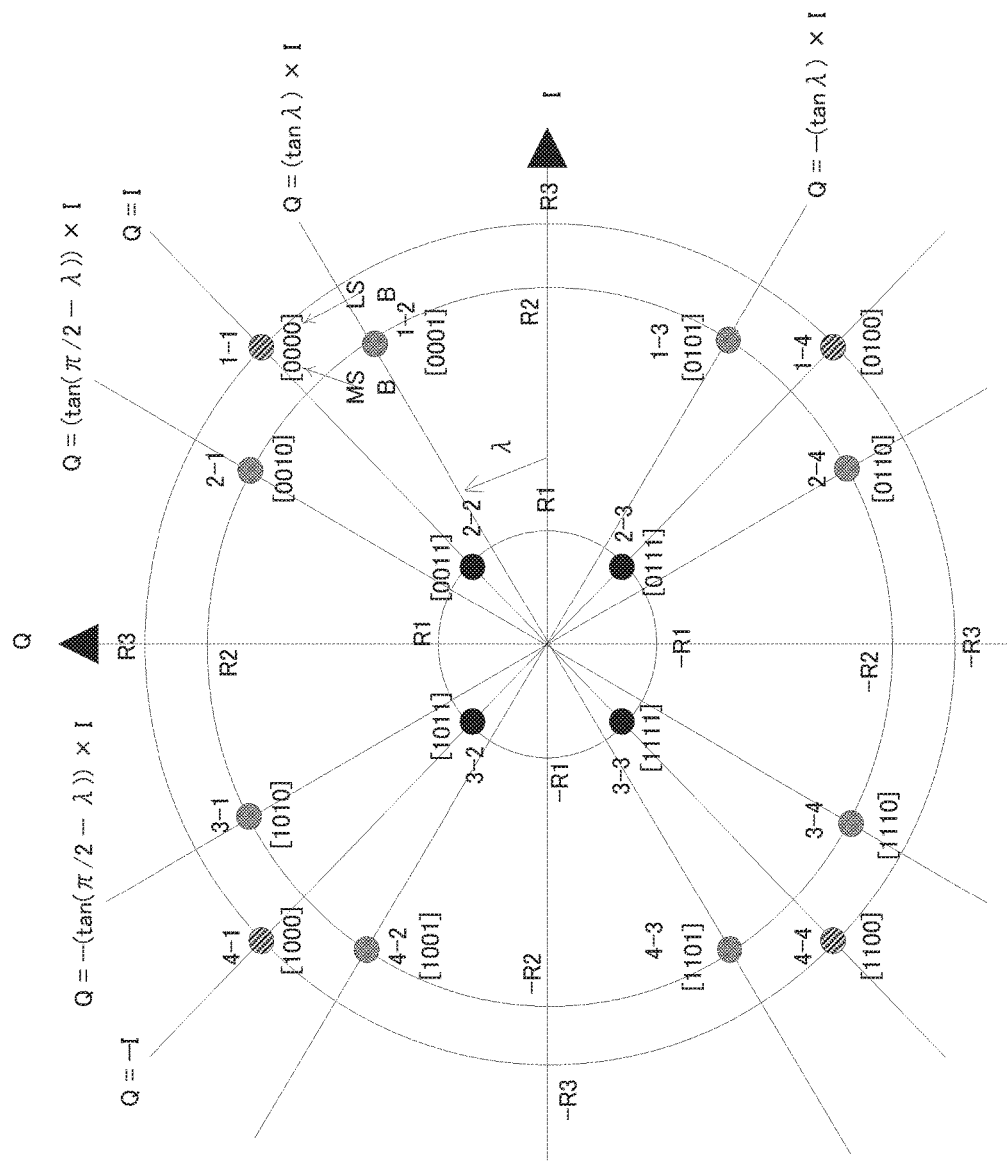
FIG. 31 illustrates an example of a constellation of (4,8,4)16APSK.

In FIG. 31, 16 constellation points of (4,8,4)16APSK are drawn so that $\lambda$>$\pi$/8 radians.

First, eight constellation points, i.e. constellation point 1-2, constellation point 1-3, constellation point 2-1, constellation point 2-4, constellation point 3-1, constellation point 3-4, constellation point 4-2, and constellation point 4-3 exist on an intermediate size "mid circle" of radius $R_2$. Focusing on these eight constellation points, a method of setting $\lambda$ to $\pi$/8 radians, as in a constellation of 8PSK, may be considered in order to achieve high reception quality.

However, four constellation points, i.e., constellation point 1-1, constellation point 1-4, constellation point 4-1, and constellation point 4-4 exist on a largest "outer circle" of radius $R_3$. Further, four constellation points, i.e., constellation point 2-2, constellation point 2-3, constellation point 3-2, and constellation point 3-3, exist on a smallest "inner circle" of radius $R_1$. When focusing on the relationship between these constellation points and the eight constellation points on the "mid circle", <Condition 9> is preferably satisfied (Condition 9 becomes a condition for achieving high data reception quality).

<Condition 9>

$\lambda$<$\pi$/8 radians

This point is described with reference to FIG. 30 and FIG. 31. In FIG. 30 and FIG. 31, constellation point 1-2 and constellation point 2-1 on the "mid circle", constellation point 1-1 on the "outer circle", and constellation point 2-2 on the "inner circle", all in a first quadrant, are focused on. Although constellation point 1-2, constellation point 2-1, constellation point 1-1, and constellation point 2-2 in the first quadrant are focused on, discussion focusing on these four constellation points also applies to four constellation points in a second quadrant, four constellation points in a third quadrant, and four constellation points in a fourth quadrant.

As can be seen from FIG. 31, when $\lambda$≥$\pi$/8, a distance between constellation point 1-2 and constellation point 2-1 on the "mid circle" and constellation point 1-1 on the "outer circle" becomes short. Thus, because resistance to noise is reduced, data reception quality by a receive apparatus decreases.

In the case of FIG. 31, constellation point 1-1 on the "outer circle" is focused on, but according to values of $R_1$, $R_2$, and $R_3$, focus on constellation point 2-2 on the "inner circle" may be required, so that when $\lambda$≥$\pi$/8 radians, a distance between constellation point 1-2 and constellation point 2-1 on the "mid circle" and constellation point 2-2 on the "inner circle" becomes short. Thus, because resistance to noise is reduced, data reception quality by a receive apparatus decreases.

On the other hand, when $\lambda$<$\pi$/8 radians is set as in FIG. 30, a distance between constellation point 1-1 and constellation point 1-2, a distance between constellation point 1-1 and constellation point 2-1, a distance between constellation point 2-2 and constellation point 1-2, and a distance between constellation point 2-2 and constellation point 2-1 can all be set larger, which is one condition for achieving high data reception quality.

From the above points, <Condition 9> becomes an important condition for a receive apparatus to achieve high data reception quality.

The following describes further conditions for a receive apparatus to achieve high data reception quality.

Figure 32:
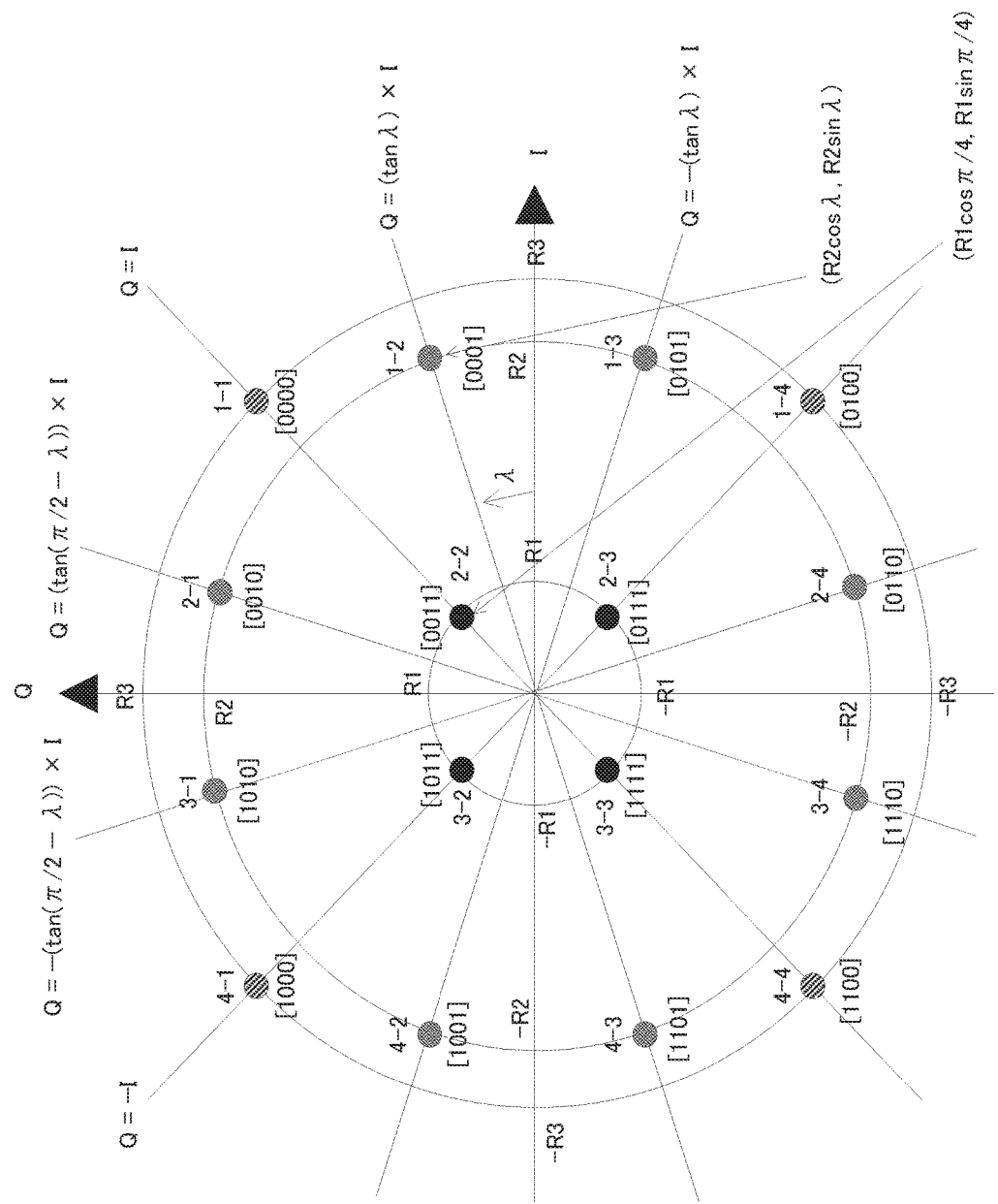
FIG. 32 illustrates an example of a constellation of (4,8,4)16APSK.

In FIG. 32, constellation point 1-2 and constellation point 2-2 of the first quadrant are focused on. Although constellation point 1-2 and constellation point 2-2 of the first quadrant are focused on here, this focus is also applicable to constellation point 3-2 and constellation point 4-2 of the second quadrant, constellation point 3-3 and constellation point 4-3 of the third quadrant, and constellation point 1-3 and constellation point 2-3 of the fourth quadrant.

Coordinates of constellation point 1-2 are ($R_2$ cos $\lambda$, $R_2$ sin $\lambda$), and coordinates of constellation point 2-2 are ($R_1$ cos($\pi$/4), $R_1$ sin($\pi$/4)). In order to increase the probability of a receive apparatus achieving a high data reception quality, the following condition is provided.

<Condition 10>

$R_1$ sin($\pi$/4)<$R_2$ sin $\lambda$

Among the four constellation points on the "inner circle", the smallest Euclidean distance is $\alpha$. (Euclidean distance between constellation point 2-2 and constellation point 2-3, Euclidean distance between constellation point 2-3 and constellation point 3-3, and Euclidean distance between constellation point 3-2 and constellation point 2-2 is $\alpha$.)

Among the eight constellation points on the "mid circle", a Euclidean distance between constellation point 1-2 and constellation point 1-3 is $\beta$. Distance between constellation point 2-1 and constellation point 3-1, distance between constellation point 4-2 and constellation point 4-3, and distance between constellation point 3-4 and constellation point 2-4 is also $\beta$.

When <Condition 10> is satisfied, $\alpha$<$\beta$ holds true.

Considering the points above, when both <Condition 9> and <Condition 10> are satisfied, and when Euclidean distance derived by extracting two different constellation points among 16 constellation points is considered, regardless of which two constellation points are extracted, the Euclidean distance is large, and therefore the possibility of a receive apparatus achieving high data reception quality is increased.

However, there is the possibility of a receive apparatus achieving high data reception quality without satisfying <Condition 9> and/or <Condition 10>. This is because there is the possibility of different suitable conditions existing according to distortion characteristics (for example, see FIG. 1) of a power amplifier for transmission included in the radio section 712 of the transmit apparatus illustrated in FIG. 7.

In this case, when considering arrangement of constellation points (coordinates of constellation points) of (4,8,4)16APSK on an in-phase (I)-quadrature-phase (Q) plane as disclosed in embodiment 8, the following condition is added in addition to <Condition 10>

Coordinates of constellation point 1-2 are ($R_2 \cos \lambda, R_2 \sin \lambda$), and coordinates of constellation point 2-2 are ($R_1 \cos(\pi/4), R_1 \sin(\pi/4)$). Thus, the following condition is provided.
<Condition 11>
$R_1 \sin(\pi/4) \neq R_2 \sin \lambda$.

Coordinates of constellation point 1-1 are ($R_3 \cos(\pi/4), R_3 \sin(\pi/4)$), and coordinates of constellation point 1-2 are ($R_2 \cos \lambda, R_2 \sin \lambda$). Thus, the following condition is provided.
<Condition 12>
$R_2 \cos \lambda \neq R_3 \cos(\pi/4)$ Thus, the following nine (4,8,4)16APSK are considered.

[1] Satisfying <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[2] Satisfying <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[3] Satisfying <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[4] Satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[5] Satisfying <Condition 9> and <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[6] Satisfying <Condition 9> and <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[7] Satisfying <Condition 10> and $\lambda=\pi/12$ for arrangement of constellation points (coordinates of constellation points) of (4,8,4)16APSK on an in-phase (I)-quadrature-phase (Q) plane as described in embodiment 8. ($R_1<R_2<R_3$)

[8] Satisfying <Condition 11> and $\lambda=\pi/12$ for arrangement of constellation points (coordinates of constellation points) of (4,8,4)16APSK on an in-phase (I)-quadrature-phase (Q) plane as described in embodiment 8. ($R_1<R_2<R_3$)

[9] Satisfying <Condition 12> and $\lambda=\pi/12$ for arrangement of constellation points (coordinates of constellation points) of (4,8,4)16APSK on an in-phase (I)-quadrature-phase (Q) plane as described in embodiment 8. ($R_1<R_2<R_3$)

Constellations (coordinates of constellation points) on an in-phase (I)-quadrature-phase (Q) plane of these nine (4,8,4)16APSK schemes are different from constellations (coordinates of constellation points) on an in-phase (I)-quadrature-phase (Q) plane of the NU-16QAM scheme described in embodiment 7, and are constellations characteristic of the present embodiment.

Further, the following nine (4,8,4)16APSK are considered.

[10] Satisfying <Condition 7> and <Condition 8>, and satisfying <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[11] Satisfying <Condition 7> and <Condition 8>, and satisfying <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[12] Satisfying <Condition 7> and <Condition 8>, and satisfying <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[13] Satisfying <Condition 7> and <Condition 8>, and satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[14] Satisfying <Condition 7> and <Condition 8>, and satisfying <Condition 9> and <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[15] Satisfying <Condition 7> and <Condition 8>, and satisfying <Condition 9> and <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[16] Satisfying <Condition 7> and <Condition 8>, $\lambda=\pi/12$ radians, and satisfying <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[17] Satisfying <Condition 7> and <Condition 8>, $\lambda=\pi/12$ radians, and satisfying <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[18] Satisfying <Condition 7>, and <Condition 8>, $\lambda=\pi/12$ radians, and satisfying <Condition 12> for arrangement of constellation points (coordinates of constellation points) of (4,8,4)16APSK on an in-phase (I)-quadrature-phase (Q) plane as described in embodiment 8. ($R_1<R_2<R_3$)

According to the above, the number of different bits of labelling among constellation points that are near each other in an in-phase (I)-quadrature-phase (Q) plane is low, and therefore the possibility of a receive apparatus achieving high data reception quality is increased. Thus, when a receive apparatus performs iterative detection, the possibility of the receive apparatus achieving high data reception quality is increased.

Embodiment 10

According to embodiment 1 to embodiment 4, methods of switching (12,4)16APSK symbols and (8,8)16APSK symbols in a transmit frame, methods of configuring pilot symbols, methods of configuring control information including TMCC, etc., have been described. Embodiment 7 describes a method using NU-16QAM instead of (8,8)16APSK as described in embodiment 1 to embodiment 4, and embodiment 8 describes a method using (4,8,4)16APSK instead of (8,8)16APSK as described in embodiment 1 to embodiment 4.

In embodiment 9, a constellation of (4,8,4)16APSK is described for a receive apparatus to achieve improved data reception quality in a method using (4,8,4)16APSK instead of the (8,8)16APSK described in embodiment 1 to embodiment 4.

For example, in a situation in which distortion characteristics are severe, such as satellite broadcasting by using a power amplifier for transmission included in the radio section 712 of the transmit apparatus illustrated in FIG. 7, even when (only) using (4,8,4)16APSK as a modulation scheme, PAPR is low and therefore intersymbol interference is reduced and, when compared to (12,4)16APSK, (4,8,4)16APSK improves constellation and labelling, and therefore a receive apparatus is likely to achieve high data reception quality.

In the present embodiment, this point, i.e., a transmission method that can specify (4,8,4)16APSK as a modulation scheme of data symbols is described.

For example, in a frame of a modulated signal such as in FIG. 11, (4,8,4)16APSK can be specified as a modulation scheme of Data #1 to Data #7920.

Accordingly, in FIG. 11, when "1st symbol, 2nd symbol, 3rd symbol, ... , 135th symbol, 136th symbol" are arranged along a horizontal axis of time, (4,8,4)16APSK can be specified as the modulation scheme of "1st symbol, 2nd symbol, 3rd symbol, ... , 135th symbol, 136th symbol".

As one feature of such configuration, "two or more (4,8,4)16APSK symbols are consecutive". Two or more consecutive (4,8,4)16APSK symbols are consecutive along a time axis when, for example, a single carrier transmission scheme is used (see FIG. 33). Further, when a multi-carrier transmission scheme such as orthogonal frequency division multiplexing (OFDM) is used, the two or more consecutive (4,8,4)16APSK symbols may be consecutive along a time axis (see FIG. 33), and may be consecutive along a frequency axis (see FIG. 34).

Figure 33:
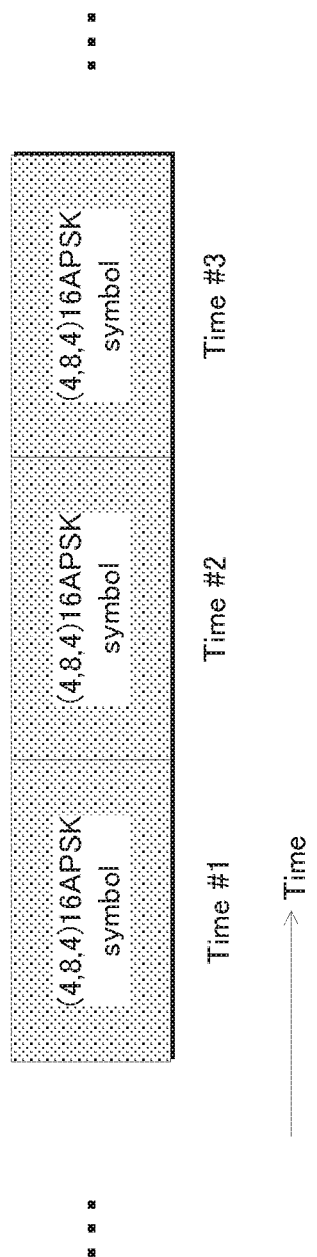
FIG. 33 illustrates an example of arrangement of symbols.

FIG. 33 illustrates an example arrangement of symbols when time is a horizontal axis. A (4,8,4)16APSK symbol at time #1, a (4,8,4)16APSK symbol at time #2, a (4,8,4)16APSK symbol at time #3, . . . .

Figure 34:
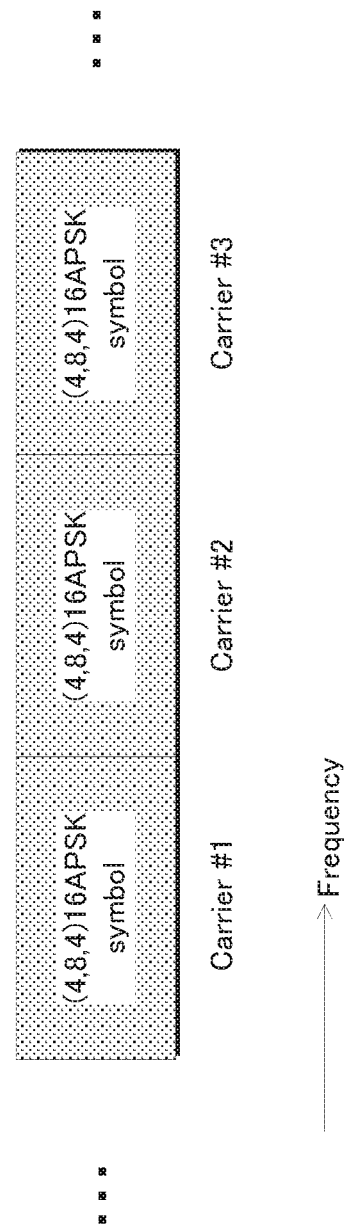
FIG. 34 illustrates an example of arrangement of symbols.

FIG. 34 illustrates an example arrangement of symbols when frequency is a horizontal axis. A (4,8,4)16APSK symbol at carrier #1, a (4,8,4)16APSK symbol at carrier #2, a (4,8,4)16APSK symbol at carrier #3, . . . .

Figure 35:
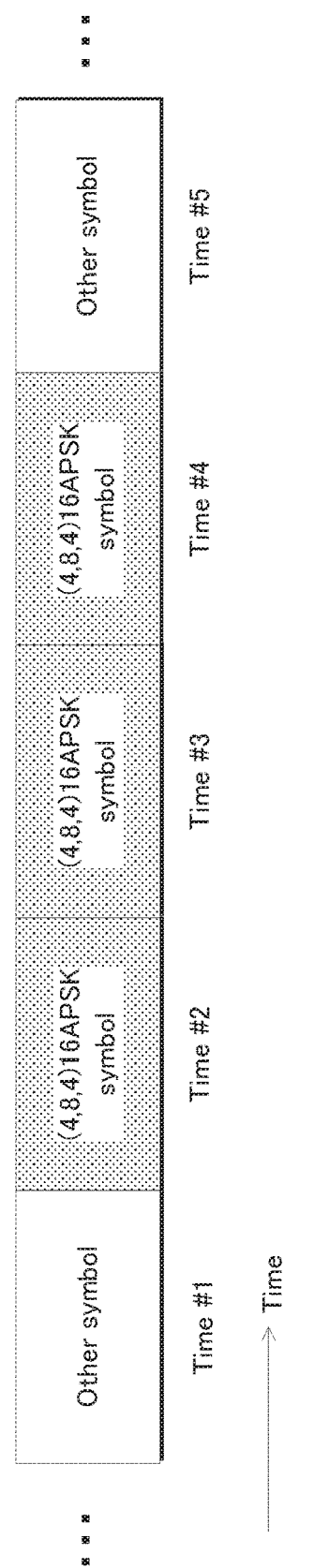
FIG. 35 illustrates an example of arrangement of symbols.
Figure 36:
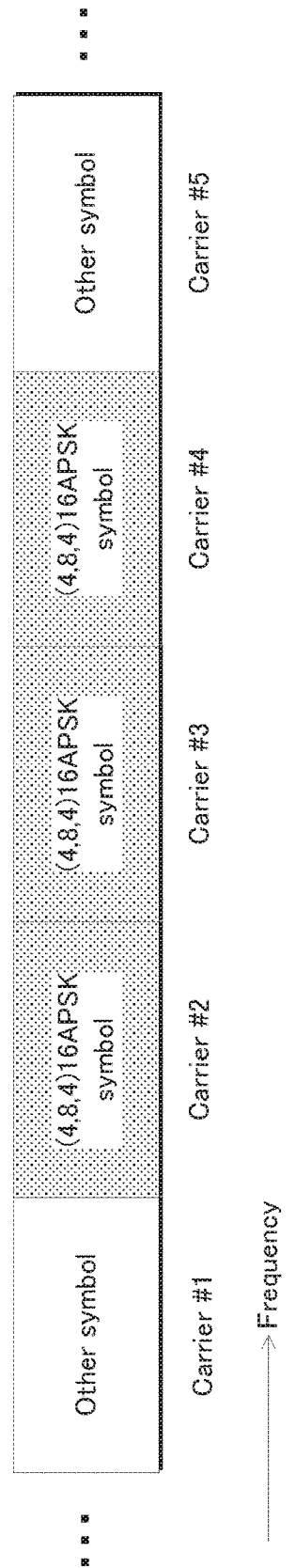
FIG. 36 illustrates an example of arrangement of symbols.

Further examples of "two or more (4,8,4)16APSK symbols are consecutive" are illustrated in FIG. 35 and FIG. 36.

FIG. 35 illustrates an example arrangement of symbols when time is a horizontal axis. Another symbol at time #1, a (4,8,4)16APSK symbol at time #2, a (4,8,4)16APSK symbol at time #3, a (4,8,4)16APSK symbol at time #4, another symbol at time #5, . . . . The other symbol may be a pilot symbol, a symbol transmitting control information, a reference symbol, a symbol for frequency or time synchronization, or any kind of symbol.

FIG. 36 illustrates an example arrangement of symbols when frequency is a horizontal axis. Another symbol at carrier #1, a (4,8,4)16APSK symbol at carrier #2, a (4,8,4)16APSK symbol at carrier #3, a (4,8,4)16APSK symbol at carrier #4, another symbol at carrier #5, . . . . The other symbol may be a pilot symbol, a symbol transmitting control information, a reference symbol, a symbol for frequency or time synchronization, or any kind of symbol.

(4,8,4)16APSK symbols may be symbols for transmitting data and may be pilot symbols as described in embodiment 2.

When a (4,8,4)16APSK symbol is a symbol for transmitting data, (4,8,4)16APSK mapping described in embodiment 8 is performed to obtain an in-phase component and quadrature component of a baseband signal from four bits of data, $b_3$, $b_2$, $b_1$, and $b_0$.

As above, when a modulation scheme of a data symbol is (4,8,4)16APSK, PAPR is low and therefore occurrence of intersymbol interference is reduced and, when compared to (12,4)16APSK, (4,8,4)16APSK is preferred for constellation and labelling, and therefore a receive apparatus is likely to achieve high data reception quality.

In this case, when the constellation described in embodiment 9 is applied to (4,8,4)16APSK, the probability of achieving higher data reception quality becomes higher. Specific examples are as follows.

[1] Satisfying <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[2] Satisfying <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[3] Satisfying <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[4] Satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[5] Satisfying <Condition 9> and <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[6] Satisfying <Condition 9> and <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[7] Satisfying <Condition 10> and $\lambda=\pi/12$ radians for arrangement of constellation points (coordinates of constellation points) of (4,8,4)16APSK on an in-phase (I)-quadrature-phase (Q) plane as described in embodiment 8. ($R_1<R_2<R_3$)

[8] Satisfying <Condition 11> and $\lambda=\pi/12$ radians for arrangement of constellation points (coordinates of constellation points) of (4,8,4)16APSK on an in-phase (I)-quadrature-phase (Q) plane as described in embodiment 8. ($R_1<R_2<R_3$)

[9] Satisfying <Condition 12> and $\lambda=\pi/12$ radians for arrangement of constellation points (coordinates of constellation points) of (4,8,4)16APSK on an in-phase (I)-quadrature-phase (Q) plane as described in embodiment 8. ($R_1<R_2<R_3$)

[10] Satisfying <Condition 7> and <Condition 8>, and satisfying <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[11] Satisfying <Condition 7> and <Condition 8>, and satisfying <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[12] Satisfying <Condition 7> and <Condition 8>, and satisfying <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[13] Satisfying <Condition 7> and <Condition 8>, and satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[14] Satisfying <Condition 7> and <Condition 8>, and satisfying <Condition 9> and <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[15] Satisfying <Condition 7> and <Condition 8>, and satisfying <Condition 9> and <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[16] Satisfying <Condition 7> and <Condition 8>, and satisfying <Condition 10> and λ=π/12 radians for arrangement of constellation points (coordinates of constellation points) of (4,8,4)16APSK on an in-phase (I)-quadrature-phase (Q) plane as described in embodiment 8. ($R_1<R_2<R_3$)

[17] Satisfying <Condition 7> and <Condition 8>, and satisfying <Condition 11> and λ=π/12 radians for arrangement of constellation points (coordinates of constellation points) of (4,8,4)16APSK on an in-phase (I)-quadrature-phase (Q) plane as described in embodiment 8. ($R_1<R_2<R_3$)

[18] Satisfying <Condition 7> and <Condition 8>, and satisfying <Condition 12> and λ=π/12 radians for arrangement of constellation points (coordinates of constellation points) of (4,8,4)16APSK on an in-phase (I)-quadrature-phase (Q) plane as described in embodiment 8. ($R_1<R_2<R_3$)

[19] Satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[20] Satisfying <Condition 7> and <Condition 8>, and satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

Embodiment 11

<Example of Pilot Symbols>

In the present embodiment, an example of pilot symbol configuration is described in the transmission scheme described in embodiment 10 (the modulation scheme of data symbols is (4,8,4)16APSK).

Note that the transmit apparatus in the present embodiment is identical to the transmit apparatus described in embodiment 1 and therefore description thereof is omitted here. However, (4,8,4)16APSK is used instead of (8,8) 16APSK.

Intersymbol interference occurs for modulated signals because of non-linearity of the power amplifier of the transmit apparatus. High data reception quality can be achieved by a receive apparatus by decreasing this intersymbol interference.

In the present example of pilot symbol configuration, in order to reduce intersymbol interference at a receive apparatus, when data symbols are configured so that "two or more (4,8,4)16APSK symbols are consecutive", a transmit apparatus generates and transmits, as pilot symbols, all baseband signals corresponding to all possible constellation points of (4,8,4)16APSK on an in-phase (I)-quadrature-phase (Q) plane (in other words, baseband signals corresponding to 16 constellation points of four transmit bits [$b_3b_2b_1b_0$], from [0000] to [1111]). Thus, a receive apparatus can estimate intersymbol interference for all possible constellation points of (4,8,4)16APSK on an in-phase (I)-quadrature-phase (Q) plane, and therefore achieving high data reception quality is likely.

Specifically, the following are transmitted as pilot symbols (reference symbols), in order:

a symbol of a constellation point (baseband signal) corresponding to [$b_3b_2b_1b_0$]=[0000] of (4,8,4)16APSK;
a symbol of a constellation point (baseband signal) corresponding to [$b_3b_2b_1b_0$]=[0001] of (4,8,4)16APSK;
a symbol of a constellation point (baseband signal) corresponding to [$b_3b_2b_1b_0$]=[0010] of (4,8,4)16APSK;
a symbol of a constellation point (baseband signal) corresponding to [$b_3b_2b_1b_0$]=[0011] of (4,8,4)16APSK;
a symbol of a constellation point (baseband signal) corresponding to [$b_3b_2b_1b_0$]=[0100] of (4,8,4)16APSK;
a symbol of a constellation point (baseband signal) corresponding to [$b_3b_2b_1b_0$]=[0101] of (4,8,4)16APSK;
a symbol of a constellation point (baseband signal) corresponding to [$b_3b_2b_1b_0$]=[0110] of (4,8,4)16APSK;
a symbol of a constellation point (baseband signal) corresponding to [$b_3b_2b_1b_0$]=[0111] of (4,8,4)16APSK;
a symbol of a constellation point (baseband signal) corresponding to [$b_3b_2b_1b_0$]=[1000] of (4,8,4)16APSK;
a symbol of a constellation point (baseband signal) corresponding to [$b_3b_2b_1b_0$]=[1001] of (4,8,4)16APSK;
a symbol of a constellation point (baseband signal) corresponding to [$b_3b_2b_1b_0$]=[1010] of (4,8,4)16APSK;
a symbol of a constellation point (baseband signal) corresponding to [$b_3b_2b_1b_0$]=[1011] of (4,8,4)16APSK;
a symbol of a constellation point (baseband signal) corresponding to [$b_3b_2b_1b_0$]=[1100] of (4,8,4)16APSK;
a symbol of a constellation point (baseband signal) corresponding to [$b_3b_2b_1b_0$]=[1101] of (4,8,4)16APSK;
a symbol of a constellation point (baseband signal) corresponding to [$b_3b_2b_1b_0$]=[1110] of (4,8,4)16APSK; and
a symbol of a constellation point (baseband signal) corresponding to [$b_3b_2b_1b_0$]=[1111] of (4,8,4)16APSK.

The above feature means that:

<1> Symbols corresponding to all constellation points of (4,8,4)16APSK on an in-phase (I)-quadrature-phase (Q) plane, i.e., the following symbols, are transmitted in any order:

a symbol of a constellation point (baseband signal) corresponding to [$b_3b_2b_1b_0$]=[0000] of (4,8,4)16APSK;
a symbol of a constellation point (baseband signal) corresponding to [$b_3b_2b_1b_0$]=[0001] of (4,8,4)16APSK;
a symbol of a constellation point (baseband signal) corresponding to [$b_3b_2b_1b_0$]=[0010] of (4,8,4)16APSK;
a symbol of a constellation point (baseband signal) corresponding to [$b_3b_2b_1b_0$]=[0011] of (4,8,4)16APSK;
a symbol of a constellation point (baseband signal) corresponding to [$b_3b_2b_1b_0$]=[0100] of (4,8,4)16APSK;
a symbol of a constellation point (baseband signal) corresponding to [$b_3b_2b_1b_0$]=[0101] of (4,8,4)16APSK;
a symbol of a constellation point (baseband signal) corresponding to [$b_3b_2b_1b_0$]=[0110] of (4,8,4)16APSK;
a symbol of a constellation point (baseband signal) corresponding to [$b_3b_2b_1b_0$]=[0111] of (4,8,4)16APSK;
a symbol of a constellation point (baseband signal) corresponding to [$b_3b_2b_1b_0$]=[1000] of (4,8,4)16APSK;
a symbol of a constellation point (baseband signal) corresponding to [$b_3b_2b_1b_0$]=[1001] of (4,8,4)16APSK;
a symbol of a constellation point (baseband signal) corresponding to [$b_3b_2b_1b_0$]=[1010] of (4,8,4)16APSK;
a symbol of a constellation point (baseband signal) corresponding to [$b_3b_2b_1b_0$]=[1011] of (4,8,4)16APSK;
a symbol of a constellation point (baseband signal) corresponding to [$b_3b_2b_1b_0$]=[1100] of (4,8,4)16APSK;
a symbol of a constellation point (baseband signal) corresponding to [$b_3b_2b_1b_0$]=[1101] of (4,8,4)16APSK;

a symbol of a constellation point (baseband signal) corresponding to $[b_3b_2b_1b_0]$=[1110] of (4,8,4)16APSK; and a symbol of a constellation point (baseband signal) corresponding to $[b_3b_2b_1b_0]$=[1111] of (4,8,4)16APSK.

Pilot symbols need not be symbols only for estimating intersymbol interference, and a receive apparatus may estimate a radio wave propagation environment between a transmit apparatus and the receive apparatus (channel estimation), and may estimate frequency offset using the pilot symbols.

Further, a transmission method of pilot symbols is not limited to the above. Above, the pilot symbols are configured as 16 symbols, but when, for example, the pilot symbols are configured as 16×N symbols (N being a natural number), there is an advantage that the number of occurrences of each of the following symbols can be equalized:

a symbol of a constellation point (baseband signal) corresponding to $[b_3b_2b_1b_0]$=[0000] of (4,8,4)16APSK;

a symbol of a constellation point (baseband signal) corresponding to $[b_3b_2b_1b_0]$=[0001] of (4,8,4)16APSK;

a symbol of a constellation point (baseband signal) corresponding to $[b_3b_2b_1b_0]$=[0010] of (4,8,4)16APSK;

a symbol of a constellation point (baseband signal) corresponding to $[b_3b_2b_1b_0]$=[0011] of (4,8,4)16APSK;

a symbol of a constellation point (baseband signal) corresponding to $[b_3b_2b_1b_0]$=[0100] of (4,8,4)16APSK;

a symbol of a constellation point (baseband signal) corresponding to $[b_3b_2b_1b_0]$=[0101] of (4,8,4)16APSK;

a symbol of a constellation point (baseband signal) corresponding to $[b_3b_2b_1b_0]$=[0110] of (4,8,4)16APSK;

a symbol of a constellation point (baseband signal) corresponding to $[b_3b_2b_1b_0]$=[0111] of (4,8,4)16APSK;

a symbol of a constellation point (baseband signal) corresponding to $[b_3b_2b_1b_0]$=[1000] of (4,8,4)16APSK;

a symbol of a constellation point (baseband signal) corresponding to $[b_3b_2b_1b_0]$=[1001] of (4,8,4)16APSK;

a symbol of a constellation point (baseband signal) corresponding to $[b_3b_2b_1b_0]$=[1010] of (4,8,4)16APSK;

a symbol of a constellation point (baseband signal) corresponding to $[b_3b_2b_1b_0]$=[1011] of (4,8,4)16APSK;

a symbol of a constellation point (baseband signal) corresponding to $[b_3b_2b_1b_0]$=[1100] of (4,8,4)16APSK;

a symbol of a constellation point (baseband signal) corresponding to $[b_3b_2b_1b_0]$=[1101] of (4,8,4)16APSK;

a symbol of a constellation point (baseband signal) corresponding to $[b_3b_2b_1b_0]$=[1110] of (4,8,4)16APSK; and a symbol of a constellation point (baseband signal) corresponding to $[b_3b_2b_1b_0]$=[1111] of (4,8,4)16APSK.

Embodiment 12

<Signaling>

In the present embodiment, examples are described of various information signaled as TMCC information in order to facilitate reception at the receive apparatus of a transmit signal used in the transmission scheme described in embodiment 10.

Note that the transmit apparatus in the present embodiment is identical to the transmit apparatus described in embodiment 1 and therefore description thereof is omitted here. However, (4,8,4)16APSK is used instead of (8,8) 16APSK.

FIG. 18 illustrates a schematic of a frame of a transmit signal of advanced wide band digital satellite broadcasting (however, FIG. 18 is not intended to be an exact illustration of a frame of advanced wide band digital satellite broadcasting). Note that details are described in embodiment 3, and therefore description is omitted here.

Table 9 illustrates a configuration of modulation scheme information. In table 9, for example, when four bits to be transmitted by a symbol for transmitting a modulation scheme of a transmission mode of "transmission mode/slot information" of a "TMCC information symbol group" are [0001], a modulation scheme for generating symbols of "slots composed of a symbol group" is π/2 shift binary phase shift keying (BPSK).

When four bits to be transmitted by a symbol for transmitting a modulation scheme of a transmission mode of "transmission mode/slot information" of a "TMCC information symbol group" are [0010], a modulation scheme for generating symbols of "slots composed of a symbol group" is quadrature phase shift keying (QPSK).

When four bits to be transmitted by a symbol for transmitting a modulation scheme of a transmission mode of "transmission mode/slot information" of a "TMCC information symbol group" are [0011], a modulation scheme for generating symbols of "slots composed of a symbol group" is 8 phase shift keying (8PSK).

When four bits to be transmitted by a symbol for transmitting a modulation scheme of a transmission mode of "transmission mode/slot information" of a "TMCC information symbol group" are [0100], a modulation scheme for generating symbols of "slots composed of a symbol group" is (12,4)16APSK.

When four bits to be transmitted by a symbol for transmitting a modulation scheme of a transmission mode of "transmission mode/slot information" of a "TMCC information symbol group" are [0101], a modulation scheme for generating symbols of "slots composed of a symbol group" is (4,8,4)16APSK.

When four bits to be transmitted by a symbol for transmitting a modulation scheme of a transmission mode of "transmission mode/slot information" of a "TMCC information symbol group" are [0110], a modulation scheme for generating symbols of "slots composed of a symbol group" is 32 amplitude phase shift keying (32APSK).

. . .

TABLE 9

| Modulation scheme information | |
|---|---|
| Value | Assignment |
| 0000 | Reserved |
| 0001 | π/2 shift BPSK |
| 0010 | QPSK |
| 0011 | 8PSK |
| 0100 | (12,4)16APSK |
| 0101 | (4,8,4)16APSK |
| 0110 | 32APSK |
| 0111 | . . . |
| . . . | . . . |
| 1111 | No scheme assigned |

Table 10 illustrates a relationship between coding rates of error correction code and ring ratios when a modulation scheme is (12,4)16APSK. According to $R_1$ and $R_2$, used above to represent constellation points in an I-Q plane of (12,4)16APSK, a ring ratio $R_{(12,4)}$ of (12,4)16APSK is represented as $R_{(12,4)}=R_2/R_1$. In Table 10, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when a symbol for transmitting a modulation scheme of a transmission mode is indicated to be (12,4)16APSK, a ring ratio $R_{(12,4)}$ of (12,4)16APSK is 3.09.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈2/5), and this means that when a symbol for transmitting a modulation scheme of a transmission mode is indicated to be (12,4)16APSK, a ring ratio $R_{(12,4)}$ of (12,4)16APSK is 2.97.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when a symbol for transmitting a modulation scheme of a transmission mode is indicated to be (12,4)16APSK, a ring ratio $R_{(12,4)}$ of (12,4)16APSK is 3.93.

. . .

TABLE 10

Relationship between coding rates of error correction code and ring ratios when modulation scheme is (12,4)16APSK

| Value | Coding rate (approximate value) | Ring ratio |
|---|---|---|
| 0000 | 41/120 (⅓) | 3.09 |
| 0001 | 49/120 (⅖) | 2.97 |
| 0010 | 61/120 (½) | 3.93 |
| . . . | . . . | . . . |
| 1111 | No scheme assigned | — |

Table 11 indicates a relationship between coding rate of error correction code and radii/phases, when a modulation scheme is (4,8,4)16APSK.

In Table 11, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when a symbol for transmitting a modulation scheme of a transmission mode is indicated to be (4,8,4)16APSK, $R_1$=1.00, $R_2$=2.00, $R_3$=2.20, and phase $\lambda$=$\pi$/12 radians.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈2/5), and this means that when a symbol for transmitting a modulation scheme of a transmission mode is indicated to be (4,8,4)16APSK, $R_1$=1.00, $R_2$=2.10, $R_3$=2.20, and phase $\lambda$=$\pi$/12 radians.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when a symbol for transmitting a modulation scheme of a transmission mode is indicated to be (4,8,4)16APSK, $R_1$=1.00, $R_2$=2.20, $R_3$=2.30, and phase $\lambda$=$\pi$/10 radians.

. . .

TABLE 11

Relationship between radii/phases of error correction coding and ring ratios when modulation scheme is (4,8,4)16APSK

| Value | Coding rate (approximate value) | Radii and phase |
|---|---|---|
| 0000 | 41/120 (⅓) | $R_1$ = 1.00, $R_2$ = 2.00, $R_3$ = 2.20, $\lambda$ = $\pi$/12 |
| 0001 | 49/120 (⅖) | $R_1$ = 1.00, $R_2$ = 2.10, $R_3$ = 2.20, $\lambda$ = $\pi$/12 |
| 0010 | 61/120 (½) | $R_1$ = 1.00, $R_2$ = 2.20, $R_3$ = 2.30, $\lambda$ = $\pi$/10 |
| . . . | . . . | . . . |
| 1111 | No scheme assigned | — |

<Receive Apparatus>

The following describes operation of a receive apparatus that receives a radio signal transmitted by the transmit apparatus 700, with reference to the diagram of a receive apparatus in FIG. 19.

The receive apparatus 1900 of FIG. 19 receives a radio signal transmitted by the transmit apparatus 700 via the antenna 1901. The RF receiver 1902 performs processing such as frequency conversion and quadrature demodulation on a received radio signal, and outputs a baseband signal.

The demodulator 1904 performs processing such as root roll-off filter processing, and outputs a post-filter baseband signal.

The synchronization and channel estimator 1914 receives a post-filter baseband signal as input, performs time synchronization, frequency synchronization, and channel estimation, using, for example, a "synchronization symbol group" and "pilot symbol group" transmitted by the transmit apparatus, and outputs an estimated signal.

The control information estimator 1916 receives a post-filter baseband signal as input, extracts symbols including control information such as a "TMCC information symbol group", performs demodulation and decoding, and outputs a control signal.

Of importance in the present embodiment is that a receive apparatus demodulates and decodes a symbol transmitting "transmission mode modulation scheme" information and a symbol transmitting "transmission mode coding rate" of "transmission mode/slot information" of a "TMCC information symbol group"; and, based on Table 9, Table 10, and Table 11, the control information estimator 1916 generates modulation scheme information and error correction code scheme (for example, coding rate of error correction code) information used by "slots composed of a data symbol group", and generates ring ratio and radii/phase information when a modulation scheme used by "slots composed of a data symbol group" is (12,4)16APSK, (4,8,4)16APSK, or 32APSK, and outputs the information as a portion of a control signal.

The de-mapper 1906 receives a post-filter baseband signal, control signal, and estimated signal as input, determines a modulation scheme (or transmission method) used by "slots composed of a data symbol group" based on the control signal (in this case, when there is a ring ratio and radii/phase, determination with respect to the ring ratio and radii/phase is also performed), calculates, based on this determination, a log-likelihood ratio (LLR) for each bit included in a data symbol from the post-filter baseband signal and estimated signal, and outputs the log-likelihood ratios. (However, instead of a soft decision value such as an LLR a hard decision value may be outputted, and a soft decision value instead of an LLR may be outputted.)

The de-interleaver 1908 receives log-likelihood ratios as input, accumulates input, performs de-interleaving (permutes data) corresponding to interleaving used by the transmit apparatus, and outputs post-de-interleaving log-likelihood ratios.

The error correction decoder 1912 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method.

The above describes operation when iterative detection is not performed. The following is supplemental description of operation when iterative detection is performed. Note that a receive apparatus need not implement iterative detection, and a receive apparatus may be a receive apparatus that performs initial detection and error detection decoding without being provided with elements related to iterative detection that are described below.

When iterative detection is performed, the error correction decoder 1912 outputs a log-likelihood ratio for each post-decoding bit (note that when only initial detection is performed, output of a log-likelihood ratio for each post decoding bit is not necessary).

The interleaver 1910 interleaves log-likelihood ratios of post-decoding bits (performs permutation), and outputs post-interleaving log-likelihood ratios.

The de-mapper 1906 performs iterative detection by using post-interleaving log-likelihood ratios, a post-filter baseband signal, and an estimated signal, and outputs a log-likelihood ratio for each post-iterative detection bit.

Subsequently, interleaving and error correction code operations are performed. Thus, these operations are iteratively performed. In this way, finally the possibility of achieving a preferable decoding result is increased.

In the above description, a feature thereof is that by a reception apparatus obtaining a symbol for transmitting a modulation scheme of a transmission mode of "transmission mode/slot information" of a "TMCC information symbol group" and a symbol for transmitting a coding rate of a transmission mode of "transmission mode/slot information" of a "TMCC information symbol group", a modulation scheme and coding rate of error detection coding are estimated, and, when a modulation scheme is 16APSK, 32APSK, ring ratios and radii/phases are estimated, and demodulation and decoding operations become possible.

The above description describes the frame configuration in FIG. 18, but frame configurations applicable to the present invention are not limited in this way. When a plurality of data symbols exist, a symbol exists for transmitting information related to a modulation scheme used in generating the plurality of data symbols, and a symbol exists for transmitting information related to an error correction scheme (for example, error correction code used, code length of error correction code, coding rate of error correction code, etc.) used in generating the plurality of data symbols, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

In addition, as a method different to that described above, a symbol transmitting information related to ring ratios and radii/phases may exist, and the transmit apparatus may transmit the symbol. An example of a symbol transmitting information related to ring ratios and radii/phases is illustrated below.

TABLE 12

Example of symbol transmitting information related to ring ratios and radii/phases

| Value | Assignment |
|---|---|
| 00000 | (12,4)16APSK ring ratio 4.00 |
| 00001 | (12,4)16APSK ring ratio 4.10 |
| 00010 | (12,4)16APSK ring ratio 4.20 |
| 00011 | (12,4)16APSK ring ratio 4.30 |
| 00100 | (4,8,4)16APSK $R_1 = 1.00$, $R_2 = 2.00$, $R_3 = 2.20$, $\lambda = \pi/12$ |
| 00101 | (4,8,4)16APSK $R_1 = 1.00$, $R_2 = 2.10$, $R_3 = 2.20$, $\lambda = \pi/12$ |
| 00110 | (4,8,4)16APSK $R_1 = 1.00$, $R_2 = 2.20$, $R_3 = 2.30$, $\lambda = \pi/10$ |
| 00111 | (4,8,4)16APSK $R_1 = 1.00$, $R_2 = 2.20$, $R_3 = 2.30$, $\lambda = \pi/12$ |
| . . . | . . . |
| 11111 | . . . |

In Table 12, when [00000] is transmitted by a symbol transmitting information related to ring ratio and radii/phase, a data symbol is a symbol of "(12,4)16APSK ring ratio 4.00".

Further, the following is true.

When [00001] is transmitted by a symbol transmitting information related to ring ratio and radii/phase, a data symbol is a symbol of "(12,4)16APSK ring ratio 4.10".

When [00010] is transmitted by a symbol transmitting information related to ring ratio and radii/phase, a data symbol is a symbol of "(12,4)16APSK ring ratio 4.20".

When [00011] is transmitted by a symbol transmitting information related to ring ratio and radii/phase, a data symbol is a symbol of "(12,4)16APSK ring ratio 4.30".

When [00100] is transmitted by a symbol transmitting information related to ring ratio and radii/phase, a data symbol is a symbol of "(4,8,4)16APSK $R_1$=1.00, $R_2$=2.00, $R_3$=2.20, $\lambda$=$\pi$/12".

When [00101] is transmitted by a symbol transmitting information related to ring ratio and radii/phase, a data symbol is a symbol of "(4,8,4)16APSK $R_1$=1.00, $R_2$=2.10, $R_3$=2.20, $\lambda$=$\pi$/12".

When [00110] is transmitted by a symbol transmitting information related to ring ratio and radii/phase, a data symbol is a symbol of "(4,8,4)16APSK $R_1$=1.00, $R_2$=2.20, $R_3$=2.30, $\lambda$=$\pi$/10".

When [00111] is transmitted by a symbol transmitting information related to ring ratio and radii/phase, a data symbol is a symbol of "(4,8,4)16APSK $R_1$=1.00, $R_2$=2.20, $R_3$=2.30, $\lambda$=$\pi$/12".

Thus, by obtaining a symbol transmitting information related to ring ratio and radii/phases, a receive apparatus can estimate a ring ratio and radii/phases used by a data symbol, and therefore demodulation and decoding of the data symbol becomes possible.

Further, ring ratio and radii/phases information may be included in a symbol for transmitting a modulation scheme. An example is illustrated below.

TABLE 13

Modulation scheme information

| Value | Assignment |
|---|---|
| 00000 | (12,4)16APSK ring ratio 4.00 |
| 00001 | (12,4)16APSK ring ratio 4.10 |
| 00010 | (12,4)16APSK ring ratio 4.20 |
| 00011 | (12,4)16APSK ring ratio 4.30 |
| 00100 | (4,8,4)16APSK $R_1 = 1.00, R_2 = 2.00, R_3 = 2.20, \lambda = \pi/12$ |
| 00101 | (4,8,4)16APSK $R_1 = 1.00, R_2 = 2.10, R_3 = 2.20, \lambda = \pi/12$ |
| 00110 | (4,8,4)16APSK $R_1 = 1.00, R_2 = 2.20, R_3 = 2.30, \lambda = \pi/10$ |
| 00111 | (4,8,4)16APSK $R_1 = 1.00, R_2 = 2.20, R_3 = 2.30, \lambda = \pi/12$ |
| ... | ... |
| 11101 | 8PSK |
| 11110 | QPSK |
| 11111 | π/2 shift BPSK |

In Table 13, when [00000] is transmitted by a symbol transmitting modulation scheme information, a data symbol is a symbol of "(12,4)16APSK ring ratio 4.00".

Further, the following is true.

When [00001] is transmitted by a symbol transmitting modulation scheme information, a data symbol is a symbol of "(12,4)16APSK ring ratio 4.10".

When [00010] is transmitted by a symbol transmitting modulation scheme information, a data symbol is a symbol of "(12,4)16APSK ring ratio 4.20".

When [00011] is transmitted by a symbol transmitting modulation scheme information, a data symbol is a symbol of "(12,4)16APSK ring ratio 4.30".

When [00100] is transmitted by a symbol transmitting modulation scheme information, a data symbol is a symbol of "(4,8,4)16APSK $R_1$=1.00, $R_2$=2.00, $R_3$=2.20, $\lambda$=π/12".

When [00101] is transmitted by a symbol transmitting modulation scheme information, a data symbol is a symbol of "(4,8,4)16APSK $R_1$=1.00, $R_2$=2.10, $R_3$=2.20, $\lambda$=π/12".

When [00110] is transmitted by a symbol transmitting modulation scheme information, a data symbol is a symbol of "(4,8,4)16APSK $R_1$=1.00, $R_2$=2.20, $R_3$=2.30, $\lambda$=π/10".

When [00111] is transmitted by a symbol transmitting modulation scheme information, a data symbol is a symbol of "(4,8,4)16APSK $R_1$=1.00, $R_2$=2.20, $R_3$=2.30, $\lambda$=π/12".

When [11101] is transmitted by a symbol transmitting modulation scheme information, a data symbol is a symbol of "8PSK".

When [11110] is transmitted by a symbol transmitting modulation scheme information, a data symbol is a symbol of "QPSK".

When [11111] is transmitted by a symbol transmitting modulation scheme information, a data symbol is a symbol of "π/2 shift BPSK".

Thus, by obtaining a symbol transmitting modulation scheme information, a receive apparatus can estimate a modulation scheme, ring ratio, radii, and phases used by a data symbol, and therefore demodulation and decoding of the data symbol becomes possible.

Note that in the above description, examples are described including "(12,4)16APSK" and "(4,8,4)16APSK" as selectable modulation schemes (transmission methods), but modulation schemes (transmission methods) are not limited to these examples. In other words, other modulation schemes may be selectable.

Embodiment 13

In the present embodiment, an order of generation of a data symbol is described.

FIG. 18, part (a) illustrates a schematic of a frame configuration. In FIG. 18, part (a), the "#1 symbol group", the "#2 symbol group", the "#3 symbol group", . . . are lined up. Each symbol group among the "#1 symbol group", the "#2 symbol group", the "#3 symbol group", . . . is herein composed of a "synchronization symbol group", a "pilot symbol group", a "TMCC information symbol group", and "slots composed of a data symbol group", as illustrated in FIG. 18, part (a).

Here, a configuration scheme is described of data symbol groups in each "slots composed of a data symbol group" among, for example, N symbol groups including the "#1 symbol group", the "#2 symbol group", the "#3 symbol group", . . . , an "#N−1 symbol group", an "#N symbol group".

A rule is provided with respect to generation of data symbol groups in each "slots composed of a data symbol group" among N symbol groups from a "#(β× N+1) symbol group" to a "#(β×N+N) symbol group". The rule is described with reference to FIG. 37.

Thus, a data symbol group of (4,8,4)16APSK of FIG. 37 satisfies features of FIG. 37, part (a), to FIG. 37, part (f). Note that in FIG. 37, the horizontal axis is symbols.

FIG. 37, part (a):

When a 32APSK data symbol exists and a (12,4)16APSK data symbol does not exist, a "(4,8,4)16APSK data symbol" exists after a "32APSK data symbol", as illustrated in FIG. 37, part (a).

FIG. 37, part (b):

When a (12,4)16APSK data symbol exists, a "(4,8,4) 16APSK data symbol" exists after a "(12,4)16APSK data symbol", as illustrated in FIG. 37, part (b).

FIG. 37, part (c):

When a (4,8,4)16APSK data symbol exists, a "(12,4) 16APSK data symbol" exists after a "(4,8,4)16APSK data symbol", as illustrated in FIG. 37, part (b).

Either FIG. 37, part (b), or FIG. 37, part (c) may be satisfied.

FIG. 37, part (d):

When an 8PSK data symbol exists and a (12,4)16APSK data symbol does not exist, an "8PSK data symbol" exists after a "(4,8,4)16APSK data symbol", as illustrated in FIG. 37, part (d).

FIG. 37, part (e):

When an QPSK data symbol exists, an 8PSK data symbol does not exist, and a (12,4)16APSK data symbol does not exist, a "QPSK data symbol" exists after a "(4,8,4)16APSK data symbol", as illustrated in FIG. 37, part (e).

FIG. 37, part (f):

When π/2 shift BPSK data symbol exists, a QPSK data symbol does not exist, an 8PSK data symbol does not exist, and a (12,4)16APSK data symbol does not exist, a "π/2 shift BPSK data symbol" exists after a "(4,8,4)16APSK data symbol", as illustrated in FIG. 37, part (f).

When symbols are arranged as described above, there is an advantage that a receive apparatus can easily perform automatic gain control (AGC) because a signal sequence is arranged in order of modulation schemes (transmission methods) of high peak power.

Figure 38:
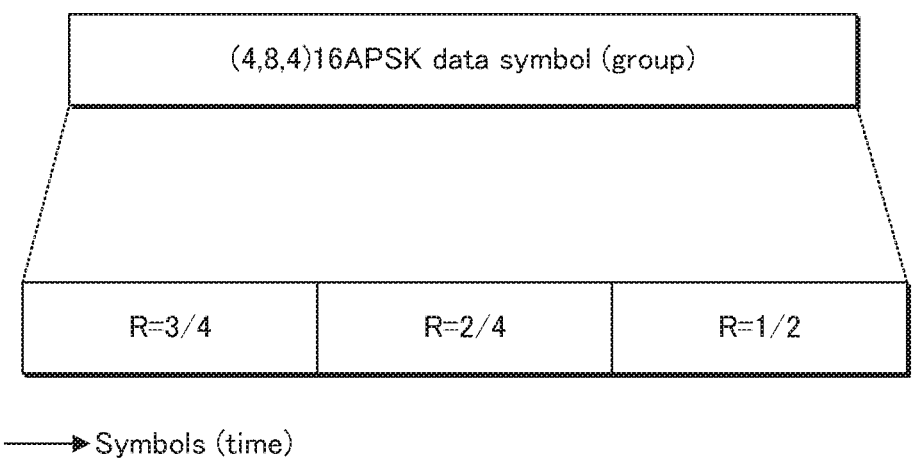
FIG. 38 illustrates an example of arrangement of modulation schemes.

FIG. 38 illustrates an example configuration method of the "(4,8,4)16APSK data symbol" described above.

Assume that a "(4,8,4)16APSK data symbol" of a coding rate X of error correction code and a "(4,8,4)16APSK data symbol" of a coding rate Y of error correction code exist. Also assume that a relationship X>Y is satisfied.

Thus, a "(4,8,4)16APSK data symbol" of a coding rate Y of error correction code is arranged after a "(4,8,4)16APSK data symbol" of a coding rate X of error correction code.

As in FIG. 38, assume that a "(4,8,4)16APSK data symbol" of a coding rate 1/2 of error correction code, a "(4,8,4)16APSK data symbol" of a coding rate 2/3 of error correction code, and a "(4,8,4)16APSK data symbol" of a coding rate 3/4 of error correction code exist. Thus, from the above description, as illustrated in FIG. 38, symbols are arranged in the order of a "(4,8,4)16APSK data symbol" of a coding rate 3/4 of error correction code, a "(4,8,4)16APSK data symbol" of a coding rate 2/3 of error correction code, and a "(4,8,4)16APSK data symbol" of a coding rate 1/2 of error correction code.

Embodiment A

In the present embodiment, a scheme is described that can select a ring ratio (for example, a (12,4)16APSK ring ratio) even when a coding rate of error correction code is a given coding rate (for example, coding rate is set to a value K). This scheme contributes to improvements in variation of patterns of switching modulation schemes, for example, and thereby a receive apparatus can achieve high data reception quality by setting suitable ring ratios.

Note that ring ratio (for example, (12,4)16APSK ring ratio) has been defined prior to the present embodiment, and ring ratio may also be referred to as "radius ratio".

Figure 39:
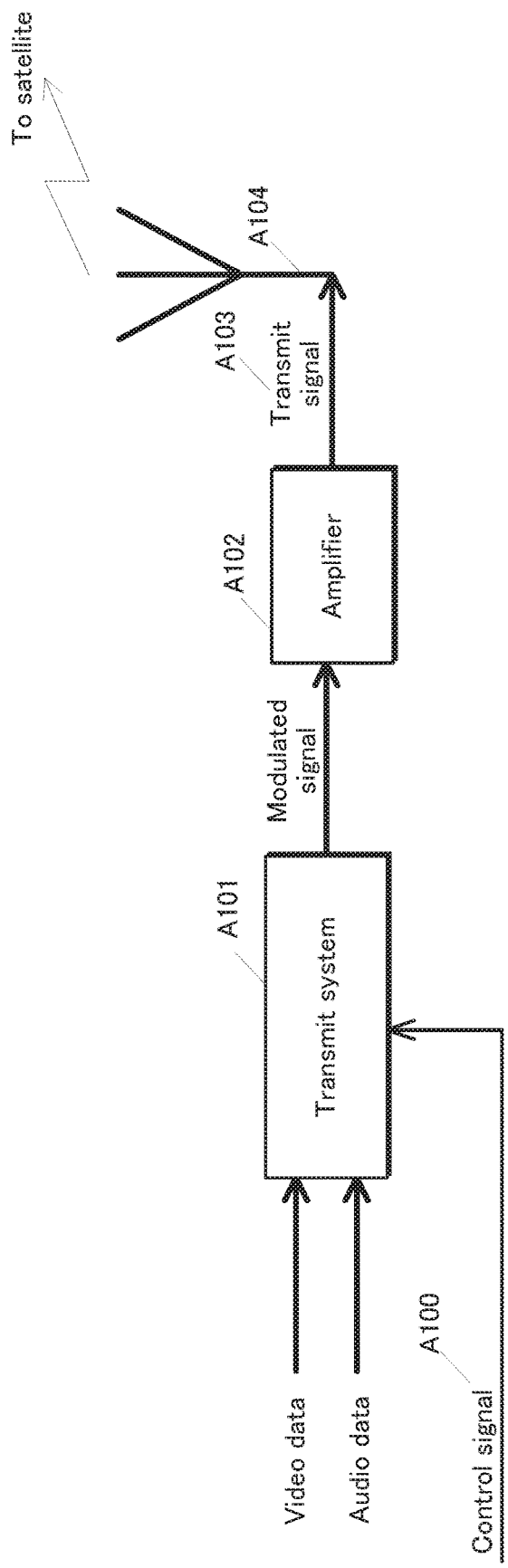
FIG. 39 illustrates an example configuration of a transmit station.

<Transmit Station>
FIG. 39 illustrates an example of a transmit station.

A transmit system A101 in FIG. 39 receives video data and audio data as input and generates a modulated signal according to a control signal A100.

The control signal A100 specifies code length of error correction code, coding rate, modulation scheme, and ring ratio.

An amplifier A102 receives a modulated signal as input, amplifies the modulated signal, and outputs a post-amplification transmit signal A103. The transmit signal A103 is transmitted via an antenna A104.

<Ring Ratio Selection>
Table 14 illustrates an example of coding rates of error correction code and ring ratios when a modulation scheme is (12,4)16APSK.

TABLE 14

Coding rates of error correction code and ring ratios when modulation scheme is (12,4)16APSK

| Value | Coding rate (approximate value) | Ring ratio |
|---|---|---|
| 0000 | 41/120 (⅓) | 2.99 |
| 0001 | 41/120 (⅓) | 3.09 |
| 0010 | 41/120 (⅓) | 3.19 |
| 0011 | 49/120 (⅖) | 2.87 |
| 0100 | 49/120 (⅖) | 2.97 |
| 0101 | 49/120 (⅖) | 3.07 |
| 0110 | 61/120 (½) | 3.83 |
| ... | ... | ... |
| 1111 | No scheme assigned | — |

A control signal generator (not illustrated) generates the control signal A100 for indicating a value of Table 14 according to a predefined coding rate and ring ratio of a transmit apparatus. At the transmit system A101, a modulated signal is generated according to a coding rate and ring ratio specified by the control signal A100.

For example, when a transmit apparatus specifies (12,4)16APSK as a modulation scheme, 41/120 (≈1/3) as a coding rate of error correction code, and 2.99 as a ring ratio, four bits of control information related to bit ratio are "0000". Further, when (12,4)16APSK is specified as a modulation scheme, 41/120 (≈1/3) is specified as a coding rate of error correction code, and 3.09 is specified as a ring ratio, four bits of control information related to bit ratio are "0001".

Thus, a transmit apparatus transmits "four bits of control information related to ring ratio" as a portion of control information.

Further, at a terminal that receives data (control information) containing four bit values of Table 14 (four bits of control information related to ring ratio), de-mapping (for example, log-likelihood ratio for each bit) is performed according to a coding rate and ring ratio indicated by the bit values, and data modulation, etc., is performed.

Transmission of this four bit value (four bits of control information related to ring ratio) can be performed using four bits within "transmission mode/slot information" with a "TMCC information symbol group".

Table 14 indicates "in a case in which a symbol for transmitting a modulation scheme of a transmission mode indicates (12,4)16APSK, when values of four bits are "0000", a coding rate of error correction code for generating symbols of "slots composed of a data symbol group" is 41/120 (≈1/3) and a ring ratio of (12,4)16APSK is $R_{(12,4)}=2.99$".

Further, "in a case in which a symbol for transmitting a modulation scheme of a transmission mode indicates (12,4)16APSK, when values of four bits are "0001", a coding rate of error correction code for generating symbols of "slots composed of a data symbol group" is 41/120 (≈1/3) and a ring ratio of (12,4)16APSK is $R_{(12,4)}=3.09$".

Further. "in a case in which a symbol for transmitting a modulation scheme of a transmission mode indicates (12,4)16APSK, when values of four bits are "0010", a coding rate of error correction code for generating symbols of "slots composed of a data symbol group" is 41/120 (≈1/3) and a ring ratio of (12,4)16APSK is $R_{(12,4)}=3.19$".

In this Table 14, for each coding rate value three types of ring ratio are assigned, but this is merely one example. In other words, for each coding rate value a plurality of types of ring ratio may be assigned. Further, a portion of coding rate values may be assigned one type of ring ratio, and remaining coding rate values may be assigned a plurality of types of ring ratio.

<Receive Apparatus>
A receive apparatus is described that corresponds to the transmission method of the present embodiment.

Figure 40:
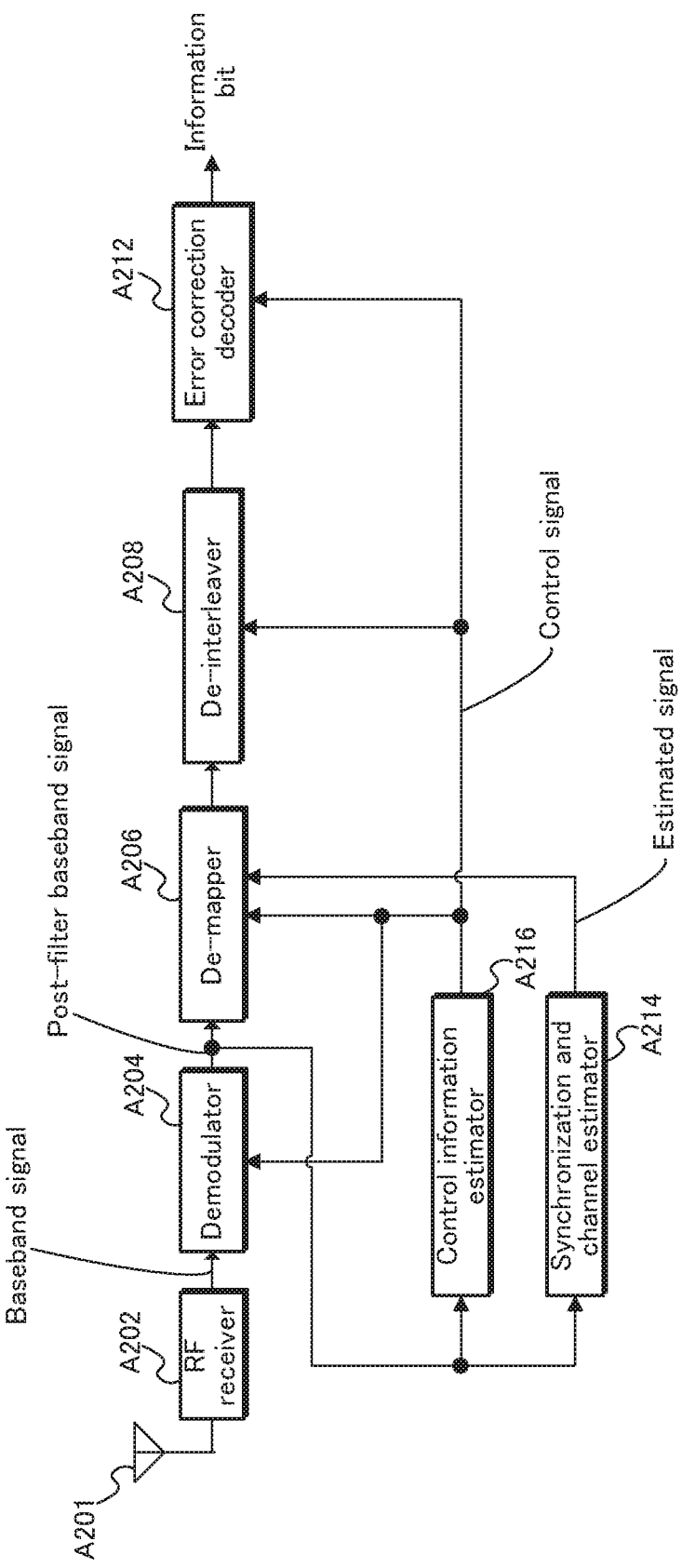
FIG. 40 illustrates an example configuration of a receive apparatus.

A receive apparatus (terminal) A200 of FIG. 40 receives, via an antenna A201, a radio signal transmitted by the transmit station of FIG. 39 and relayed by a satellite (repeater station). A relationship between the transmit station, repeated station, and receive apparatus (terminal) is described in the next embodiment.

An RF receiver A202 performs processing such as frequency conversion and quadrature demodulation on a received radio signal, and outputs a baseband signal.

A demodulator A204 performs processing such as root roll-off filter processing, and outputs a post-filter baseband signal.

A synchronization and channel estimator A214 receives a post-filter baseband signal as input, performs time synchronization, frequency synchronization, and channel estimation, using, for example, a "synchronization symbol group"

and "pilot symbol group" transmitted by the transmit apparatus, and outputs an estimated signal.

A control information estimator A216 receives a post-filter baseband signal as input, extracts symbols including control information such as a "TMCC information symbol group", performs demodulation and decoding, and outputs a control signal. Of importance to the present embodiment is that a symbol transmitting "transmission mode/slot information" of a "TMCC information symbol group" is demodulated and decoded by the receive apparatus A200. Thus, the control information estimator A216 generates information specifying a coding rate and ring ratio from values of four bits (four bits of control information related to ring ratio) decoded based on a table identical to Table 14 stored at the receive apparatus A200, and outputs the information as a portion of a control signal.

A de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value instead of an LLR may be outputted.) A de-interleaver A208 receives log-likelihood ratios and control signal as input, accumulates input, performs de-interleaving (permutes data) corresponding to interleaving used by the transmit apparatus, and outputs a post-de-interleaving log-likelihood ratio.

An error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the receive apparatus may perform iterative detection as described for the receiver apparatus of FIG. 2.

Embodiment B

The present embodiment describes a scheme that can select a ring ratio of (12,4)16APSK for each channel even when a coding rate of error correction code is set to a given value (for example, coding rate set as K). In the following, (12,4)16APSK is described as a modulation scheme that selects ring ratios, but modulation schemes that select ring ratios are not limited to (12,4)16APSK. Thus, by setting a suitable ring ratio for each channel, a receive apparatus can achieve high data reception quality.

Figure 41:
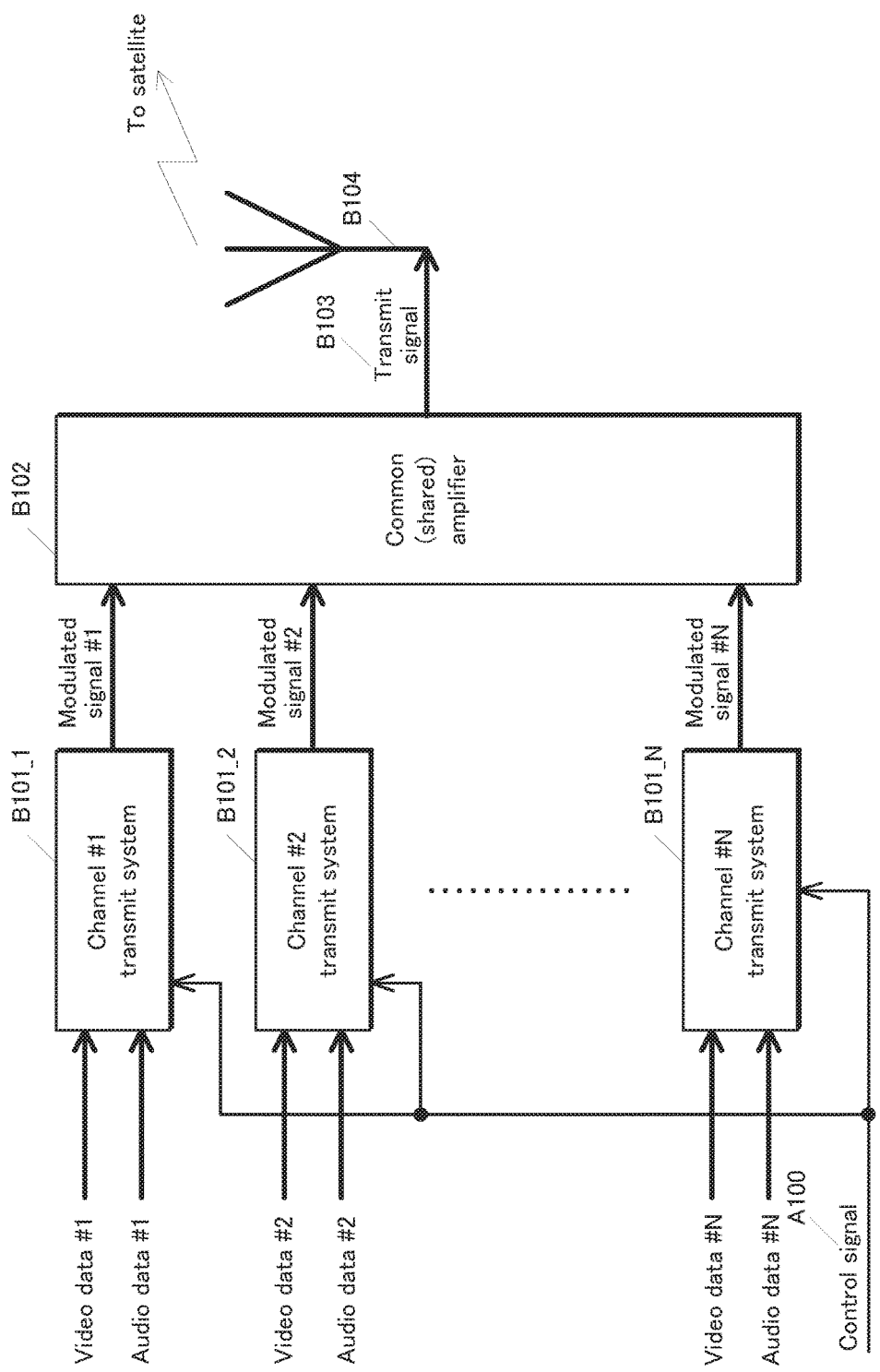
FIG. 41 illustrates an example configuration of a transmit station.
Figure 42:
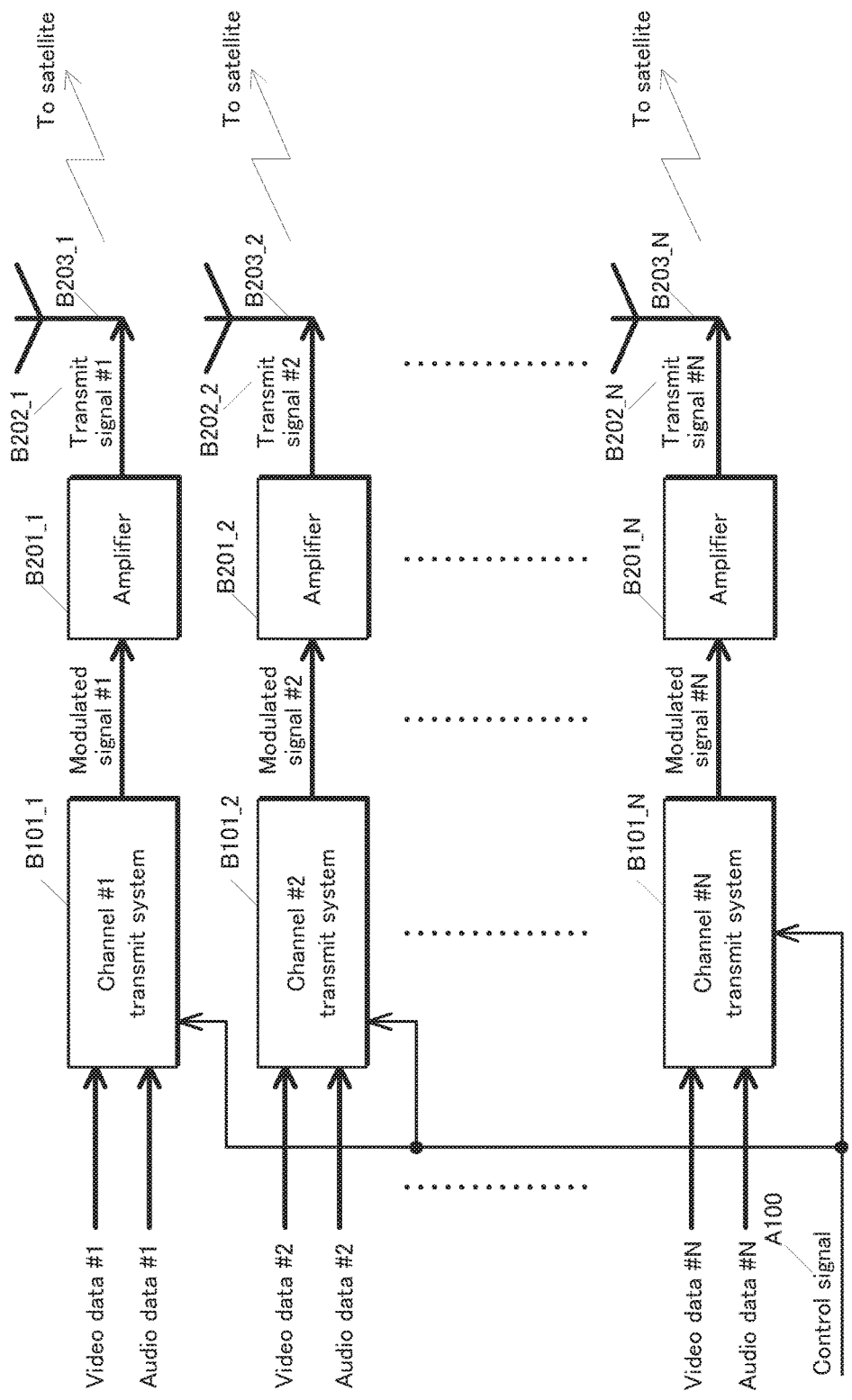
FIG. 42 illustrates an example configuration of a transmit station.
Figure 43:
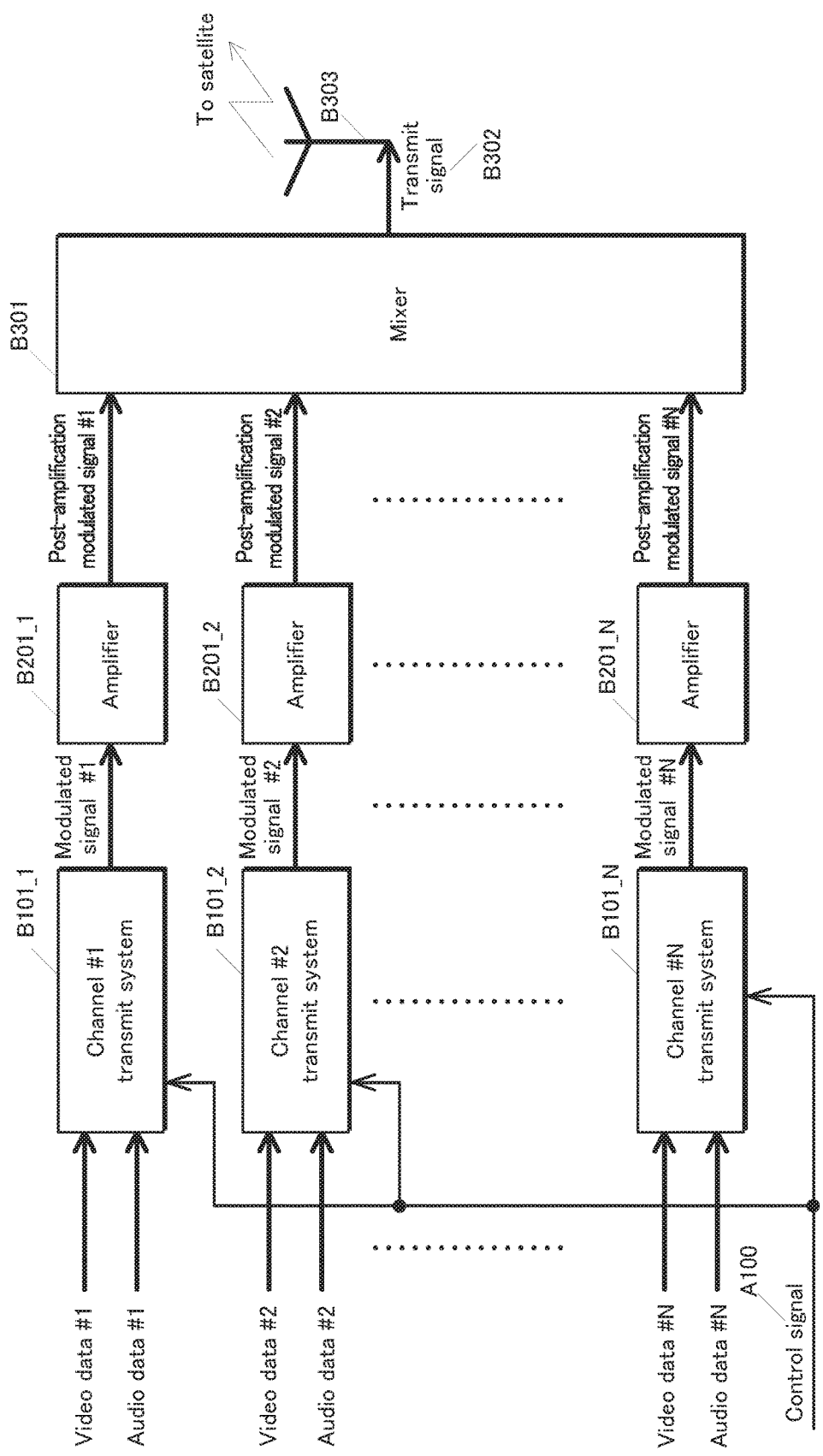
FIG. 43 illustrates an example configuration of a transmit station.
Figure 44:
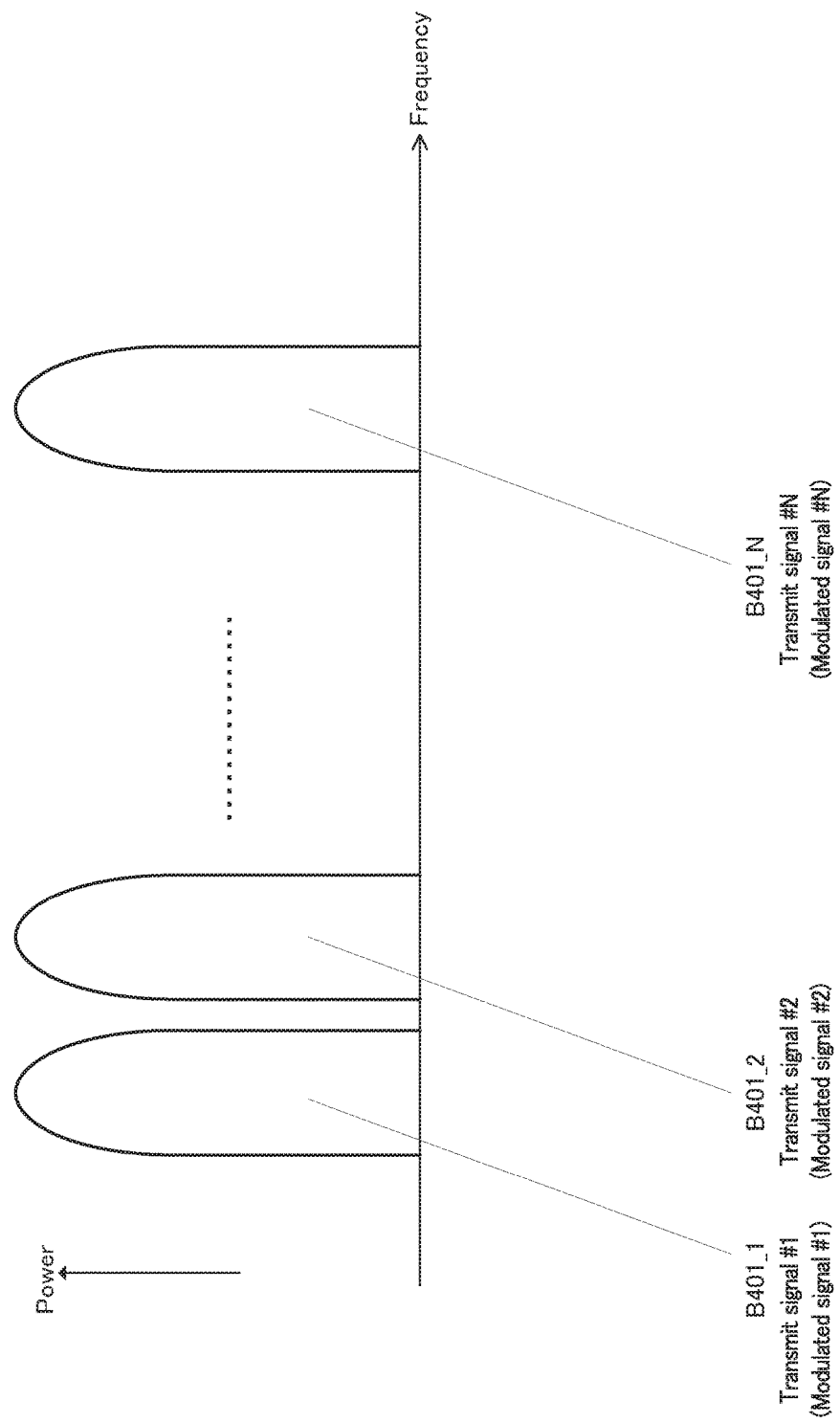
FIG. 44 illustrates an example of frequency allocation of signals.
Figure 45:
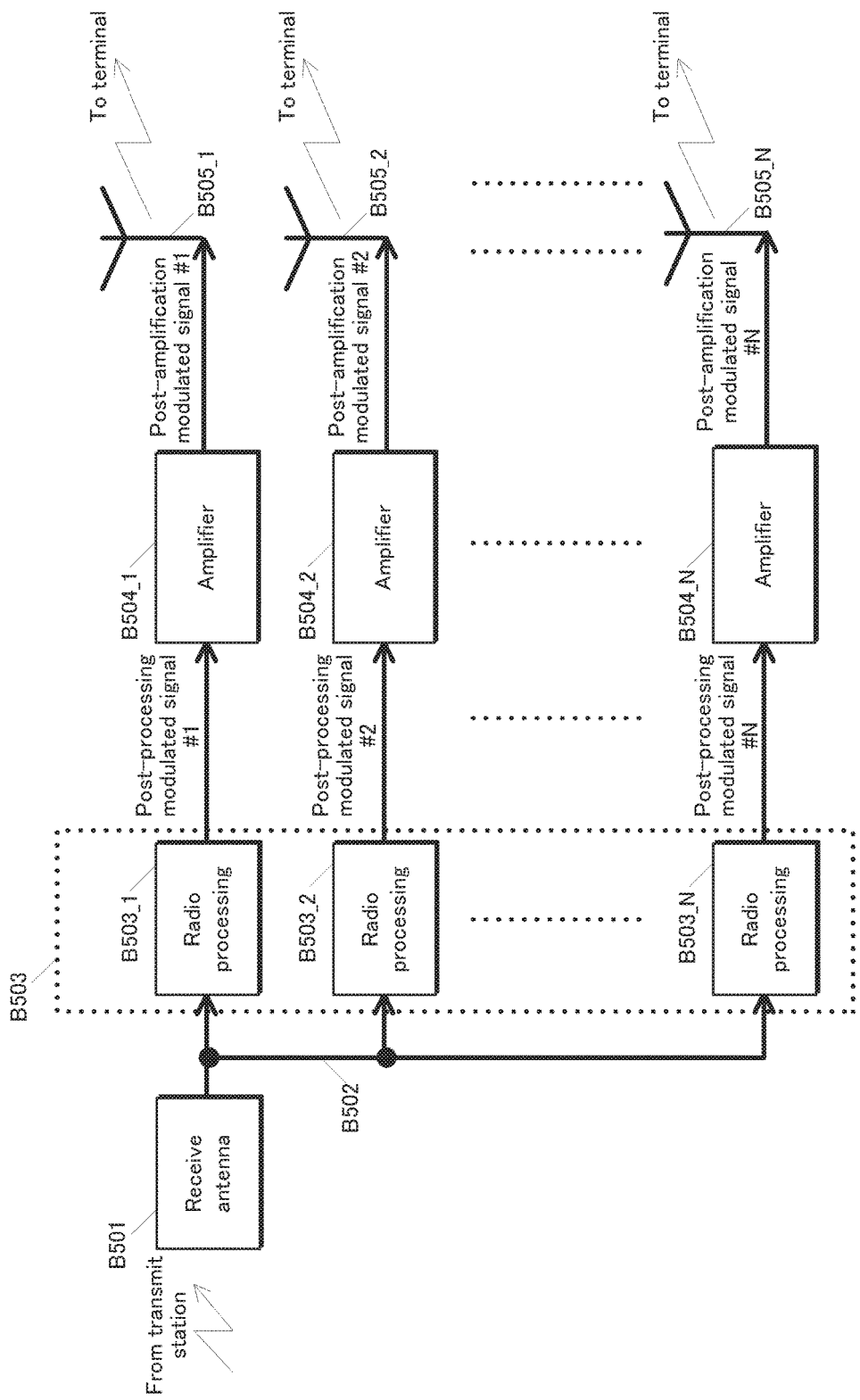
FIG. 45 illustrates an example configuration of a satellite.
Figure 46:
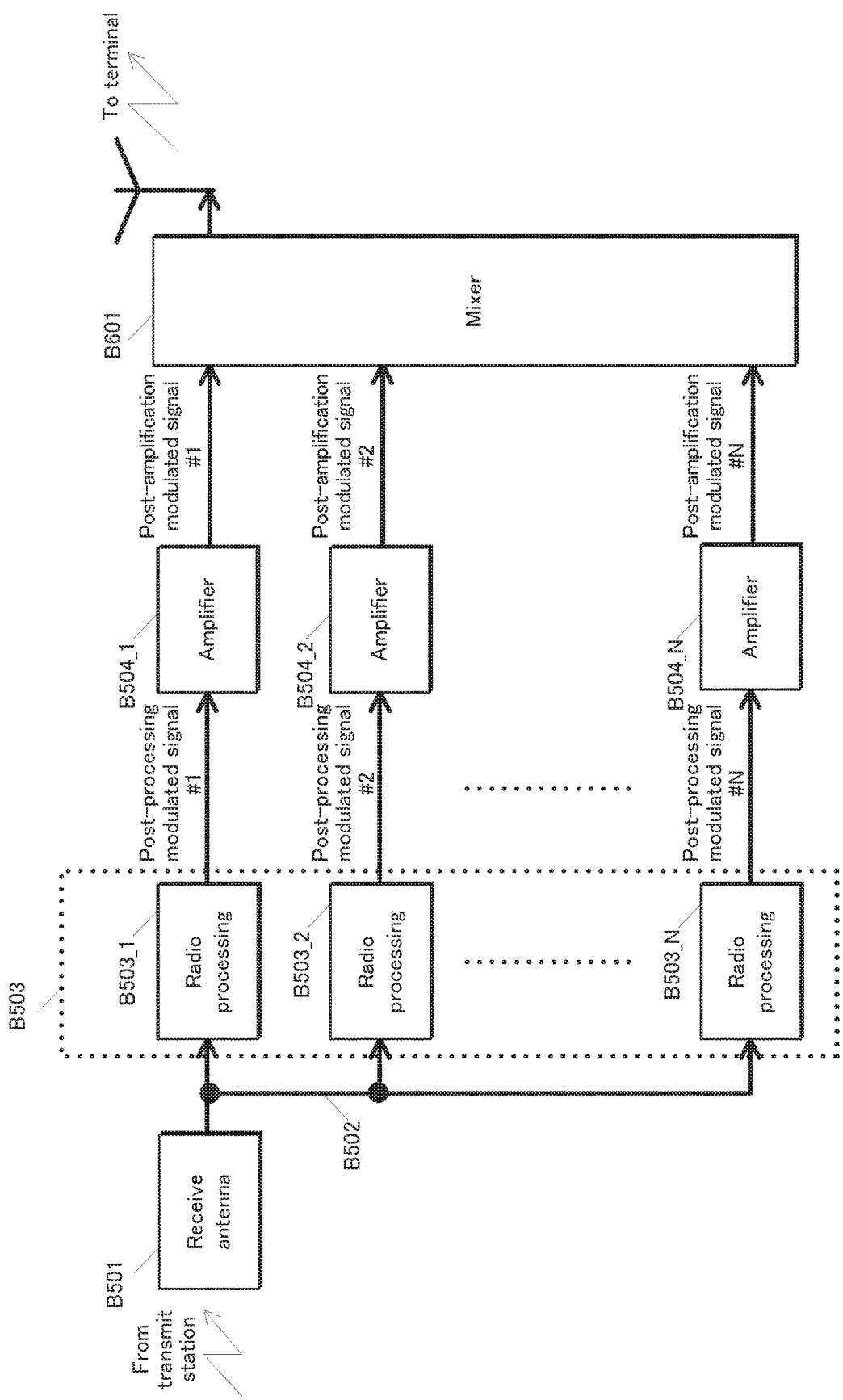
FIG. 46 illustrates an example configuration of a satellite.

FIG. 41 to FIG. 43 illustrate a terrestrial transmit station transmitting a transmit signal towards a satellite. FIG. 44 illustrates frequency allocation of each modulated signal. FIG. 45 and FIG. 46 illustrate examples of satellites (repeaters) that receive a signal transmitted by a terrestrial transmit station and transmit a modulated signal towards a terrestrial receive terminal.

Note that ring ratio (for example, (12,4)16APSK ring ratio) has been defined prior to the present embodiment, and ring ratio may also be referred to as "radius ratio".

<Transmit Station>

FIG. 41 illustrates an example of a transmit station having a common (shared) amplifier.

N transmit systems B101_1 to B101_N of FIG. 41 each receive video data, audio data, and the control signal A100 as input.

The control signal A100 specifies code length of error correction code, coding rate, modulation scheme, and ring ratio for each channel. This modulation scheme is, for example, specified as (12,4)16APSK.

Transmit systems B101_1 to B101_N generate modulated signals according to the control signal A100.

A common (shared) amplifier B102 receives modulated signals #1 to #N as input, amplifies the modulated signals, and outputs a post-amplification transmit signal B103 including the modulated signals #1 to #N.

The transmit signal B103 is composed of a signal of N channels of modulated signals #1 to #N and includes a "TMCC information symbol group" for each channel (each modulated signal). These "TMCC information symbol groups" include ring ratio information in addition to code length of error correction code, coding rate and modulation scheme.

Specifically, modulated signal #1 includes "TMCC information symbol group" in modulated signal #1 (channel #1), modulated signal #2 includes "TMCC information symbol group" in modulated signal #2 (channel #2), . . . , modulated signal #N includes "TMCC information symbol group" in modulated signal #N (channel #N).

Transmit signal B103 is transmitted via antenna B104.

FIG. 42 illustrates an example of a transmit station having an amplifier for each transmit system channel.

N amplifiers B201_1 to B201_N amplify a modulated signal inputted thereto, and output transmit signals B202_1 to B202_N. Transmit signals B202_1 to B202_N are transmitted via antennas B203_1 to B203_N.

The transmit station of FIG. 43 is an example of a transmit station that has an amplifier for each transmit system channel, but transmits after mixing by a mixer.

A mixer B301 mixes post-amplification modulated signals outputted from the amplifiers B201_1 to B201_N, and transmits a post-mixing transmit signal B302 via an antenna B303.

<Frequency Allocation of Each Modulated Signal>

FIG. 44 illustrates an example of frequency allocation of signals (transmit signals or modulated signals) B401_1 to B401_N. In FIG. 44, the horizontal axis is frequency and the vertical axis is power. As illustrated in FIG. 44, B401_1 indicates a position on a frequency axis of transmit signal #1 (modulated signal #1) in FIG. 41, FIG. 42, and FIG. 43; B401_2 indicates a position on the frequency axis of transmit signal #2 (modulated signal #2) in FIG. 41, FIG. 42, and FIG. 43; . . . ; and B401_N indicates a position on the frequency axis of transmit signal #N (modulated signal #N) in FIG. 41, FIG. 42, and FIG. 43.

<Satellite>

Referring to the satellite of FIG. 45, a receive antenna B501 receives a signal transmitted by a transmit station, and outputs a receive signal B502. Here, the receive signal B502 includes components of modulated signal #1 to modulated signal #N in FIG. 41, FIG. 42, FIG. 43, and FIG. 44.

B503 in FIG. 45 is a radio processor. The radio processor B503 includes radio processing B503_1 to B503_N.

Radio processing B503_1 receives the receive signal B502 as input, performs signal processing such as amplification and frequency conversion with respect to components of modulated signal #1 in FIG. 41, FIG. 42, FIG. 43, and FIG. 44, and outputs a post-signal processing modulated signal #1.

Likewise, radio processing B503_2 receives the receive signal B502 as input, performs signal processing such as amplification and frequency conversion with respect to components of modulated signal #2 in FIG. 41, FIG. 42, FIG. 43, and FIG. 44, and outputs a post-signal processing modulated signal #2.

. . .

Likewise, radio processing B503_N receives the receive signal B502 as input, performs signal processing such as amplification and frequency conversion with respect to components of modulated signal #N in FIG. 41, FIG. 42, FIG. 43, and FIG. 44, and outputs a post-signal processing modulated signal #N.

An amplifier B504_1 receives the post-signal processing modulated signal #1 as input, amplifies the post-signal processing modulated signal #1, and outputs a post-amplification modulated signal #1.

An amplifier B504_2 receives the post-signal processing modulated signal #2 as input, amplifies the post-signal processing modulated signal #2, and outputs a post-amplification modulated signal #2.

. . .

An amplifier B504_N receives the post-signal processing modulated signal #N as input, amplifies the post-signal processing modulated signal #N, and outputs a post-amplification modulated signal #N.

Thus, each post-amplification modulated signal is transmitted via a respective one of antennas B505_1 to B505_N. (A transmitted modulated signal is received by a terrestrial terminal.)

Here, frequency allocation of signals transmitted by a satellite (repeater) is described with reference to FIG. 44.

As previously described, referring to FIG. 44, B401_1 indicates a position on the frequency axis of transmit signal #1 (modulated signal #1) in FIG. 41, FIG. 42, and FIG. 43; B401_2 indicates a position on the frequency axis of transmit signal #2 (modulated signal #2) in FIG. 41, FIG. 42, and FIG. 43; . . . ; and B401_N indicates a position on the frequency axis of transmit signal #N (modulated signal #N) in FIG. 41, FIG. 42, and FIG. 43. Here, a frequency band being used is assumed to be α GHz.

Referring to FIG. 44, B401_1 indicates a position on the frequency axis of modulated signal #1 transmitted by the satellite (repeater) in FIG. 45; B401_2 indicates a position on the frequency axis of modulated signal #2 transmitted by the satellite (repeater) in FIG. 45; . . . ; and B401_N indicates a position on the frequency axis of modulated signal #N transmitted by the satellite (repeater) in FIG. 45. Here, a frequency band being used is assumed to be β GHz.

A satellite in FIG. 46 is different from the satellite in FIG. 45 in that a signal is transmitted after mixing at a mixer B601. Thus, the mixer B601 receives a post-amplification modulated signal #1, a post-amplification modulated signal #2, . . . , a post-amplification modulated signal #N as input, and generates a post-mixing modulated signal. Here, the post-mixing modulated signal includes a modulated signal #1 component, a modulated signal #2 component, . . . , and a modulated signal #N component, frequency allocation is as in FIG. 44, and is a signal in β GHz.

<Ring Ratio Selection>

Referring to the satellite systems described in FIG. 41 to FIG. 46, (12,4)16APSK ring ratio (radius ratio) is described as being selected for each channel from channel #1 to channel #N.

For example, when a code length (block length) of error correction code is X bits, among a plurality of selectable coding rates, a coding rate A (for example, 3/4) is selected.

Referring to the satellite systems in FIG. 45 and FIG. 46, when distortion of the amplifiers B504_1, B504_2, . . . , B504_N is low (linearity of input and output is high), even when a ring ratio (radius ratio) of (12,4)16APSK is uniquely defined, as long as a suitable value is determined a (terrestrial) terminal (receive apparatus) can achieve high data reception quality.

In satellite systems, amplifiers that can achieve high output are used in order to transmit modulated signals to terrestrial terminals. Thus, high-distortion amplifiers (linearity of input and output is low) are used, and the likelihood of distortion varying between amplifiers is high (distortion properties (input/output properties) of the amplifiers B504_1, B504_2, . . . , B504_N are different).

In this case, use of suitable (12,4)16APSK ring ratios (radius ratios) for each amplifier, i.e., selecting a suitable (12,4)16APSK ring ratio (radius ratio) for each channel, enables high data reception quality for each channel at a terminal. The transmit stations in FIG. 41, FIG. 42, and FIG. 43 perform this kind of setting by using the control signal A100.

Accordingly, information related to (12,4)16APSK ring ratios is included in, for example, control information such as TMCC that is included in each modulated signal (each channel). (This point is described in the previous embodiment.)

Accordingly, when the (terrestrial) transmit station in FIG. 41, FIG. 42, and FIG. 43 uses (12,4)16APSK as a modulation scheme of a data symbol of modulated signal #1, ring ratio information of the (12,4)16APSK is transmitted as a portion of control information.

Likewise, when the (terrestrial) transmit station in FIG. 41, FIG. 42, and FIG. 43 uses (12,4)16APSK as a modulation scheme of a data symbol of modulated signal #2, ring ratio information of the (12,4)16APSK is transmitted as a portion of control information.

. . .

Likewise, when the (terrestrial) transmit station in FIG. 41, FIG. 42, and FIG. 43 uses (12,4)16APSK as a modulation scheme of a data symbol of modulated signal #N, ring ratio information of the (12,4)16APSK is transmitted as a portion of control information.

A coding rate of error correction code used in modulated signal #1, a coding rate of error correction code used in modulated signal #2, . . . , and a coding rate of error correction code used in modulated signal #N may be identical.

<Receive Apparatus>

A receive apparatus is described that corresponds to the transmission method of the present embodiment.

The receive apparatus (terminal) A200 of FIG. 40 receives, via the antenna A201, a radio signal transmitted by the transmit station in FIG. 41 and FIG. 42 and relayed by a satellite (repeater station). The RF receiver A202 performs processing such as frequency conversion and quadrature demodulation on a received radio signal, and outputs a baseband signal.

The demodulator A204 performs processing such as root roll-off filter processing, and outputs a post-filter baseband signal.

The synchronization and channel estimator A214 receives a post-filter baseband signal as input, performs time synchronization, frequency synchronization, and channel estimation, using, for example, a "synchronization symbol group" and "pilot symbol group" transmitted by the transmit apparatus, and outputs an estimated signal.

The control information estimator A216 receives a post-filter baseband signal as input, extracts symbols including control information such as a "TMCC information symbol group", performs demodulation and decoding, and outputs a control signal. Of importance to the present embodiment is that a symbol transmitting "TMCC information symbol group" information is demodulated and decoded by the receive apparatus A200. Thus, the control information estimator A216 generates information specifying a code length of error correction code, coding rate, modulation scheme, and ring ratio per channel, from values decoded at the receive apparatus A200, and outputs the information as a portion of a control signal.

The de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value may be outputted instead of an LLR.)

The de-interleaver A208 receives log-likelihood ratios and a control signal as input, accumulates input, performs de-interleaving (permutes data) corresponding to interleaving used by the transmit apparatus, and outputs a post-de-interleaving log-likelihood ratio.

The error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the receive apparatus may perform iterative detection as described for the receiver apparatus of FIG. 2.

A method of generating ring ratio information included in control information is not limited to the embodiment described prior to the present embodiment, and information related to ring ratios may be transmitted by any means.

Embodiment C

The present embodiment describes signaling (method of transmitting control information) for notifying a terminal of a ring ratio (for example (12,4)16APSK ring ratio).

Note that ring ratio (for example, (12,4)16APSK ring ratio) has been defined prior to the present embodiment, and ring ratio may also be referred to as "radius ratio".

Signaling as above can be performed by using bits included in a "TMCC information symbol group" as described in the present description.

In the present embodiment, an example of configuring a "TMCC information symbol group" is based on *Transmission System for Advanced Wide Band Digital Satellite Broadcasting*, ARIB Standard STD-B44, Ver. 1.0 (Non-Patent Literature 2).

Information related to ring ratios for a transmit station to notify a terminal via a satellite (repeater) may accompany use of the 3614 bits of "extended information" within a "TMCC information symbol group" described with reference to FIG. 18. (This point is also disclosed in *Transmission System for Advanced Wide Band Digital Satellite Broadcasting*, ARIB Standard STD-B44, Ver. 1.0 (Non-Patent Literature 2).) This is illustrated in FIG. 47.

Figure 47:
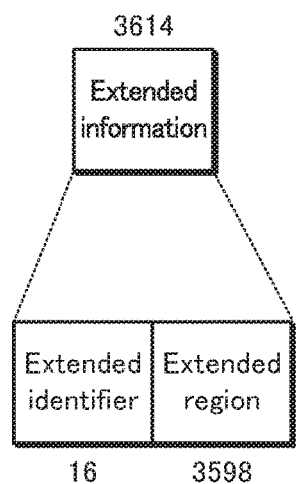
FIG. 47 illustrates an example configuration of extended information.

Extended information in FIG. 47 is a field used for conventional TMCC extended information, and is composed of 16 bits of an extended identifier and 3598 bits of an extended region. In "extended information" of TMCC in FIG. 47, when "scheme A" is applied, the extended identifier is all "0" (all 16 bits are zero) and the 3598 bits of the extended region are "1".

Further, when "scheme B" is applied, bits of the extended identifier have values other than all "0", i.e., values other than "0000000000000000", as TMCC information is extended. Whether scheme A or scheme B is applied may for example be determined by user settings.

"Scheme A" is a transmission scheme (for example, satellite digital broadcast) that determines a ring ratio when a coding rate of error correction code is set to a given value. (Ring ratio is uniquely determined when a coding rate of error correction code to be used is determined.)

"Scheme B" is a transmission scheme (for example, satellite digital broadcast) that can select a ring ratio to use from a plurality of ring ratios each time a coding rate of error correction code is set to a given value.

The following describes examples of signaling performed by a transmit station, with reference to FIG. 48 to FIG. 52, but in all the examples the following bits are used in signaling.

$d_0$: Indicates a scheme of satellite broadcasting.

$c_0c_1c_2c_3$: Indicate a table.

$b_0b_1b_2b_3$: Indicate coding rate (may also indicate ring ratio).

$x_0x_1x_2x_3x_4x_5$: Indicate ring ratio.

$y_0y_1y_2y_3y_4y_5$: Indicate difference of ring ratio.

Detailed description of the above bits is provided later.

The "coding rate" illustrated in FIG. 48, FIG. 49, FIG. 50, FIG. 51, and FIG. 52 is coding rate of error correction code, and although values of 41/120, 49/120, 61/120, and 109/120 are specifically illustrated, these value may be approximated as 41/120≈1/3, 49/120≈2/5, 61/120≈1/2, and 109/120≈9/10.

The following describes <Example 1> to <Example 5>.

Referring to extended information in FIG. 47, "scheme A" is selected when all bits of the extended identifier are "0" (all 16 bits are zero) and all 3598 bits of the extended region are "1".

First, a case is described in which a transmit apparatus (transmit station) transmits a modulated signal using "scheme A".

When a transmit apparatus (transmit station) selects (12, 4)16APSK as a modulation scheme, a relationship between coding rate of error correction code and ring ratio of (12,4)16APSK is as follows.

TABLE 15

Relationship between coding rate and (12,4)16APSK ring ratio (radius ratio) when "scheme A" is selected.

| Coding rate (approximate value) | Ring ratio |
|---|---|
| 41/120 (⅓) | 3.09 |
| 49/120 (⅖) | 2.97 |
| 61/120 (½) | 3.93 |
| 73/120 (⅗) | 2.87 |

TABLE 15-continued

Relationship between coding rate and (12,4)16APSK ring ratio
(radius ratio) when "scheme A" is selected.

| Coding rate (approximate value) | Ring ratio |
|---|---|
| 81/120 (2/3) | 2.92 |
| 89/120 (3/4) | 2.97 |
| 97/120 (4/5) | 2.73 |
| 101/120 (5/6) | 2.67 |
| 105/120 (7/8) | 2.76 |
| 109/120 (9/10) | 2.69 |

Accordingly, setting all bits of TMCC extended identifier to "0" (all 16 bits are zero) and setting all 3598 bits of TMCC extended region to "1" (a transmit apparatus transmits these values) enables a receive apparatus to determine that "scheme A" is selected, and further, coding rate information of error correction code is transmitted as a portion of TMCC. A receive apparatus can determine a (12,4)16APSK ring ratio from this information when (12,4)16APSK is used as a modulation scheme.

Specifically, $b_0$, $b_1$, $b_2$, and $b_3$ are used as described above. A relationship between $b_0$ $b_1$, $b_2$, $b_3$, and coding rate of error correction code is as follows.

TABLE 16

Relationship between $b_1$, $b_2$, $b_3$,
$b_4$ and coding rate of error correction code

| $b_0b_1b_2b_3$ | Coding rate (approximate value) |
|---|---|
| 0000 | 41/120 (1/3) |
| 0001 | 49/120 (2/5) |
| 0010 | 61/120 (1/2) |
| 0011 | 73/120 (3/5) |
| 0100 | 81/120 (2/3) |
| 0101 | 89/120 (3/4) |
| 0110 | 97/120 (4/5) |
| 0111 | 101/120 (5/6) |
| 1000 | 105/120 (7/8) |
| 1001 | 109/120 (9/10) |

As in Table 16, when a transmit apparatus (transmit station) uses 41/120 as a coding rate of error correction code, $(b_0b_1b_2b_3)=(0000)$. Further, when 49/120 is used as a coding rate of error correction code, $(b_0b_1b_2b_3)=(0001)$, . . . , when 109/120 is used as a coding rate of error correction code, $(b_0b_1b_2b_3)=(1001)$. As a portion of TMCC, $b_0$, $b_1$, $b_2$, and $b_3$ are transmitted.

Accordingly, the following table can be made.

TABLE 17

Relationship between $b_0$, $b_1$, $b_2$, $b_3$, coding
rate of error correction code, and ring ratio

| $b_0b_1b_2b_3$ | Coding rate (approximate value) | Ring ratio |
|---|---|---|
| 0000 | 41/120 (1/3) | 3.09 |
| 0001 | 49/120 (2/5) | 2.97 |
| 0010 | 61/120 (1/2) | 3.93 |
| 0011 | 73/120 (3/5) | 2.87 |
| 0100 | 81/120 (2/3) | 2.92 |
| 0101 | 89/120 (3/4) | 2.97 |
| 0110 | 97/120 (4/5) | 2.73 |
| 0111 | 101/120 (5/6) | 2.67 |
| 1000 | 105/120 (7/8) | 2.76 |
| 1001 | 109/120 (9/10) | 2.69 |

As can be seen from Table 17:

When a transmit apparatus (transmit station) is set to $(b_0b_1b_2b_3)=(0000)$, a coding rate of error correction code is 41/120, and when (12,4)16APSK is used, a ring ratio (radius ratio) is 3.09.

When a transmit apparatus (transmit station) is set to $(b_0b_1b_2b_3)=(0001)$, a coding rate of error correction code is 49/120, and when (12,4)16APSK is used, a ring ratio (radius ratio) is 2.97.

When a transmit apparatus (transmit station) is set to $(b_0b_1b_2b_3)=(0010)$, a coding rate of error correction code is 61/120, and when (12,4)16APSK is used, a ring ratio (radius ratio) is 3.93.

When a transmit apparatus (transmit station) is set to $(b_0b_1b_2b_3)=(0011)$, a coding rate of error correction code is 73/120, and when (12,4)16APSK is used, a ring ratio (radius ratio) is 2.87.

When a transmit apparatus (transmit station) is set to $(b_0b_1b_2b_3)=(0100)$, a coding rate of error correction code is 81/120, and when (12,4)16APSK is used, a ring ratio (radius ratio) is 2.92.

When a transmit apparatus (transmit station) is set to $(b_0b_1b_2b_3)=(0101)$, a coding rate of error correction code is 89/120, and when (12,4)16APSK is used, a ring ratio (radius ratio) is 2.97.

When a transmit apparatus (transmit station) is set to $(b_0b_1b_2b_3)=(0110)$, a coding rate of error correction code is 97/120, and when (12,4)16APSK is used, a ring ratio (radius ratio) is 2.73.

When a transmit apparatus (transmit station) is set to $(b_0b_1b_2b_3)=(0111)$, a coding rate of error correction code is 101/120, and when (12,4)16APSK is used, a ring ratio (radius ratio) is 2.67.

When a transmit apparatus (transmit station) is set to $(b_0b_1b_2b_3)=(1000)$, a coding rate of error correction code is 105/120, and when (12,4)16APSK is used, a ring ratio (radius ratio) is 2.76.

When a transmit apparatus (transmit station) is set to $(b_0b_1b_2b_3)=(1001)$, a coding rate of error correction code is 109/120, and when (12,4)16APSK is used, a ring ratio (radius ratio) is 2.69.

Accordingly, a transmit apparatus (transmit station) implements:

Setting all bits of TMCC extended information to "0" (all 16 bits are zero) and all 3598 bits of TMCC extended region to "1", in order to notify a receive apparatus that "scheme A" is being used.

Transmitting $b_0b_1b_2b_3$ in order that coding rate of error correction code and (12,4)16APSK can be estimated.

The following describes a case in which a transmit apparatus (of a transmit station) transmits data using "scheme B".

As described above, when "scheme B" is applied, bits of the extended identifier have values other than all "0", i.e., values other than "0000000000000000", as TMCC information is extended. Here, as an example, when "0000000000000001" is transmitted as an extended identifier, a transmit apparatus (of a transmit station) transmits data using "scheme B".

When the 16 bits of an extended identifier are represented as $d_{15}$, $d_{14}$, $d_{13}$, $d_{12}$, $d_{11}$, $d_{10}$, $d_9$, $d_8$, $d_7$, $d_6$, $d_5$, $d_4$, $d_3$, $d_2$, $d_1$, $d_0$, in a case in which "scheme B" is applied, ($d_{15}$, $d_{14}$, $d_{13}$, $d_{12}$, $d_{11}$, $d_{10}$, $d_9$, $d_8$, $d_7$, $d_6$, $d_5$, $d_4$, $d_3$, $d_2$, $d_1$, $d_0$)=(0, 0, 0, 0, 0, 0, 0, 0, 0, 0, 0, 0, 0, 0, 0, 1). (When "scheme B" is applied as described above it suffices that ($d_{15}$, $d_{14}$, $d_{13}$, $d_{12}$, $d_{11}$, $d_{10}$, $d_9$, $d_8$, $d_7$, $d_6$, $d_5$, $d_4$, $d_3$, $d_2$, $d_1$, $d_0$) are set to values other than (0, 0, 0, 0, 0, 0, 0, 0, 0, 0, 0, 0, 0, 0, 0, 0), and are therefore not limited to the example of ($d_{15}$, $d_{14}$, $d_{13}$, $d_{12}$, $d_{11}$, $d_{10}$, $d_9$, $d_8$, $d_7$, $d_6$, $d_5$, $d_4$, $d_3$, $d_2$, $d_1$, $d_0$)=(0, 0, 0, 0, 0, 0, 0, 0, 0, 0, 0, 0, 0, 0, 0, 1).)

As specific examples, <Example 1> to <Example 5> are described below.

Example 1

In example 1, a plurality of ring ratios are prepared in a table of (12,4)16APSK ring ratios, and therefore different ring ratios can be set for one coding rate.

As an example a case is described in which "satellite broadcasting scheme: "scheme B", coding rate: 41/120, and (12,4)16APSK ring ratio: 4.00" are set. (Note that it is assumed that (12,4)16APSK is selected as a modulation scheme.)

As illustrated in FIG. 48, table 1, table 2, . . . , table 16, in other words 16 tables, table 1 to table 16, are prepared.

Each table associates ($b_0 b_1 b_2 b_3$) values as described above, coding rates of error correction codes, and (12,4)16APSK ring ratios with each other.

For example, in table 1, when a coding rate of error correction code for generating a data symbol is 41/120 and a (12,4)16APSK ring ratio is 3.09, ($b_0 b_1 b_2 b_3$)=(0000). In the same way, when a coding rate of error correction code for generating a data symbol is 49/120 and a (12,4)16APSK ring ratio is 2.97, ($b_0 b_1 b_2 b_3$)=(0001) . . . . When a coding rate of error correction code for generating a data symbol is 109/120 and a (12,4)16APSK ring ratio is 3.09, ($b_0 b_1 b_2 b_3$)=(1001).

In table 2, when a coding rate of error correction code for generating a data symbol is 41/120 and a (12,4)16APSK ring ratio is 4.00, ($b_0 b_1 b_2 b_3$)=(0000). In the same way, when a coding rate of error correction code for generating a data symbol is 49/120 and a (12,4)16APSK ring ratio is 3.91, ($b_0 b_1 b_2 b_3$)=(0001) . . . . When a coding rate of error correction code for generating a data symbol is 109/120 and a (12,4)16APSK ring ratio is 3.60, ($b_0 b_1 b_2 b_3$)(1001). . . .

In table 16, when a coding rate of error correction code for generating a data symbol is 41/120 and a (12,4)16APSK ring ratio is 2.59, ($b_0 b_1 b_2 b_3$)=(0000). In the same way, when a coding rate of error correction code for generating a data symbol is 49/120 and a (12,4)16APSK ring ratio is 2.50, ($b_0 b_1 b_2 b_3$)=(0001) . . . . When a coding rate of error correction code for generating a data symbol is 109/120 and a (12,4)16APSK ring ratio is 2.23, ($b_0 b_1 b_2 b_3$)(1001).

In table 1 to table 16, although not described above, $b_0 b_1 b_2 b_3$ values and (12,4)16APSK ring ratios are associated with each of coding rates of error correction code 41/120, 49/120, 61/120, 73/120, 81/120, 89/120, 97/120, 101/120, 105/120, and 109/120.

Further, as illustrated in FIG. 48, association between $c_0 c_1 c_2 c_3$ values and table selected is performed. When table 1 is selected, ($c_0, c_1, c_2, c_3$)=(0,0,0,0), when table 2 is selected, ($c_0, c_1, c_2, c_3$)=(0,0,0,1), . . . , and when table 16 is selected, ($c_0, c_1, c_2, c_3$)=(1,1,1,1).

The following describes a method of setting, for example, "satellite broadcasting scheme: "scheme B", coding rate: 41/120, and (12,4)16APSK ring ratio: 4.00".

First, as above, "scheme B" is selected so $d_0$="1" is set.

Further, as illustrated in FIG. 48, a first line of table 2 shows a coding rate 41/120 and a (12,4)16APSK ring ratio 4.00, and therefore $b_0 b_1 b_2 b_3$="0000".

Accordingly, a value $c_0 c_1 c_2 c_3$="0001" for indicating table 2 among 16 tables, table 1 to 16.

Accordingly, when a transmit apparatus (transmit station) transmits a data symbol when "satellite broadcasting scheme: "scheme B", coding rate: 41/120, and (12,4) 16APSK ring ratio: 4.00", the transmit apparatus transmits $d_0$="1", $b_0 b_1 b_2 b_3$="0000", and $c_0 c_1 c_2 c_3$="0001" control information (a portion of TMCC information) along with the data symbol. Note that, as control information, transmission is also required of control information indicating that a modulation scheme of the data symbol is (12,4)16APSK.

In other words, in <Example 1>:

A plurality of tables are prepared that associates $b_0 b_1 b_2 b_3$ values and (12,4)16APSK ring ratios with each of coding rates of error correction code 41/120, 49/120, 61/120, 73/120, 81/120, 89/120, 97/120, 101/120, 105/120, and 109/120.

$c_0 c_1 c_2 c_3$ indicates a used table and is transmitted by a transmit apparatus (transmit station).

Thus, a transmit apparatus transmits ring ratio information of (12,4)16APSK used to generate a data symbol.

A method of setting (12,4)16APSK ring ratios when a transmit apparatus (transmit station) uses "scheme A" is as described prior to the description of <Example 1>.

Example 2

Example 2 is a modification of <Example 1>.

Figure 49:
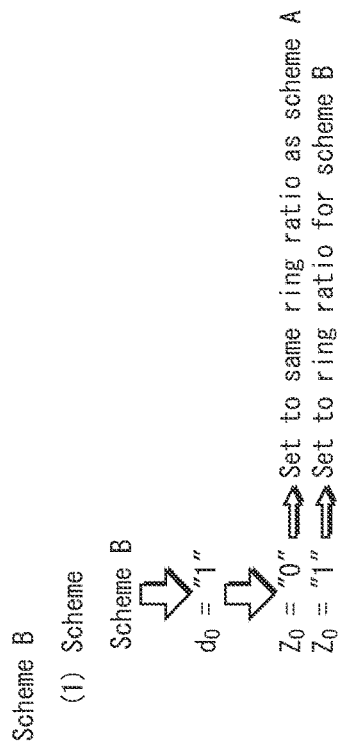
FIG. 49 illustrates an example of signaling.

The following describes a case in which a transmit apparatus (of a transmit station) selects "scheme B". Here, a transmit apparatus (transmit station) selects "scheme B", and therefore $d_0$="1" is set, as indicated in FIG. 49.

Subsequently, the transmit apparatus (transmit station) sets a value of $z_0$. When a (12,4)16APSK ring ratio is set by the same method as "scheme A", $z_0$=0 is set. When $z_0$=0 is set, a coding rate of error correction code is determined from $b_0$, $b_1$, $b_2$, $b_3$ in table 16 and (12,4)16APSK ring ratio is determined from table 15. (See Table 17)

When a (12,4)16APSK ring ratio is set by the same method as in Example 1, $z_0$=11 is set. Thus, (12,4)16APSK ring ratio is not determined based on table 15, but is determined in the way described in Example 1.

As an example a case is described in which "satellite broadcasting scheme: "scheme B", coding rate: 41/120, and (12,4)16APSK ring ratio: 4.00" are set. (Note that it is assumed that (12,4)16APSK is selected as a modulation scheme and $z_0$=1.)

As illustrated in FIG. 49, table 1, table 2, . . . , table 16, in other words 16 tables, table 1 to table 16, are prepared.

Each table associates ($b_0 b_1 b_2 b_3$) values as described above, coding rates of error correction code, and (12,4)16APSK ring ratios with each other.

For example, in table 1, when a coding rate of error correction code for generating a data symbol is 41/120 and a (12,4)16APSK ring ratio is 3.09, ($b_0 b_1 b_2 b_3$)=(0000). In the same way, when a coding rate of error correction code for generating a data symbol is 49/120 and a (12,4)16APSK ring ratio is 2.97, ($b_0 b_1 b_2 b_3$)(0001) . . . . When a coding rate of error correction code for generating a data symbol is 109/120 and a (12,4)16APSK ring ratio is 3.09, $(b_0b_1b_2b_3)$=(1001).

In table 2, when a coding rate of error correction code for generating a data symbol is 41/120 and a (12,4)16APSK ring ratio is 4.00, $(b_0b_1b_2b_3)$=(0000). In the same way, when a coding rate of error correction code for generating a data symbol is 49/120 and a (12,4)16APSK ring ratio is 3.91, $(b_0b_1b_2b_3)$=(0001) . . . . When a coding rate of error correction code for generating a data symbol is 109/120 and a (12,4)16APSK ring ratio is 3.60, $(b_0b_1b_2b_3)$(1001).

. . .

In table 16, when a coding rate of error correction code for generating a data symbol is 41/120 and a (12,4)16APSK ring ratio is 2.59, $(b_0b_1b_2b_3)$=(0000). In the same way, when a coding rate of error correction code for generating a data symbol is 49/120 and a (12,4)16APSK ring ratio is 2.50, $(b_0b_1b_2b_3)$=(0001) . . . . When a coding rate of error correction code for generating a data symbol is 109/120 and a (12,4)12APSK ring ratio is 2.23, $(b_0b_1b_2b_3)$(1001).

In table 1 to table 16, although not described above, $b_0b_1b_2b_3$ values and (12,4)16APSK ring ratios are associated with each of coding rates of error correction code 41/120, 49/120, 61/120, 73/120, 81/120, 89/120, 97/120, 101/120, 105/120, and 109/120.

Further, as illustrated in FIG. 49, association between $c_0c_1c_2c_3$ values and table selected is performed. When table 1 is selected, $(c_0,c_1,c_2,c_3)$=(0,0,0,0), when table 2 is selected, $(c_0,c_1,c_2,c_3)$=(0,0,0,1), . . . , and when table 16 is selected, $(c_0,c_1,c_2,c_3)$=(1,1,1,1).

The following describes a method of setting, for example, "satellite broadcasting scheme: "scheme B", coding rate: 41/120, and (12,4)16APSK ring ratio: 4.00".

First, as above, "scheme B" is selected so $d_0$-="1" is set. Further, $z_0$=11 is set.

Further, as illustrated in FIG. 49, a first line of table 2 shows a coding rate 41/120 and a (12,4)16APSK ring ratio 4.00, and therefore $b_0b_1b_2b_3$="0000".

Accordingly, a value $c_0c_1c_2c_3$="0001" for indicating table 2 among 16 tables, table 1 to 16.

Accordingly, when a transmit apparatus (transmit station) transmits a data symbol so that "satellite broadcasting scheme: "scheme B", coding rate: 41/120, and (12,4) 16APSK ring ratio: 4.00", the transmit apparatus transmits $d_0$="1", $z_0$=1, $b_0b_1b_2b_3$="0000", and $c_0c_1c_2c_3$="0001" control information (a portion of TMCC information) along with the data symbol. Note that, as control information, transmission is also required of control information indicating that a modulation scheme of the data symbol is (12,4) 16APSK.

A method of setting (12,4)16APSK ring ratios when a transmit apparatus (transmit station) uses "scheme A" is as described prior to the description of <Example 1>.

Example 3

Example 3 is characterized by signaling being performed by a value indicating ring ratio.

First, as in <Example 1> and <Example 2>, a transmit apparatus (transmit station) transmits a modulated signal by "scheme B", and therefore $d_0$-="1" is set.

Thus, as illustrated in FIG. 50, values of $x_0x_1x_2x_3x_4x_5$ and (12,4)16APSK ring ratios are associated with each other. For example, as illustrated in FIG. 50, when a transmit apparatus (transmit station) is set so that when $(x_0,x_1,x_2,x_3,x_4,x_5)$=(0,0,0,0,0,0), (12,4)16APSK ring ratio is set to 2.00, . . . , when $(x_0,x_1,x_2,x_3,x_4,x_5)$=(1,1,1,1,1,1), (12,4)16APSK ring ratio is set to 4.00.

As an example, the following describes a method of setting, for example, "satellite broadcasting scheme: "scheme B", and (12,4)16APSK ring ratio: 2.00".

In this example, a transmit apparatus (transmit station) sets $x_0,x_1,x_2,x_3,x_4,x_5$="000000" from "relationship between $x_0,x_1,x_2,x_3,x_4,x_5$ value and (12,4)16APSK ring ratio" in FIG. 50.

Accordingly, when a transmit apparatus (transmit station) transmits a data symbol so that "satellite broadcast scheme: "scheme B" and (12,4)16APSK ring ratio: 2.00", the transmit apparatus transmits $d_0$="1" and $x_0x_1x_2x_3x_4x_5$="000000" control information (a portion of TMCC information) along with the data symbol. Note that, as control information, transmission is also required of control information indicating that a modulation scheme of the data symbol is (12,4) 16APSK.

A method of setting (12,4)16APSK ring ratios when a transmit apparatus (transmit station) uses "scheme A" is as described prior to the description of <Example 1>.

Example 4

Example 4 implements signaling of a desired (12,4) 16APSK ring ratio by $b_0b_1b_2b_3$, indicating coding rate of error correction code and (12,4)16APSK ring ratio in a main table, and $y_0y_1y_2y_3y_4y_5$, indicating ring ratio difference.

An important point in Example 4 is that the main table illustrated in FIG. 51 is composed of the relationship between $b_0,b_1,b_2,b_3$, coding rate of error correction code, and ring ratio from Table 17, in other words "scheme A".

Further characterizing points of Example 4 are described below.

FIG. 51 illustrates a difference table. The difference table is a table for difference information from (12,4)16APSK ring ratios set using the main table. Based on the main table, a (12,4)16APSK ring ratio is, for example, set as h.

Thus, the following is true.

. . .

When a transmit apparatus (transmit station) sets $(y_0y_1y_2y_3y_4y_5)$=(011110), (12,4)16APSK ring ratio is set to h+0.4.

When a transmit apparatus (transmit station) sets $(y_0y_1y_2y_3y_4y_5)$=(011111), (12,4)16APSK ring ratio is set to h+0.2.

When a transmit apparatus (transmit station) sets $(y_0y_1y_2y_3y_4y_5)$=(100000), (12,4)16APSK ring ratio is set to h+0.

When a transmit apparatus (transmit station) sets $(y_0y_1y_2y_3y_4y_5)$=(100001), (12,4)16APSK ring ratio is set to h−0.2.

When a transmit apparatus (transmit station) sets $(y_0y_1y_2y_3y_4y_5)$=(100010), (12,4)16APSK ring ratio is set to h−0.4.

. . .

Accordingly, a transmit apparatus determines $(y_0y_1y_2y_3y_4y_5)$ and thereby determines a correction value f with respect to a (12,4)16APSK ring ratio h determined by the main table, and sets a (12,4)16APSK ring ratio to h+f.

As an example, the following describes a method of setting "satellite broadcasting scheme: "scheme B", coding rate: 41/120, and (12,4)16APSK ring ratio: 3.49".

First, a transmit apparatus selects "scheme B" and therefore sets $d_0$-="1".

Subsequently, the transmit apparatus sets $b_0b_1b_2b_3$="0000" to select coding rate 41/120 from the main table of FIG. 51.

Since the (12,4)16APSK ring ratio corresponding to $b_0b_1b_2b_3$="0000" in the main table is 3.09, the difference between the ring ratio 3.49 to be set and the ring ration 3.09 is 3.49−3.09=+0.4.

Thus, the transmit apparatus sets $y_0y_1y_2y_3y_4y_5$="011110", which indicates "+0.4" in the difference table.

Accordingly, when the transmit apparatus (transmit station) transmits a data symbol so that "satellite broadcasting scheme: "scheme B", coding rate: 41/120, and (12,4)16APSK ring ratio: 3.49", the transmit apparatus transmits $d_0$="1", $b_0b_1b_2b_3$="0000", $y_0y_1y_2y_3y_4y_5$="011110" control information (a portion of TMCC information) along with the data symbol. Note that, as control information, transmission is also required of control information indicating that a modulation scheme of the data symbol is (12,4)16APSK.

Example 4 uses a portion of the main table of "scheme A" even when using "scheme B", and therefore a portion of "scheme A" is suitable for use in "scheme B".

Not that a method of setting (12,4)16APSK ring ratios when a transmit apparatus (transmit station) uses "scheme A" is as described prior to the description of <Example 1>.

In FIG. 51 a single difference table is provided but a plurality of difference tables may be provided. For example, difference table 1 to difference table 16 may be provided. Thus, as in FIG. 48 and FIG. 49, a difference table to be used may be selected by $c_0c_1c_2c_3$. Accordingly, a transmit apparatus sets $c_0c_1c_2c_3$ in addition to $d_0$, $b_0b_1b_2b_3$, and $y_0y_1y_2y_3y_4y_5$, and transmits $c_0c_1c_2c_3$ in addition to $d_0$, $b_0b_1b_2b_3$, and $y_0y_1y_2y_3y_4y_5$ as a portion of control information along with a data symbol.

Further, from a value of $y_0y_1y_2y_3y_4y_5$ in a difference table being used, a correction value f is obtained for a (12,4)16APSK ring ratio h determined by using the main table.

Example 5

Example 5 implements signaling of a desired ring ratio by using $b_0b_1b_2b_3$, indicating coding rate of error correction code and (12,4)16APSK ring ratio in a main table, and $y_0y_1y_2y_3y_4y_5$, indicating ring ratio difference.

An important point in Example 5 is that the main table illustrated in FIG. 52 is composed of the relationship between $b_0,b_1,b_2,b_3$, coding rate of error correction code, and ring ratio from Table 17, in other words "scheme A".

Further characterizing points of Example 5 are described below.

FIG. 52 illustrates a difference table. The difference table is a table for difference information from (12,4)16APSK ring ratios set using the main table. Based on the main table, a (12,4)16APSK ring ratio is, for example, set as h.

Thus, the following is true.

. . .

When a transmit apparatus (transmit station) sets $(y_0y_1y_2y_3y_4y_5)$=(011110), (12,4)16APSK ring ratio is set to h×1.2.

When a transmit apparatus (transmit station) sets $(y_0y_1y_2y_3y_4y_5)$=(011111), (12,4)16APSK ring ratio is set to h×1.1.

When a transmit apparatus (transmit station) sets $(y_0y_1y_2y_3y_4y_5)$=(100000), (12,4)16APSK ring ratio is set to h×1.0.

When a transmit apparatus (transmit station) sets $(y_0y_1y_2y_3y_4y_5)$=(100001), (12,4)16APSK ring ratio is set to h×0.9.

When a transmit apparatus (transmit station) sets $(y_0y_1y_2y_3y_4y_5)$=(100010), (12,4)16APSK ring ratio is set to h×0.8.

. . .

Accordingly, a transmit apparatus determines $(y_0y_1y_2y_3y_4y_5)$ and thereby determines a correction coefficient g with respect to a (12,4)16APSK ring ratio h determined by the main table, and sets a (12,4)16APSK ring ratio to h×g.

As an example, the following describes a method of setting "satellite broadcasting scheme: "scheme B", coding rate: 41/120, and (12,4)16APSK ring ratio: 2.78".

First, a transmit apparatus selects "scheme B" and therefore sets $d_0$=" ".

Subsequently, the transmit apparatus sets $b_0b_1b_2b_3$="0000" to select coding rate 41/120 from the main table of FIG. 52.

Since the (12,4)16APSK ring ratio corresponding to $b_0b_1b_2b_3$="0000" in the main table is 3.09, the difference indicated by multiplication between the ring ratio to be set 2.78 and 3.09 is 2.78/3.09=0.9.

Thus, the transmit apparatus sets $y_0y_1y_2y_3y_4y_5$="100001", which indicates "×0.9" in the difference table.

Accordingly, when a transmit apparatus (transmit station) transmits a data symbol so that "satellite broadcasting scheme: "scheme B", coding rate: 41/120, and (12,4)16APSK ring ratio: 2.78", the transmit apparatus transmits $d_0$="1", $b_0b_1b_2b_3$="0000", and $y_0y_1y_2y_3y_4y_5$="100001" control information (portion of TMCC information) along with the data symbol. Note that, as control information, transmission is also required of control information indicating that a modulation scheme of the data symbol is (12,4)16APSK.

Example 5 uses a portion of the main table of "scheme A" even when using "scheme B", and therefore a portion of "scheme A" is suitable for use in "scheme B".

Not that a method of setting (12,4)16APSK ring ratios when a transmit apparatus (transmit station) uses "scheme A" is as described prior to the description of <Example 1>.

In FIG. 52 a single difference table is provided but a plurality of difference tables may be provided. For example, difference table 1 to difference table 16 may be provided. Thus, as in FIG. 48 and FIG. 49, a difference table to be used may be selected by $c_0c_1c_2c_3$. Accordingly, a transmit apparatus sets $c_0c_1c_2c_3$ in addition to $d_0$, $b_0b_1b_2b_3$, and $y_0y_1y_2y_3y_4y_5$, and transmits $c_0c_1c_2c_3$ in addition to $d_0$, $b_0b_1b_2b_3$, and $y_0y_1y_2y_3y_4y_5$ as a portion of control information along with a data symbol.

Further, from a value of $y_0y_1y_2y_3y_4y_5$ in a difference table being used, a correction coefficient g is obtained for a (12,4)16APSK ring ratio h determined by using the main table.

<Receive Apparatus>

The following describes configuration common to <Example 1> to <Example 5> of a receive apparatus corresponding to a transmission method of the present embodiment and subsequently describes specific processing for each example.

The terrestrial receive apparatus (terminal) A200 of FIG. 40 receives, via the antenna A201, a radio signal transmitted by the transmit station of FIG. 39 and relayed by a satellite (repeater station). The RF receiver A202 performs processing such as frequency conversion and quadrature demodulation on a received radio signal, and outputs a baseband signal.

The demodulator A204 performs processing such as root roll-off filter processing, and outputs a post-filter baseband signal.

The synchronization and channel estimator A214 receives a post-filter baseband signal as input, performs time synchronization, frequency synchronization, and channel estimation, using, for example, a "synchronization symbol group" and "pilot symbol group" transmitted by the transmit apparatus, and outputs an estimated signal.

The control information estimator A216 receives a post-filter baseband signal as input, extracts symbols including control information such as a "TMCC information symbol group", performs demodulation and decoding, and outputs a control signal.

Of importance to the present embodiment is that control information included in "TMCC information symbol group" is estimated by the control information estimator A216 and outputted as a control signal, and that $d_0$, $z_0$, $c_0c_1c_2c_3$, $b_0b_1b_2b_3$, $x_0,x_1,x_2,x_3,x_4,x_5$, and $y_0y_1y_2y_3y_4y_5$ information, described above, is included in the control signal.

The de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value may be outputted instead of an LLR)

The de-interleaver A208 receives log-likelihood ratios and a control signal as input, accumulates input, performs de-interleaving (permutes data) corresponding to interleaving used by the transmit apparatus, and outputs post-de-interleaving log-likelihood ratios.

The error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the receive apparatus may perform iterative detection as described for the receiver apparatus of FIG. 2.

Such a receive apparatus stores tables that are the same as the tables indicates in <Example 1> to <Example 5>, described above, and, by performing operations in reverse of that described in <Example 1> to <Example 5>, estimates a satellite broadcasting scheme, coding rate of error correction code, and (12,4)16APSK ring ratio, and performs demodulation and decoding. The following describes each example separately.

In the following, the control information estimator A216 of a receive apparatus is assumed to determine that a modulation scheme of a data symbol is (12,4)16APSK from TMCC information.

<<Receive Apparatus Corresponding to Example 1>>

When a transmit apparatus (transmit station) transmits a modulated signal by "scheme A":

When the control information estimator A216 of a receive apparatus obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4)16APSK ring ratio. The de-mapper A206 performs demodulation of the data symbol based on the above estimated information.

When a transmit apparatus (transmit station) transmits a modulated signal by "scheme B":

As illustrated in FIG. 53, the control information estimator A216 of the receive apparatus estimates "scheme B" from $d_0$="1", and a coding rate of error correction code 41/120 and (12,4)16APSK ring ratio 4.00 from line 1 of table 2 based on $c_0c_1c_2c_3$="0001" and $b_0b_1b_2b_3$="0000". The de-mapper A206 performs demodulation of the data symbol based on the above estimated information.

<<Receive Apparatus Corresponding to Example 2>>

When a transmit apparatus (transmit station) transmits a modulated signal by "scheme A":

When the control information estimator A216 of a receive apparatus obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4)16APSK ring ratio. The de-mapper A206 performs demodulation of the data symbol based on the above estimated information.

When a transmit apparatus (transmit station) transmits a modulated signal by "scheme B":

As illustrated in FIG. 54, the control information estimator A216 of the receive apparatus determines "set to same ring ratio as scheme A" when obtaining $d_0$="1" and $z_0$="0", and estimates a coding rate of error correction code and (12,4)16APSK ring ratio from Table 17 when obtaining $b_0b_1b_2b_3$. The de-mapper A206 performs demodulation of the data symbol based on the above estimated information.

Further, as illustrated in FIG. 54, the control information estimator A216 of the receive apparatus determines "set to ring ratio for scheme B" from $d_0$="1" and $z_0$=" ", and estimates a coding rate of error correction code 41/120 and (12,4)16APSK ring ratio 4.00 from line 1 of table 2 based on $c_0c_1c_2c_3$="0001" and $b_0b_1b_2b_3$="0000". The de-mapper A206 performs demodulation of the data symbol based on the above estimated information.

<<Receive Apparatus Corresponding to Example 3>>

When a transmit apparatus (transmit station) transmits a modulated signal by "scheme A":

When the control information estimator A216 of a receive apparatus obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4)16APSK ring ratio. The de-mapper A206 performs demodulation of the data symbol based on the above estimated information.

When a transmit apparatus (transmit station) transmits a modulated signal by "scheme B":

As illustrated in FIG. 55, the control information estimator A216 of the receive apparatus estimates "scheme B" from $d_0$="1", and (12,4)16APSK ring ratio 2.00 from $x_0x_1x_2x_3x_4x_5$="000000". The de-mapper A206 performs demodulation of the data symbol based on the above estimated information.

<<Receive Apparatus Corresponding to Example 4>>

When a transmit apparatus (transmit station) transmits a modulated signal by "scheme A":

When the control information estimator A216 of a receive apparatus obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4)16APSK ring ratio. The de-mapper A206 performs demodulation of the data symbol based on the above estimated information.

When a transmit apparatus (transmit station) transmits a modulated signal by "scheme B":

As illustrated in FIG. 56, the control information estimator A216 of the receive apparatus determines that a data symbol is a symbol of "scheme B" from $d_0$="1". Further, the control information estimator A216 of the receive apparatus estimates a difference of +0.4 from $y_0y_1y_2y_3y_4y_5$="011110". Further, based on $b_0b_1b_2b_3$="0000", the control information estimator A216 estimates (12,4)16APSK ring ratio 3.09 prior to taking into account difference, and estimates a coding rate of error correction code 41/120. By summing both so that 3.09+0.4=3.49, the control information estimator A216 estimates a (12,4)16APSK ring ratio 3.49. The de-mapper A206 performs demodulation of the data symbol based on the above estimated information.

<<Receive Apparatus Corresponding to Example 5>>

When a transmit apparatus (transmit station) transmits a modulated signal by "scheme A":

When the control information estimator A216 of a receive apparatus obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4)16APSK ring ratio. The de-mapper A206 performs demodulation of the data symbol based on the above estimated information.

When a transmit apparatus (transmit station) transmits a modulated signal by "scheme B":

As illustrated in FIG. 57, the control information estimator A216 of the receive apparatus determines that a data symbol is a symbol of "scheme B" from $d_0$="1". Further, the control information estimator A216 of the receive apparatus estimates a difference of ×0.9 from $y_0y_1y_2y_3y_4y_5$="100001". Further, based on $b_0b_1b_2b_3$="0000", the control information estimator A216 estimates (12,4)16APSK ring ratio 3.09 prior to taking into account difference, and estimates a coding rate of error correction code 41/120. By multiplying both so that 3.09×0.9=2.78, the control information estimator A216 estimates a (12,4)16APSK ring ratio 2.78. The de-mapper A206 performs demodulation of the data symbol based on the above estimated information.

Embodiment D

In the present embodiment, a method of transmitting pilot symbols based on embodiment C is described.

Note that ring ratio (for example, (12,4)16APSK ring ratio) has been defined prior to the present embodiment, and ring ratio may also be referred to as "radius ratio".

<Example of Pilot Symbols>

In the present embodiment, an example is described of pilot symbol configuration in the transmit scheme described in embodiment C (a data symbol modulation scheme is (12,4)16APSK).

Note that the transmit apparatus in the present embodiment is identical to the transmit apparatus described in embodiment 1 and therefore description thereof is omitted here.

Interference occurs between code (between symbols) of a modulated signal, because of non-linearity of the power amplifier of the transmit apparatus. High data reception quality can be achieved by a receive apparatus by decreasing this intersymbol interference.

In the present example of pilot symbol configuration, in order to reduce intersymbol interference at a receive apparatus, a transmit apparatus transmits pilot symbols by using a modulation scheme and ring ratio used in a data symbol.

Accordingly, when a transmit apparatus (transmit station) determines a modulation scheme and ring ratio of a data symbol by any of the methods of <Example 1> to <Example 5> of embodiment C, the transmit apparatus generates and transmits pilot symbols by using the same modulation scheme and ring ratio as the data symbol.

The following illustrates specific examples. However, description continues assuming that (12,4)16APSK is selected as a modulation scheme.

In the case of <Example 1> of embodiment C:

When a transmit apparatus (transmit station) transmits a data symbol so that "satellite broadcasting scheme: "scheme B", coding rate: 41/120, and (12,4)16APSK ring ratio: 4.00", $d_0$="1", $b_0b_1b_2b_3$="0000", and $c_0c_1c_2c_3$="0001". Thus, based on "$d_0$="1", $b_0b_1b_2b_3$="0000", and $c_0c_1c_2c_3$="0001"", the transmit apparatus sets a modulation scheme and ring ratio of pilot symbols to (12,4)16APSK and ring ratio 4.00 (of (12,4)16APSK), respectively.

Accordingly, the transmit apparatus (transmit station) transmits the following, in order, as pilot symbols:

a symbol of a constellation point (baseband signal) corresponding to $[b_3b_2b_1b_0]$=[0000] of (12,4)16APSK ring ratio 4.00;

a symbol of a constellation point (baseband signal) corresponding to $[b_3b_2b_1b_0]$=[0001] of (12,4)16APSK ring ratio 4.00;

a symbol of a constellation point (baseband signal) corresponding to $[b_3b_2b_1b_0]$=[0010] of (12,4)16APSK ring ratio 4.00;

a symbol of a constellation point (baseband signal) corresponding to $[b_3b_2b_1b_0]$=[0011] of (12,4)16APSK ring ratio 4.00;

a symbol of a constellation point (baseband signal) corresponding to $[b_3b_2b_1b_0]$=[0100] of (12,4)16APSK ring ratio 4.00;

a symbol of a constellation point (baseband signal) corresponding to $[b_3b_2b_1b_0]$=[0101] of (12,4)16APSK ring ratio 4.00;

a symbol of a constellation point (baseband signal) corresponding to $[b_3b_2b_1b_0]$=[0110] of (12,4)16APSK ring ratio 4.00;

a symbol of a constellation point (baseband signal) corresponding to $[b_3b_2b_1b_0]$=[0111] of (12,4)16APSK ring ratio 4.00;

a symbol of a constellation point (baseband signal) corresponding to $[b_3b_2b_1b_0]$=[1000] of (12,4)16APSK ring ratio 4.00;

a symbol of a constellation point (baseband signal) corresponding to $[b_3b_2b_1b_0]$=[1001] of (12,4)16APSK ring ratio 4.00;

a symbol of a constellation point (baseband signal) corresponding to $[b_3b_2b_1b_0]$=[1010] of (12,4)16APSK ring ratio 4.00;

a symbol of a constellation point (baseband signal) corresponding to $[b_3b_2b_1b_0]$=[1011] of (12,4)16APSK ring ratio 4.00;

a symbol of a constellation point (baseband signal) corresponding to $[b_3b_2b_1b_0]$=[1100] of (12,4)16APSK ring ratio 4.00;

a symbol of a constellation point (baseband signal) corresponding to $[b_3b_2b_1b_0]=[1101]$ of (12,4)16APSK ring ratio 4.00;

a symbol of a constellation point (baseband signal) corresponding to $[b_3b_2b_1b_0]=[1110]$ of (12,4)16APSK ring ratio 4.00; and a symbol of a constellation point (baseband signal) corresponding to $[b_3b_2b_1b_0]=[1111]$ of (12,4)16APSK ring ratio 4.00.

Thus, a receive apparatus can estimate intersymbol interference with high precision, and can therefore achieve high data reception quality.

Pilot symbols need not be symbols only for estimating intersymbol interference, and a receive apparatus may estimate a radio wave propagation environment between a transmit apparatus and the receive apparatus (channel estimation), and may estimate frequency offset and perform time synchronization using the pilot symbols.

When a transmit apparatus sets separate values for data symbol ring ratios, pilot symbols are changed to the same ring ratio as data symbols (a value L) and the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

In the case of <Example 2> of embodiment C:

When a transmit apparatus (transmit station) transmits a data symbol so that "satellite broadcasting scheme: "scheme B", coding rate: 41/120, and (12,4)16APSK ring ratio: 4.00", the transmit apparatus transmits $d_0$="1", $z_0=1$, $b_0b_1b_2b_3$="0000", and $c_0c_1c_2c_3$="0001" control information (a portion of TMCC information) along with the data symbol. Thus, based on "$d_0$="1", $z_0=1$, $b_0b_1b_2b_3$="0000", and $c_0c_1c_2c_3$="0001"", the transmit apparatus sets a modulation scheme and ring ratio of pilot symbols to (12,4)16APSK and ring ratio 4.00 (of (12,4)16APSK), respectively.

Accordingly, the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio 4.00;

a symbol of a constellation point (baseband signal) corresponding to $[b_3b_2b_1b_0]=[0001]$ of (12,4)16APSK ring ratio 4.00;

a symbol of a constellation point (baseband signal) corresponding to $[b_3b_2b_1b_0]=[0010]$ of (12,4)16APSK ring ratio 4.00;

a symbol of a constellation point (baseband signal) corresponding to $[b_3b_2b_1b_0]=[0011]$ of (12,4)16APSK ring ratio 4.00;

a symbol of a constellation point (baseband signal) corresponding to $[b_3b_2b_1b_0]=[0100]$ of (12,4)16APSK ring ratio 4.00;

a symbol of a constellation point (baseband signal) corresponding to $[b_3b_2b_1b_0]=[0101]$ of (12,4)16APSK ring ratio 4.00;

a symbol of a constellation point (baseband signal) corresponding to $[b_3b_2b_1b_0]=[0110]$ of (12,4)16APSK ring ratio 4.00;

a symbol of a constellation point (baseband signal) corresponding to $[b_3b_2b_1b_0]=[0111]$ of (12,4)16APSK ring ratio 4.00;

a symbol of a constellation point (baseband signal) corresponding to $[b_3b_2b_1b_0]=[1000]$ of (12,4)16APSK ring ratio 4.00;

a symbol of a constellation point (baseband signal) corresponding to $[b_3b_2b_1b_0]=[1001]$ of (12,4)16APSK ring ratio 4.00;

a symbol of a constellation point (baseband signal) corresponding to $[b_3b_2b_1b_0]=[1010]$ of (12,4)16APSK ring ratio 4.00;

a symbol of a constellation point (baseband signal) corresponding to $[b_3b_2b_1b_0]=[1011]$ of (12,4)16APSK ring ratio 4.00;

a symbol of a constellation point (baseband signal) corresponding to $[b_3b_2b_1b_0]=[1100]$ of (12,4)16APSK ring ratio 4.00;

a symbol of a constellation point (baseband signal) corresponding to $[b_3b_2b_1b_0]=[1101]$ of (12,4)16APSK ring ratio 4.00;

a symbol of a constellation point (baseband signal) corresponding to $[b_3b_2b_1b_0]=[1110]$ of (12,4)16APSK ring ratio 4.00; and a symbol of a constellation point (baseband signal) corresponding to $[b_3b_2b_1b_0]=[1111]$ of (12,4)16APSK ring ratio 4.00.

Thus, a receive apparatus can estimate intersymbol interference with high precision, and can therefore achieve high data reception quality.

Pilot symbols need not be symbols only for estimating intersymbol interference, and a receive apparatus may estimate a radio wave propagation environment between a transmit apparatus and the receive apparatus (channel estimation), and may estimate frequency offset and perform time synchronization using the pilot symbols.

When a transmit apparatus sets separate values for data symbol ring ratios, pilot symbols are changed to the same ring ratio as data symbols (a value L) and the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

In the case of <Example 3> of embodiment C:

When a transmit apparatus (transmit station) transmits a data symbol so that "satellite broadcasting scheme: "scheme B" and (12,4)16APSK ring ratio: 2.00", the transmit apparatus transmits $d_0$="1" and $x_0x_1x_2x_3x_4x_5$="000000" control information (a portion of TMCC information) along with the data symbol. Thus, based on "$d_0$="1", and $x_0x_1x_2x_3x_4x_5$="000000"", the transmit apparatus sets a modulation scheme and ring ratio of pilot symbols to (12,4)16APSK and ring ratio 2.00 (of (12,4)16APSK), respectively.

Accordingly, the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio 2.00;

a symbol of a constellation point (baseband signal) corresponding to $[b_3b_2b_1b_0]=[0001]$ of (12,4)16APSK ring ratio 2.00;

a symbol of a constellation point (baseband signal) corresponding to $[b_3b_2b_1b_0]=[0010]$ of (12,4)16APSK ring ratio 2.00;

a symbol of a constellation point (baseband signal) corresponding to $[b_3b_2b_1b_0]=[0011]$ of (12,4)16APSK ring ratio 2.00;

a symbol of a constellation point (baseband signal) corresponding to $[b_3b_2b_1b_0]=[0100]$ of (12,4)16APSK ring ratio 2.00;

a symbol of a constellation point (baseband signal) corresponding to $[b_3b_2b_1b_0]=[0101]$ of (12,4)16APSK ring ratio 2.00;

a symbol of a constellation point (baseband signal) corresponding to $[b_3b_2b_1b_0]=[0110]$ of (12,4)16APSK ring ratio 2.00;

a symbol of a constellation point (baseband signal) corresponding to $[b_3b_2b_1b_0]=[0111]$ of (12,4)16APSK ring ratio 2.00;

a symbol of a constellation point (baseband signal) corresponding to $[b_3b_2b_1b_0]=[1000]$ of (12,4)16APSK ring ratio 2.00;

a symbol of a constellation point (baseband signal) corresponding to $[b_3b_2b_1b_0]=[1001]$ of (12,4)16APSK ring ratio 2.00;

a symbol of a constellation point (baseband signal) corresponding to $[b_3b_2b_1b_0]=[1010]$ of (12,4)16APSK ring ratio 2.00;

a symbol of a constellation point (baseband signal) corresponding to $[b_3b_2b_1b_0]=[1011]$ of (12,4)16APSK ring ratio 2.00;

a symbol of a constellation point (baseband signal) corresponding to $[b_3b_2b_1b_0]=[1100]$ of (12,4)16APSK ring ratio 2.00;

a symbol of a constellation point (baseband signal) corresponding to $[b_3b_2b_1b_0]=[1101]$ of (12,4)16APSK ring ratio 2.00;

a symbol of a constellation point (baseband signal) corresponding to $[b_3b_2b_1b_0]=[1110]$ of (12,4)16APSK ring ratio 2.00; and a symbol of a constellation point (baseband signal) corresponding to $[b_3b_2b_1b_0]=[1111]$ of (12,4)16APSK ring ratio 2.00.

Thus, a receive apparatus can estimate intersymbol interference with high precision, and can therefore achieve high data reception quality.

Pilot symbols need not be symbols only for estimating intersymbol interference, and a receive apparatus may estimate a radio wave propagation environment between a transmit apparatus and the receive apparatus (channel estimation), and may estimate frequency offset and perform time synchronization using the pilot symbols.

When a transmit apparatus sets separate values for data symbol ring ratios, pilot symbols are changed to the same ring ratio as data symbols (a value L) and the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

In the case of <Example 4> of embodiment C:

When a transmit apparatus (transmit station) transmits a data symbol so that "satellite broadcasting scheme: "scheme B", coding rate: 41/120, and (12,4)16APSK ring ratio: 3.49", the transmit apparatus transmits $d_0$="1", $b_0b_1b_2b_3$="0000", and $y_0y_1y_2y_3y_4y_5$="011110" control information (portion of TMCC information) along with the data symbol. Thus, based on "$d_0$="1", $b_0b_1b_2b_3$="0000", and $y_0y_1y_2y_3y_4y_5$="011110"", the transmit apparatus sets a modulation scheme and ring ratio of pilot symbols to (12,4)16APSK and ring ratio 3.49 (of (12,4)16APSK), respectively.

Accordingly, the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio 3.49;

a symbol of a constellation point (baseband signal) corresponding to $[b_3b_2b_1b_0]=[0001]$ of (12,4)16APSK ring ratio 3.49;

a symbol of a constellation point (baseband signal) corresponding to $[b_3b_2b_1b_0]=[0010]$ of (12,4)16APSK ring ratio 3.49;

a symbol of a constellation point (baseband signal) corresponding to $[b_3b_2b_1b_0]=[0011]$ of (12,4)16APSK ring ratio 3.49;

a symbol of a constellation point (baseband signal) corresponding to $[b_3b_2b_1b_0]=[0100]$ of (12,4)16APSK ring ratio 3.49;

a symbol of a constellation point (baseband signal) corresponding to $[b_3b_2b_1b_0]=[0101]$ of (12,4)16APSK ring ratio 3.49;

a symbol of a constellation point (baseband signal) corresponding to $[b_3b_2b_1b_0]=[0110]$ of (12,4)16APSK ring ratio 3.49;

a symbol of a constellation point (baseband signal) corresponding to $[b_3b_2b_1b_0]=[0111]$ of (12,4)16APSK ring ratio 3.49;

a symbol of a constellation point (baseband signal) corresponding to $[b_3b_2b_1b_0]=[1000]$ of (12,4)16APSK ring ratio 3.49;

a symbol of a constellation point (baseband signal) corresponding to $[b_3b_2b_1b_0]=[1001]$ of (12,4)16APSK ring ratio 3.49;

a symbol of a constellation point (baseband signal) corresponding to $[b_3b_2b_1b_0]=[1010]$ of (12,4)16APSK ring ratio 3.49;

a symbol of a constellation point (baseband signal) corresponding to $[b_3b_2b_1b_0]=[1011]$ of (12,4)16APSK ring ratio 3.49;

a symbol of a constellation point (baseband signal) corresponding to $[b_3b_2b_1b_0]=[1100]$ of (12,4)16APSK ring ratio 3.49;

a symbol of a constellation point (baseband signal) corresponding to $[b_3b_2b_1b_0]=[1101]$ of (12,4)16APSK ring ratio 3.49;

a symbol of a constellation point (baseband signal) corresponding to $[b_3b_2b_1b_0]=[1110]$ of (12,4)16APSK ring ratio 3.49; and a symbol of a constellation point (baseband signal) corresponding to $[b_3b_2b_1b_0]=[1111]$ of (12,4)16APSK ring ratio 3.49.

Thus, a receive apparatus can estimate intersymbol interference with high precision, and can therefore achieve high data reception quality.

Pilot symbols need not be symbols only for estimating intersymbol interference, and a receive apparatus may estimate a radio wave propagation environment between a transmit apparatus and the receive apparatus (channel estimation), and may estimate frequency offset and perform time synchronization using the pilot symbols.

When a transmit apparatus sets separate values for data symbol ring ratios, pilot symbols are changed to the same ring ratio as data symbols (a value L) and the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

In the case of <Example 5> of embodiment C:

When a transmit apparatus (transmit station) transmits a data symbol so that "satellite broadcasting scheme: "scheme B", coding rate: 41/120, and (12,4)16APSK ring ratio: 2.78", the transmit apparatus transmits $d_0$="1", $b_0b_1b_2b_3$="0000", and $y_0y_1y_2y_3y_4y_5$="100001" control information (portion of TMCC information) along with the data symbol. Thus, based on "$d_0$="1", $b_0b_1b_2b_3$="0000", and $y_0y_1y_2y_3y_4y_5$="100001"", the transmit apparatus sets a modulation scheme and ring ratio of pilot symbols to (12,4)16APSK and ring ratio 2.78 (of (12,4)16APSK), respectively.

Accordingly, the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio 2.78;

a symbol of a constellation point (baseband signal) corresponding to $[b_3b_2b_1b_0]=[0001]$ of (12,4)16APSK ring ratio 2.78;

a symbol of a constellation point (baseband signal) corresponding to $[b_3b_2b_1b_0]=[0010]$ of (12,4)16APSK ring ratio 2.78;

a symbol of a constellation point (baseband signal) corresponding to $[b_3b_2b_1b_0]=[0011]$ of (12,4)16APSK ring ratio 2.78;

a symbol of a constellation point (baseband signal) corresponding to $[b_3b_2b_1b_0]=[0100]$ of (12,4)16APSK ring ratio 2.78;

a symbol of a constellation point (baseband signal) corresponding to $[b_3b_2b_1b_0]=[0101]$ of (12,4)16APSK ring ratio 2.78;

a symbol of a constellation point (baseband signal) corresponding to $[b_3b_2b_1b_0]=[0110]$ of (12,4)16APSK ring ratio 2.78;

a symbol of a constellation point (baseband signal) corresponding to $[b_3b_2b_1b_0]=[0111]$ of (12,4)16APSK ring ratio 2.78;

a symbol of a constellation point (baseband signal) corresponding to $[b_3b_2b_1b_0]=[1000]$ of (12,4)16APSK ring ratio 2.78;

a symbol of a constellation point (baseband signal) corresponding to $[b_3b_2b_1b_0]=[1001]$ of (12,4)16APSK ring ratio 2.78;

a symbol of a constellation point (baseband signal) corresponding to $[b_3b_2b_1b_0]=[1010]$ of (12,4)16APSK ring ratio 2.78;

a symbol of a constellation point (baseband signal) corresponding to $[b_3b_2b_1b_0]=[1011]$ of (12,4)16APSK ring ratio 2.78;

a symbol of a constellation point (baseband signal) corresponding to $[b_3b_2b_1b_0]=[1100]$ of (12,4)16APSK ring ratio 2.78;

a symbol of a constellation point (baseband signal) corresponding to $[b_3b_2b_1b_0]=[1101]$ of (12,4)16APSK ring ratio 2.78;

a symbol of a constellation point (baseband signal) corresponding to $[b_3b_2b_1b_0]=[1110]$ of (12,4)16APSK ring ratio 2.78; and a symbol of a constellation point (baseband signal) corresponding to $[b_3b_2b_1b_0]=[1111]$ of (12,4)16APSK ring ratio 2.78.

Thus, a receive apparatus can estimate intersymbol interference with high precision, and can therefore achieve high data reception quality.

Pilot symbols need not be symbols only for estimating intersymbol interference, and a receive apparatus may estimate a radio wave propagation environment between a transmit apparatus and the receive apparatus (channel estimation), and may estimate frequency offset and perform time synchronization using the pilot symbols.

When a transmit apparatus sets separate values for data symbol ring ratios, pilot symbols are changed to the same ring ratio as data symbols (a value L) and the transmit apparatus (transmit station) transmits the following, in order, as pilot symbols:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

Operation of a receive apparatus is described with reference to FIG. 2.

In FIG. 2, 210 indicates a configuration of a receive apparatus. The de-mapper 214 of FIG. 2 performs de-mapping with respect to mapping of a modulation scheme used by the transmit apparatus, for example obtaining and outputting a log-likelihood ratio for each bit. At this time, although not illustrated in FIG. 2, estimation of intersymbol interference, estimation of a radio wave propagation environment (channel estimation) between the transmit apparatus and the receive apparatus, time synchronization with the transmit apparatus, and frequency offset estimation may be performed in order to precisely perform de-mapping.

Although not illustrated in FIG. 2, the receive apparatus includes an intersymbol interference estimator, a channel estimator, a time synchronizer, and a frequency offset estimator. These estimators extract from receive signals a portion of pilot symbols, for example, and respectively perform intersymbol interference estimation, estimation of a radio wave propagation environment (channel estimation) between the transmit apparatus and the receive apparatus, time synchronization between the transmit apparatus and the receive apparatus, and frequency offset estimation between the transmit apparatus and the receive apparatus. Subsequently, the de-mapper 214 of FIG. 2 inputs these estimation signals and, by performing de-mapping based on these estimation signals, performs, for example, calculation of log-likelihood ratios.

Modulation scheme and ring ratio information used in generating a data symbol is, as described in embodiment C, transmitted by using control information such as TMCC control information. Thus, because a modulation scheme and ring ratio used in generating pilot symbols is the same as the modulation scheme and ring ratio used in generating data symbols, a receive apparatus estimates, by a control information estimator, the modulation scheme and ring ratio from control information, and, by inputting this information to the de-mapper 214, estimation of distortion of propagation path, etc., is performed from the pilot symbols and de-mapping of the data symbol is performed.

Further, a transmission method of pilot symbols is not limited to the above. For example, a transmit apparatus (transmit station) may transmit, as pilot symbols:

a symbol of a constellation point (baseband signal) corresponding to $[b_3b_2b_1b_0]=[0000]$ of (12,4)16APSK ring ratio L, a plurality of times;

a symbol of a constellation point (baseband signal) corresponding to $[b_3b_2b_1b_0]=[0001]$ of (12,4)16APSK ring ratio L, a plurality of times;

a symbol of a constellation point (baseband signal) corresponding to $[b_3b_2b_1b_0]=[0010]$ of (12,4)16APSK ring ratio L, a plurality of times;

a symbol of a constellation point (baseband signal) corresponding to $[b_3b_2b_1b_0]=[0011]$ of (12,4)16APSK ring ratio L, a plurality of times;

a symbol of a constellation point (baseband signal) corresponding to $[b_3b_2b_1b_0]=[0100]$ of (12,4)16APSK ring ratio L, a plurality of times;

a symbol of a constellation point (baseband signal) corresponding to $[b_3b_2b_1b_0]=[0101]$ of (12,4)16APSK ring ratio L, a plurality of times;

a symbol of a constellation point (baseband signal) corresponding to $[b_3b_2b_1b_0]=[0110]$ of (12,4)16APSK ring ratio L, a plurality of times;

a symbol of a constellation point (baseband signal) corresponding to $[b_3b_2b_1b_0]=[0111]$ of (12,4)16APSK ring ratio L, a plurality of times;

a symbol of a constellation point (baseband signal) corresponding to $[b_3b_2b_1b_0]=[1000]$ of (12,4)16APSK ring ratio L, a plurality of times;

a symbol of a constellation point (baseband signal) corresponding to $[b_3b_2b_1b_0]=[1001]$ of (12,4)16APSK ring ratio L, a plurality of times;

a symbol of a constellation point (baseband signal) corresponding to $[b_3b_2b_1b_0]=[1010]$ of (12,4)16APSK ring ratio L, a plurality of times;

a symbol of a constellation point (baseband signal) corresponding to $[b_3b_2b_1b_0]=[1011]$ of (12,4)16APSK ring ratio L, a plurality of times;

a symbol of a constellation point (baseband signal) corresponding to $[b_3b_2b_1b_0]=[1100]$ of (12,4)16APSK ring ratio L, a plurality of times;

a symbol of a constellation point (baseband signal) corresponding to $[b_3b_2b_1b_0]=[1101]$ of (12,4)16APSK ring ratio L, a plurality of times;

a symbol of a constellation point (baseband signal) corresponding to $[b_3b_2b_1b_0]=[1110]$ of (12,4)16APSK ring ratio L, a plurality of times; and a symbol of a constellation point (baseband signal) corresponding to $[b_3b_2b_1b_0]=[1111]$ of (12,4)16APSK ring ratio L, a plurality of times.

When the following symbols are each transmitted an equal number of times, there is an advantage that a receive apparatus can perform precise estimation of distortion of a propagation path:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

Frame configurations applicable to the present invention are not limited to the above description. When a plurality of data symbols exist, a symbol for transmitting information related to a modulation scheme used in generating the plurality of data symbols, and a symbol for transmitting information related to an error correction scheme (for example, error correction code used, code length of error correction code, coding rate of error correction code, etc.) exist, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

(Supplement)

As a matter of course, a plurality of embodiments described herein may be implemented in combination.

Herein, "∀" represents a universal quantifier and "∃" represents an existential quantifier.

Herein, in the case of a complex plane, the unit of phase of the argument, for example, is "radians".

When a complex plane is used, it can be displayed in polar form as polar coordinates of complex numbers. When points (a and b) on a complex plane are made to correspond to a complex number $z=a+jb$ (a and b are real numbers, j is an imaginary unit), when expressing a and b as polar coordinates $(r, \theta)$, $a=r\times\cos\theta$ and $b=r\times\sin\theta$, the following holds true:

[Math 27]

$$r=\sqrt{a^2+b^2} \qquad \text{(Math 27)}$$

Here, r is the absolute value of z ($r=|z|$), and $\theta$ is the argument of z. Thus, $z=a+jb$ is expressed as $r\times e^{j\theta}$.

Note that, for example, a program executing the above communication method may be stored on read only memory (ROM) and the program may be executed by a central processing unit (CPU).

Further, a program executing the above communication method may be stored on a computer-readable non-transitory storage medium, the program stored in the storage medium may be written to random access memory (RAM) of a computer, and the computer may be made to operate according to the program.

Further, each configuration such as each embodiment may be implemented typically as a large scale integration (LSI), which is an integrated circuit. This may be an individual chip, and an entire configuration or part of the configuration of an embodiment may be included in one chip. Here, "LSI" is referred to, but according to the degree of integration this may be called an integrated circuit (IC), system LSI, super LSI, or ultra LSI. Further, methods of integration are not limited to LSI, and may be implemented by a dedicated circuit or general-purpose processor. After LSI manufacture, a field programmable gate array (FPGA) or reconfigurable processor that allows reconfiguring of connections and settings of circuit cells within the LSI may be used.

Further, if integrated circuit technology to replace LSI is achieved through advancement in semiconductor technology or other derivative technology, such technology may of course be used to perform integration of function blocks. Application of biotechnology, etc., is also a possibility.

The following provides supplemental description of transmission schemes.

Figure 29:
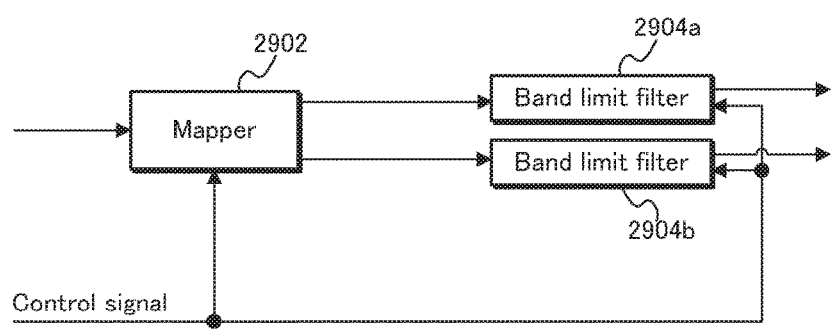
FIG. 29 is a diagram for describing a bandlimiting filter.

In the description of the present invention, FIG. 29 is a diagram in which a section performing mapping of, for example, the mapper 708 and the modulator 710 of FIG. 7 and a section performing bandlimiting are extracted when single carrier transmission is used as a transmission scheme.

In FIG. 29, a mapper 2902 receives a control signal and a digital signal as input, performs mapping based on information related to a modulation scheme (or transmission method) included in the control signal, and outputs an in-phase component of a post-mapping baseband signal and a quadrature component of a post-mapping baseband signal.

A bandlimiting filter 2904a receives the in-phase component of the post-mapping baseband signal and the control signal as input, sets a roll-off rate included in the control signal, performs bandlimiting, and outputs an in-phase component of a post-bandlimiting baseband signal.

In the same way, a bandlimiting filter 2904b receives the quadrature component of the post-mapping baseband signal and the control signal as input, sets a roll-off rate included in the control signal, performs bandlimiting, and outputs a quadrature component of a post-bandlimiting baseband signal.

Frequency properties of a bandlimiting filter performing bandlimiting of a carrier are as in Math (28), below.

[Math 28]

$$\begin{cases} 1 & |F| \leq F_n \times (1-\alpha) \\ \sqrt{\frac{1}{2} + \frac{1}{2}\sin\frac{\pi}{2F_n}\left[\frac{F_n - |F|}{\alpha}\right]} & F_n \times (1-\alpha) \leq |F| \leq F_n \times (1+\alpha) \\ 0 & |F| \geq F_n \times (1+\alpha) \end{cases} \quad \text{(Math 28)}$$

In the above formula, F is center frequency of a carrier, $F_n$ is a Nyquist frequency, and α is a roll-off rate.

Here, in a case in which it is possible that the control signal can change roll-off rate when transmitting a data symbol, ring ratio may also be changed for each modulation scheme/transmission method along with changes in roll-off rate. In this case, it is necessary to transmit information related to changes in ring ratio such as in the examples above. Thus, a receive apparatus can demodulate and decode based on this information.

Alternatively, in a case in which it is possible that the roll-off rate can be changed when transmitting a data symbol, a transmit apparatus transmits information related to roll-off rate changes as a control information symbol. The control information symbol may be generated by a roll-off rate of a given setting.

(Supplement 2)

Embodiment 12 describes the following.

<Signaling>

In the present embodiment, examples are described of various information signaled as TMCC information in order to facilitate reception at the receive apparatus of a transmit signal used in the transmission scheme described in embodiment 10.

Note that the transmit apparatus in the present embodiment is identical to the transmit apparatus described in embodiment 1 and therefore description thereof is omitted here. However, (4,8,4)16APSK is used instead of (8,8) 16APSK.

FIG. 18 illustrates a schematic of a transmit signal frame of advanced wide band digital satellite broadcasting. However, this is not intended to be an accurate diagram of a frame of advanced wide band digital satellite broadcasting. Note that details are described in embodiment 3, and therefore description is omitted here.

Table 18 illustrates a configuration of modulation scheme information. In table 18, for example, when four bits to be transmitted by a symbol for transmitting a modulation scheme of a transmission mode of "transmission mode/slot information" of a "TMCC information symbol group" are [0001], a modulation scheme for generating symbols of "slots composed of a symbol group" is π/2 shift binary phase shift keying (BPSK).

When four bits to be transmitted by a symbol for transmitting a modulation scheme of a transmission mode of "transmission mode/slot information" of a "TMCC information symbol group" are [0010], a modulation scheme for generating symbols of "slots composed of a symbol group" is quadrature phase shift keying (QPSK).

When four bits to be transmitted by a symbol for transmitting a modulation scheme of a transmission mode of "transmission mode/slot information" of a "TMCC information symbol group" are [0011], a modulation scheme for generating symbols of "slots composed of a symbol group" is 8 phase shift keying (8PSK).

When four bits to be transmitted by a symbol for transmitting a modulation scheme of a transmission mode of "transmission mode/slot information" of a "TMCC information symbol group" are [0100], a modulation scheme for generating symbols of "slots composed of a symbol group" is (12,4)16APSK.

When four bits to be transmitted by a symbol for transmitting a modulation scheme of a transmission mode of "transmission mode/slot information" of a "TMCC information symbol group" are [0101], a modulation scheme for generating symbols of "slots composed of a symbol group" is (4,8,4)16APSK.

When four bits to be transmitted by a symbol for transmitting a modulation scheme of a transmission mode of "transmission mode/slot information" of a "TMCC information symbol group" are [0110], a modulation scheme for generating symbols of "slots composed of a symbol group" is 32 amplitude phase shift keying (32APSK).

. . .

TABLE 18

| Modulation scheme information | |
|---|---|
| Value | Assignment |
| 0000 | Reserved |
| 0001 | π/2 shift BPSK |
| 0010 | QPSK |
| 0011 | 8PSK |
| 0100 | (12,4)16APSK |
| 0101 | (4,8,4)16APSK |
| 0110 | 32APSK |
| 0111 | . . . |
| . . . | . . . |
| 1111 | No scheme assigned |

Table 19 illustrates a relationship between coding rates of error correction code and ring ratios when a modulation scheme is (12,4)16APSK. According to $R_1$ and $R_2$, used above to represent constellation points of (12,4)16APSK in an I-Q plane, a ring ratio $R_{(12,4)}$ of (12,4)16APSK is represented as $R_{(12,4)} = R_2/R_1$. In Table 19, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when a symbol for transmitting a modulation scheme of a transmission mode is indicated to be (12,4)16APSK, a ring ratio $R_{(12,4)}$ of (12,4) 16APSK is 3.09.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈2/5), and this means that when a symbol for transmitting a modulation scheme of a transmission mode is indicated to be (12,4)16APSK, a ring ratio $R_{(12,4)}$ of (12,4)16APSK is 2.97.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when a symbol for transmitting a modulation scheme of a transmission mode is indicated to be (12,4)16APSK, a ring ratio $R_{(12,4)}$ of (12,4)16APSK is 3.93.

. . .

TABLE 19

Relationship between coding rates of error correction code and ring ratios when modulation scheme is (12,4)16APSK

| Value | Coding rate (approximate value) | Ring ratio |
|---|---|---|
| 0000 | 41/120 (⅓) | 3.09 |
| 0001 | 49/120 (⅖) | 2.97 |
| 0010 | 61/120 (½) | 3.93 |
| . . . | . . . | . . . |
| 1111 | No scheme assigned | — |

Table 20 indicates a relationship between coding rate of error correction code and radii/phase, when a modulation scheme is (4,8,4)16APSK.

In Table 20, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈1/3), and this means that when a symbol for transmitting a modulation scheme of a transmission mode is indicated to be (4,8,4)16APSK, a radius $R_1$ is 1.00, a radius $R_2$ is 2.00, a radius $R_3$ is 2.20, and a phase λ is π/12 radians.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈2/5), and this means that when a symbol for transmitting a modulation scheme of a transmission mode is indicated to be (4,8,4)16APSK, a radius $R_1$ is 1.00, a radius $R_2$ is 2.10, a radius $R_3$ is 2.20, and a phase λ is π/12 radians.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈1/2), and this means that when a symbol for transmitting a modulation scheme of a transmission mode is indicated to be (4,8,4)16APSK, a radius $R_1$ is 1.00, a radius $R_2$ is 2.20, a radius $R_3$ is 2.30, and a phase λ is π/10 radians.

. . .

TABLE 20

Relationship between radii/phases of error correction code and ring ratios when modulation scheme is (4,8,4)16APSK

| Value | Coding rate (approximate value) | Radii and phase |
|---|---|---|
| 0000 | 41/120 (⅓) | $R_1 = 1.00, R_2 = 2.00, R_3 = 2.20, λ = π/12$ |
| 0001 | 49/120 (⅖) | $R_1 = 1.00, R_2 = 2.10, R_3 = 2.20, λ = π/12$ |
| 0010 | 61/120 (½) | $R_1 = 1.00, R_2 = 2.20, R_3 = 2.30, λ = π/10$ |
| . . . | . . . | . . . |
| 1111 | No scheme assigned | — |

<Receive Apparatus>

The following describes operation of a receive apparatus that receives a radio signal transmitted by the transmit apparatus 700, with reference to the diagram of a receive apparatus in FIG. 19.

The receive apparatus 1900 of FIG. 19 receives a radio signal transmitted by the transmit apparatus 700 via the antenna 1901. The RF receiver 1902 performs processing such as frequency conversion and quadrature demodulation on a received radio signal, and outputs a baseband signal.

The demodulator 1904 performs processing such as root roll-off filter processing, and outputs a post-filter baseband signal.

The synchronization and channel estimator 1914 receives a post-filter baseband signal as input, performs time synchronization, frequency synchronization, and channel estimation, using, for example, a "synchronization symbol group" and "pilot symbol group" transmitted by the transmit apparatus, and outputs an estimated signal.

The control information estimator 1916 receives a post-filter baseband signal as input, extracts symbols including control information such as a "TMCC information symbol group", performs demodulation and decoding, and outputs a control signal.

Of importance in the present embodiment is that a receive apparatus demodulates and decodes a symbol transmitting "transmission mode modulation scheme" information and a symbol transmitting "transmission mode coding rate" of "transmission mode/slot information" of a "TMCC information symbol group"; and, based on Table 18, Table 19, and Table 20, the control information estimator 1916 generates modulation scheme information and error correction code scheme (for example, coding rate of an error correction code) information used by "slots composed of a data symbol group", and generates ring ratio and radii/phase information when a modulation scheme used by "slots composed of a data symbol group" is (12,4)16APSK, (4,8,4)16APSK, or 32APSK, and outputs the information as a portion of a control signal.

The de-mapper 1906 receives a post-filter baseband signal, control signal, and estimated signal as input, determines a modulation scheme (or transmission method) used by "slots composed of a data symbol group" based on the control signal (in this case, when there is a ring ratio and radii/phase, determination with respect to the ring ratio and radii/phase is also performed), calculates, based on this determination, a log-likelihood ratio (LLR) for each bit included in a data symbol from the post-filter baseband signal and estimated signal, and outputs the log-likelihood ratios. (However, instead of a soft decision value such as an LLR a hard decision value may be outputted, and a soft decision value may be outputted instead of an LLR)

The de-interleaver 1908 receives log-likelihood ratios as input, accumulates input, performs de-interleaving (permutes data) corresponding to interleaving used by the transmit apparatus, and outputs a post-de-interleaving log-likelihood ratio.

The error correction decoder 1912 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method.

The above describes operation when iterative detection is not performed. The following is supplemental description of operation when iterative detection is performed. Note that a receive apparatus need not implement iterative detection, and a receive apparatus may be a receive apparatus that performs initial detection and error detection decoding without being provided with elements related to iterative detection that are described below.

When iterative detection is performed, the error correction decoder 1912 outputs a log-likelihood ratio for each post-decoding bit. (Note that when only initial detection is performed, output of a log-likelihood ratio for each post decoding bit is not necessary.)

The interleaver 1910 interleaves log-likelihood ratios for post-decoding bits (performs permutation), and outputs a post-interleaving log-likelihood ratio.

The de-mapper 1906 performs iterative detection by using post-interleaving log-likelihood ratios, a post-filter baseband signal, and an estimated signal, and outputs log-likelihood ratios for post-iterative detection bits.

Subsequently, interleaving and error correction code operations are performed. Thus, these operations are iteratively performed. In this way, finally the possibility of achieving a preferable decoding result is increased.

In the above description, a feature thereof is that by a reception apparatus obtaining a symbol for transmitting a modulation scheme of a transmission mode of "transmission mode/slot information" of a "TMCC information symbol group" and a symbol for transmitting a coding rate of a transmission mode of "transmission mode/slot information" of a "TMCC information symbol group", a modulation scheme, coding rate of error detection coding, and, when a modulation scheme is 16APSK, 32APSK, ring ratios and radii/phases are estimated and demodulation and decoding operations become possible.

The above describes frame configuration of FIG. 18, but frame configurations applicable to the present invention are not limited to the above description. When a plurality of data symbols exist, a symbol for transmitting information related to a modulation scheme used in generating the plurality of data symbols, and a symbol for transmitting information related to an error correction scheme (for example, error correction code used, code length of error correction code, coding rate of error correction code, etc.) exist, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

In addition, as a method different to that described above, a symbol transmitting information related to ring ratios and radii/phases may exist, and the transmit apparatus may transmit the symbol. An example of a symbol transmitting information related to ring ratios and radii/phases is illustrated below.

TABLE 21

Examples of symbol transmitting information related to ring ratios and radii/phases

| Value | Assignment |
|---|---|
| 00000 | (12,4)16APSK ring ratio 4.00 |
| 00001 | (12,4)16APSK ring ratio 4.10 |
| 00010 | (12,4)16APSK ring ratio 4.20 |
| 00011 | (12,4)16APSK ring ratio 4.30 |
| 00100 | (4,8,4)16APSK $R_1 = 1.00, R_2 = 2.00, R_3 = 2.20, \lambda = \pi/12$ |

TABLE 21-continued

Examples of symbol transmitting information related to ring ratios and radii/phases

| Value | Assignment |
|---|---|
| 00101 | (4,8,4)16APSK $R_1 = 1.00, R_2 = 2.10, R_3 = 2.20, \lambda = \pi/12$ |
| 00110 | (4,8,4)16APSK $R_1 = 1.00, R_2 = 2.20, R_3 = 2.30, \lambda = \pi/10$ |
| 00111 | (4,8,4)16APSK $R_1 = 1.00, R_2 = 2.20, R_3 = 2.30, \lambda = \pi/12$ |
| ... | ... |
| 11111 | ... |

In Table 21, when [00000] is transmitted by a symbol transmitting information related to ring ratio and radii/phase, a data symbol is a symbol of "(12,4)16APSK ring ratio 4.00".

Further, the following is true.

When [00001] is transmitted by a symbol transmitting information related to ring ratio and radii/phase, a data symbol is a symbol of "(12,4)16APSK ring ratio 4.10".

When [00010] is transmitted by a symbol transmitting information related to ring ratio and radii/phase, a data symbol is a symbol of "(12,4)16APSK ring ratio 4.20".

When [00011] is transmitted by a symbol transmitting information related to ring ratio and radii/phase, a data symbol is a symbol of "(12,4)16APSK ring ratio 4.30".

When [00100] is transmitted by a symbol transmitting information related to ring ratio and radii/phase, a data symbol is a symbol of "(4,8,4)16APSK $R_1$=1.00, $R_2$=2.00, $R_3$=2.20, $\lambda$=$\pi$/12".

When [00101] is transmitted by a symbol transmitting information related to ring ratio and radii/phase, a data symbol is a symbol of "(4,8,4)16APSK $R_1$=1.00, $R_2$=2.10, $R_3$=2.20, $\lambda$=$\pi$/12".

When [00110] is transmitted by a symbol transmitting information related to ring ratio and radii/phase, a data symbol is a symbol of "(4,8,4)16APSK $R_1$=1.00, $R_2$=2.20, $R_3$=2.30, $\lambda$=$\pi$/10".

When [00111] is transmitted by a symbol transmitting information related to ring ratio and radii/phase, a data symbol is a symbol of "(4,8,4)16APSK $R_1$=1.00, $R_2$=2.20, $R_3$=2.30, $\lambda$=$\pi$/12".

Thus, by obtaining a symbol transmitting information related to ring ratio and radii/phases, a receive apparatus can estimate a ring ratio and radii/phases used by a data symbol, and therefore demodulation and decoding of the data symbol becomes possible.

Further, ring ratio and radii/phases information may be included in a symbol for transmitting a modulation scheme. An example is illustrated below.

TABLE 22

Modulation scheme information

| Value | Assignment |
|---|---|
| 00000 | (12,4)16APSK ring ratio 4.00 |
| 00001 | (12,4)16APSK ring ratio 4.10 |
| 00010 | (12,4)16APSK ring ratio 4.20 |
| 00011 | (12,4)16APSK ring ratio 4.30 |
| 00100 | (4,8,4)16APSK $R_1 = 1.00, R_2 = 2.00, R_3 = 2.20, \lambda = \pi/12$ |
| 00101 | (4,8,4)16APSK $R_1 = 1.00, R_2 = 2.10, R_3 = 2.20, \lambda = \pi/12$ |
| 00110 | (4,8,4)16APSK $R_1 = 1.00, R_2 = 2.20, R_3 = 2.30, \lambda = \pi/10$ |
| 00111 | (4,8,4)16APSK $R_1 = 1.00, R_2 = 2.20, R_3 = 2.30, \lambda = \pi/12$ |
| ... | ... |
| 11101 | 8PSK |
| 11110 | QPSK |
| 11111 | $\pi$/2 shift BPSK |

In Table 22, when [00000] is transmitted by a symbol transmitting modulation scheme information, a data symbol is a symbol of "(12,4)16APSK ring ratio 4.00".

Further, the following is true.

When [00001] is transmitted by a symbol transmitting modulation scheme information, a data symbol is a symbol of "(12,4)16APSK ring ratio 4.10".

When [00010] is transmitted by a symbol transmitting modulation scheme information, a data symbol is a symbol of "(12,4)16APSK ring ratio 4.20".

When [00011] is transmitted by a symbol transmitting modulation scheme information, a data symbol is a symbol of "(12,4)16APSK ring ratio 4.30".

When [00100] is transmitted by a symbol transmitting modulation scheme information, a data symbol is a symbol of "(4,8,4)16APSK $R_1$=1.00, $R_2$=2.00, $R_3$=2.20, $\lambda$=$\pi$/12".

When [00101] is transmitted by a symbol transmitting modulation scheme information, a data symbol is a symbol of "(4,8,4)16APSK $R_1$=1.00, $R_2$=2.10, $R_3$=2.20, $\lambda$=$\pi$/12".

When [00110] is transmitted by a symbol transmitting modulation scheme information, a data symbol is a symbol of "(4,8,4)16APSK $R_1$=1.00, $R_2$=2.20, $R_3$=2.30, $\lambda$=$\pi$/10".

When [00111] is transmitted by a symbol transmitting modulation scheme information, a data symbol is a symbol of "(4,8,4)16APSK $R_1$=1.00, $R_2$=2.20, $R_3$=2.30, $\lambda$=$\pi$/12".

When [11101] is transmitted by a symbol transmitting modulation scheme information, a data symbol is a symbol of "8PSK".

When [11110] is transmitted by a symbol transmitting modulation scheme information, a data symbol is a symbol of "QPSK".

When [11111] is transmitted by a symbol transmitting modulation scheme information, a data symbol is a symbol of "$\pi$/2 shift BPSK".

Thus, by obtaining a symbol transmitting modulation scheme information, a receive apparatus can estimate a modulation scheme, ring ratio, radii, and phases used by a data symbol, and therefore demodulation and decoding of the data symbol becomes possible.

Note that in the above description, examples are described including "(12,4)16APSK" and "(4,8,4)16APSK" as selectable modulation schemes (transmission methods), but modulation schemes (transmission methods) are not limited to these examples. In other words, other modulation schemes may be selectable.

In embodiment 12, transmission of control information is described in a case in which two different mapping patterns, "(12,4)16APSK" and "(4,8,4)16APSK", are selectable as 16APSK schemes transmitting four bits of data in one symbol. This may be re-stated as:

"A method comprising: generating a data symbol by using a modulation scheme selected from a plurality of modulation schemes including a first modulation scheme and a second modulation scheme; and transmitting the generated data symbol and control information indicating the selected modulation scheme, wherein:

(i) mapping of the first modulation scheme and mapping of the second modulation scheme each have the same number of constellation points as each other, the number of constellation points being selected according to transmit data, and (ii) the number of constellation points in a series is different between the mapping of the first modulation scheme and the mapping of the second modulation scheme, the series being the number of constellation points arranged on a plurality of concentric circles having the origin of an in-phase (I)-quadrature-phase (Q) plane as the center thereof, from a circle having the largest radius (amplitude component) to a circle having the smallest radius."

Here, the number of constellation points selected according to transmit data is, for example, 16 in the case of "(12,4)16APSK" and 16 in the case of "(4,8,4)16APSK". In other words, the number of constellation points selected according to transmit data is 16 for both "(12,4)16APSK" and "(4,8,4)16APSK", and they satisfy condition (i).

Further, the number of constellation points arranged on a plurality of concentric circles having the origin of an in-phase (I)-quadrature-phase (Q) plane as the center thereof, from a circle having the largest radius (amplitude component) to a circle having the smallest radius is, for example, (12,4) in the case of "(12,4)16APSK", and (4,8,4) in the case of "(4,8,4)16APSK". Thus, the number of constellation points arranged on concentric circles having the origin of an in-phase (I)-quadrature-phase (Q) plane as the center thereof, from a circle having the largest radius (amplitude component) to a circle having the smallest radius is different between "(12,4)16APSK" and "(4,8,4)16APSK", satisfying condition (ii).

In embodiment 12, transmission of control information in a case in which two different mapping patterns, "(12,4)16APSK" and "(4,8,4)16APSK", are selectable as 16APSK schemes transmitting four bits of data in one symbol may further be re-stated as:

"A method comprising: generating a data symbol by using a modulation scheme selected from a plurality of modulation schemes including a first modulation scheme and a second modulation scheme; and transmitting the generated data symbol and control information indicating the selected modulation scheme, wherein:

(i) mapping of the first modulation scheme and mapping of the second modulation scheme each have the same number of constellation points as each other, the number of constellation points being selected according to transmit data, (ii) the number of constellation points in a series is different between the mapping of the first modulation scheme and the mapping of the second modulation scheme, the series being the number of constellation points arranged on a plurality of concentric circles having the origin of an in-phase (I)-quadrature-phase (Q) plane as the center thereof, from a circle having the largest radius (amplitude component) to a circle having the smallest radius, and ring ratios, which are ratios of radius (or diameter) of the plurality of concentric circles, of the first modulation scheme and the second modulation scheme are selectable, and the control information indicates a selected modulation scheme and ring ratio."

Note that in embodiment 12, "examples are described including "(12,4)16APSK" and "(4,8,4)16APSK" as selectable modulation schemes (transmission methods), but modulation schemes (transmission methods) are not limited to these examples. In other words, other modulation schemes may be selectable", is disclosed, and of course "(8,8)16APSK" described in embodiment 1 to embodiment 4 may be selected as one of the "other modulation schemes".

This is because, in embodiment 10 "embodiment 7 describes a method using NU-16QAM instead of (8,8) 16APSK as described in embodiment 1 to embodiment 4, and embodiment 8 describes a method using (4,8,4)16APSK instead of (8,8)16APSK as described in embodiment 1 to embodiment 4" is disclosed, and therefore it is clear that a modulation scheme can use "(8,8)16APSK" instead of "(4,8,4)16APSK".

Further, for "(8,8)16APSK", the number of constellation points selected according to transmit data is 16 and the number of constellation points arranged on a plurality of concentric circles having the origin of an in-phase (I)-quadrature-phase (Q) plane as the center thereof, from a circle having the largest radius (amplitude component) to a circle having the smallest radius is (8,8). In other words, selecting modulation schemes from "(8,8)16APSK" and "(12,4)16APSK" also satisfies the above conditions (i) and (ii).

In embodiment 12, when "(8,8)16APSK" is used instead of "(4,8,4)16APSK", a table is used that replaces the modulation scheme assigned to value 0101 of Table 18 with "(8,8)16APSK". Further, for instance, Table 3 illustrated in embodiment 2 can be used instead of Table 20. Likewise, a table is used that replaces the ring ratio information assigned to values 00100 to 00111 in Table 21 with ring ratios of "(8,8)16APSK". Likewise, a table is used that replaces the ring ratio information assigned to values 00100 to 00111 in Table 22 with ring ratios of "(8,8)16APSK".

Thus, by obtaining a symbol transmitting modulation scheme information, a receive apparatus can estimate a modulation scheme and ring ratio used by a data symbol, and therefore demodulation and decoding of the data symbol becomes possible.

As above, embodiment 12 may be implemented with "(12,4)16APSK" and "(8,8)16APSK" as selectable modulation schemes (transmission methods). Thus, for example, according to linearity (distortion, PAPR, etc.) of a power amplifier used by a transmit apparatus, a more appropriate modulation scheme and ring ratio can be selected, and thereby the likelihood is increased of achieving a reduction in power consumption of the transmit apparatus and an increase in data reception quality of a receive apparatus.

When multicast (broadcast) transmission is used by a satellite, the distance between the satellite and a terminal is far, and therefore when the satellite transmits a modulated signal, the modulated signal is transmitted at high power and use of a power amplifier having high linearity is difficult. In order to ameliorate this problem, high power efficiency can be achieved in a power amplifier of a transmit apparatus by use of APSK that has a lower peak to average power ratio (PAPR) than quadrature amplitude modulation (QAM), and therefore power consumption of the transmit apparatus can be improved. Further, as technology advances, the likelihood of linearity of transmit power amplifiers improving is high. When a power amplifier included in a transmit apparatus mounted on a satellite is exchanged due to maintenance, etc., an increase in linearity of the transmit power amplifier is a possibility. Taking this into consideration, configuring a transmit apparatus so that (12,4)16APSK and (8,8)16APSK ((4,8,4)16APSK) are selectable and ring ratio can be set has the advantage of increasing the likelihood that both a reduction in power consumption of the transmit apparatus and an increase in data reception quality of a receive apparatus can be achieved.

Thus, a receive apparatus of a terminal that receives a modulated signal transmitted from a satellite can estimate data included in the modulated signal by receiving control information transmitted as in the above tables (modulation scheme information, coding rate of error correction code, ring ratio, etc.) and setting demodulation (de-mapping) and decoding (decoding of error correction code).

INDUSTRIAL APPLICABILITY

The transmit apparatus pertaining to the present invention is applicable to communication/broadcast systems having high error correction capability error correction code, and can contribute to improvement in data reception quality when iterative detection is performed at a receive apparatus side.

REFERENCE SIGNS LIST

200 transmit apparatus

The invention claimed is:

1. A transmitting apparatus comprising:
a mapper that, in operation, generates a symbol sequence from a bit sequence by using a first modulation scheme and a second modulation scheme, the symbol sequence being generated by alternating, in the symbol sequence, between (i) a symbol generated by using the first modulation scheme and (ii) a symbol generated by using the second modulation scheme, the first modulation scheme having a same number of constellation points as the second modulation scheme; and
a transmitter that, in operation, transmits a modulated signal including the symbol sequence, wherein
in the first modulation scheme, a defined number of constellation points are arranged on each circumference of a plurality of concentric circles having different radii on an I-Q plane,
in the second modulation scheme, a defined number of constellation points are arranged on each circumference of a plurality of concentric circles having different radii on an I-Q plane, and
a sequence of numbers of constellation points on each circumference of the plurality of concentric circles according to the first modulation scheme, in order from the circle with the largest circumference, is different from a sequence of numbers of constellation points on each circumference of the plurality of concentric circles according to the second modulation scheme.

2. A transmitting method comprising:
generating a symbol sequence from a bit sequence by using a first modulation scheme and a second modulation scheme, the symbol sequence being generated by alternating, in the symbol sequence, between (i) a symbol generated by using the first modulation scheme and (ii) a symbol generated by using the second modulation scheme, the first modulation scheme having a same number of constellation points as the second modulation scheme; and
transmitting a modulated signal including the symbol sequence, wherein
in the first modulation scheme, a defined number of constellation points are arranged on each circumference of a plurality of concentric circles having different radii on an I-Q plane,
in the second modulation scheme, a defined number of constellation points are arranged on each circumference of a plurality of concentric circles having different radii on an I-Q plane, and
a sequence of numbers of constellation points on each circumference of the plurality of concentric circles according to the first modulation scheme, in order from the circle with the largest circumference, is different from a sequence of numbers of constellation points on each circumference of the plurality of concentric circles according to the second modulation scheme.

3. A receiving apparatus comprising:
a receiver that, in operation, receives a received signal obtained by receiving a modulated signal transmitted from a transmitting apparatus, the modulated signal including a symbol sequence generated from a bit sequence by using a first modulation scheme and a second modulation scheme, the symbol sequence being generated by alternating, in the symbol sequence, between (i) a symbol generated by using the first modulation scheme and (ii) a symbol generated by using the second modulation scheme, the first modulation scheme having a same number of constellation points as the second modulation scheme; and a demodulator that, in operation, demodulates the received signal by using a first demodulation scheme corresponding to the first modulation scheme and a second demodulation scheme corresponding to the second modulation scheme, wherein in the first modulation scheme, a defined number of constellation points are arranged on each circumference of a plurality of concentric circles having different radii on an I-Q plane, in the second modulation scheme, a defined number of constellation points are arranged on each circumference of a plurality of concentric circles having different radii on an I-Q plane, and a sequence of numbers of constellation points on each circumference of the plurality of concentric circles according to the first modulation scheme, in order from the circle with the largest circumference, is different from a sequence of numbers of constellation points on each circumference of the plurality of concentric circles according to the second modulation scheme.

4. A receiving method comprising:

receiving a received signal obtained by receiving a modulated signal transmitted from a transmitting apparatus, the modulated signal including a symbol sequence generated from a bit sequence by using a first modulation scheme and a second modulation scheme, the symbol sequence being generated by alternating, in the symbol sequence, between (i) a symbol generated by using the first modulation scheme and (ii) a symbol generated by using the second modulation scheme, the first modulation scheme having a same number of constellation points as the second modulation scheme; and demodulating the received signal by using a first demodulation scheme corresponding to the first modulation scheme and a second demodulation scheme corresponding to the second modulation scheme, wherein in the first modulation scheme, a defined number of constellation points are arranged on each circumference of a plurality of concentric circles having different radii on an I-Q plane, in the second modulation scheme, a defined number of constellation points are arranged on each circumference of a plurality of concentric circles having different radii on an I-Q plane, and a sequence of numbers of constellation points on each circumference of the plurality of concentric circles according to the first modulation scheme, in order from the circle with the largest circumference, is different from a sequence of numbers of constellation points on each circumference of the plurality of concentric circles according to the second modulation scheme.

* * * * *